US008935279B2

(12) United States Patent
Skeen et al.

(10) Patent No.: US 8,935,279 B2
(45) Date of Patent: *Jan. 13, 2015

(54) VENUE-RELATED MULTI-MEDIA MANAGEMENT, STREAMING, ONLINE TICKETING, AND ELECTRONIC COMMERCE TECHNIQUES IMPLEMENTED VIA COMPUTER NETWORKS AND MOBILE DEVICES

(71) Applicant: Opus Deli, Inc., Emeryville, CA (US)

(72) Inventors: Wayne Donald Maddock Skeen, Berkeley, CA (US); Christopher Thomas Ross, Berkeley, CA (US); Howard Gregg Cockrill, Oakland, CA (US); Sara Anne Mertz, Berkeley, CA (US); Matthew Paul Smith, Berkeley, CA (US); David Mendel Mayeri, Orinda, CA (US)

(73) Assignee: Opus Deli, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/281,459

(22) Filed: May 19, 2014

(65) Prior Publication Data

US 2014/0344294 A1 Nov. 20, 2014

Related U.S. Application Data

(63) Continuation-in-part of application No. 13/517,505, filed on Jun. 13, 2012, now Pat. No. 8,732,193, and a (Continued)

(51) Int. Cl.
*G06F 17/30* (2006.01)
*G06F 17/00* (2006.01)

(52) U.S. Cl.
CPC ................... *G06F 17/30749* (2013.01)
USPC ............................ 707/769; 707/754; 709/203

(58) Field of Classification Search
CPC .................... G06F 17/30699; Y10S 707/99933
USPC ................... 707/736, 754, 769, 805; 709/203
See application file for complete search history.

(56) References Cited

U.S. PATENT DOCUMENTS

| 6,925,458 B2 | 8/2005 | Scaturro et al. |
| 7,693,978 B2 | 4/2010 | Eliason et al. |

(Continued)

OTHER PUBLICATIONS

PCT International Search Report, PCT Application No. PCT/US2012/042306, International Filing Date Jun. 13, 2012, Search report mailed Dec. 18, 2012.

(Continued)

*Primary Examiner* — Cheryl Lewis
(74) *Attorney, Agent, or Firm* — EcoTech Law Group, P.C.; Dean E. Wolf, Esq.

(57) ABSTRACT

Various aspects described or referenced herein are directed to different methods, systems, and computer program products relating to multi-media management and streaming techniques implemented over a computer network, including, for example, one or more features and/or functions relation to one or more of the following (or combinations thereof): venue-based streaming radio stations, mobile user graphical user interfaces, creation and streaming of dynamic streaming radio stations based on a user's geolocation, ticketing and reservations, etc.

20 Claims, 61 Drawing Sheets

Related U.S. Application Data continuation-in-part of application No. 13/844,672, filed on Mar. 15, 2013, now Pat. No. 8,732,195, and a continuation-in-part of application No. 13/517,505, and a continuation-in-part of application No. 13/844,656, filed on Mar. 15, 2013, now Pat. No. 8,856,170, and a continuation-in-part of application No. 13/517,505, and a continuation-in-part of application No. PCT/US2013/064735, filed on Oct. 12, 2013, which is a continuation-in-part of application No. 13/873,204, filed on Apr. 29, 2013, now Pat. No. 8,700,659, and a continuation-in-part of application No. 13/844,656, and a continuation-in-part of application No. 13/844,672.

(60) Provisional application No. 61/639,870, filed on Apr. 28, 2012, provisional application No. 61/496,452, filed on Jun. 13, 2011, provisional application No. 61/713,582, filed on Oct. 14, 2012, provisional application No. 61/713,580, filed on Oct. 14, 2012, provisional application No. 61/826,990, filed on May 23, 2013.

(56) References Cited

U.S. PATENT DOCUMENTS

| | | |
|---|---|---|
| 7,720,871 B2 | 5/2010 | Rogers et al. |
| 8,392,206 B2 | 3/2013 | Parekh et al. |
| 8,487,173 B2 | 7/2013 | Emmerson |
| 8,655,692 B2 | 2/2014 | Junkin |
| 8,700,659 B2 | 4/2014 | Skeen et al. |
| 8,732,193 B2 | 5/2014 | Skeen et al. |
| 8,732,195 B2 | 5/2014 | Skeen et al. |
| 2003/0076963 A1 | 4/2003 | Wells |
| 2004/0093325 A1 | 5/2004 | Banerjee et al. |
| 2007/0022055 A1 | 1/2007 | Eliason et al. |
| 2007/0156664 A1 | 7/2007 | Norton et al. |
| 2008/0104627 A1 | 5/2008 | Avedissian |
| 2008/0133593 A1 | 6/2008 | Clark |
| 2009/0144244 A1 | 6/2009 | Maghoul et al. |
| 2012/0047077 A1 | 2/2012 | Humphrey |
| 2012/0239526 A1 | 9/2012 | Revare |
| 2012/0330697 A1 | 12/2012 | Smith et al. |
| 2014/0032325 A1 | 1/2014 | Weiss et al. |
| 2014/0046775 A1 | 2/2014 | Harb |

OTHER PUBLICATIONS

PCT Written Opinion, Application No. PCT/US2012/042306, Int'l Filing date Jun. 13, 2012, Written Opinion dated Dec. 10, 2012.
Apple Computers (apple store), "iTunes Radio", www.apple.com/itunes/itunes-radio, pp. 1-8, printed Aug. 12, 2013.
Roger Zimmermann, Elaine Chew, Sakire Arsian, and Moses Pawar (University of Southern California), "Distributed Musical Performances: Architecture and Stream Management", ACM Transactions on Multimedia Computing, Communications and Application, vol. 4, No. 2, May 2008, pp. 1-23.
Yves Raimond, Christopher Sutton, and Mark Sandler, "The Many Faces of Semantics: Interlinking Music-Related Data on the Web", IEEE, 2009, pp. 1-12.
Alain B. Renaud, Alexander Vorot, and Pedro Rebelo, "Networked Music Performance: State of the Art", AES $30^{th}$ International Conference, Saariselka, Finland, Mar. 15-17, 2007, pp. 1-7.
www.8Tracks.com, website printout, printed Jun. 20, 2012.
www.artistgrowth.com, website printout, Jun. 20, 2012.
www.bandcamp.com, website printout, Jun. 20, 2012.
www.bandsintown.com, website printout, Jun. 20, 2012.
www.earbits.com, website printout, Jun. 20, 2012.
www.grooveshark.com website printout, Jun. 20, 2012.
www.iheart.com, website printout, Jun. 20, 2012.
www.jango.com, website printout, Jun. 20, 2012.
www.last.fm, website printout Jun. 20, 2012.
https://apps.facebook.com/concertcalendar/#_=_, website printout Jun. 20, 2012.
https://mog.com, website printout Jun. 20, 2012.
www.myspace.com, website printout Jun. 20, 2012.
www.pandora.com, website printout Jun. 20, 2012.
www.rdio.com, website printout Jun. 20, 2012.
www.reverbnation.com, website printout Jun. 20, 2012.
www.slacker.com, website printout Jun. 20, 2012.
www.getsongbird.com, website printout Jun. 20, 2012.
www.songza.com, website printout Jun. 20, 2012.
www.soundcloud.com, website printout Jun. 20, 2012.
www.spotify.com/us/desktop-splash/?utm_source=spotify&utm_medium=web&utm_campaign=start, website printout Jun. 20, 2012.
www.turntable.fm, website printout Jun. 20, 2012.
PCT International Search Report, PCT Application No. PCT/US2013/064735, International Filing Date Oct. 12, 2013, Search report mailed Aug. 4, 2014.
Melissa Silvers: "Startups' Missed Connections", http://web.archive.org/web/20120911153847/http://www.fastcompany.com/3001100/startups-missed-connections, Sep. 11, 2012, pp. 1-5. Retrieved on Jul. 21, 2014, printed on Oct. 20, 2014.

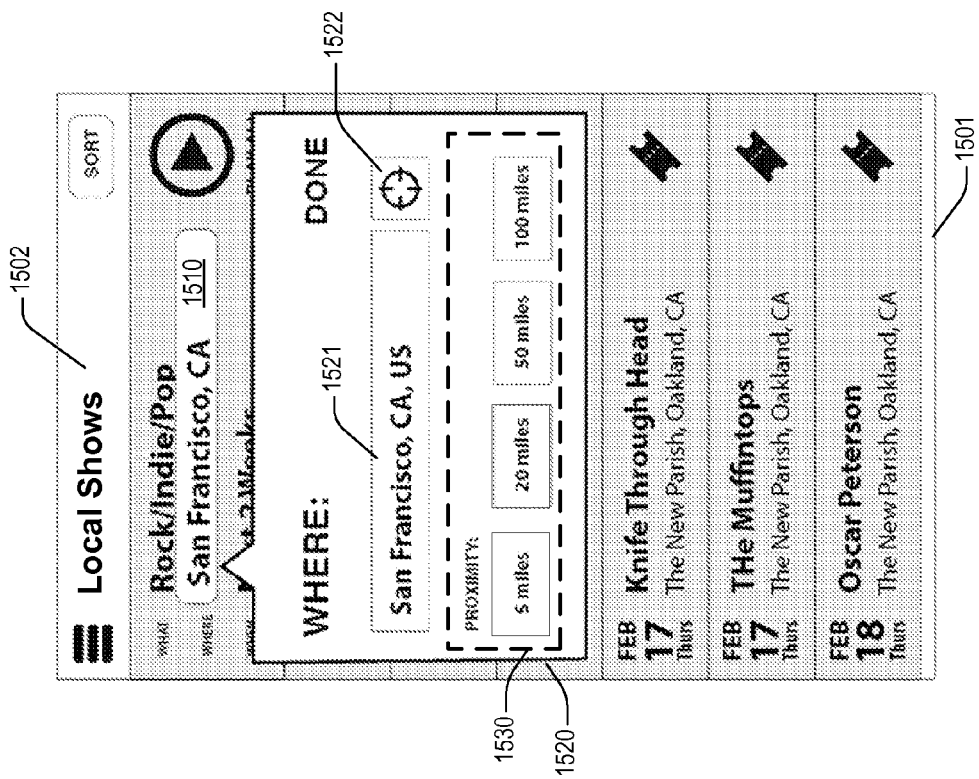
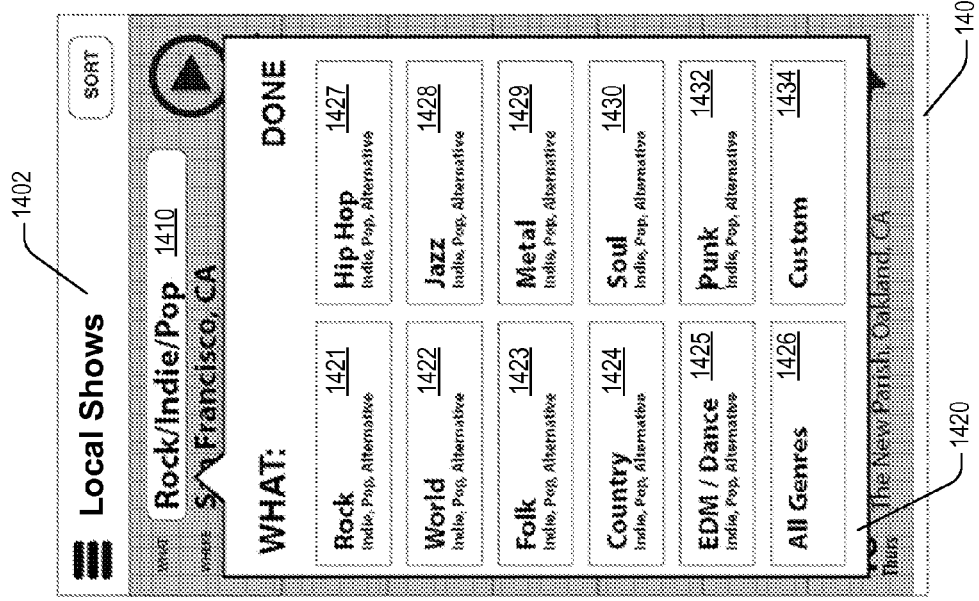
Fig. 15
Fig. 14

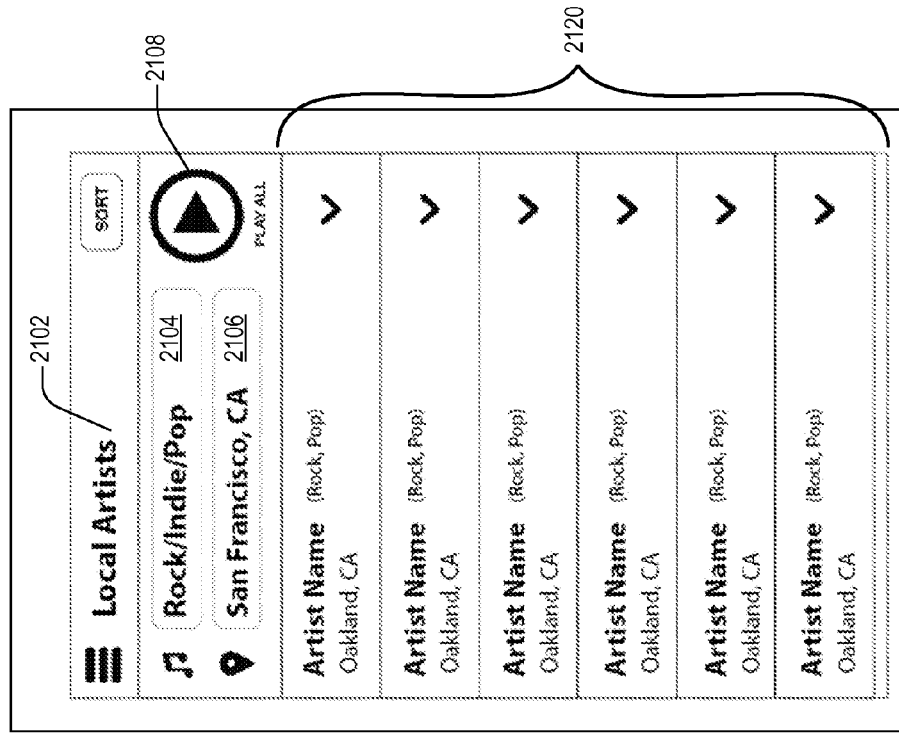
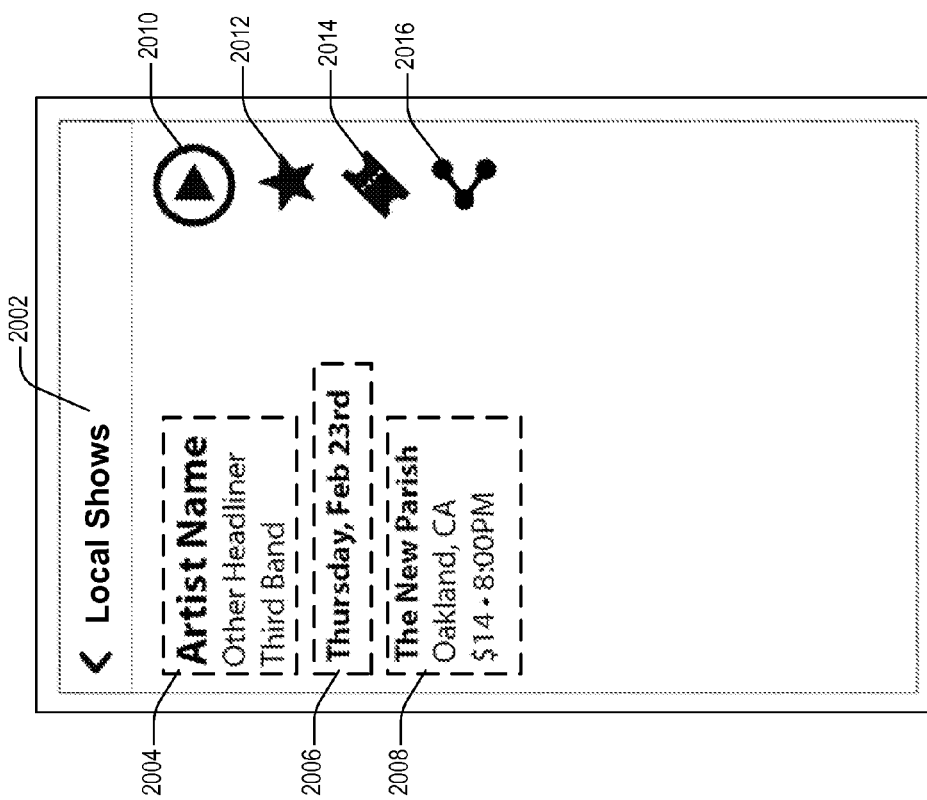
Fig. 21
Fig. 20

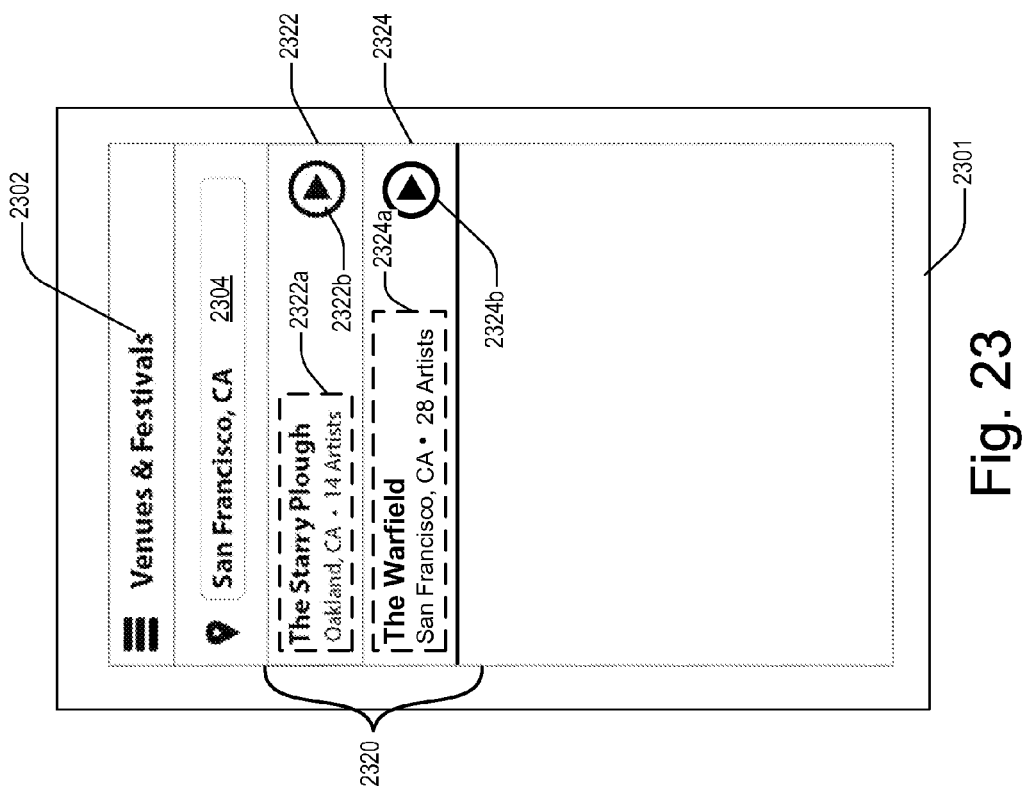
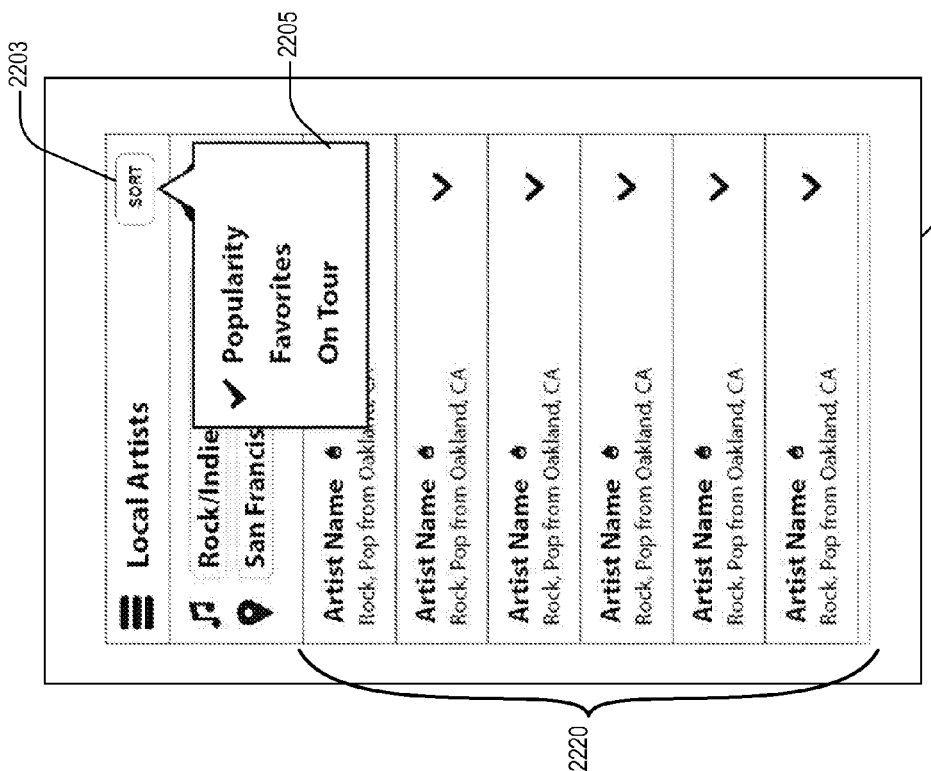
Fig. 23
Fig. 22

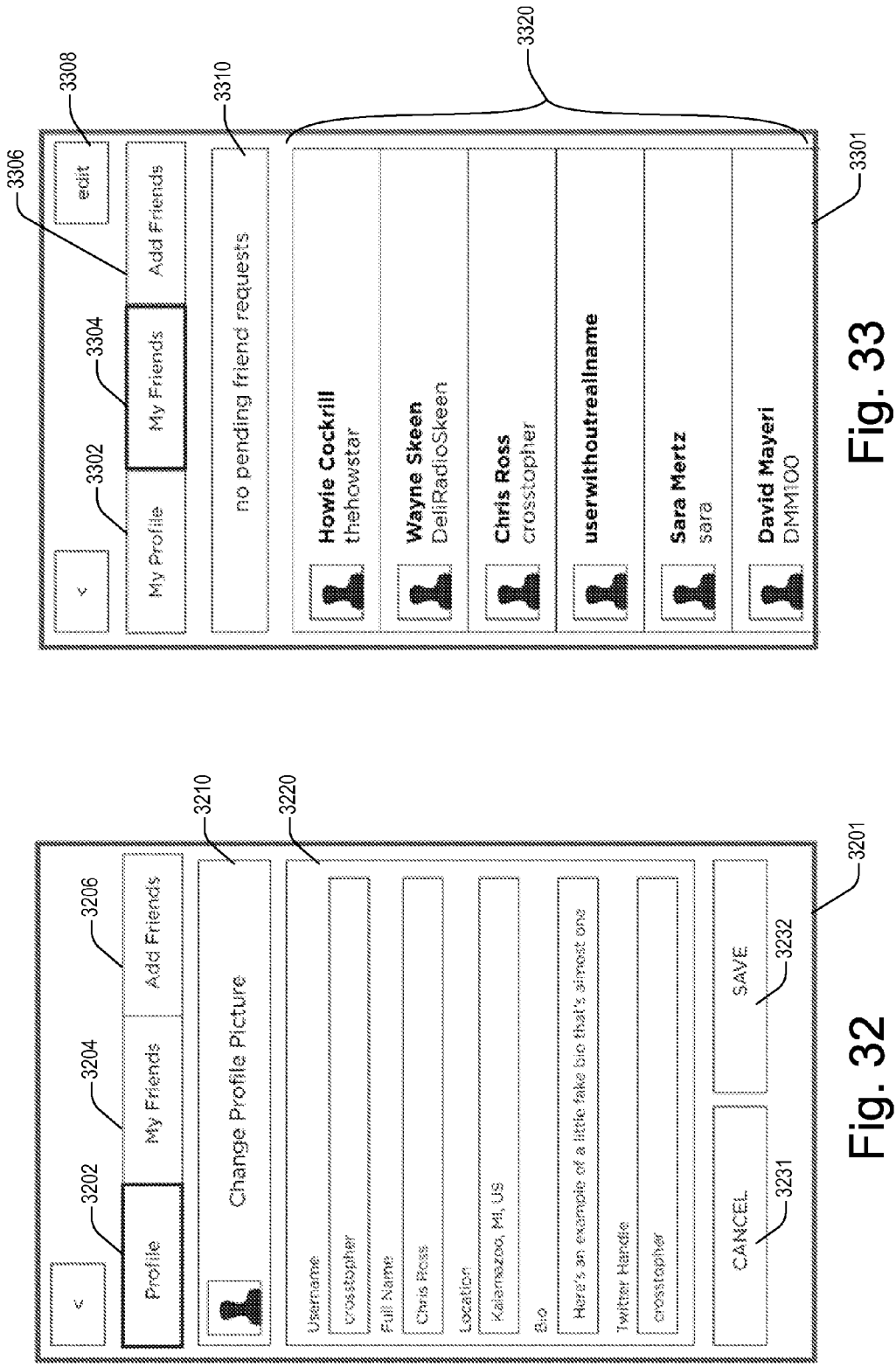

```
<!--   Begin DeliRadio BandScanner Code   -->
<script src=" http://ajax.googleapis.com/ajax/libs/jquery/1.8.0/jquery.min.js "></script>
<script src=" http://deliradio-net.s3.amazonaws.com/DeliRadio.bandscanner.current.js "></script>
<script type="text/javascript">
    $(document).ready(function () {
        $ ('td').DRBandScanner();
    });
</script>
<!--   End DeliRadio BandScanner Code   -->
```

Fig. 50A

```
<script src=" http://deliradio-net.s3.amazonaws.com/DeliRadio.bandscanner.current.js"></script>

(function ($) {
    $.fn.DRBandScanner = function (options) {
        var elements = this;
        var init = function (options) {
            var appendStringTpl = '<{appendTag} class="deli-link" style="padding-left: 5px; padding-top:
0px; margin: 0px; text-indent:-9999px; position: relative; top: 3px;"><a href={link} target=blank
><img src="http://deliradio.net/i/c/cp1.png" width="14" height="14" border="0"/></a></{appendTag}>';
            var settings = $.extend({
                'data': buildData(),
                'appendT ag': 'span',
                'template' : appendStringTpl,
                'success': onSuccess
            }, options);
            appendStringTpl = appendStringTpl.replace('{appendTag}', settings.appendTag);
            function buildData() {
                var data = elements.map(function () {
                    var text = $(this).text();
                    if(text.match(/^[\w\d\ \'\ \"]+$/))
                        return text;
                });
                var obj = {
                    artists :      $.makeArray(data)
                };

return $.param(obj);
            }
            function buildAppendString(artistLink) {
                return appendStringTpl.replace('{link}', artistLink);
            }
            function onSuccess(data, textStatus) {
                elements.each(function (index, element) {
                    element = $(element);
                    artist = data[element.text()];
                    if (artist) {
                        var link = " http://deliradio.com/player?play=band&id={artistId}&startTrack=undefined&band
                        search=undefined&utm_source=DRNET&utm_medium=BUTTON
                        ".replace("{artistId}", artist.id);    element.append(buildAppendString(link));
                        $(".deli-link > a", element).click(function (event) {
                            window.open(this.href,'_blank','    width=300,height=700,location=1');
                            event.stopPropagation();
                            return false;
                        });
                    }
                });
            }
            $.ajax({
                type:    'GET',
                url: ' http://deliradio.com/bands/play ',
                contentType: 'application/json',
                data: settings.data,
                jsonpCallback: 'wtf',
                dataType: 'jsonp',
                success: settings.success
            });
        };
        init(options);
    }
})(jQuery);
```

Fig. 50B  ↖─5050

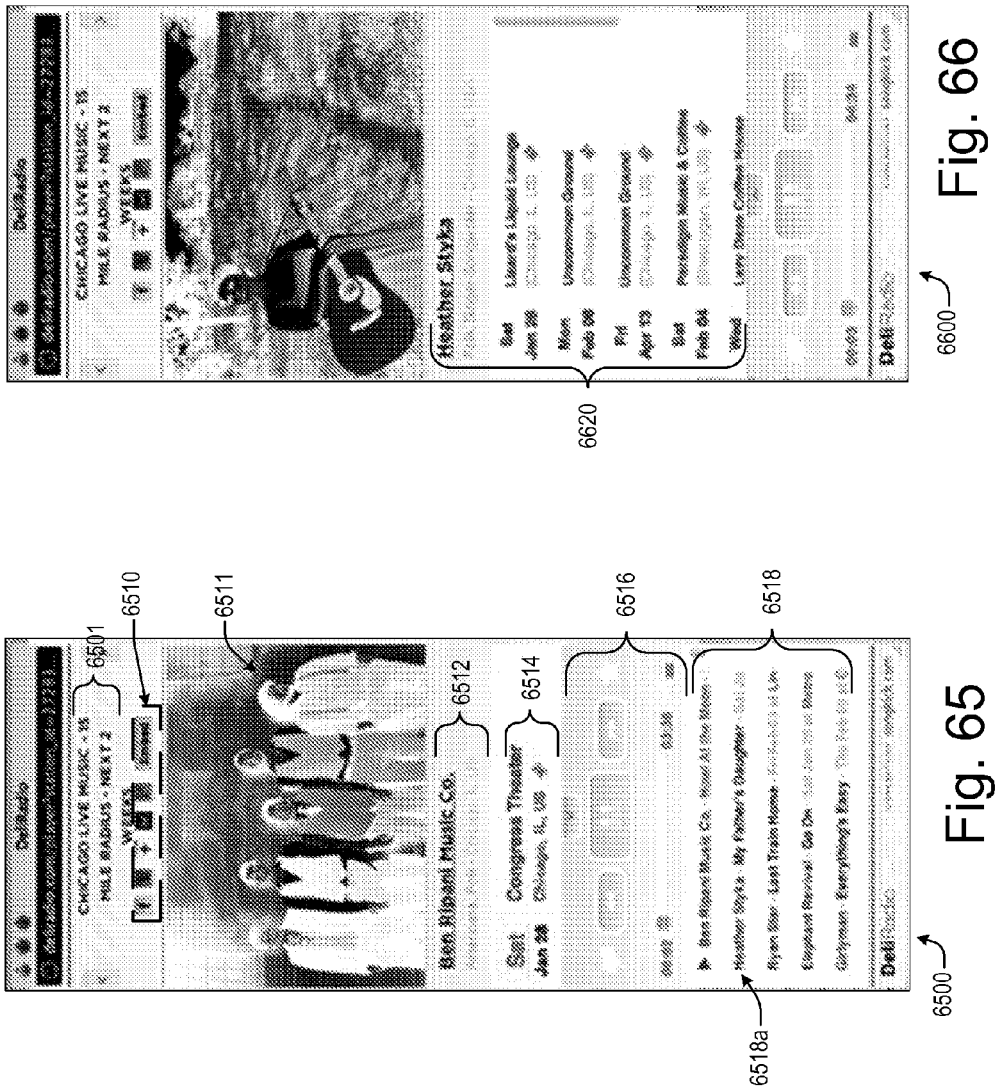

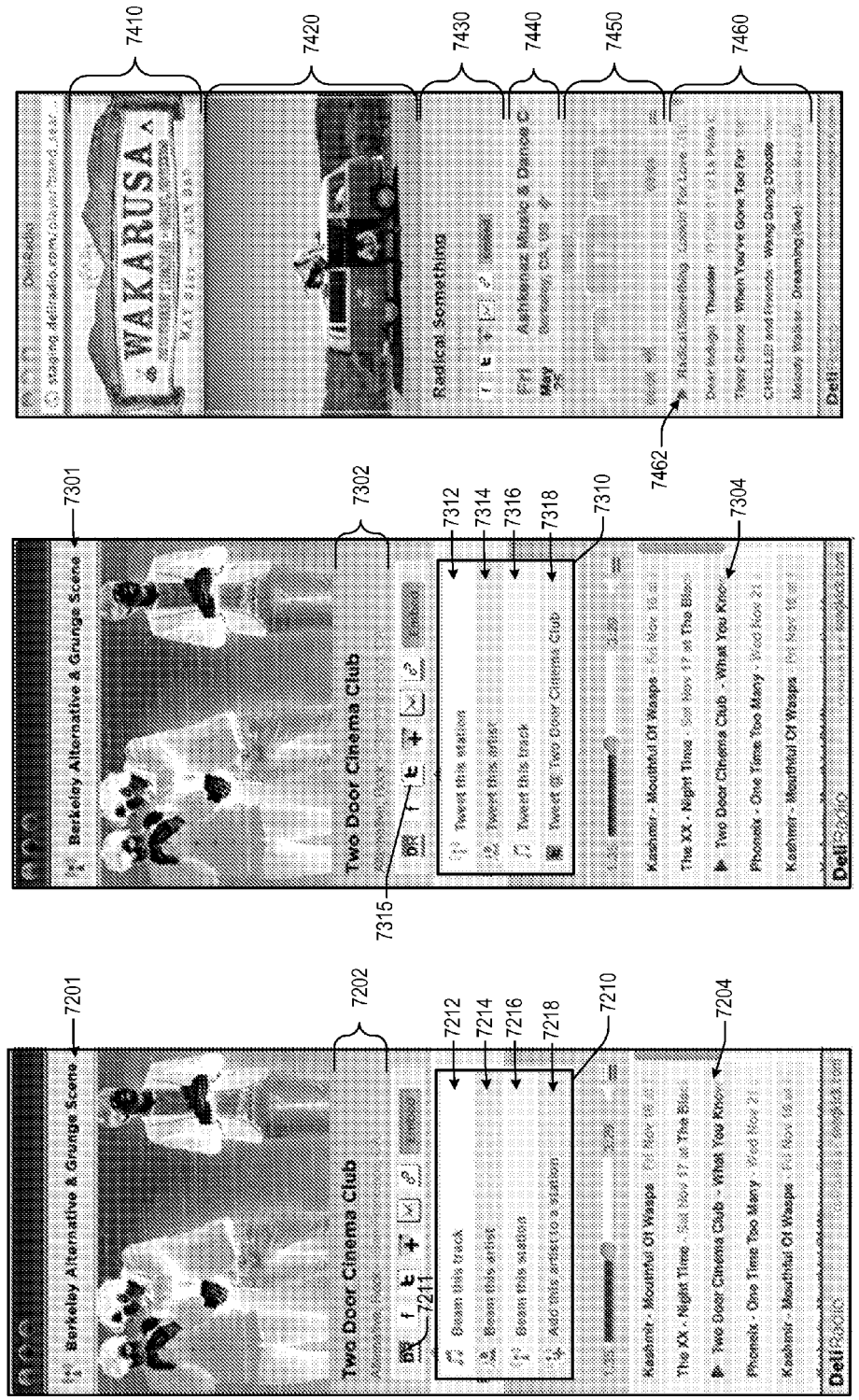

Fig. 80 — 8000

DR DeliRadio CONCERT NETWORK  [ADVANCED >]

Thousands of venues and festivals worldwide - *transformed into radio!*

DCN Stations near: Boulder, CO

▷ Fox Theatre Radio
Boulder, CO

| ⊙ Stick Figure | Reggae | Thu, Sep 19th |
| ⊙ John Brown's Body | Reggae | Thu, Sep 19th |
| ⊙ Baths | Electronic | Fri, Sep 20th |
| ⊙ PAPA | Rock, Soul | Tue, Sep 24th |
| ⊙ Radical Something | Hip Hop, Indie | Thu, Oct 3rd |
| ⊙ Head for the Hills | Folk, Americana | Sat, Oct 5th |
| ⊙ Les Claypool's Due De Twang | Country, Bluegrass | Thu, Oct 10th |
| ⊙ March Fourth Marching Band | Rock, World | Thu, Oct 17th |
| ⊙ Greensky Bluegrass | Bluegrass, Americana | Fri, Oct 25th |

VENUE-RELATED MULTI-MEDIA MANAGEMENT, STREAMING, ONLINE TICKETING, AND ELECTRONIC COMMERCE TECHNIQUES IMPLEMENTED VIA COMPUTER NETWORKS AND MOBILE DEVICES

RELATED APPLICATION DATA

This application is a continuation-in-part application, pursuant to the provisions of 35 U.S.C. §120, of prior U.S. patent application Ser. No. 13/517,505 (Published as U.S. Pat. No. 8,732,193) titled "MULTI-MEDIA MANAGEMENT AND STREAMING TECHNIQUES IMPLEMENTED OVER A COMPUTER NETWORK" naming SKEEN, et. al. as inventors, and filed 13 Jun. 2012, the entirety of which is incorporated herein by reference for all purposes. U.S. patent application Ser. No. 13/517,505 claims benefit, pursuant to the provisions of 35 U.S.C. §119, of U.S. Provisional Patent Application Ser. No. 61/639,870, titled "MULTI-MEDIA MANAGEMENT AND STREAMING TECHNIQUES IMPLEMENTED OVER A COMPUTER NETWORK", naming SKEEN, et. al. as inventors, and filed 28 Apr. 2012, the entirety of which is incorporated herein by reference for all purposes. U.S. patent application Ser. No. 13/517,505 also claims benefit, pursuant to the provisions of 35 U.S.C. §119, of U.S. Provisional Patent Application Ser. No. 61/496,452, titled "MULTI-MEDIA MANAGEMENT AND STREAMING TECHNIQUES IMPLEMENTED OVER A COMPUTER NETWORK", naming SKEEN, et. al. as inventors, and filed Jun. 13, 2011, the entirety of which is incorporated herein by reference for all purposes.

This application is a continuation-in-part application, pursuant to the provisions of 35 U.S.C. §120, of prior U.S. patent application Ser. No. 13/844,672, Published as U.S. Pat. No. 8,732,195) titled "MULTI-MEDIA MANAGEMENT, STREAMING, AND ELECTRONIC COMMERCE TECHNIQUES IMPLEMENTED OVER A COMPUTER NETWORK" naming SKEEN, et. al. as inventors, and filed 15 Mar. 2013, the entirety of which is incorporated herein by reference for all purposes. U.S. patent application Ser. No. 13/844,672 claims benefit, pursuant to the provisions of 35 U.S.C. §119, of U.S. Provisional Application Ser. No. 61/713,582, titled "MULTI-MEDIA MANAGEMENT, STREAMING, AND ELECTRONIC COMMERCE TECHNIQUES IMPLEMENTED OVER A COMPUTER NETWORK", naming Skeen et al. as inventors, and filed 14 Oct. 2012, the entirety of which is incorporated herein by reference for all purposes. U.S. patent application Ser. No. 13/844,672 is a continuation-in-part application, pursuant to the provisions of 35 U.S.C. §120, of prior U.S. patent application Ser. No. 13/517,505, titled "MULTI-MEDIA MANAGEMENT AND STREAMING TECHNIQUES IMPLEMENTED OVER A COMPUTER NETWORK", naming SKEEN, et. al. as inventors, and filed 13 Jun. 2012, the entirety of which is incorporated herein by reference for all purposes.

This application is a continuation-in-part application, pursuant to the provisions of 35 U.S.C. §120, of prior U.S. patent application Ser. No. 13/844,656 titled "BANDSCANNER, MULTI-MEDIA MANAGEMENT, STREAMING, AND ELECTRONIC COMMERCE TECHNIQUES IMPLEMENTED OVER A COMPUTER NETWORK" naming SKEEN, et. al. as inventors, and filed 15 Mar. 2013, the entirety of which is incorporated herein by reference for all purposes. U.S. patent application Ser. No. 13/844,656 claims benefit, pursuant to the provisions of 35 U.S.C. §119, of U.S. Provisional Application Ser. No. 61/713,580, titled "BANDSCANNER, MULTI-MEDIA MANAGEMENT, STREAMING, AND ELECTRONIC COMMERCE TECHNIQUES IMPLEMENTED OVER A COMPUTER NETWORK", naming Skeen et al. as inventors, and filed 14 OCT 2012, the entirety of which is incorporated herein by reference for all purposes. U.S. patent application Ser. No. 13/844,656 is a continuation-in-part application, pursuant to the provisions of 35 U.S.C. §120, of prior U.S. patent application Ser. No. 13/517,505, titled "MULTI-MEDIA MANAGEMENT AND STREAMING TECHNIQUES IMPLEMENTED OVER A COMPUTER NETWORK", naming SKEEN, et. al. as inventors, and filed 13 Jun. 2012, the entirety of which is incorporated herein by reference for all purposes.

The present application is a continuation-in-part application of pending International Patent Application No. PCT/US13/64735, titled "MULTI-MEDIA MANAGEMENT, STREAMING, AND ELECTRONIC COMMERCE TECHNIQUES IMPLEMENTED VIA COMPUTER NETWORKS AND MOBILE DEVICES", naming SKEEN, et al. as inventors, filed on 12 Oct. 2013, designating the United States, the entirety of which is incorporated herein by reference for all purposes. International Patent Application No. PCT/US13/64735 a continuation-in-part application of prior U.S. patent application Ser. No. 13/873,204 titled "VENUE-RELATED MULTI-MEDIA MANAGEMENT, STREAMING, AND ELECTRONIC COMMERCE TECHNIQUES IMPLEMENTED VIA COMPUTER NETWORKS AND MOBILE DEVICES" by Skeen et al., filed on 29 Apr. 2013, the entirety of which is incorporated herein by reference for all purposes. International Patent Application No. PCT/US13/64735 is a continuation-in-part application of prior U.S. patent application Ser. No. 13/844,656 titled "BANDSCANNER, MULTI-MEDIA MANAGEMENT, STREAMING, AND ELECTRONIC COMMERCE TECHNIQUES IMPLEMENTED OVER A COMPUTER NETWORK" by Skeen et al., filed on 15 Mar. 2013, the entirety of which is incorporated herein by reference for all purposes. International Patent Application No. PCT/US13/64735 is a continuation-in-part application of prior U.S. patent application Ser. No. 13/844,672 titled "MULTI-MEDIA MANAGEMENT, STREAMING, AND ELECTRONIC COMMERCE TECHNIQUES IMPLEMENTED OVER A COMPUTER NETWORK" by Skeen et al., filed on 15 Mar. 2013, the entirety of which is incorporated herein by reference for all purposes.

The present application claims benefit, pursuant to the provisions of 35 U.S.C. §119, of U.S. Provisional Application Ser. No. 61/826,990, titled "VENUE-BASED CONCERT NETWORK AND VENUE-RELATED MULTI-MEDIA MANAGEMENT, STREAMING, AND ELECTRONIC COMMERCE TECHNIQUES IMPLEMENTED VIA COMPUTER NETWORKS AND MOBILE DEVICES", naming SKEEN et al. as inventors, and filed 23 May 2013, the entirety of which is incorporated herein by reference for all purposes.

BACKGROUND

The present disclosure relates to network-based information searching and content delivery. More particularly, the present disclosure relates to multi-media management and streaming techniques implemented over a computer network.

BRIEF DESCRIPTION OF THE DRAWINGS

FIGS. 7A, 7B, 8A, 8B, 9-40, 41A, 41B, and 42-47 illustrate example screenshots of various graphical user interfaces (GUIs) which may be used to facilitate, initiate and/or perform various operation(s) and/or action(s) relating to one or more of the MMMS aspects disclosed or referenced herein.

FIGS. 48A, 48B, 49, 50A, and 50B illustrate example screenshots of various graphical user interfaces (GUIs) which may be used to facilitate, initiate and/or perform various BandScanner operation(s) and/or action(s) relating to one or more of the MMMS aspects disclosed or referenced herein.

FIGS. 53-62, 63, 63A, and 64-85 illustrate example screenshots of various graphical user interfaces (GUIs) which may be used to facilitate, initiate and/or perform various MMMS aspects disclosed or referenced herein.

DETAILED DESCRIPTION OF EXAMPLE EMBODIMENTS

Overview

Figure 1:
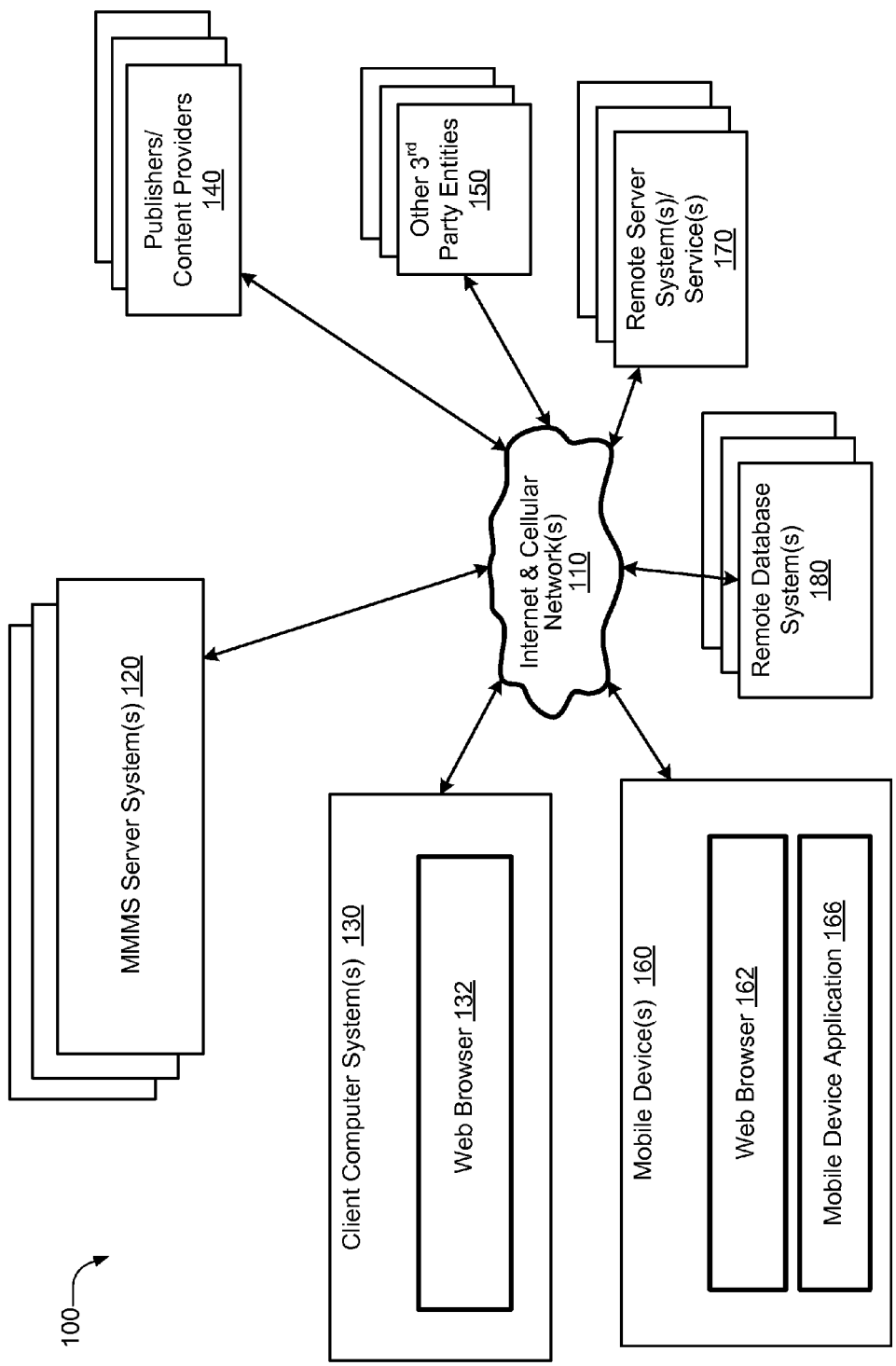
FIG. 1 illustrates a simplified block diagram of a specific example embodiment of a Multi-Media Management and Streaming (MMMS) System 100 which may be implemented in network portion 100.

Various aspects described or referenced herein are directed to different methods, systems, and computer program products relating to venue-related multi-media management, streaming, and electronic commerce techniques implemented via computer networks and mobile devices, including, for example, one or more features and/or functions relation to one or more of the following (or combinations thereof): venue-based streaming radio stations, mobile user graphical user interfaces, QuickPlay dynamic streaming radio stations based on a user's geolocation, etc.

One aspect disclosed herein is directed to different methods, systems, and computer program products for facilitating user access to streamed multimedia content via a computer network, the method comprising: determining a first set of filter criteria for use in performing a database search for music-related information matching the first set of filter criteria, wherein the first set of filter criteria includes first venue filter criteria specifying a first venue; identifying a first set of artists or bands ("artists/bands") that are scheduled to perform in at least one live music performance at the first venue; performing, using the first set of artists/bands, a database search of at least one database for songs or tracks ("songs/tracks") which are performed by or recorded by at least one of the artists/bands of the first set of artists/bands; identifying a first set of songs/tracks from the at least one database which are performed by or recorded by at least one of the artists/bands of the first set of artists/bands; and; dynamically creating, using the first set of songs/tracks, a first venue-related streaming media station, wherein the first venue-related streaming media station is configured to stream songs/tracks from the first set of songs/tracks to a first user's electronic device for audio presentation at the first user's electronic device.

In at least one embodiment, various method(s), system(s) and/or computer program product(s) may be operable for: receiving a first set of input from the first user, the first set of input including the first venue filter criteria, and including genre criteria specifying a first genre; identifying, using the first genre criteria, a filtered set of songs/tracks from the at least one database which match the first genre criteria and which are performed by or recorded by at least one of the artists/bands of the first set of artists/bands; dynamically creating, using the filtered set of songs/tracks, a filtered venue-related streaming media station, wherein the filtered venue-related streaming media station is configured to stream songs/tracks from the filtered set of songs/tracks to the first user's electronic device; and; streaming, in response to the first request, songs/tracks from the filtered set of songs/tracks to the first user's electronic device.

In at least one embodiment, various method(s), system(s) and/or computer program product(s) may be operable for: receiving a first set of input from the first user, the first set of input including the first venue filter criteria, and including timeframe criteria specifying a first time interval; identifying a second set of artists or bands ("artists/bands") that are scheduled to perform in at least one live music performance at the first venue during the first time interval; and; performing, using the second set of artists/bands, a database search of at least one database for songs or tracks ("songs/tracks") which are performed by or recorded by at least one of the artists/bands of the second set of artists/bands; identifying a filtered set of songs/tracks from the at least one database which are performed by or recorded by at least one of the artists/bands of the second set of artists/bands; dynamically creating, using the filtered set of songs/tracks, a filtered venue-related streaming media station, wherein the filtered venue-related streaming media station is configured to stream songs/tracks from the filtered set of songs/tracks to the first user's electronic device; and; streaming, in response to the first request, songs/tracks from the filtered set of songs/tracks to the first user's electronic device.

Another aspect disclosed herein is directed to different methods, systems, and computer program products for facilitating user access to multimedia content via a computer network, the method comprising: determining a first set of filter criteria for use in performing a database search for music-related information matching the first set of filter criteria, wherein the first set of filter criteria includes search type criteria indicating that a search is to be performed for artists or bands matching the first set of filter criteria which have upcoming shows at the at least one venue; performing, using the first set of filter criteria, a database search of at least one database for music-related information matching the first set of filter criteria; identifying, using the first set of filter criteria, a first set of artists or bands matching the first set of filter criteria which have upcoming shows at the at least one venue; and; dynamically creating a streaming media station which is configured or designed to play songs performed by or recorded by the first set of artists or bands.

Yet another aspect disclosed herein is directed to different methods, systems, and computer program products for facilitating user access to streamed multimedia content via a first graphical user interface (GUI), the method comprising: presenting the first GUI at a first computer device of a first user; receiving, via the first GUI, a first set of input from the first user, the first set of input including first venue filter criteria specifying a first venue; receiving, via the first GUI, a first request from the first user to listen to a venue-related streaming media station which is configured to play songs or tracks ("songs/tracks") performed by or recorded by artists or bands ("artists/bands") that are scheduled to perform in at least one live music performance at the first venue; identifying a first set of artists or bands that are scheduled to perform in at least one live music performance at the first venue; performing, using the first set of artists/bands, a database search of at least one database for songs or tracks which are performed by or recorded by at least one of the artists/bands of the first set of artists/bands; identifying a first set of songs/tracks from the at least one database which are performed by or recorded by at least one of the artists/bands of the first set of artists/bands; and; dynamically creating, using the first set of songs/tracks, a first venue-related streaming media station, wherein the first venue-related streaming media station is configured to stream songs/tracks from the first set of songs/tracks to a first user's electronic device; and; streaming, in response to the first request, songs/tracks from the first set of songs/tracks to a first user's electronic device for playback at the first user's electronic device.

Other aspects disclosed herein are directed to different methods, systems, and computer program products for facilitating user access to multimedia content via a computer network. In at least one embodiment, various method(s), system(s) and/or computer program product(s) may be operable to: access a first portion of content associated with an Internet-based webpage; analyze the first portion of content for references to artist names or band names; identify a first set of artists/band names referenced in the first portion of content; search, using the first set of artist/band names, a first database for artist or band names which match at least one of the artist or band names in the first set of artist/band names; identify, from the first database, a first artist or band which matches at least one of the artist or band names in the first set of artists/band names; generate webpage modification instructions which include information relating to the first artist or band; cause, using the webpage modification instructions, modification of a second portion of content of the Internet-based webpage to thereby generate a modified second portion of content; wherein the modification of the second portion of content includes insertion of a first hyperlinked object into the second portion of content to thereby generate the modified second portion of content; configure the modified second portion of content for display at a client system in a manner such that, when a user clicks on the displayed first hyperlinked object, the client system is caused to access a first streaming media station from a remote server, and is caused to play the streaming media at the client system. In at least one embodiment, the first streaming media station is configured to stream music performed by the first artist or band.

Additional aspects disclosed herein is directed to different methods, systems, and computer program products providing ticketing reservation and purchasing functionality for enabling and/or facilitating users in performing activities/operations relating to reservation and/or purchasing of tickets to events such as live performances at one or more venues. For example, in at least one embodiment, the DeliRadio System may include a Ticketing Reservation/Purchase System ("TRPS") which, for example, may be configured or designed to automatically and/or dynamically identify event ticketing reservation/purchasing opportunities in advance of tickets going on sale to the public.

Various graphical user interfaces (GUIs) are described herein which may be used to facilitate, initiate and/or perform various operation(s) and/or action(s) relating event ticket reservations and purchasing operations implemented via a user's mobile device. According to specific embodiments, at least a portion of the content and functionality of ticked reservation and purchasing GUIs disclosed herein may be implemented at the DeliRadio System.

Additional objects, features and advantages of the various aspects described or referenced herein may become apparent from the following description of its preferred embodiments, which description may be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way. Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article. The functionality and/or the features of a device may be alternatively embodied by one or more other devices that are not explicitly described as having such functionality/features. Thus, other embodiments of one or more of the invention(s) need not include the device itself. Techniques and mechanisms described or reference herein will sometimes be described in singular form for clarity. However, it should be noted that particular embodiments include multiple iterations of a technique or multiple instantiations of a mechanism unless noted otherwise.

Various aspects described or referenced herein are directed to different methods, systems, and computer program products relating to multi-media management and streaming techniques implemented over a computer network. According to various embodiments disclosed herein, a Multi-Media Management and Streaming (MMMS) System may be configured or designed to provide online users with "location based" streaming radio functionality. Users from different geographic locations may access a variety of MMMS System GUIs to search for, create, and/or share customized streaming radio stations which may be configured to identify and play/stream music associated with one or more of the following (or combinations thereof):
  Upcoming shows;
  Bands/Artists;
  Venue related events;
  Online streaming radio stations;
  Online streaming video stations;
  Etc.

In at least one embodiment, the MMMS System may include functionality for enabling users to selectively filter search results and/or presented content according to a variety of different filtering criteria such as, for example, one or more of the following (or combinations thereof):
  geographic location;
  geographic proximity;
  time/date criteria;
  venue name(s);
  music genre(s);
  video genre(s);
  artist/band name(s)
  user ID;
  geographic location of artist/band origin (e.g., home town);
  geographic location of upcoming shows and/or events;
  geographic proximity of upcoming shows and/or events;
  etc.

In at least some embodiments described herein, the terms "DeliRadio" and "DeliRadio System" may refer to one or more embodiments of the MMMS System (and/or portions thereof), such as, for example, those corresponding to the website system(s), GUI(s), and music streaming service(s) associated with the website domain deliradio.com (www.deliradio.com). Thus, for example, as used herein, the terms "MMMS System", "DeliRadio", and "DeliRadio System" may be used interchangeably, unless otherwise noted. Additionally, at least some embodiments described herein, the terms "Artist" or "Band" may be used interchangeably to refer to one or more of the following (or combinations thereof): music related artist(s)/band(s), songwriters, composers, performers, etc.

FIG. 1 illustrates a simplified block diagram of a specific example embodiment of a Multi-Media Management and Streaming (MMMS) System 100 which may be implemented in network portion 100. As described in greater detail herein, different embodiments of MMMS Systems may be configured, designed, and/or operable to provide various different types of operations, functionalities, and/or features generally relating to MMMS System technology. Further, as described in greater detail herein, many of the various operations, functionalities, and/or features of the MMMS System(s) disclosed herein may provide may enable or provide different types of advantages and/or benefits to different entities interacting with the MMMS System(s).

Figure 6:
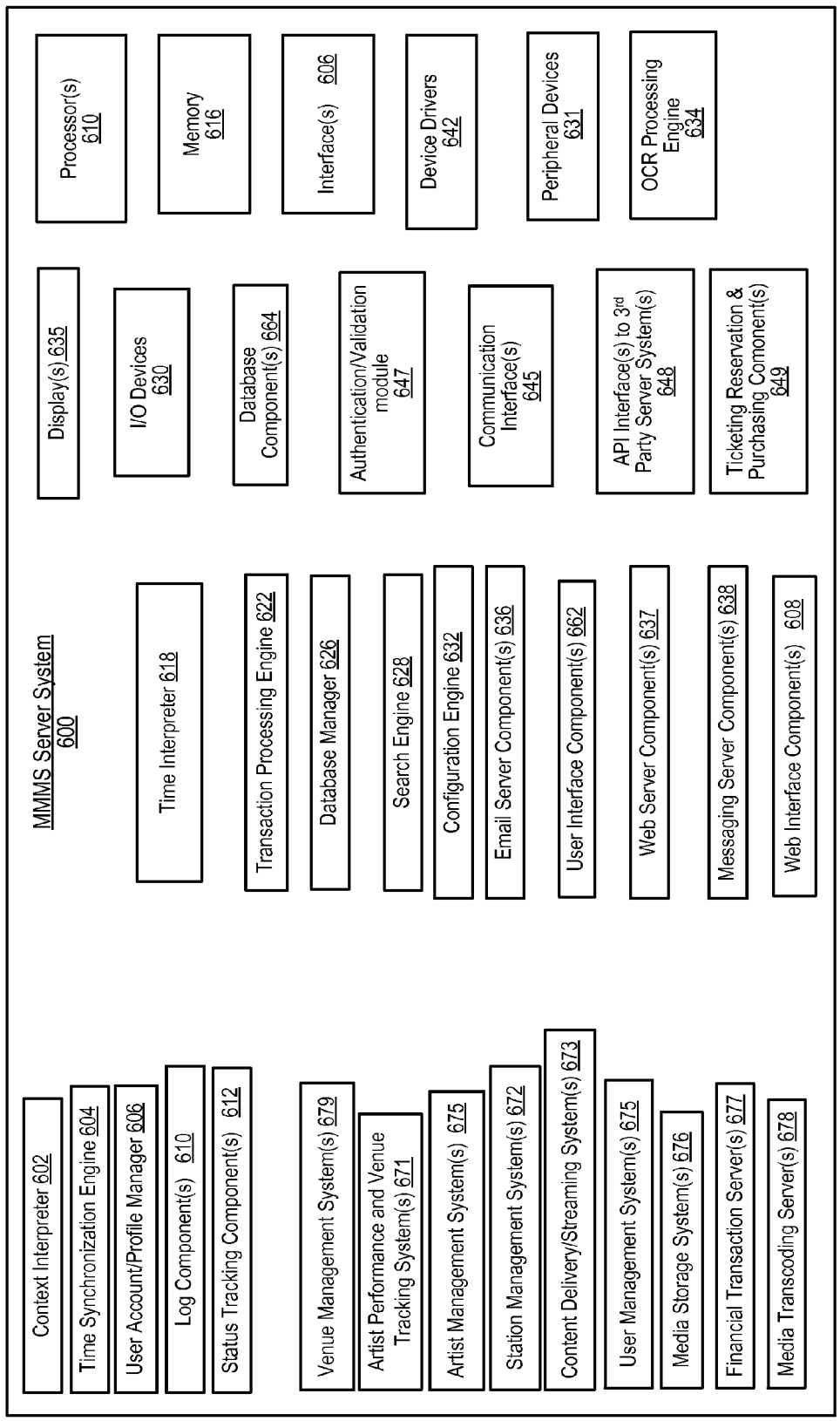
FIG. 6 illustrates an example of a functional block diagram of a MMMS Server System in accordance with a specific embodiment.

According to different embodiments, the MMMS System 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the MMMS System may include one or more of the following types of systems, components, devices, processes, etc. (or combinations thereof):

MMMS Server System(s) 120—In at least one embodiment, the MMMS Server System(s) may be operable to perform and/or implement various types of functions, operations, actions, and/or other features such as those described or referenced herein (e.g., such as those illustrated and/or described with respect to FIG. 6).

Publisher/Content Provider System component(s) 140. In at least one embodiment, one or more devices, components, and/or systems of the MMMS System (100) may be operable to interface with external content sources via an import/export API to load information into the various storage devices and database within the MMMS System (120).

Client Computer System (s) 130
  3$^{rd}$ Party System(s)/Service(s) 150
  Internet & Cellular Network(s) 110
  Remote Database System(s) 180
  Remote Server System(s) 170, which, for example, may include, but are not limited to, one or more of the following (or combinations thereof):
    Content provider servers/services
    Media Streaming servers/services
    Database storage/access/query servers/services
    Financial transaction servers/services
    Payment gateway servers/services
    Electronic commerce servers/services
    Event management/scheduling servers/services
    Etc.
  Mobile Device(s) 160—In at least one embodiment, the Mobile Device(s) may be operable to perform and/or implement various types of functions, operations, actions, and/or other features such as those described or referenced herein (e.g., such as those illustrated and/or described with respect to FIG. 4). Additionally, in some embodiments, mobile devices which interact with the MMMS may offer additional unique functionality, including, but not limited to, temporal and geographic operations involving bands, events, users, and venues, enhanced social networking functionality, and photographic and videographic capture and transmission. Etc.

In at least one embodiment, the MMMS System may be operable to utilize and/or generate various different types of data and/or other types of information when performing specific tasks and/or operations. This may include, for example, input data/information and/or output data/information. For example, in at least one embodiment, the MMMS System may be operable to access, process, and/or otherwise utilize information from one or more different types of sources, such as, for example, one or more local and/or remote memories, devices and/or systems. Additionally, in at least one embodiment, the MMMS System may be operable to generate one or more different types of output data/information, which, for example, may be stored in memory of one or more local and/or remote devices and/or systems. Examples of different types of input data/information and/or output data/information which may be accessed and/or utilized by the MMMS System may include, but are not limited to, one or more of those described and/or referenced herein.

According to specific embodiments, multiple instances or threads of the MMMS System may be concurrently implemented and/or initiated via the use of one or more processors and/or other combinations of hardware and/or hardware and software. For example, in at least some embodiments, various aspects, features, and/or functionalities of the MMMS System may be performed, implemented and/or initiated by one or more of the various systems, components, systems, devices, procedures, processes, etc., described and/or referenced herein.

In at least one embodiment, a given instance of the MMMS System may access and/or utilize information from one or more associated databases. In at least one embodiment, at least a portion of the database information may be accessed via communication with one or more local and/or remote memory devices. Examples of different types of data which may be accessed by the MMMS System may include, but are not limited to, one or more of those described and/or referenced herein.

According to different embodiments, various different types of encryption/decryption techniques may be used to facilitate secure communications between devices in MMMS System(s) and/or MMMS Network(s). Examples of the various types of security techniques which may be used may include, but are not limited to, one or more of the following (or combinations thereof): random number generators, SHA-1 (Secured Hashing Algorithm), MD2, MD5, DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard), RSA, DSA, DH, NTRU, and ECC (elliptic curve cryptography), PKA (Private Key Authentication), Device-Unique Secret Key and other cryptographic key data, SSL, etc. Other security features contemplated may include use of well known hardware-based and/or software-based security components, and/or any other known or yet to be devised security and/or hardware and encryption/decryption processes implemented in hardware and/or software.

According to different embodiments, one or more different threads or instances of the MMMS System may be initiated in response to detection of one or more conditions or events satisfying one or more different types of minimum threshold criteria for triggering initiation of at least one instance of the MMMS System. Various examples of conditions or events which may trigger initiation and/or implementation of one or more different threads or instances of the MMMS System may include, but are not limited to, one or more of those described and/or referenced herein.

It will be appreciated that the MMMS System of FIG. 1 is but one example from a wide range of MMMS System embodiments which may be implemented. Other embodiments of the MMMS System (not shown) may include additional, fewer and/or different components/features that those illustrated in the example MMMS System embodiment of FIG. 1.

Generally, the MMMS techniques described herein may be implemented in hardware and/or hardware+software. For example, they can be implemented in an operating system kernel, in a separate user process, in a library package bound into network applications, on a specially constructed machine, or on a network interface card. In a specific embodiment, various aspects described herein may be implemented in software such as an operating system or in an application running on an operating system.

Hardware and/or software+hardware hybrid embodiments of the MMMS techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, server systems, cloud computing systems, network devices, etc.

Figure 2:
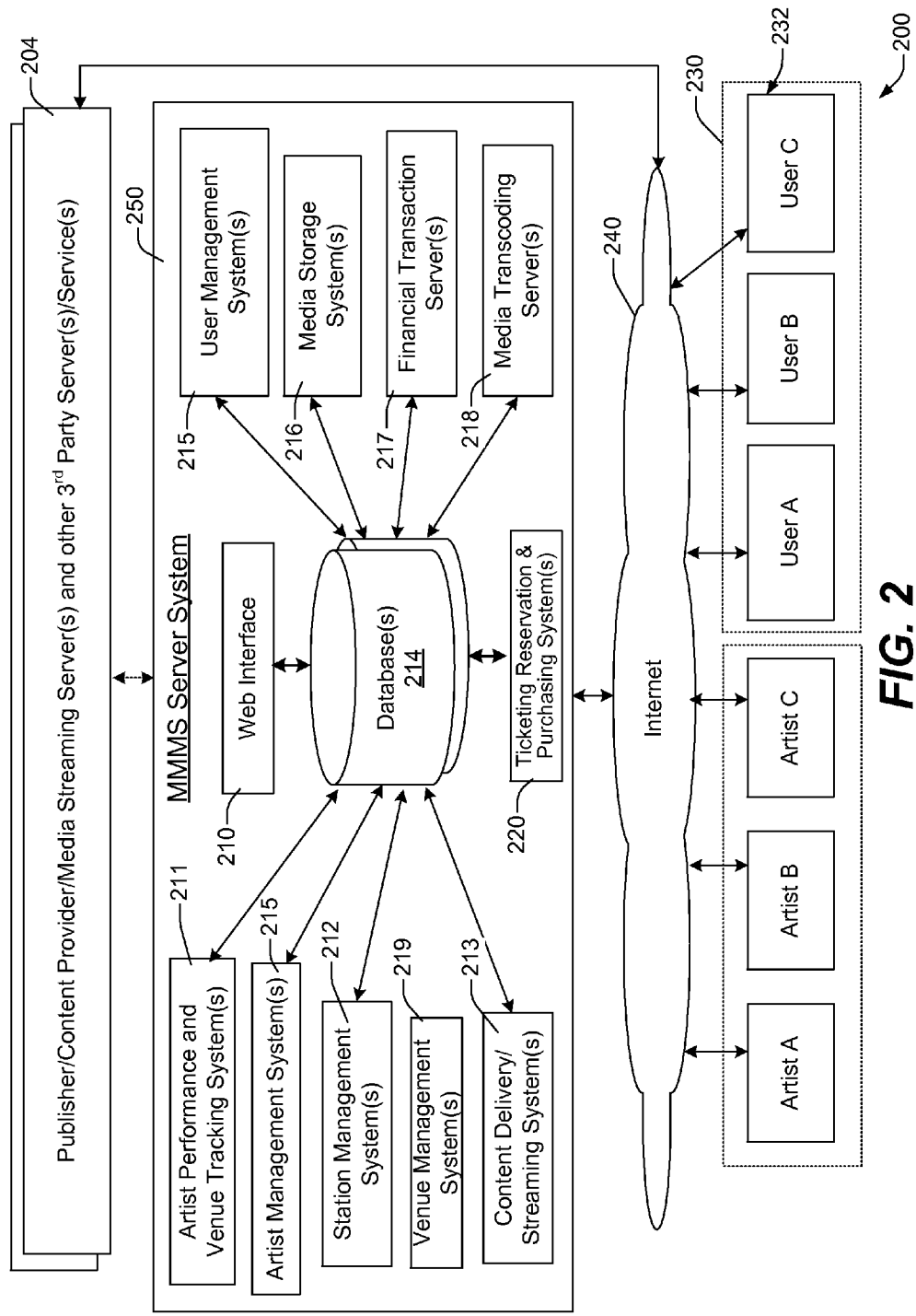
FIG. 2 shows a specific example embodiment of a network diagram illustrating an embodiment of an MMMS System 200.

FIG. 2 shows a specific example embodiment of a network diagram illustrating an embodiment of an MMMS System 200, which may be configured or designed for implementing various aspects, functions, and/or features such as one or more of those described and/or referenced herein. Additionally, the example embodiment of FIG. 2 provides an illustrative example of the different interactions and communication paths between and among the various components of the MMMS System network.

According to specific embodiments, the MMMS System may be accessible to various entities such as, for example: individual persons, corporate or business entities, system administrators, online content providers, online publishers, merchants, artists, copyright holders, etc.

In at least one embodiment, the MMMS System may include a plurality of hardware and/or software components operable to perform and/or implement various types of functions, operations, actions, and/or other features of the MMMS technology disclosed herein. Examples of such components may include, but are not limited to, one or more of the following (or combinations thereof):

MMMS Server System (e.g. 250).
Artist Performance and Venue Tracking System(s) 211, which, for example, may be configured or designed to facilitate, initiate and/or perform one or more of the following operation(s)/action(s) (or combinations thereof):
  Manage database(s) of Event information.
  Information about Events may be stored or cached, include artist(s), date(s) and venue(s), geographic location(s), photographs along with ticketing information, as well as additional fields.

Venue and Event data may be incorporated from external sources, using external API as available and permitted.

Accommodate discrepancies between internal and external databases and data.

Artist Management System(s) 215, which, for example, may be configured or designed to facilitate, initiate and/or perform one or more of the following operation(s)/action(s) (or combinations thereof):

Provide interfaces to, and manage database(s) for the purpose of storing, editing and distributing media and material relating to the Artist's identity, including but not limited to Albums, Tracks, Photographs, Video Links, Biographies, Tags, Locations, Comments, Reviews, Social Networks and Hyperlinks.

Once authenticated, Artists may easily edit their own information, and access statistics and analytics associated with their account from a central dashboard.

Artists may view the statistics and activities of their Stations, Tracks, Albums, email subscribers, and Radio Play.

Station Management System(s) 212, which, for example, may be configured or designed to facilitate, initiate and/or perform one or more of the following operation(s)/action(s) (or combinations thereof):

Store and cache 'Stations' of two types: Static and Dynamic.

Static Stations may include a ranked list of Artists, with no minimum or maximum number.

Dynamic Stations may include a "snapshot" of Filter Settings used when the Station was created or saved. At any point in time the Station may be refreshed, resulting in a new Ranked List of Artists recalculated from the most current MMMS databases, according to the Saved Filters.

MMMS may store or cache usage statistics and listenership data for one or more Stations Content Delivery/Streaming System(s) 213, which, for example, may be configured or designed to facilitate, initiate and/or perform one or more of the following operation(s)/action(s) (or combinations thereof): Serve digital content, including, but not limited to audio, video, images, or other documents to a variety of network enabled devices, including, but not limited to, desktop and laptop computers, PDAs, smart phones, tablets, iOS devices, or other external networks.

User Management System(s) 215, which, for example, may be configured or designed to facilitate, initiate and/or perform one or more of the following operation(s)/action(s) (or combinations thereof): Store information and usage statistics for several classes of User, including Visitors, Users, Artists, Venues, and Administrators Media Storage System(s) 216, which, for example, may be configured or designed to facilitate, initiate and/or perform one or more of the following operation(s)/action(s) (or combinations thereof): Employ sufficient and reliable digital storage, as is necessary to hold Artist Content in an organized fashion.

Financial Transaction Server(s) 217, which, for example, may be configured or designed to facilitate, initiate and/or perform one or more of the following operation(s)/action(s) (or combinations thereof): Provide servers or services related to the processing of financial transactions, through a variety of methods.

Media Transcoding Server(s) 218, which, for example, may be configured or designed to facilitate, initiate and/or perform one or more of the following operation(s)/action(s) (or combinations thereof): Receive digital audio content from Artists, and performing any operations that are necessary for operation of the MMMS system, and related subsystems.

Venue Management System(s) 219, which, for example, may be configured or designed to facilitate, initiate and/or perform one or more of the following operation(s)/action(s) (or combinations thereof): Provide interfaces to, and manage database(s) for the purpose of storing, editing and distributing media and material relating to the identity of a Venue, including but not limited to Calendar Information, Photographs, Video Links, Descriptions, Tags, Locations, Social Networks and Website. Once authenticated, Venues may easily edit their own information, and access statistics and analytics associated with their account from a central dashboard.

Ticketing Reservation and Purchasing System(s) (TRPS) 220, which, for example, may be configured or designed to facilitate, initiate and/or perform activities/operations relating to reservation and/or purchasing of tickets to events such as live performances at one or more venues.

According to different embodiments, at least some MMMS System(s) may be configured, designed, and/or operable to provide a number of different advantages and/or benefits and/or may be operable to initiate, and/or enable various different types of operations, functionalities, and/or features, such as, for example, one or more of the following (or combinations thereof):

"Shows Near" Geographic Location Stations Functionality

In at least one embodiment, MMMS System (also referred to herein as "DeliRadio") users may create geographic location specific (e.g., "city specific") streaming radio stations playing artists with upcoming live performances within the geographic location (e.g., San Francisco) specified by the user. Additionally, users may specify other filtering criteria (either separately or in different combinations) such as, for example, one or more of the following (or combinations thereof):

Geographic proximity or "radius" filtering criteria (e.g. "within 15 miles of Paris" or "within 50 miles of Chicago");

Time/Date filtering criteria (e.g. "tonight," "this week," "next 2 weeks," "all dates" or "custom dates" wherein a user specifies a specific date range such as between July $15^{th}$ and August $3^{rd}$);

"Genre" and/or "Tag" filtering criteria (e.g. folk, folk+rock, folk+rock but not experimental)

Venue specific filtering criteria (e.g., limit search results to events at The Fillmore (San Francisco) or The Great American Music Hall (San Francisco) or Yoshi's Jazz Club (Oakland)).

Artist/band specific filtering criteria (e.g., "The Cribs"; "STS9 or Mojomama"; etc.)

In at least one embodiment, when a user enters their filter criteria for a "Shows Near" Geographic Location search, DeliRadio searches its database (and/or remote database(s)) and automatically and dynamically generates (e.g., in real-time) at least one streaming radio station which will play only songs from artists who match the criteria. For example, "Folk Rock but not Experimental Artists with upcoming live performances in the next 2 weeks within 50 miles of Chicago."

Venue(s) Stations Functionality

In at least one embodiment, DeliRadio users may create "venue specific" streaming radio stations playing artists with upcoming live performances at one or more venues selected by the user. Users may also set "timeframe" filter criteria (e.g. "tonight," "this week," "next 2 weeks," "all dates" or "custom dates" wherein a user specifies a specific date range such as between July 15$^{th}$ and August 3$^{rd}$). Users may also set "genre" filter criteria (e.g. "folk," or "folk+rock," or "folk+rock but not experimental"). When a user enters their filter criteria for a Venue(s) Station, DeliRadio searches its database (and/or remote database(s)) and automatically and dynamically generates (e.g., in real-time) at least one streaming radio station playing only songs from artists who match the specified filter criteria. For example, using one or more DeliRadio GUIs, a user may initiate a filtered search for "Folk Rock but not Experimental Artists with upcoming live performances at The Fillmore, Great American Music Hall and Café Du Nord between July 15$^{th}$ and August 3$^{rd}$." In response, DeliRadio may search its database (and/or remote database(s)) and automatically and dynamically identify and display (e.g., in real-time) information relating to artists/bands and/or upcoming live performances which match the user specified filter criteria. Additionally, DeliRadio may identify songs of artists/bands which match the user specified filter criteria, and dynamically generate a streaming radio station which includes only songs from the identified artists who match the user specified filter criteria.

Hometown/Neighborhood Stations Functionality

In at least one embodiment, DeliRadio users may create "artist hometown/neighborhood" streaming radio stations which includes only those artists whose hometown or "homehood" matches a city or neighborhood specified by the user. Users may also specify geographic proximity (e.g., "radius") filter criteria (e.g. "within 15 miles of Paris" or "within 50 miles of Chicago"); and/or may also specify "genre" filter criteria (e.g. "folk," or "folk+rock," or "folk+rock but not experimental"). When a user enters their filter criteria for a Hometown/Home-hood Station. DeliRadio searches its database (and/or remote database(s)) and automatically and dynamically generates (e.g., in real-time) at least one streaming radio station for playing only songs by artists who match the criteria. For example, "Folk Rock but not Experimental Artists from within 5 miles of Moscow" or "Indie Singer-Songwriter but not Country Artists from the Lower East Side of New York City."

Artist/Show Recommendation Stations Functionality

In at least one embodiment, DeliRadio users may enter the name of one or more artist(s)/band(s) (herein the "Target Artist(s)") to create "recommendation" stations, where the "recommendation criteria" for the station is based primarily on live performance and tour information, such as, for example, one or more of the following (or combinations thereof):

(1) other artists who have performed with the Target Artist(s) in the past;
(2) other artists who are scheduled to perform with the Target Artist(s) in the future;
(3) other artists who have performed at the same venue(s) and/or festival(s) that the Target Artist(s) has performed at in the past; and/or
(4) other artists who are scheduled to perform in the future at the same venue(s) and/or festival(s) that the Target Artist(s) has performed at.
Additional "recommendation criteria" may include other filter criteria such as, for example, one or more of the following (or combinations thereof): other artists who have been "starred" by DeliRadio users who have also starred the Target Artist(s); genre and tag cross-matching filter criteria (e.g., specified by the user); play count and popularity within the DeliRadio System; geolocation based criteria (such as prioritizing other artists in the station based on upcoming concerts that are proximal to the listener); "similar artist" results which, for example, may be acquired from API calls to external databases (e.g. EchoNest, Last.FM); user created stations that include one or more of the Target Artist(s); etc.

Ticket Reservation Service Functionality

Venue Implementation: In at least one embodiment, the MMMS System may be configured or designed to provide ticketing reservation and purchasing functionality for enabling and/or facilitating users in performing activities/operations relating to reservation and/or purchasing of tickets to events such as live performances at one or more venues. For example, in at least one embodiment, the MMMS System may include a Ticketing Reservation/Purchase System ("TRPS") which may be configured or designed to automatically and/or dynamically identify event ticketing reservation/purchasing opportunities in advance of tickets going on sale to the public. In one embodiment, reservation and/or purchasing of tickets by DeliRadio users may be facilitated by 3$^{rd}$ party system(s)/component(s). In at least one embodiment, at some point after the Initial Ticket On-Sale event (e.g., approximately 1-5 days after), the venue hosting the event (e.g., concert/show) would set the Reservation Allotment for how many reservations it would guarantee/allot for a specific concert. In one embodiment, to determine the Reservation Allotment, the venue may take their "Sellable Capacity" less "Anticipated Sales", and the remaining number may be the Anticipated Unsold Tickets ("AUTs"). For example, a venue with a Sellable Capacity of 500 and Anticipated Sales of 300 would have 200 AUTs remaining. The TRPS would multiply the venue's AUT by a "super percent" multiplier (e.g., 100+%), thus creating the Reservation Allotment for the event. One reason for the super percentage multiplier is that not all reservations may be converted to a ticket purchase.

Customer Interaction: In at least one embodiment, once the Reservation Allotment is available in the TRPS, DeliRadio users may be able to view a Concert Page for a particular event. On the Concert Page, the user may view (e.g., in real-time) information relating to the total number of tickets sold for that event and the number of reservations available. DeliRadio users may be able to "buy now" for immediate ticket purchase and/or be able to make ticket reservations (e.g., for one or more persons). In one embodiment where DeliRadio users may "star" particular venues, DeliRadio users could receive an update when an event is scheduled at one of their starred venues, and by clicking on the update, they may be directed to the Concert Page for that event, where they could purchase tickets and/or make Reservations.

Making the Reservation: In at least one embodiment, when making the Reservation, the Reservation Host may be able to designate other DeliRadio users (Reservation Recipients) to receive an "invitation to accept the Reservation." This message may be sent within DeliRadio to Reservation Recipients. The Host and the Recipients would have a window of time in which to convert their Reservations into Ticket purchases. Once the Host has received confirmation from Recipients of their intent to attend the show as a group (e.g., via DeliRadio SMS, text message, phone call, in person, etc.), the Reservation Host may automatically handle the Ticket purchases on behalf of the Reservation Group.

Picking up Tickets purchased through TRPS: In at least one embodiment, the venue keeps track of tickets purchased through at least one Reservation Group in the TRPS. The Host of at least one Reservation Group is now "hosting" a "guest list" of attendees at the event. At least one member of the Reservation Group arrives at the venue, informs Will Call that they're on the Reservation Host's Guest List, presents ID, and receives their Ticket.

Reservation Incentives: In at least one embodiment, venues participating in the TRPS may be able to access their Venue Dashboard, select a particular event, and set any incentives/discounts it wants to offer for that event. The Reservation Host would then be eligible for deals as an incentive for buying AUTs in bulk, for example. In at least one embodiment, DeliRadio users who reserve or purchase their tickets via the DeliRadio System may receive other types of promotional offers or benefits such as, for example:

- Bulk Ticket Discount: By way of example, 5 tickets for the price of 4, with the discount spread across the price of one or more tickets, thus benefiting the Reservation Group. The venue is only getting income from 4 ticket sales, but the event will be attended by 5 persons who may generate other income for the venue while attending the show.
- Promotional Offers: drink tickets, venue swag, VIP privileges, priority seat reservations, discount coupons, etc.
- Future Show Discounts: Discounts on Ticket purchases for future shows at that venue, or at shows among various venues in a Venue Group.
- Vendor Affiliate Discounts: Discounts at vendors/merchants in the same neighborhood as the venue.
- Venue "Points": Redeemable by the Host at the venue at some later date for any of the above.

TRPS Monetization: Monetization of the TRPS could take one or more of the following forms (or combinations thereof): Per Ticket Fee; Per Order Fee; and/or Per Show Fee.

- Example Models for Sponsorship Sales: (1) local/national sponsor underwrites one or more fees and is perceived as paying one or more convenience fees related to Tickets purchased through the TRPS for that event, in exchange for brand goodwill and/or user data provided by DeliRadio; (2) local/national sponsor pays a flat fee per show to buy a relationship with a specific demographic and receives demographic specific user data from DeliRadio; (3) local/national sponsor pays a flat fee per show and offers product giveaways and/or raffle entries for a contest.
- Example "Reservation" Definitions: (1) a socially broadcast interest in attending a particular event (e.g., a "like" for an event that others may see), and then helping that general interest culminate in a tipping point where everyone wants to convert their Reservation into Ticket Buys to be guaranteed admission; (2) an option to purchase a Ticket; (3) an opportunity for an individual to get a group of people to buy multiple tickets, and by doing so, the organizer (host) receives something of value from the venue; (4) a discrete unit of the allocation of Anticipated Unsold Tickets multiplied by a super-percentage (100+%)
- According to different embodiments, a reservation window may close the sooner of (1) x days before the event or (2) X % of Tickets sold. Alternatively, X days after the Reservation is made, but no later than X days before the event.
- Example Benefits/Advantages of MMMS System TRPS: Various benefits/advantages of the MMMS System TRPS may include, for example: the limited quantity of Reservations; the limited time window in which to convert Reservations into Ticket Buys; and/or the social broadcast nature of the Reservation (allowing one or more DeliRadio users to see the status of one or more Reservations for a given show at any time.

Functionality for Display of Relevant Gigs on a Per-User Geo-Location Basis

In at least one embodiment, when a DeliRadio station is created, information relating to the station may be displayed or presented to the user via a Pop-Out Player GUI which may include one or more of the following types of content and/or features (or combinations thereof):

- Venue Station: if the station created is venue-specific, then the first concert date displayed for at least one artist in that station matches the concert scheduled to occur at the venue(s) selected in the user's search criteria.
- Geographic proximity: if the station created is not venue-specific, and an artist in the station has an upcoming concert within a predetermined radius (e.g., 200 miles) of user's location (as determined by geo-locating the user's IP address or user's mobile device, for example), then that concert within 200 miles of the user is the first displayed concert.
- Chronologically: if the station created is not venue-specific, and an artist in the station does not have an upcoming concert within the predetermined radius (e.g., 200 miles) of user's location (e.g., as determined by geo-located the user's IP Address or user's mobile device), then the concert that is occurring next chronologically is the first displayed concert.

Stations Map Overlay Functionality

In at least one embodiment, information relating to any given station created on DeliRadio may be selectively displayed according to the user's viewing preferences, such as, for example: "List View" (e.g., FIG. 11), "Tile View" (e.g., FIG. 12) or "Map View" (e.g., FIG. 13). In one embodiment, when a genre and/or hometown station is viewed in map view, at least one artist's hometown is plotted on a map (e.g., using "guitar pick" icons to indicate the location(s) on the displayed map), and a number inside the guitar pick indicating how many artists matching the search reside in that location (see, e.g., FIG. 13). When a DeliRadio Station for "shows near" city/neighborhood or one or more venues is created, the guitar pick icons indicate venue locations where a concert that matches the search criteria may take place, and the number inside the guitar pick indicate how many artists matching the search may perform at that venue. In either instance (hometown/genre stations or "shows near" city/venue stations), clicking on a displayed icon may open a small window listing the artists matching the overall search criteria who are located (or who have upcoming concerts located) in or near the location indicated by the corresponding selected icon. In at least one embodiment, each of the List View, Tile View, and Map View GUIs may also include a "Play Station" button which enables a user to create a new station which is automatically configured to play only songs from the artists displayed in the current window/GUI (and, in some embodiments, related artists as well).

For example, creating a DeliRadio Station of rock bands (without indicating a specific location) may include all rock bands on DeliRadio. The map view may initially only display rock bands within a certain radius of the user's IP Address or user's mobile device. The user may then zoom out to see one or more DeliRadio rock bands across the world, as indicated by guitar picks for at least one location. Clicking on a guitar pick over London, England, may reload the map view to focus only on London. Clicking on the guitar pick over London may open a window listing one or more the London rock bands. The user may then click the play button to hear only rock bands from London. This same example could be used for a "hometown" only station (e.g., indicating a search for one or more bands from a specific city or town) or a hybrid hometown/genre station (e.g., indicating a search for one or more bands of a specific genre (or genres) from a specific city or town).

For example, creating a DeliRadio Station of rock bands with upcoming shows within 100 miles of Amsterdam, Netherlands, when viewed in map view, may display one or more DeliRadio rock bands with upcoming shows in this radius around Amsterdam. In one embodiment, at least a portion of the displayed icons on the map may represent or indicate venues where one or more of the show(s) (matching the filtered search criteria) are to take place. In at least one embodiment, one or more displayed icons may each display a numerical value indicating the number of upcoming shows at that particular venue for which ticket reservations/purchases are currently available. In one embodiment, clicking on an icon may cause a Venue Info GUI to be displayed which includes information about one or more bands matching the search criteria at that particular venue. In one embodiment, a user may click a "Play" button displayed in the Venue Info GUI to dynamically generate a DeliRadio Station playing only those bands at that venue.

Gig Sharing (User-to-User) Functionality

In at least one embodiment, a user may select a particular concert/event from an artist's upcoming calendar, and share the event information (e.g., date, artists performing, location, ticket price, ticket purchase information, etc.) as well as content associated with the performing artists (e.g., audio recordings, photos, biographical information, website links, Facebook URLs, Twitter URLs, etc.) directly with other DeliRadio users (e.g., via DeliRadio's DeliRadio Mobile Applications and web applications), and associate a personal message from the sharer with the information shared. This would present an opportunity for the "sharer" and the "sharee(s)" to express their interest in attending the show together, whether by making plans offline or purchasing tickets online, including via the DeliRadio Ticket Reservation Service.

Social Blogging Functionality

By embedding the DeliRadio BloggerTool javascript in the <head> of their HTML pages, website operators may use DeliRadio to provide playable links next to the textual mention of any Artist Name that currently has music available for public streaming on DeliRadio. Clicking on a play link may launch the DeliRadio Pop-Out Player that may either play the single artist that was clicked on, or a DeliRadio Station comprising one or more artists (including the selected artist) with DeliRadio music on that web page. A single web page may include multiple instances of the DeliRadio BloggerTool.

Play Traction Heat Map Functionality

In at least one embodiment, artists may view an interactive world map overlaid with "heat zones" indicating where and to what degree listeners have been streaming that artist's music. Artists may interact with a Play Traction Heat Map GUI to change views and/or filter criteria to view mobile plays, website plays, or both combined. In at least one embodiment, the Play Traction Heat Map Functionality may also be operable to enable the artist to further hone this map to a specific album or track.

Artist/Band Tweet @ Functionality

In at least one embodiment, if an artist has provided their Twitter handle in their DeliRadio artist profile, then, when a DeliRadio listener is streaming an artist's recording on the DeliRadio Mobile Application, with 1-click the user may send a Twitter message ("tweet") directly at the artist's Twitter handle, with an automatically generated (or personalized) comment and a link to the artist's DeliRadio station. Any Twitter user who "follows" the DeliRadio user sending the tweet, who follows the artist on Twitter or who follows DeliRadio on Twitter may see the tweet in their "feed." Any Twitter user who clicks on the link for the artist's station may view the artist's upcoming concert dates. In one embodiment, the first date displayed may be presented per the algorithm described in the "Display of Relevant Gigs on a Per User Geo-Location Basis" section.

Auto-Magic Blog Functionality

In at least one embodiment, any DeliRadio City/Neighborhood/Venue "Shows Near" or "Bands From" station may include a more comprehensive display of related content via that station's own unique, automatically updating website (or GUI or webpage). The station's own unique, automated content updating website may be referred to as the "AutoMagic Blog." In one embodiment of the AutoMagic Blog, the DeliRadio user responsible for owning or managing the station/blog would receive their own unique Twitter handle for that station/blog (e.g. @drfm_oakland). Information and/or other content which may be displayed at the AutoMagic Blog may include, but are not limited to, one or more of the following (or combinations thereof):

- A map showing the specified radius for the station;
- The station's venue and/or artist search results overlaid on that map, with associated playable links;
- The station's search results of artists and concerts presented in list form;
- Artist profiles of at least one artist in the search results;
- A DeliRadio embedded player which plays the search results for that station;
- A customized "outgoing" twitter feed of one or more tweets from the blog's owner;
- A customized "incoming" twitter feed representing a real time search of one or more tweets by twitter users who include in their tweet a hashtag for the blog (e.g. #drfm_oakland). In at least one embodiment, the Blog's owner could "re-tweet" (e.g., from the owner's official Blog handle) any tweets containing the hashtag, thus creating a method for Twitter users to tweet comments and a method for the Blog owner to officially recognize those comments by retweeting them;
- A "PLAY" button for the outgoing Twitter feed that uses technology to "scrape" any DeliRadio station links, allowing at least one tweet to be played as a DeliRadio Station, or one or more tweets in the feed to be played as a separate station;
- A "PLAY" button for the incoming Twitter feed that uses technology to scrape any DeliRadio station links, allowing at least one tweet to be played as a DeliRadio Station, or one or more tweets in the feed to be played as a separate station;
- Editorial content related to the artists and venues currently displayed, either linked in from outside websites or created within the Blog itself by the Blog owner;
- Etc.

Track-Level Control Slider Functionality

In at least one embodiment, when an artist uploads audio recordings to DeliRadio, the "Track-Level Control Slider" gives them fine-grain control over how their recordings are made available and promoted across the internet, based on a "promotional sliding scale" that increases by degree of public availability. In at least one embodiment, the Track-Level Control Slider GUI may be configured or designed to enable a user to assign one or more separately definable access and/or usage attributes to each of the Artist's recordings (e.g., which have been uploaded to the DeliRadio System). Examples of such access and/or usage control attributes may include, but are not limited to, one or more of the following (or combinations thereof):

- For Sale Only: Tracks marked as "for sale only" are not streamable anywhere on DeliRadio, but downloads may be purchased on the artist's DeliRadio profile page by listeners.
- Profile Only: Tracks marked as "profile only" are streamable only on the artist's DeliRadio profile page via the Pop-Out Player (which may also be embedded elsewhere on the internet), but these tracks may not be included in the pool of tracks available for stations created by DeliRadio users and stations automatically generated by DeliRadio.
- Radio Enabled: Tracks marked as "radio enabled" may be streamable on the artist's DeliRadio profile page via the Pop-Out Player, and may also be included in the pool of tracks available for stations created by DeliRadio users and automatically generated by DeliRadio.
- Radio Preferred: Same as Radio Enabled, but "Radio Preferred" tracks may be played first when this artist appears in a DeliRadio station.
- Free Download: This checkbox may be applied to any track, and may allow the free, promotional download of the marked track. Free downloads are only available on the artist's DeliRadio profile page.

Functionality for Targeted Promotion of Stations on the DR Website, Based on User Location In at least one embodiment, the DeliRadio homepage may be comprised in part of a "mosaic" of image "tiles", wherein each tile may depict a DeliRadio station selected for promotion on the homepage, including but not limited to one or more of the following (or combinations thereof): festival stations, venue stations, record label stations, artist stations, etc. These promotional mosaic tiles may be "tagged" in the DeliRadio System as being associated with a specific geographic region or regions. For example, a festival taking place in New York may be tagged as being associated with the eastern coast of the United States. When a user arrives at the DeliRadio homepage, the user may be geo-located based on their IP Address or user's mobile device, and the DeliRadio homepage promotional mosaic tiles may be automatically and dynamically selected (e.g., in real-time) based on that user's location, such that the promotional mosaic tiles the user sees on the homepage may be directly geo-targeted to each individual user. For example, the DeliRadio System may determine a first user's geolocation as being Paris, France, and in response, the DeliRadio System may display to the user only promotional mosaic tiles associated with the geographic region(s) in and around Paris. In contrast, the DeliRadio System may determine a second user's geolocation as being San Francisco, Calif., and may display to the second user only promotional mosaic tiles associated with the geographic region(s) in and around San Francisco, Calif.

Share a Gig Functionality

Compatible with the conventional ways to share content between users and among existing social networks (e.g., Facebook, Twitter, etc.), a DeliRadio user may select a particular show or event from an artist's upcoming tour calendar, and share that show/event via the DeliRadio mobile and web apps. This would mark a user's interest in that particular show, which may be visible to other users of the DeliRadio System, and may present an opportunity to other DeliRadio users to express their interest in the identified show/event.

Venue Check-In Functionality

In at least one embodiment, mobile device users may use the DeliRadio Mobile Application to "Check-In" at a show or event. For example, in one embodiment, by accessing one or more databases relating to events, shows, and/or tour dates (e.g., including, for example, DeliRadio tour date archive database), and using the geolocation services/functionality at the user's mobile device (at least a portion of which may be provided by the DeliRadio Mobile Application), the venue check-in process may be streamlined considerably as compared to more traditional methods of check-in. In at least one embodiment, the DeliRadio Mobile Application may be configured or designed to include functionality for facilitating user "Check-In" activities at a given venue & event. After completing a check-in activity at a given location, the user may be granted (e.g., via the DeliRadio Mobile Application and/or DeliRadio website) access to additional functionality, promotional opportunities, and/or rewards, such as, for example, one or more of the following (or combinations thereof):

- Join the venue email list;
- Vote for upcoming shows (e.g., at that venue);
- Access current band's info, twitter, Facebook, merchandise and email list signups;
- Incentives for discounted drinks and/or merchandise;
- receive information or notification about friends or other DeliRadio users who will be attending one or more show(s) at the venue and/or who have already check-in at the venue for the current show;
- Send photos to band and/or DeliRadio Band/Artist webpage or blog;
- Integrate with additional "check-in" services;
- Earn points for social activity which may be later redeemed by the user for promotional rewards, incentives, etc.

Embedded Players and Extended Functionality

In at least one embodiment, the DeliRadio System technology disclosed herein provides capability for any DeliRadio Station, Album, or Artist to be embedded in any webpage on the World Wide Web, using an <iframe> tag and HTML5 code, for example. The user may customize the appearance of the embedded player prior to receiving the code. The user may customize: color scheme & width of the player, along with choosing the visibility of tour dates, photos, & station title. In one embodiment, when an embedded player is first loaded, it will cycle through the artists in the station in a random order, displaying one highlighted gig according to certain criteria. This first displayed tour date is chosen with regards to the 'closest upcoming show' in geographic proximity, based on the geolocation of the user (e.g., via user's IP address or via geolocation of users mobile device). If a DeliRadio Station has been created based on specific 'Venue Criteria', the highlighted date(s) will be the upcoming date(s) that occurs at one of the specified venue(s).

In some embodiments, the Embedded Players and Extended Functionality may include the ability for a venue to embed a complete concert calendar which may include listings for bands that aren't currently members of DeliRadio and/or which may include bands which are not currently in the DeliRadio database. Concert calendars may be accompanied by additional GUI features/buttons in the embedded window for enabling features such as, for example, one or more of the following (or combinations thereof): genre and date range selectors, multiple stages or associated venues, social sharing tools, etc.

In at least one embodiment, Track and Album embeds may be accompanied by corresponding track list(s), with additional GUI features/buttons in the embedded window for enabling features such as, for example, one or more of the following (or combinations thereof): downloading the tracks, social sharing tools, favoriting/liking/following controls, purchase options, links to external sites for purchase/download, etc.

In one embodiment, a user may choose to customize and embed a button (e.g., via a <script> tag) that creates a button on an external web page that immediately triggers a pop-up window containing just the DeliRadio player for that Station, Artist or Track. The Embedded Players and Extended Functionality may include is functionality for the embedded player to cycle through the photos of bands in the embedded station, even if the visitor to the website where the player is embedded has not tapped or clicked on the "PLAY" button. In at least one embodiment, this may result in the display of an automatically and/or dynamically generated "slideshow" of images of the artist(s) associated with that particular station.

EXAMPLES

The following examples are intended to help illustrate some of the various types of functions, operations, actions, and/or other features which may be provided by the MMMS System. By way of example, described below are some examples of "Stations" that may be created, named, saved, shared and listened to in real-time via the MMMS System, by adjusting the intuitive filters that appear in the various GUIs presented by the MMMS System.

(1) A DeliRadio Station comprised of songs by indie rock bands (or any other genre) that are playing shows within 10 miles San Francisco this Saturday night.
  While the collection of songs is being streamed to the user's computer or mobile device, a photo slide-show of the current Artist is simultaneously streamed and rotated on the listeners browser or mobile device.
  Date and location of upcoming show nearby is displayed next to current Artist and track information.
  In many urban areas, fans have the opportunity to see dozens of shows on any given night. By creating this station, they may be able to hear a selection of songs relating only to those Artists who have been identified as playing upcoming shows within 10 miles San Francisco within the specified time period.
  Stations may be shared with friends on Facebook, twitter or any other social media sites, instantly.

(2) A DeliRadio Station comprised of bands from a high school, college, hometown, or any other geographical grouping.
  In at least one embodiment, the MMMS System may include functionality for enabling the user to post a link to a selected DeliRadio Station on Facebook or social networks. From there, one or more the user's friends may view the post/link, and may instantly listen to the DeliRadio Station by clicking on the link (for example). In at least one embodiment, the user's social networking friends and/or other DeliRadio users may be able to chat with the user (or with others) via a chat GUI which may be incorporated into the associated DeliRadio Station web page. According to different embodiments, DeliRadio Station chat functionality may be selectively enabled and/or disabled by the creator/owner of that DeliRadio Station.

(3) A DeliRadio Station comprised of choir music from choirs based in and around Oakland, Calif.
  Very many choir groups exist nationwide, and most of them make recordings which are difficult to promote and share publically.
  A DeliRadio 'Oakland Choir Radio' Station may be dynamically created by the MMMS System and could be made to be publically accessible a variety of different groups such as, for example, one or more of the following (or combinations thereof): users/members of the MMMS System; social network friends and family; anyone who is able to obtain the URL to the DeliRadio Oakland Choir Radio Station (e.g., by doing a Google search, for example).

(4) A DeliRadio Station comprised of California high school bands that rank in the top 100 "most popular", "most listened to", etc.
  Rankings may be generated and/or updated manually, automatically, and/or programmatically via data gathered from statistics and analytics relating to artist and user actions, such as 'track play count', 'page views', 'MMMS player spins', most starred, 'band preferred', upcoming tour dates, etc.

(5) A DeliRadio Station of US serviceman rock bands (stationed anywhere in the world.)
  Could be active members only, or active and retired.
  Could be genre agnostic; for instance, it could be rap-specific, reggae, etc
  Example DeliRadio Station: One or more 'Southern Rock' groups, currently stationed in Iraq.

(6) A DeliRadio Station comprised of bands made up of workers at Safeway supermarkets
  Once a DeliRadio Safeway Station was created, bands that want to be included in this station may send requests to the station owner asking to be added.
  Stations may be earmarked as "closed" or "open" to non-owner manipulation of content.
  Corporations could find this a healthy morale building enterprise, and could even promote it actively as such.

(7) A DeliRadio Station comprised of bands playing upcoming shows at a SPECIFIC VENUE.
  A lot of music fans have a favorite venue(s).
  The songs and artists associated with the Station may be automatically, dynamically and/or periodically updated so that it may be kept current with the upcoming events, shows, artists, song popularity, etc.
  Venues could post links to their DeliRadio Station on their web sites, and send links to their DeliRadio Station out to recipients on the venue mailing list.
  In at least one embodiment, the content streamed by the DeliRadio Venue Station may automatically and periodically be updated (e.g., "Always Be Current"). In one embodiment, the Station owner (e.g., which may be the venue's agent) may manually update DeliRadio's database of upcoming shows and events that particular venue. In other embodiments, the MMMS System may automatically and periodically access updated venue-specific event/date/artist information from one or more remote databases and APIs such as, for example, those provided by, Songkick, Last FM, etc.
  One significant advantage/benefit of the customized DeliRadio Venue Station is that it facilitates and provides the ability for end users and customers to easily access, learn about, explore, and listen to music from bands/artists who will be performing (and/or who have performed) at a given venue. Venues may advantageously leverage the features and advantages by embedding their customized, venue-specific DeliRadio Station in the home page (or other web pages) of the venue's website.

Another significant advantage/benefit customized DeliRadio Venue Station is that it allows the venue to offload the tasks of managing, uploading, and updating the venue's website with new music relating to the artists of upcoming shows. For example, in one embodiment, when the venue books an upcoming show with a given artist, the venue may simply instruct the artist to upload one or more of the artist's song(s) and/or album(s) to the DeliRadio System. In at least one embodiment, the DeliRadio System may include functionality for automatically monitoring newly uploaded content, and cross checking the identified content with other resources in order to automatically link selected portions of the newly uploaded content with selected DeliRadio Stations.

In at least one embodiment, the MMMS System may be configured or designed to automatically identify various types of criteria (e.g., song, artist, album, video, venue, user location, artist location, etc.) relating to content being displayed to a user as the user accesses the DeliRadio website and/or DeliRadio Mobile Application.

In at least one embodiment, one or more GUIs may be displayed to the user to facilitate operation and/or initiation of the various features and functions disclosed herein. According to different embodiments, the GUIs may be implemented via use of a web browser application, a mobile device application, a desktop application, a cloud-based service, etc. In at least one embodiment, a User Web Interface may provide functionality for dynamically generating at least a portion of the GUIs.

As illustrated in the example embodiment of FIG. 2, the MMMS System may include one or more databases (e.g. 240, FIG. 2), which, for example, may be populated with information and/or content relating to music, videos, venues, events, merchants, merchandise, artists, user profile information, user activity information, radio station information, etc.

In at least one embodiment, one or more of the databases may be queried via the use of various types of programming languages and/or protocols such as, for example, one or more of the following (or combinations thereof): HTML, XML, MySQL, Perl, Ajax, JavaScript, Etc.

In at least one embodiment, a user may initiate a MMMS session via the Internet (e.g., via 240, FIG. 2) to cause the MMMS System to perform and/or initiate various functions and operations (such as those described and/or referenced herein), according to user-specified criteria.

In at least one embodiment, the MMMS System may be operable to populate and/or access information at Database(s) 214, and utilize such information in order to identify and/or determine artist information and/or music content according to user-specified criteria. Examples of such database information may include, but are not limited to, one or more of the following (or combinations thereof):

- artist profile criteria, including, but not limited to artist rating, artist feedback, etc.;
- artist location information;
- music genre information;
- venue information;
- artist event performance information and related venue information;
- ticketing information;
- geographical information relating to artists, events, venues, users, etc.
- calendar information relating to artist performances, venue events, etc.
- negative filter criteria;
- music streaming services;
- Artist criteria;
- Similarity to other artists
- Brand-related criteria such as, for example, branding information related to (or associated with) one or more of the following (or combinations thereof): Song; Artist; Team; Celebrity; Album; Venue; Trademarks; Corporate Identities; Content owners; Publisher; Author; Distributor; Digital Content Criteria; Etc.

Various embodiments disclosed herein may be configured, designed, or otherwise operable to initiate, perform and/or provide different types of advantages, benefits and/or other features such as, for example, one or more advantages and/or benefits described and/or referenced herein.

For example, in at least one embodiment, the MMMS System functionality may be operable to perform and/or implement various types of functions, operations, actions, and/or other features such as, for example, one or more of the following (or combinations thereof):

- Monitor user behaviors and activities;
- Identify brand-related information associated with user-accessible content that the user is accessing; has requested access to; and/or has interest in;
- Identify songs and/or artists based on specified criteria;
- Manage and track revenue sharing;
- Manage reporting;
- Transact online ordering and purchasing;
- Transact Database queries/responses
- Acquire and manage artist-related music content and other artist-related information;
- Manage artist subscription services;
- Create user customized music streaming stations, e.g., based on user-specified filter criteria;
- Acquire and manage artist performance event and related venue information;
- Provide query disambiguation;
- Provide input correction/suggestion functionality such as, for example, normalization of brand name, brand identity and/or other searchable criteria amongst misspelled and/or other spelling variations;
- Facilitate artist profile management and user subscriptions;
- Manage and track songs and/or other media content which has been streamed to user(s);
- Etc.

According to specific embodiments, multiple instances or threads of the MMMS System functionality may be concurrently implemented and/or initiated via the use of one or more processors and/or other combinations of hardware and/or hardware and software. For example, in at least some embodiments, various aspects, features, and/or functionalities of the MMMS System mechanism(s) may be performed, implemented and/or initiated by one or more of the various systems, components, systems, devices, procedures, and/or processes described herein.

According to different embodiments, one or more different threads or instances of the MMMS System functionality may be initiated in response to detection of one or more conditions or events satisfying one or more different types of minimum threshold criteria for triggering initiation of at least one instance of the MMMS System functionality. Various examples of conditions or events which may trigger initiation and/or implementation of one or more different threads or instances of the MMMS System functionality may include, but are not limited to, one or more of the following (or combinations thereof):

Detection of user interest in particular artist, brand, genre, geographic location and/or other criteria Identification of user;

Identification of music content matching specified criteria;

Detection of user input;

Identification of artist performance event(s) matching specified criteria;

Detection of artist input;

Identification of artist performance event(s);

Identification of user's geographic location;

Determination of revenue sharing distributions;

Receiving database query communication from external server;

Etc.

In at least one embodiment, a given instance of the MMMS System functionality may access and/or utilize information from one or more associated databases. In at least one embodiment, at least a portion of the database information may be accessed via communication with one or more local and/or remote memory devices. Examples of different types of data which may be accessed by the MMMS System functionality may include, but are not limited to, one or more of the following (or combinations thereof):

Brand-related information;

User behavior and analytic information;

Performance information;

Artist information;

Venue Information;

Artist performance event information;

Geographic location information (e.g., relating to artist performances, events, user location, artist origination, venues, etc.)

Brand related taxonomy information;

Artist subscription information;

Ecommerce related transaction information;

Publisher/Content Provider information;

User profile information;

Artist profile information;

Music inventory information;

Artist-brand association information;

etc.

It may be appreciated that the various embodiments of the MMMS Systems disclosed herein are but a few examples from a wide range of MMMS System embodiments which may be implemented. Other embodiments of the MMMS System (not shown) may include additional, fewer and/or different components/features that those illustrated and described herein.

Figure 3:
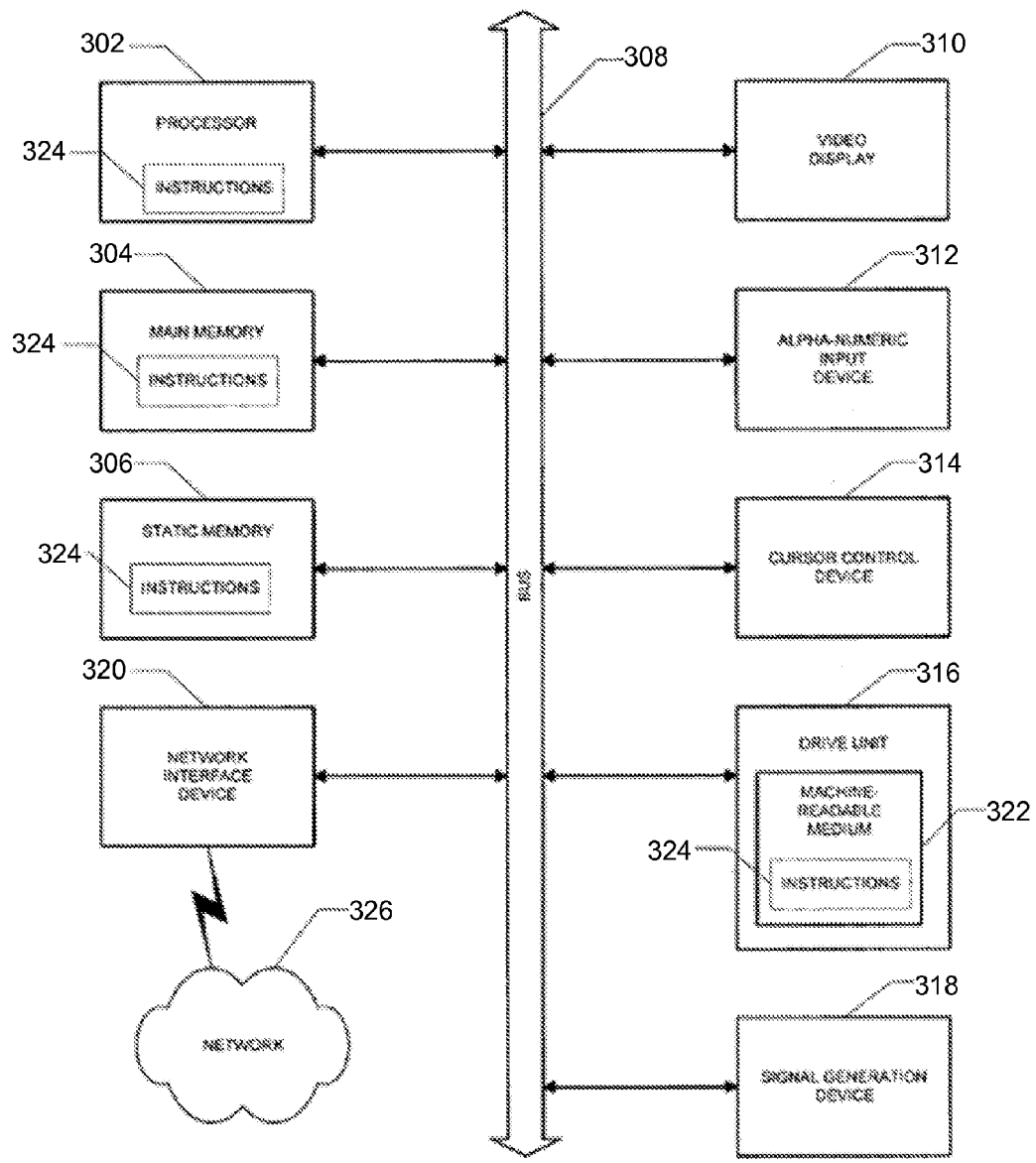
FIG. 3 shows a diagrammatic representation of machine in the exemplary form of a client (or end user) computer system 300.

FIG. 3 shows a diagrammatic representation of machine in the exemplary form of a client (or end user) computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Further, while only a single machine is illustrated, the term "machine" may also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 and a static memory 306, which communicate with at least one other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an exemplary embodiment to be a single medium, the term "machine-readable medium" may be taken to include a single medium or multiple media (e.g., a centralized or distributed database, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" may accordingly be taken to include, but not be limited to, solid-state memories, optical and magnetic media, and carrier wave signals. Although an embodiment of the present invention has been described with reference to specific exemplary embodiments, it may be evident that various modifications and changes may be made to these embodiments without departing from the broader spirit and scope of the invention. Accordingly, the specification and drawings are to be regarded in an illustrative rather than a restrictive sense.

According to various embodiments, Client Computer System 300 may include a variety of components, modules and/or systems for providing various types of functionality. For example, in at least one embodiment, Client Computer System 300 may include a web browser application which is operable to process, execute, and/or support the use of scripts (e.g., JavaScript, AJAX, etc.), Plug-ins, executable code, virtual machines, vector-based web animation (e.g., Adobe Flash), etc.

In at least one embodiment, the web browser application may be configured or designed to instantiate components and/or objects at the Client Computer System in response to processing scripts, instructions, and/or other information received from a remote server such as a web server. Examples of such components and/or objects may include, but are not limited to, one or more of the following (or combinations thereof):

- User Interface (UI) Components such as those illustrated, described, and/or referenced herein.
- Database Components such as those illustrated, described, and/or referenced herein.
- Processing Components such as those illustrated, described, and/or referenced herein.
- Other Components which, for example, may include components for facilitating and/or enabling the Client Computer System to perform and/or initiate various types of operations, activities, functions such as those described herein.

Figure 4:
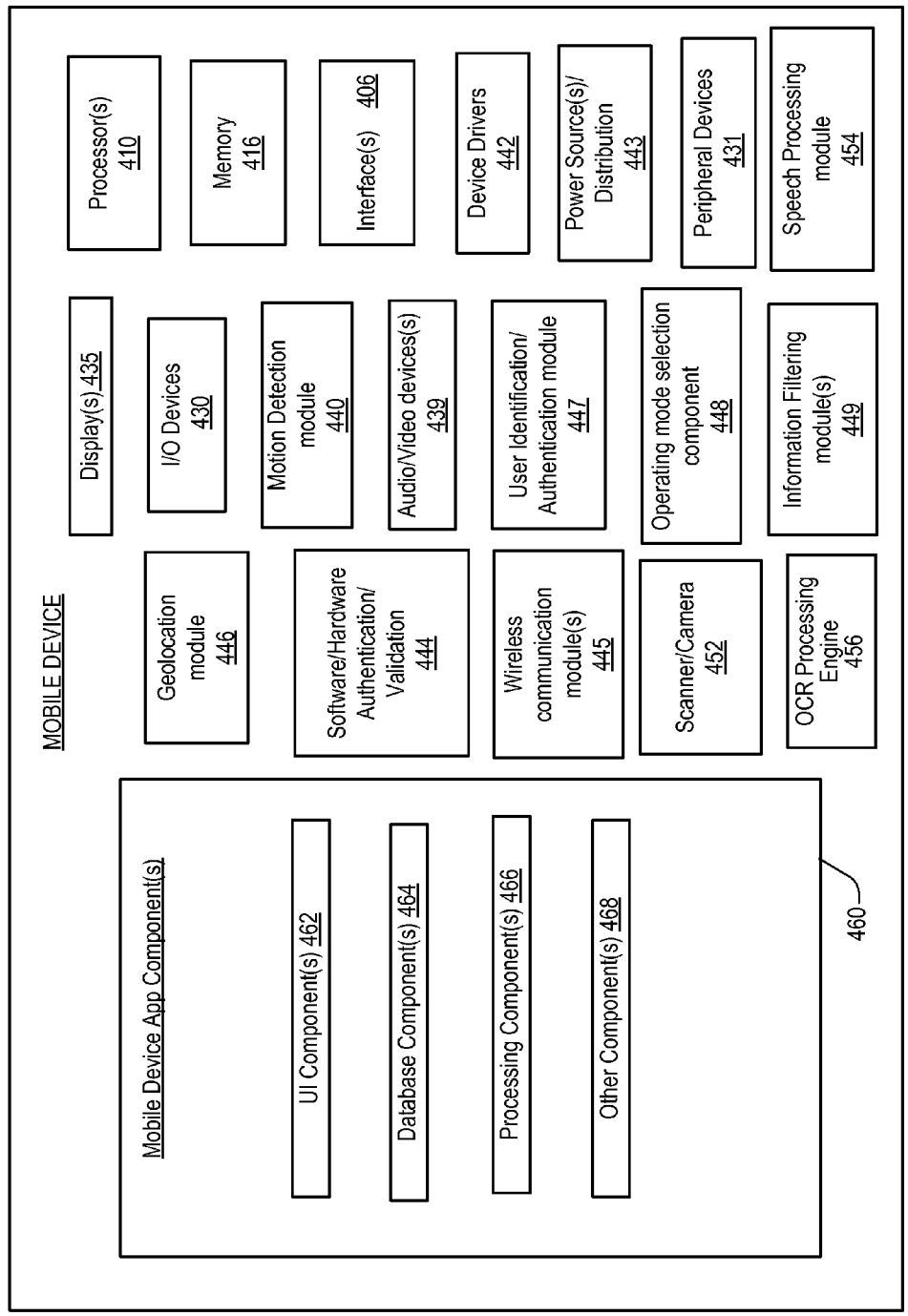
FIG. 4 is a simplified block diagram of an exemplary client system 400 in accordance with a specific embodiment.

FIG. 4 is a simplified block diagram of an exemplary client system 400 in accordance with a specific embodiment. In at least one embodiment, the client system may include MMMS Mobile Device App Component(s) which have been configured or designed to provide functionality for enabling or implementing at least a portion of the various MMMS techniques at the client system.

According to specific embodiments, various aspects, features, and/or functionalities of the Mobile Device may be performed, implemented and/or initiated by one or more of the following types of systems, components, systems, devices, procedures, processes, etc. (or combinations thereof):

- Processor(s) 410
- Device Drivers 442
- Memory 416
- Interface(s) 406
- Power Source(s)/Distribution 443
- Geolocation module 446
- Display(s) 435
- I/O Devices 430
- Audio/Video devices(s) 439
- Peripheral Devices 431
- Motion Detection module 440
- User Identification/Authentication module 447
- Client App Component(s) 460
- Other Component(s) 468
- UI Component(s) 462
- Database Component(s) 464
- Processing Component(s) 466
- Software/Hardware Authentication/Validation 444
- Wireless communication module(s) 445
- Information Filtering module(s) 449
- Operating mode selection component 448
- Speech Processing module 454
- Scanner/Camera 452
- OCR Processing Engine 456
- etc.

As illustrated in the example of FIG. 4 Mobile Device 400 may include a variety of components, modules and/or systems for providing various functionality. For example, as illustrated in FIG. 4, Mobile Device 400 may include Mobile Device Application components (e.g., 460), which, for example, may include, but are not limited to, one or more of the following (or combinations thereof):

- UI Components 462 such as those illustrated, described, and/or referenced herein.
- Database Components 464 such as those illustrated, described, and/or referenced herein.
- Processing Components 466 such as those illustrated, described, and/or referenced herein.
- Other Components 468 which, for example, may include components for facilitating and/or enabling the Mobile Device to perform and/or initiate various types of operations, activities, functions such as those described herein.

In at least one embodiment, the Mobile Device Application component(s) may be operable to perform and/or implement various types of functions, operations, actions, and/or other features such as, for example, one or more of those described or referenced herein.

According to specific embodiments, multiple instances or threads of the Mobile Device Application component(s) may be concurrently implemented and/or initiated via the use of one or more processors and/or other combinations of hardware and/or hardware and software. For example, in at least some embodiments, various aspects, features, and/or functionalities of the Mobile Device Application component(s) may be performed, implemented and/or initiated by one or more systems, components, systems, devices, procedures, processes, such as, for example, one or more of those described or referenced herein.

According to different embodiments, one or more different threads or instances of the Mobile Device Application component(s) may be initiated in response to detection of one or more conditions or events satisfying one or more different types of minimum threshold criteria for triggering initiation of at least one instance of the Mobile Device Application component(s). Various examples of conditions or events which may trigger initiation and/or implementation of one or more different threads or instances of the Mobile Device Application component(s) may include, but are not limited to, one or more of those described or referenced herein.

In at least one embodiment, a given instance of the Mobile Device Application component(s) may access and/or utilize information from one or more associated databases. In at least one embodiment, at least a portion of the database information may be accessed via communication with one or more local and/or remote memory devices. Examples of different types of data which may be accessed by the Mobile Device Application component(s) may include, but are not limited to, one or more of those described or referenced herein.

According to different embodiments, Mobile Device 400 may further include, but is not limited to, one or more of the following types of components, modules and/or systems (or combinations thereof):

- At least one processor 410. In at least one embodiment, the processor(s) 410 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes one or more these functions under the control of software including an operating system, and any appropriate applications software.
- Memory 416, which, for example, may include volatile memory (e.g., RAM), non-volatile memory (e.g., disk memory, FLASH memory, EPROMs, etc.), unalterable memory, and/or other types of memory. In at least one implementation, the memory 416 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the client system and/or other information relating to the functionality of the various MMMS techniques described herein. The program instructions may control the operation of an operating system and/or one or more applications, for example. The memory or memories may also be configured to store data structures, metadata, timecode synchronization information, audio/visual media content, asset file information, keyword taxonomy information, advertisement information, and/or information/data relating to other features/functions described herein. Because such information and program instructions may be employed to implement at least a portion of the MMMS techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 406 which, for example, may include wired interfaces and/or wireless interfaces. In at least one implementation, the interface(s) 406 may include functionality similar to at least a portion of functionality implemented by one or more computer system interfaces such as those described herein and/or generally known to one having ordinary skill in the art. For example, in at least one implementation, the wireless communication interface(s) may be configured or designed to communicate with selected electronic game tables, computer systems, remote servers, other wireless devices (e.g., PDAs, cell phones, player tracking transponders, etc.), etc. Such wireless communication may be implemented using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Device driver(s) 442. In at least one implementation, the device driver(s) 442 may include functionality similar to at least a portion of functionality implemented by one or more computer system driver devices such as those described herein and/or generally known to one having ordinary skill in the art.

At least one power source (and/or power distribution source) 443. In at least one implementation, the power source may include at least one mobile power source (e.g., battery) for allowing the client system to operate in a wireless and/or mobile environment. For example, in one implementation, the power source 443 may be implemented using a rechargeable, thin-film type battery. Further, in embodiments where it is desirable for the device to be flexible, the power source 443 may be designed to be flexible.

Geolocation module 446 which, for example, may be configured or designed to acquire geolocation information from remote sources and use the acquired geolocation information to determine information relating to a relative and/or absolute position of the client system.

Motion detection component 440 for detecting motion or movement of the client system and/or for detecting motion, movement, gestures and/or other input data from user. In at least one embodiment, the motion detection component 440 may include one or more motion detection sensors such as, for example, MEMS (Micro Electro Mechanical System) accelerometers, that may detect the acceleration and/or other movements of the client system as it is moved by a user.

User Identification/Authentication module 447. In one implementation, the User Identification module may be adapted to determine and/or authenticate the identity of the current user or owner of the client system. For example, in one embodiment, the current user may be required to perform a log in process at the client system in order to access one or more features. Alternatively, the client system may be adapted to automatically determine the identity of the current user based upon one or more external signals such as, for example, an RFID tag or badge worn by the current user which provides a wireless signal to the client system for determining the identity of the current user. In at least one implementation, various security features may be incorporated into the client system to prevent unauthorized users from accessing confidential or sensitive information.

One or more display(s) 435. According to various embodiments, such display(s) may be implemented using, for example, LCD display technology, OLED display technology, and/or other types of conventional display technology. In at least one implementation, display(s) 435 may be adapted to be flexible or bendable. Additionally, in at least one embodiment the information displayed on display(s) 435 may utilize e-ink technology (such as that available from E Ink Corporation, Cambridge, Mass., www.eink.com), or other suitable technology for reducing the power consumption of information displayed on the display(s) 435.

One or more user I/O Device(s) 430 such as, for example, keys, buttons, scroll wheels, cursors, touchscreen sensors, audio command interfaces, magnetic strip reader, optical scanner, etc.

Audio/Video device(s) 439 such as, for example, components for displaying audio/visual media which, for example, may include cameras, speakers, microphones, media presentation components, wireless transmitter/receiver devices for enabling wireless audio and/or visual communication between the client system 400 and remote devices (e.g., radios, telephones, computer systems, etc.). For example, in one implementation, the audio system may include componentry for enabling the client system to function as a cell phone or two-way radio device.

Other types of peripheral devices 431 which may be useful to the users of various client systems, such as, for example: PDA functionality; memory card reader(s); fingerprint reader(s); image projection device(s); social networking peripheral component(s); etc.

Information filtering module(s) 449 which, for example, may be adapted to automatically and dynamically generate, using one or more filter parameters, filtered information to be displayed on one or more displays of the mobile device. In one implementation, such filter parameters may be customizable by the player or user of the device. In some embodiments, information filtering module(s) 449 may also be adapted to display, in real-time, filtered information to the user based upon a variety of criteria such as, for example, geolocation information, casino data information, player tracking information, etc.

Wireless communication module(s) 445. In one implementation, the wireless communication module 445 may be configured or designed to communicate with external devices using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Software/Hardware Authentication/validation components 444 which, for example, may be used for authenticating and/or validating local hardware and/or software components, hardware/software components residing at a remote device, game play information, wager information, user information and/or identity, etc. Examples of various authentication and/or validation components are described in U.S. Pat. No. 6,620,047, titled, "ELECTRONIC GAMING APPARATUS HAVING AUTHENTICATION DATA SETS," incorporated herein by reference in its entirety for one or more purposes.

Operating mode selection component 448 which, for example, may be operable to automatically select an appropriate mode of operation based on various parameters and/or upon detection of specific events or conditions such as, for example: the mobile device's current location; identity of current user; user input; system override (e.g., emergency condition detected); proximity to other devices belonging to same group or association; proximity to specific objects, regions, zones, etc. Additionally, the mobile device may be operable to automatically update or switch its current operating mode to the selected mode of operation. The mobile device may also be adapted to automatically modify accessibility of user-accessible features and/or information in response to the updating of its current mode of operation.

Scanner/Camera Component(s) (e.g., 452) which may be configured or designed for use in scanning identifiers and/or other content from other devices and/or objects such as for example: mobile device displays, computer displays, static displays (e.g., printed on tangible mediums), etc.

OCR Processing Engine (e.g., 456) which, for example, may be operable to perform image processing and optical character recognition of images such as those captured by a mobile device camera, for example.

Speech Processing module (e.g., 454) which, for example, may be operable to perform speech recognition, and may be operable to perform speech-to-text conversion.

Etc.

Figure 5:
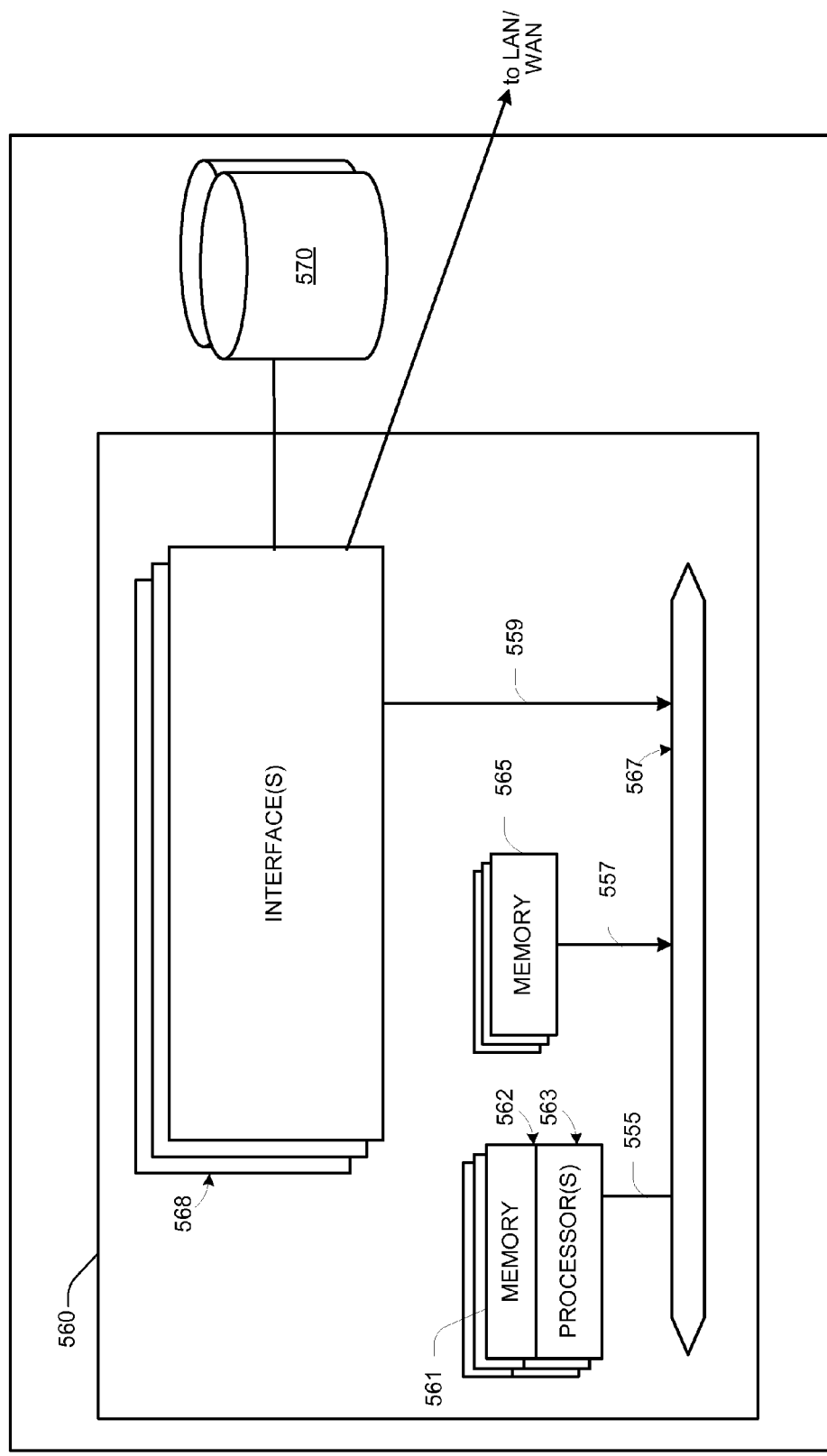
FIG. 5 illustrates an example embodiment of a server system 580 which may be used for implementing various aspects/features described herein.

FIG. 5 illustrates an example embodiment of a server system 580 which may be used for implementing various aspects/features described herein. In at least one embodiment, the server system 580 includes at least one network device 560, and at least one storage device 570 (such as, for example, a direct attached storage device). In one embodiment, server system 580 may be suitable for implementing at least some of the MMMS techniques described herein.

In according to one embodiment, network device 560 may include a master central processing unit (CPU) 562, interfaces 568, and a bus 567 (e.g., a PCI bus). When acting under the control of appropriate software or firmware, the CPU 562 may be responsible for implementing specific functions associated with the functions of a desired network device. For example, when configured as a server, the CPU 562 may be responsible for analyzing packets; encapsulating packets; forwarding packets to appropriate network devices; instantiating various types of virtual machines, virtual interfaces, virtual storage volumes, virtual appliances; etc. The CPU 562 preferably accomplishes at least a portion of these functions under the control of software including an operating system (e.g. Linux), and any appropriate system software (such as, for example, AppLogic™ software).

CPU 562 may include one or more processors 563 such as, for example, one or more processors from the AMD, Motorola, Intel and/or MIPS families of microprocessors. In an alternative embodiment, processor 563 may be specially designed hardware for controlling the operations of server system 580. In a specific embodiment, a memory 561 (such as non-volatile RAM and/or ROM) also forms part of CPU 562. However, there may be many different ways in which memory could be coupled to the system. Memory block 561 may be used for a variety of purposes such as, for example, caching and/or storing data, programming instructions, etc.

The interfaces 568 may be typically provided as interface cards (sometimes referred to as "line cards"). Alternatively, one or more of the interfaces 568 may be provided as on-board interface controllers built into the system motherboard. Generally, they control the sending and receiving of data packets over the network and sometimes support other peripherals used with the server system 580. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (WiFi) interfaces, 802.15 interfaces (including Bluetooth™), 802.16 (WiMax) interfaces, 802.22 interfaces, Cellular standards such as CDMA interfaces, CDMA2000 interfaces, WCDMA interfaces, TDMA interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

In at least one embodiment, some interfaces may be configured or designed to allow the server system 580 to communicate with other network devices associated with various local area network (LANs) and/or wide area networks (WANs). Other interfaces may be configured or designed to allow network device 560 to communicate with one or more direct attached storage device(s) 570.

Although the system shown in FIG. 5 illustrates one specific network device described herein, it is by no means the only network device architecture on which one or more embodiments may be implemented. For example, an architecture having a single processor that handles communications as well as routing computations, etc. may be used. Further, other types of interfaces and media could also be used with the network device.

Regardless of network device's configuration, it may employ one or more memories or memory modules (such as, for example, memory block 565, which, for example, may include random access memory (RAM)) configured to store data, program instructions for the general-purpose network operations and/or other information relating to the functionality of the various MMMS techniques described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (ROM) and random access memory (RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

FIG. 6 illustrates an example of a functional block diagram of a MMMS Server System in accordance with a specific embodiment. In at least one embodiment, the MMMS Server System may be operable to perform and/or implement various types of functions, operations, actions, and/or other features such as, for example, one or more of those described or referenced herein (e.g., such as those previously described with respect to FIGS. 1 and 2).

In at least one embodiment, the MMMS Server System may include a plurality of components operable to perform and/or implement various types of functions, operations, actions, and/or other features such as, for example, one or more of the following (or combinations thereof):

Artist Performance and Venue Tracking System(s) 671
Artist Management System(s) 675
Station Management System(s) 672
Content Delivery/Streaming System(s) 673
Venue Management System(s) 679
User Management System(s) 675
Media Storage System(s) 676
Financial Transaction Server(s) 677
Media Transcoding Server(s) 678
Context Interpreter (e.g., 602) which, for example, may be operable to automatically and/or dynamically analyze contextual criteria relating to a given transaction, and automatically determine or identify the type of transaction to be performed. According to different embodiments, examples of contextual criteria which may be analyzed may include, but are not limited to, one or more of the following (or combinations thereof):
  location-based criteria (e.g., geolocation of client device, geolocation of agent device, etc.) time-based criteria
  identity of user
  identity of artist
  user profile information
  transaction history information
  recent user activities
  etc.
Time Synchronization Engine (e.g., 604) which, for example, may be operable to manages universal time synchronization (e.g., via NTP and/or GPS)
Search Engine (e.g., 628) which, for example, may be operable to search for transactions, logs, items, accounts, options in the TIS databases
Configuration Engine (e.g., 632) which, for example, may be operable to determine and handle configuration of various customized configuration parameters for one or more devices, component(s), system(s), process(es), etc.
Time Interpreter (e.g., 618) which, for example, may be operable to automatically and/or dynamically modify or change identifier activation and expiration time(s) based on various criteria such as, for example, time, location, transaction status, etc.
AuthenticationNalidation Component(s) (e.g., 647) (password, software/hardware info, SSL certificates) which, for example, may be operable to perform various types of authentication/validation tasks such as, for example, one or more of the following (or combinations thereof):
  verifying/authenticating devices,
  verifying passwords, passcodes, SSL certificates, biometric identification information, and/or other types of security-related information
  verify/validate activation and/or expiration times
  etc.
Transaction Processing Engine (e.g., 622) which, for example, may be operable to handle various types of transaction processing tasks such as, for example, one or more of the following (or combinations thereof):
  identifying/determining transaction type
  determining which payment gateway(s) to use
  associating databases information to identifiers
  etc.
OCR Processing Engine (e.g., 634) which, for example, may be operable to perform image processing and optical character recognition of images such as those captured by a mobile device camera, for example.
Database Manager (e.g., 626) which, for example, may be operable to handle various types of tasks relating to database updating, database management, database access, etc. In at least one embodiment, the Database Manager may be operable to manage databases, MMMS Device Application databases, etc.
Log Component(s) (e.g., 610) which, for example, may be operable to generate and manage transactions history logs, system errors, connections from APIs, etc.
Status Tracking Component(s) (e.g., 612) which, for example, may be operable to automatically and/or dynamically determine, assign, and/or report updated transaction status information based, for example, on the state of the transaction. In at least one embodiment, the status of a given transaction may be reported as one or more of the following (or combinations thereof): Completed, Incomplete Pending, Invalid, Error, Declined, Accepted, etc.

Gateway Component(s) (e.g., 614) which, for example, may be operable to facilitate and manage communications and transactions with external Payment Gateways.

Web Interface Component(s) (e.g., 608) which, for example, may be operable to facilitate and manage communications and transactions with TIS web portal(s).

API Interface(s) to MMMS Server System(s) (e.g., 646) which, for example, may be operable to facilitate and manage communications and transactions with API Interface(s) to MMMS Server System(s)

API Interface(s) to 3rd Party Server System(s) (e.g., 648) which, for example, may be operable to facilitate and manage communications and transactions with API Interface(s) to 3rd Party Server System(s)

Ticketing Reservation and Purchasing Component(s) (e.g., 649), which, for example, may be configured or designed to facilitate, initiate and/or perform activities/operations relating to reservation and/or purchasing of tickets to events such as live performances at one or more venues.

OCR Processing Engine (e.g., 634) which, for example, may be operable to perform image processing and optical character recognition of images such as those captured by a mobile device camera, for example.

At least one processor 610. In at least one embodiment, the processor(s) 610 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the mobile client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes one or more these functions under the control of software including an operating system, and any appropriate applications software.

Memory 616, which, for example, may include volatile memory (e.g., RAM), non-volatile memory (e.g., disk memory, FLASH memory, EPROMs, etc.), unalterable memory, and/or other types of memory. In at least one implementation, the memory 616 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile client system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein. Because such information and program instructions may be employed to implement at least a portion of the MMMS System techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 606 which, for example, may include wired interfaces and/or wireless interfaces. In at least one implementation, the interface(s) 606 may include functionality similar to at least a portion of functionality implemented by one or more computer system interfaces such as those described herein and/or generally known to one having ordinary skill in the art.

Device driver(s) 642. In at least one implementation, the device driver(s) 642 may include functionality similar to at least a portion of functionality implemented by one or more computer system driver devices such as those described herein and/or generally known to one having ordinary skill in the art.

One or more display(s) 635. According to various embodiments, such display(s) may be implemented using, for example, LCD display technology, OLED display technology, and/or other types of conventional display technology. In at least one implementation, display(s) 635 may be adapted to be flexible or bendable. Additionally, in at least one embodiment the information displayed on display(s) 635 may utilize e-ink technology (such as that available from E Ink Corporation, Cambridge, Mass., www.eink.com), or other suitable technology for reducing the power consumption of information displayed on the display(s) 635.

Email Server Component(s) 636, which, for example, may be configured or designed to provide various functions and operations relating to email activities and communications.

Web Server Component(s) 637, which, for example, may be configured or designed to provide various functions and operations relating to web server activities and communications.

Messaging Server Component(s) 638, which, for example, may be configured or designed to provide various functions and operations relating to text messaging and/or other social network messaging activities and/or communications.

Etc.

In at least some embodiments described herein, the terms "DeliRadio" and "DeliRadio System" may refer to one or more embodiments of the MMMS System (and/or portions thereof), such as, for example, those corresponding to the website system(s), GUI(s), and music streaming service(s) associated with the website domain deliradio.com (www.deliradio.com). Thus, for example, as used herein, the terms "MMMS System", "DeliRadio", and "DeliRadio System" may be used interchangeably, unless otherwise noted. Additionally, at least some embodiments described herein, the terms "Artist" or "Band" may be used interchangeably to refer to one or more of the following (or combinations thereof): music related artist(s)/band(s), songwriters, Deliradio Mobile Functionality FIG. 7A illustrates an example screenshot of a User Profile graphical user interface (GUI) which may be used to facilitate, initiate and/or perform various operation(s) and/or action(s) relating to the DeliRadio System technology described herein. In at least one embodiment, a user my select a DeliRadio user from a DeliRadio friend list, and/or may search for other DeliRadio users via DeliRadio System search functionality. The user may view, via User Profile GUI 701, information relating to the selected user's DeliRadio user profile, which, for example, may include, but is not limited to, one or more of the following (or combinations thereof): username info 710; user bio information, and hometown/geographic location 720; user's Twitter handle 732; user's favorite DeliRadio artist(s) 734; other users followed by this user 736; other users the selected user is following 738, etc.

Figure 7B:
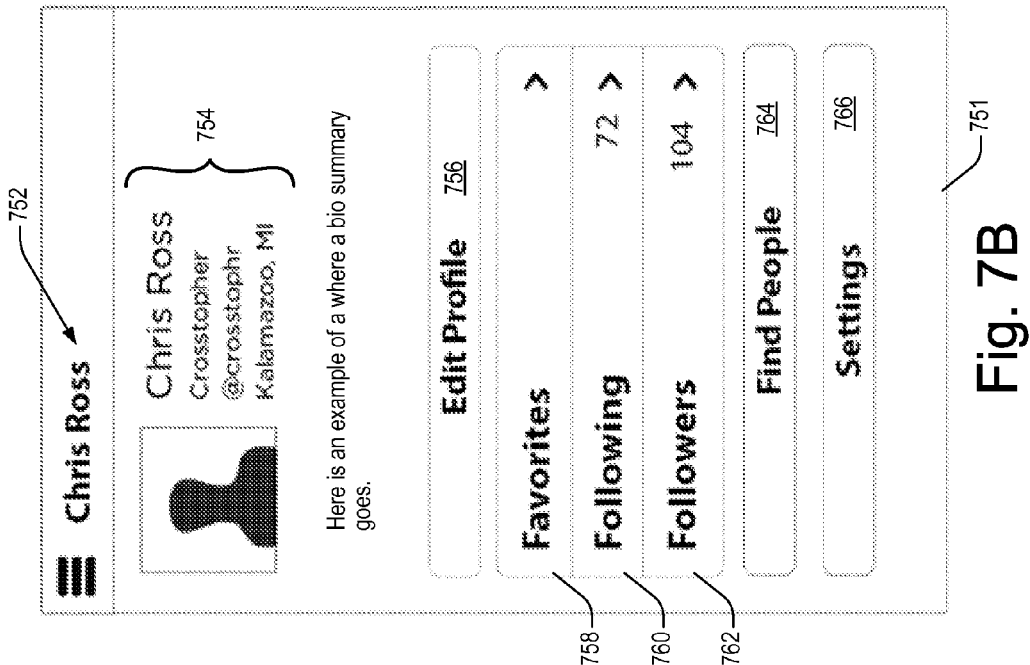
Figure 7A:
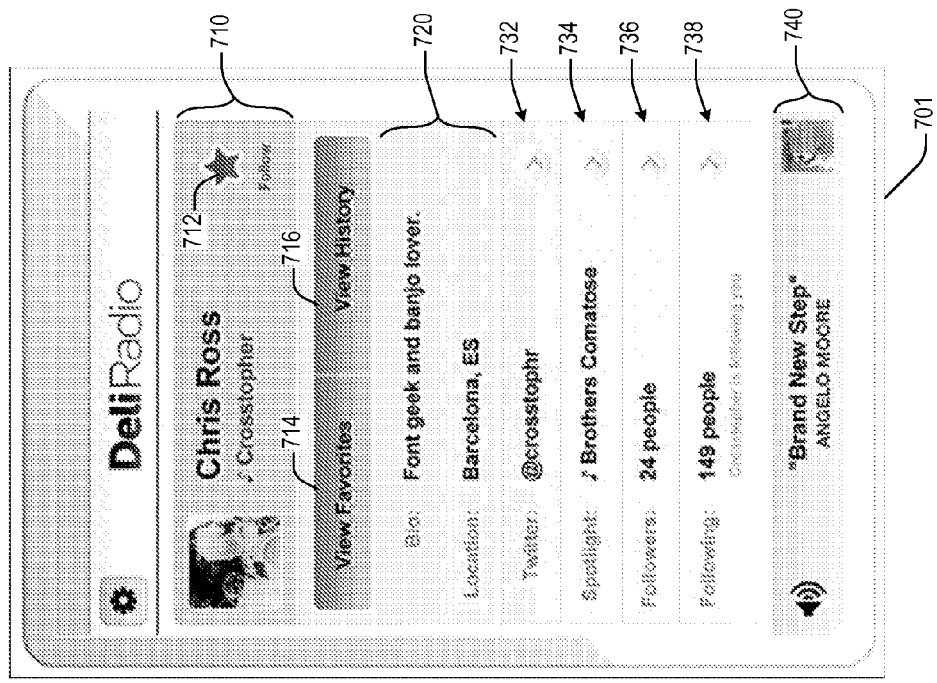

FIG. 7B illustrates an example screenshot of an alternate embodiment of a User Profile GUI 751 which may be used to facilitate, initiate and/or perform various operation(s) and/or action(s) relating to the DeliRadio System technology described herein. In at least one embodiment, User Profile GUI 751 represents a registered user's view of their own Mobile User Profile, which can display a variety of information and capabilities, such as, for example, one or more of the following (or combinations thereof):

The user's real name (e.g., as shown at 754).
The user's DeliRadio username (e.g., as shown at 754).
The user's twitter handle (e.g., as shown at 754).
The user's hometown (e.g., as shown at 754).
User profile/bio information.
The ability of the user to edit their own mobile user profile 756. For example, in at least one embodiment, the user may change their user profile picture; enter/edit other fields such as their username, real name, location and bio; connect their DeliRadio account with their Facebook account, Twitter account, and/or other social network account, etc.
Functionality 758 for enabling access to the user's collection of starred or "favorite" content 758, such as, for example, the user's favorite tracks, albums, bands, playlists, etc. In at least one embodiment, the DeliRadio Mobile Application may provide functionality for enabling the user to access to a User Favorites GUI for viewing, modifying, and/or updating the user's Favorites content and information. Examples of various features of the User Favorites GUI are illustrated, for example, in FIGS. 24 and 25 of the drawings.
Following Information 760 relating to other persons, artists/bands, and/or users which the identified user (Chris Ross) is currently following. In one embodiment, the user may tap on the Following menu item 760 to access a list of other DeliRadio users and/or artists that the user is following.
Follower Information 762 relating to other persons, artists/bands, and/or users who are following the user (Chris Ross). In one embodiment, the user may tap on the Follower menu item 762 to access a list of other DeliRadio users and/or artists who are following the user.
Functionality 764 for enabling the user to search for new DeliRadio friends and send follow requests.
Functionality 766 for enabling the user to access to a User Settings GUI for viewing, modifying, and/or updating other types of settings associated with the user's DeliRadio profile or account. An example of a DeliRadio User Settings GUI is illustrated, for example, in FIG. 28 of the drawings.

In at least one embodiment, the user may tap on the Favorites row 758 to access a User Favorites GUI which may be configured or designed to display and/or provide access to various types of information associated with the user's favorite or starred content such as, for example, one or more of the following (or combinations thereof):

Favorite artists.
Favorite tracks or songs.
Favorite shows or events.
Favorite venues.
Favorite stations (e.g., DeliRadio stations).
And/or other types of information and/or functionality described herein.

According to specific embodiments, a user may add to their customized favorites by "starring" a selected artist/band, song/track, show/event, station, and/or venue. In at least one embodiment, at least a portion of user's Favorites may be accessed or viewed by other users of the DeliRadio System, such as, for example, the identified user's friends, followers, etc.

Figure 24:
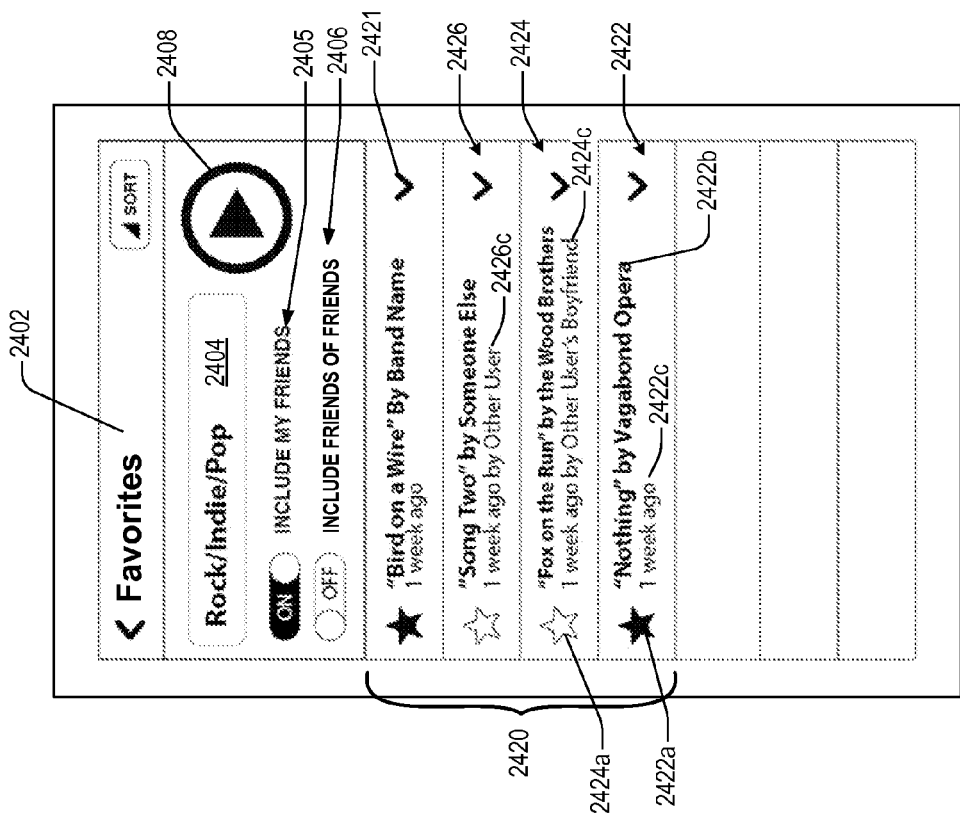

FIG. 24 illustrates an example screenshot of a User Favorite Tracks GUI which may be used to facilitate, initiate and/or perform various operation(s) and/or action(s) relating to the DeliRadio System technology described herein. In at least one embodiment, the User Favorite Tracks GUI may be configured or designed to provide functionality for enabling the user to identify, sort, filter, select, and/or edit his/her Favorite Tracks. As illustrated in the example embodiment of FIG. 24, a search/filter input interface 2404 may be provided to enable the user to search for desired tracks matching search keywords, and/or to filter the displayed favorite tracks based on various criteria such as, for example, artist, genre, then you, album, etc.

As illustrated in the example embodiment of FIG. 24, the User Favorite Tracks GUI may include a Play Button 2408, which, when selected (e.g., tapped on) by the user, may cause the DeliRadio System to dynamically generate a dynamic DeliRadio station which is based upon the filtered tracks 2420 which are being displayed in the Track List portion 2420 of the User Favorite Tracks GUI. In this way, for example, the Play Button may be utilized to create a genre-customized DeliRadio Station of the user's Favorite Tracks for the specified genre. In one embodiment, the user can also choose to view and/or to include (in a selected DeliRadio Station) selected Favorite Tracks of the user's DeliRadio's Friends (e.g., tracks which the user's friends have starred as "Favorites").

As illustrated in the example embodiment of FIG. 24, the User Favorite Tracks GUI may include information about when the user starred the track (e.g., 2422c, 2424c, 2426c). If the user clicks or taps on one of the "down arrow" buttons (e.g., 2421)—a drop down Action Drawer GUI may be displayed which may provide the user with suggested action choices such as, for example, one or more of the following (or combinations thereof): sharing, artist information, seeing which of the users DeliRadio Friends also likes this track or this artist, allowing the user to click through to those Mobile User Profiles, etc.

In at least one embodiment, the User Favorite Tracks GUI may include one or more, settings and/or features (e.g., 2405, 2406, etc.) which may be toggled on/off. For example, as illustrated in the example embodiment of FIG. 24, the user may toggle "on" or "off" the "Include My Friends" feature 2405, to thereby cause the User Favorite Tracks GUI to display/to not display Favorite Tracks of the user's DeliRadio Friends. Additionally, as illustrated in the example embodiment of FIG. 24, the user may toggle "on" or "off" the "Include Friends of Friends" feature 2406, to thereby cause the User Favorite Tracks GUI to display/to not display Favorite Tracks of friends of the user's DeliRadio Friends (e.g., Friends of Friends). In the specific example embodiment of FIG. 24, some of the displayed star icons (e.g., 2422a, 2424a) are "starred" (e.g., 2422a) and some are not "starred" (e.g., 2424a). In one embodiment, the tracks that are not "starred" indicate other user's Favorite Tracks, giving this user the ability to "star" that track as well. The drop down Action Drawer GUI feature may also be used to enable the user to learn more about the other users who have starred this track.

Figure 25:
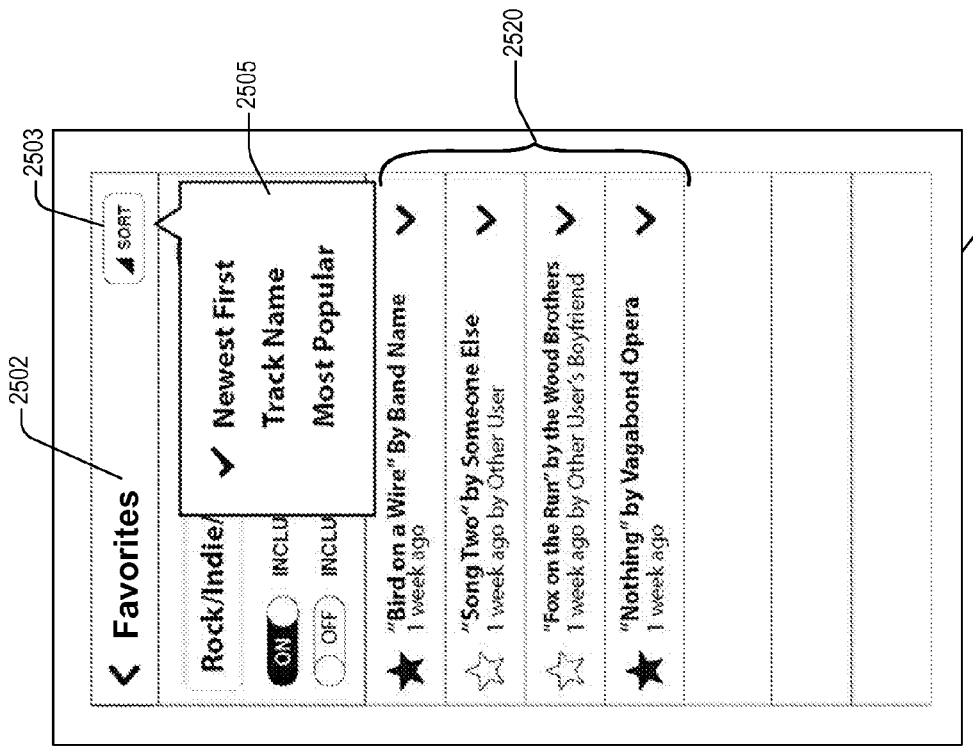

As illustrated in the example embodiment of FIG. 25, the User Favorite Tracks GUI may include sorting functionality (2503, 2505), which, for example, may allow the user to sort the displayed list of favorite tracks 2520 according to user selected criteria such as, for example, newest first (e.g., chronological sort), track name (e.g., alphabetical sort), most popular, etc.

Figure 26:
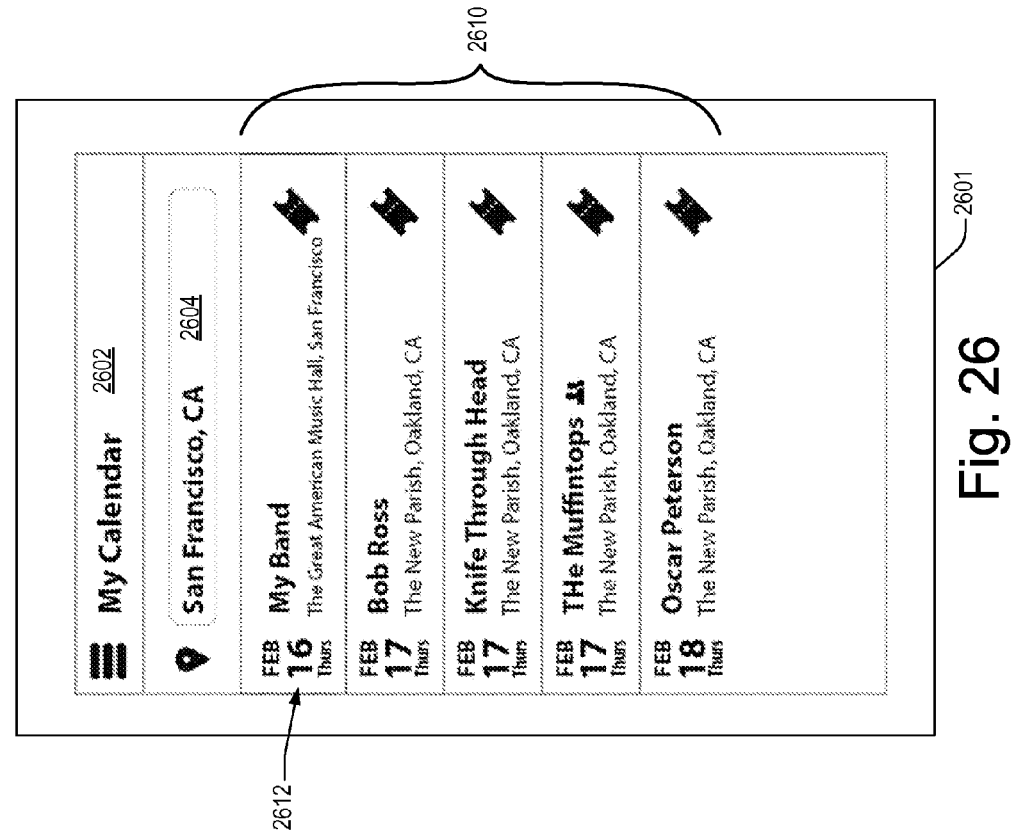

FIG. 26 illustrates an example screenshot of an embodiment of a User Calendar GUI 2601 which may be used to facilitate, initiate and/or perform various operation(s) and/or action(s) relating to the DeliRadio System technology described herein. In at least one embodiment, User Calendar GUI 2601 may be configured or designed to display a customized list 2610 of upcoming events relating to events, venues, tracks and/or artists that the user has starred. For example, the list of events may include artists (who have upcoming shows near the user's location) that are associated with one or more tracks that the user has starred. Clicking or tapping on one of the list entries (e.g., 2612) may direct the user to a related Event GUI which made display additional information relating to the selected event. In at least one embodiment, the DeliRadio Mobile Application may be configured or designed to allow the user to star the event, which may cause the selected event to automatically be added to the user's collection of Favorites.

As illustrated in the example embodiment of FIG. 26, the User Calendar GUI may also be configured or designed to include location search/filter functionality 2604, which, for example, may enable the user to input or specify a desired geographic location. In at least one embodiment, the DeliRadio Mobile Application and/or DeliRadio System may use the user-specified geographic location to generate a filtered list of calendar event results which have been customized based on the user's favorite or starred content (and/or which have been customized based on other information in the users profile. For example, in the specific example embodiment of FIG. 26, it is assumed that the DeliRadio Mobile Application is displaying a filtered list of upcoming shows in the user's current geographic location (e.g., San Francisco), wherein each of the different shows listed in the events list 2610 includes performances by at least one band or artist that has been dynamically identified (e.g., by the DeliRadio System) as being a "favorite" of the identified user (e.g., based on one or more tracks which the user has starred). Additionally, as illustrated in the example embodiment of FIG. 26, the customized calendar event list 2610 may include functionality for enabling the user to purchase and/or reserved tickets relating to one or more of the displayed events.

Figure 27:
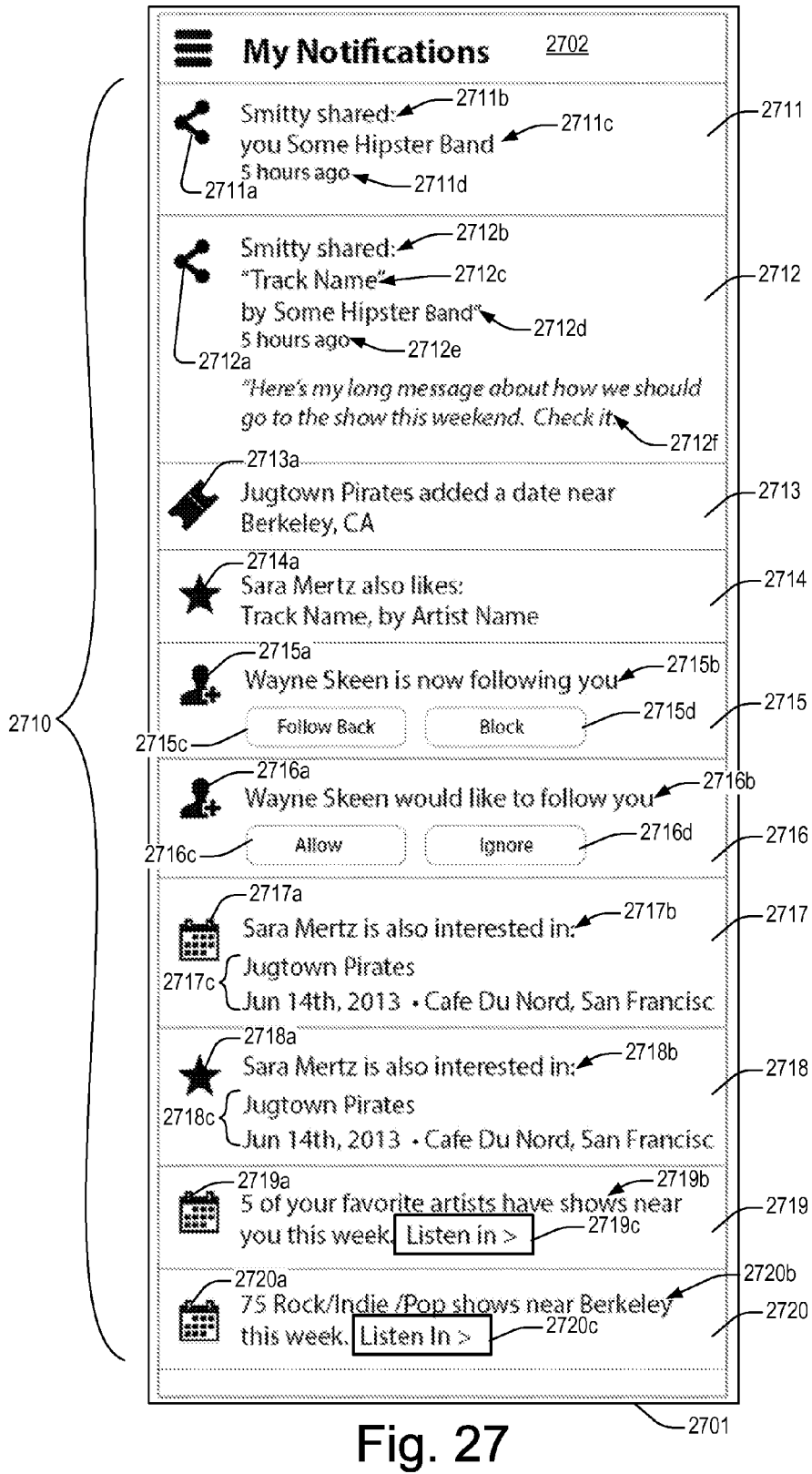

FIG. 27 illustrates an example screenshot of an embodiment of a User Notifications GUI 2701 which may be used to facilitate, initiate and/or perform various operation(s) and/or action(s) relating to the DeliRadio System technology described herein. In at least one embodiment, the user may access the User Notifications GUI by tapping on the "My Notifications" portion 914 of the Navigation Pane GUI of FIG. 9. In at least one embodiment, the User Notifications GUI may display a list 2710 of notifications which has been dynamically customized for the identified user. According to different embodiments, the User Notifications GUI may be configured or designed to display a variety of different types of notifications which, for example, may include, but are not limited to, one or more of the following (or combinations thereof):

Artist, track, station, event shares from DeliRadio Friends, which may also include a short message or other content.

New upcoming shows by Favorite Artists or Artists with Favorite Tracks.

Favorite Artists, Tracks, Stations, Events as added by DeliRadio Friends.

User follow requests—with option to allow or ignore.

User follow notifications.

General show notifications (which, for example, may be organized by genre or other criteria).

Other types of notifications, communications, and/or events described and/or referenced herein.

In at least one embodiment, if User A and User B are mutual DeliRadio Friends and both have starred the same artist, and that artist has an upcoming local show, the User Notifications GUI for User A may display a notification that one of User A's Favorite Artists has an upcoming local show, and may also display a list of User A's other DeliRadio Friends (e.g., including User B) who like that artist and may also be interested in attending the identified show. If User A and User B are DeliRadio Friends, and User A stars an Event, and User B has starred one of the artists playing that Event, User B may receive a notification that User A may be interested in going to an Event where one of User B's Favorite Artists is performing. Also if User A stars an Event, User A may also receive notifications about other DeliRadio Friends/users who have also starred that same Event.

Follow-type notifications may be implemented in accordance with several different embodiments. For example, in one embodiment, User A may configure his profile/account as "public" (e.g., allowing User A's account/profile to be publically visible). In this example, if User B (Wayne Skeen) requests to follow User A, User A may receive a notification message similar to public-follow request notification message 2715 (e.g., Wayne Skeen is now following you 2715b), along with options to Follow Back 2715c or Block 2715d. If, however, User A has configured his profile/account as "private", and if User B requests to follow User A, User A may receive a notification message similar to private-follow request notification message 2716 (e.g., Wayne Skeen would like to follow you 2716b), along with options to Allow 2716c or Ignore/Decline 2716d.

Figure 28:
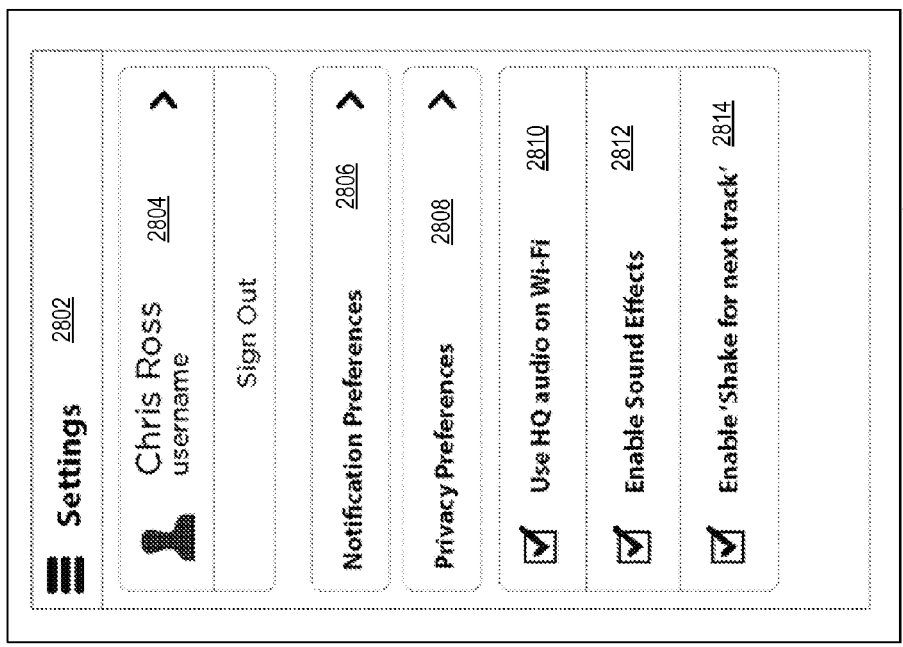

FIG. 28 illustrates an example screenshot of an embodiment of a User Settings GUI 2801 which may be used to facilitate, initiate and/or perform various operation(s) and/or action(s) relating to the DeliRadio System technology described herein. In at least one embodiment, the user may access the User Settings GUI by tapping on the "Settings" portion 916 of the Navigation Pane GUI of FIG. 9. According to different embodiments, the User Settings GUI may be configured or designed include functionality for enabling the user to configure various types of user-related account and/or profile settings such as, for example, one or more of the following (or combinations thereof):

Notification preferences 2806.

Privacy preferences 2808.

Use high quality audio on Wi-Fi 2810.

Enable Sound Effects 2812.

Enable shake for next track feature 2814.

Modify user profile details 2804.

Modifying other types of user profile and/or account settings described and/or referenced herein.

Deliradio Friends & Streams

FIGS. 8A-36 illustrate various example screenshots and GUIs relating to DeliRadio Friends & Streams functionality, at least a portion of which may be implemented at a mobile device (e.g., smartphone) via a DeliRadio Mobile Application. As described in greater detail below, at least a portion of the DeliRadio System GUIs may be configured or designed to provide mobile users with "location based" streaming radio functionality. Users from different geographic locations may access a variety of DeliRadio System GUIs to search for, create, and/or share customized streaming radio stations which may be configured to identify and play/stream music associated with one or more of the following (or combinations thereof):

Upcoming shows;
 Bands/Artists;
 Venue related events;
 Online streaming radio stations;
 Online streaming video stations;
 Etc.

In at least one embodiment, the DeliRadio System may include functionality for enabling users to selectively filter search results and/or presented content according to a variety of different filtering criteria such as, for example, one or more of the following (or combinations thereof):

geographic location;
 geographic proximity;
 time/date criteria;
 venue name(s);
 music genre(s);
 video genre(s);
 artist/band name(s)
 user ID;
 geographic location of artist/band origin (e.g., home town);
 geographic location of upcoming shows and/or events;
 geographic proximity of upcoming shows and/or events;
 etc.

Figures 8A, 8B:
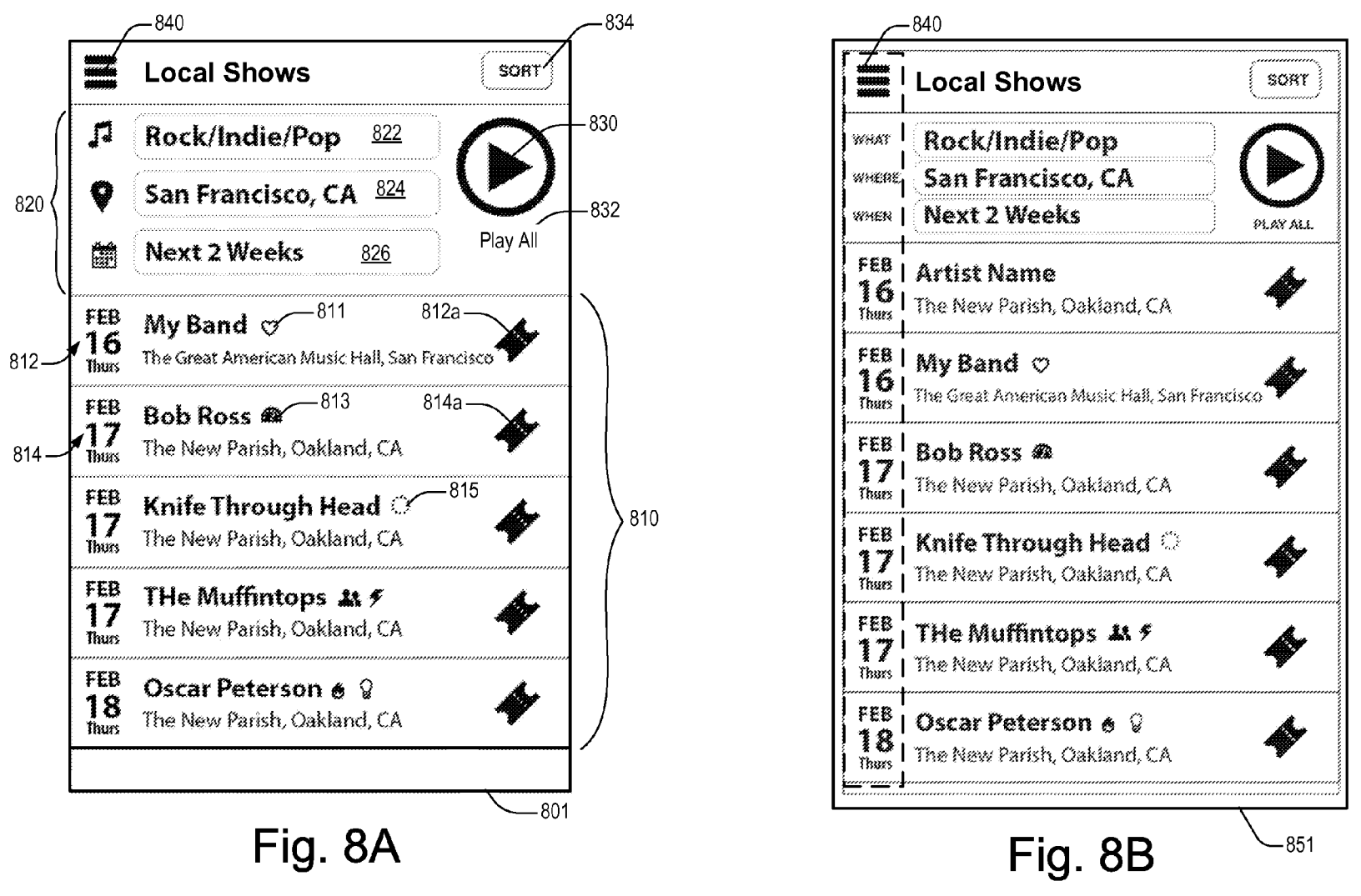

FIG. 8A illustrates an example screenshot of a Local Shows GUI which may be used to facilitate, initiate and/or perform various operation(s) and/or action(s) relating to the DeliRadio System technology described herein. As illustrated in the example embodiment of FIG. 8A, Local Shows GUI 801 provides an interface 820 which is configured or designed to enable a user to search for upcoming artist/band performances which match user-specified criteria such as, for example, one or more of the following (or combinations thereof): geographic location; geographic proximity; time/date criteria; venue name(s); music genre(s); video genre(s); artist/band name(s); geographic location of artist/band origin (e.g., home town); geographic location of upcoming shows and/or events; geographic proximity of upcoming shows and/or events; etc.

In the specific example embodiment of FIG. 8A, it is assumed that the user has initiated a search for upcoming artist/band performances which match the following user-selected criteria:

Music Genres/Types: Rock, Indie, Pop 822
 Geographic Location San Francisco, Calif. 824
 Timeframe: Next 2 Weeks In at least one embodiment, the user's specified search criteria may be provided to the MMMS Server System, which may use the search criteria to automatically and/or dynamically initiate (e.g., in real-time) one or more search query(s) at one or more MMMS System databases and/or 3$^{rd}$ party databases. Thereafter, the MMMS Server System may use the information and results obtained from the search query(s) to automatically and/or dynamically generate (e.g., in real-time) updated, customized, filtered content to be included in the Local Shows GUI that is displayed to the user. Accordingly, after the search/query has been initiated by the user, the content displayed in the Local Shows GUI may be automatically and dynamically updated to include customized GUIs and content matching (or relating to) user's specified filter-search criteria.

For example, as illustrated in the example embodiment of FIG. 8A, Local Shows GUI may be configured or designed to display Local Show search results 810 which includes updated content and links relating to the search criteria: Rock/Pop/Indie Shows Near San Francisco performing in the next Two Weeks.

According to different embodiments, the displayed content in the Local Show search results may include, for example, a list of different bands/artists (e.g., 812, 814, etc.) that will be performing in or near San Francisco in the next two weeks. In at least one embodiment, each different record (e.g., 812) in the list may include various types of artist-related, show-related, venue-related, and/or other types of related information such as, for example, one or more of the following (or combinations thereof):

Artist/Band Name
 Artist/Band Home Town/City
 Show Date
 Venue Name (where show will be performed)
 Venue Location
 Links (e.g., 812a, 812b) and/or information relating to show ticket reservation/purchasing.

In at least one embodiment, using the MMMS Server System may be operable to use the user's filter criteria and filtered search results to dynamically generate (e.g., in real-time) at least one streaming radio station which will play songs only from artists which match the user's specified filter criteria. For example, as illustrated in the example embodiment of FIG. 8A, Local Shows GUI includes a "Play" button 830 which, when selected by the user (e.g., via screen tap), may dynamically generate and begin streaming a DeliRadio Station which plays songs performed by (or recorded by) the identified group of Rock/Pop/Indie artists/bands that will be performing shows in or near San Francisco within the next two weeks.

In at least one embodiment, when the user clicks on the Play button 830, a popup dynamic Station Player GUI may automatically be displayed at the user's mobile device which plays songs performed by (or recorded by) the identified artists/bands. In some embodiments, the customized DeliRadio Station may be created as a dynamic station in which the playlist for this station is dynamic, and changes over time, as different bands and venues match (over time) the customized filter criteria used to generate this station.

In at least one embodiment, this customized DeliRadio Station may be saved by the user under a desired station name selected by the user. In one embodiment, the user may click to save a dynamic station to the user's My Stations list. Once saved, the customized DeliRadio Station may be discovered by other users and/or shared to a variety of social networks such as Facebook, Twitter, etc. In at least one embodiment, the MMMS Server System tracks and saves (e.g., in at least one database) information relating to the customized DeliRadio Station, such as, for example, one or more of the following (or combinations thereof):

station name;
 station type (e.g., dynamic or static);
 station owner;
 filter criteria used to generate the station;

artist/band names (or other artist/band identifiers) of artist(s)/band(s) associated with the station;

artist/band related information such as, for example: tour dates, twitter handles, DeliRadio artist/band page; genre information, tags, artist/band home town/city information, etc.;

song playlist information;

number of shares by users;

number of plays by users (e.g., over one or more time intervals);

number of stars collected;

track play history;

track popularity;

album information;

and/or other types of trackable DeliRadio information described herein.

In at least one embodiment, the MMMS Server System may periodically update the song list of the customized, dynamic DeliRadio Station so that the Station continues to stream only those songs which are performed by (or recorded by) Rock/Pop/Indie artists or bands that will be performing in or near San Francisco within the next two weeks (e.g., w/in two weeks from the then current real-time date). In at least one embodiment, the displayed list of bands/shows may be sorted according to show date proximity, with the shows coming up the soonest being placed at or near the top of the list.

In at least one embodiment, the user may highlight or select artist/show record (e.g., 812) from the Local Show search results in order to access additional information and/or features relating to the highlighted/selected artist (and related shows), such as, for example, one or more of the following types of information (or combinations thereof):

Artist/Band Name;

Tags and/or Genre labels associated with the Artist/Band;

Artist/Band Home Town/City;

Upcoming Artist/Band Show/Tour dates'

Artist/Band related image content and/or video content (not shown)

Artist/Band Album information

In at least one embodiment, using the MMMS Server System may be operable to use the user's filter criteria and filtered search results to dynamically generate (e.g., in real-time) at least one streaming radio station which will play only songs performed by (or recorded by) (or associated with) the selected artist. In some embodiments, the MMMS Server System may be operable to use the user's filter criteria and filtered search results to dynamically generate (e.g., in real-time) at least one streaming radio station which will play only songs performed by (or recorded by) artists or bands performing at the identified venue.

As illustrated in the example embodiment of FIG. 8A, various types of icons (e.g., 811, 813, 815, etc.) may be displayed next to each artist name, indicating the user's relationship to that artist. For example, a "heart" icon if the user has indicated they like this artist; a "speedometer" icon if this artist is trending upward in popularity; a "circle" icon if this artist is a favorite amongst the user's extended circle of friends; a "friend" icon if the user's friends like this artist; a "lightning bolt" or a "flame" icon if the artist is 'hot' right now; a "light bulb" icon if DeliRadio thinks the user might like this artist.

FIG. 14 illustrates an example screenshot of a Genre Selection GUI 1420 which may be used to facilitate, initiate and/or perform various operation(s) and/or action(s) relating to the DeliRadio System technology described herein. In the specific example embodiment of FIG. 14, it is assumed that the user has tapped on the Genre (e.g., "What") input field 1410 of the Local Shows GUI to access the Genre Selection GUI. As illustrated in the example embodiment of FIG. 14, Genre Selection GUI may be configured or designed include functionality for facilitating the user in selectively chosing and/or inputting genre-related and/or tag-related filtering criteria to be used as part of the user-specified search criteria. For example, according to different embodiments, Genre Selection GUI may me configured or designed to include one or more of the following features (or combinations thereof):

a predefined list of "Include-Type" Genre categories which (if selected by the user) are to be included as positive limitations of the filter criteria (e.g., punk+rock+jazz);

a predefined list of "Exclude-Type" Genre categories which (if selected by the user) are to be included as negative limitations of the filter criteria (e.g., not punk; not punk and not jazz);

a predefined list of "Include-Type" Tags which (if selected by the user) are to be included as positive limitations of the filter criteria;

a predefined list of "Exclude-Type" Tags which (if selected by the user) are to be included as negative limitations of the filter criteria;

an manual tag input interface which enables the user to manually enter one or more Tags to be included as part of the filter criteria;

a Presets interface which may include functionality for enabling the user to create and save different presents of user-customized Genres/Tags filtering criteria;

etc.

FIG. 15 illustrates an example screenshot of a Location/Proximity Selection GUI 1520 which may be used to facilitate, initiate and/or perform various operation(s) and/or action(s) relating to the DeliRadio System technology described herein. In the specific example embodiment of FIG. 15, it is assumed that the user has tapped on the Location/Proximity (e.g., "Where") input field 1510 of the Local Shows GUI to access the Location/Proximity Selection GUI. As illustrated in the example embodiment of FIG. 15, Location/Proximity Selection GUI may be configured or designed include functionality for facilitating the user in selectively chosing and/or inputting location/proximity filtering criteria to be used as part of the user-specified search criteria. For example, as illustrated in the example embodiment of FIG. 15, Location/Proximity Selection GUI may include one or more of the following features (or combinations thereof):

Location Input Interface 1521 for enabling a user to manually enter a desired location (e.g., city, state, country, zip code, etc.).

Automated current geolocation interface 1522, which, when tapped by the user, may cause the DeliRadio Mobile Application to access geolocation components of the user's mobile device (e.g., GPS components) to determine the user's current geolocation, and to cause the user's current geolocation to be automatically input into the Location Input Interface 1521. In at least one embodiment, the DeliRadio Mobile Application may use the user's current geolocation as the defalut input.

Proximity input interface 1530, which may be configured or designed to enable the user to specify a desired geographic proximity range to be used as part of the user-specified search criteria. For example, as illustrated in the example embodiment of FIG. 15, Location/Proximity Selection GUI may display a plurality of different proximity options (e.g., 5 mils, 20 miles, 50 miles, etc.) to be selected by the user. In some embodiments, the Location/Proximity Selection GUI may provide a manual input interface (e.g., a slider bar) for allowing the user to manually input a desired proximity value. In at least one embodiment, the DeliRadio Mobile Application may select a specific proximity value (e.g., 20 miles) as a defalut input.

Figure 16:
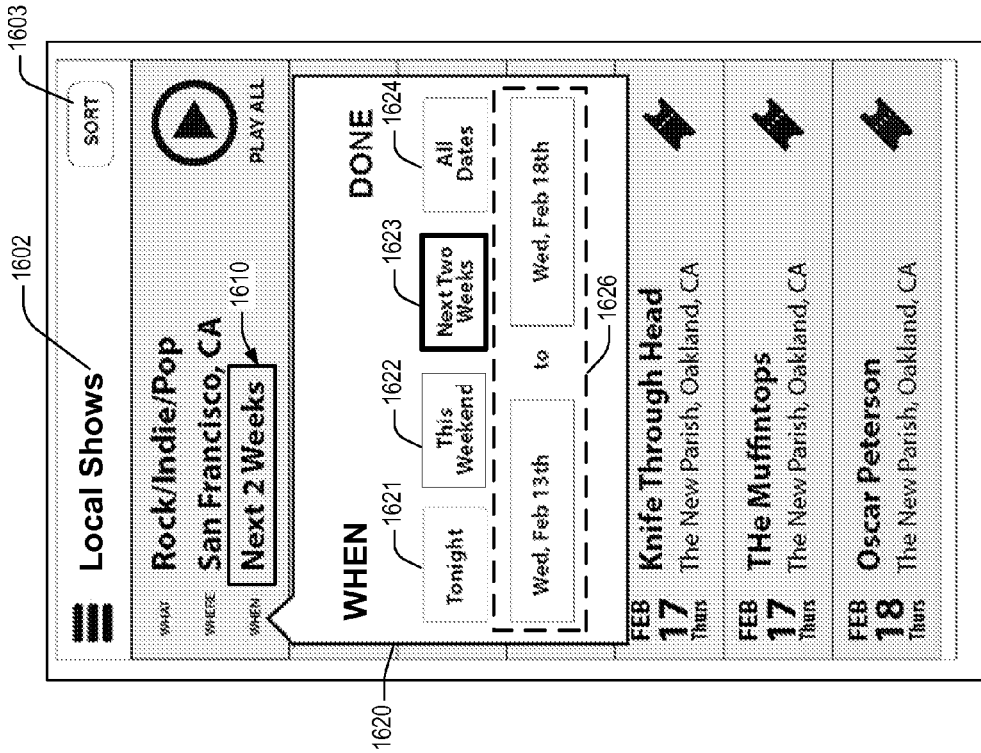

FIG. 16 illustrates an example screenshot of a Timeframe Selection GUI 1620 which may be used to facilitate, initiate and/or perform various operation(s) and/or action(s) relating to the DeliRadio System technology described herein. In the specific example embodiment of FIG. 16, it is assumed that the user has tapped on the Location/Proximity (e.g., "When") input field 1610 of the Local Shows GUI to access the Timeframe Selection GUI. As illustrated in the example embodiment of FIG. 16, Timeframe Selection GUI may be configured or designed include functionality for facilitating the user in selectively chosing and/or inputting time-based filtering criteria to be used as part of the user-specified search criteria. For example, as illustrated in the example embodiment of FIG. 15, Location/Proximity Selection GUI may display a plurality of different timeframe options (e.g., tonight 1621, this weekend 1622, next two weeks 1623, all dates 16/24, etc.) to be selected by the user. In some embodiments, the Timeframe Selection GUI may provide a custom date range input interface (e.g., 1626) for allowing the user to input a customized date range. In at least one embodiment, the DeliRadio Mobile Application may select a specific timeframe value (e.g., next two weeks) as a default input.

Figure 17:
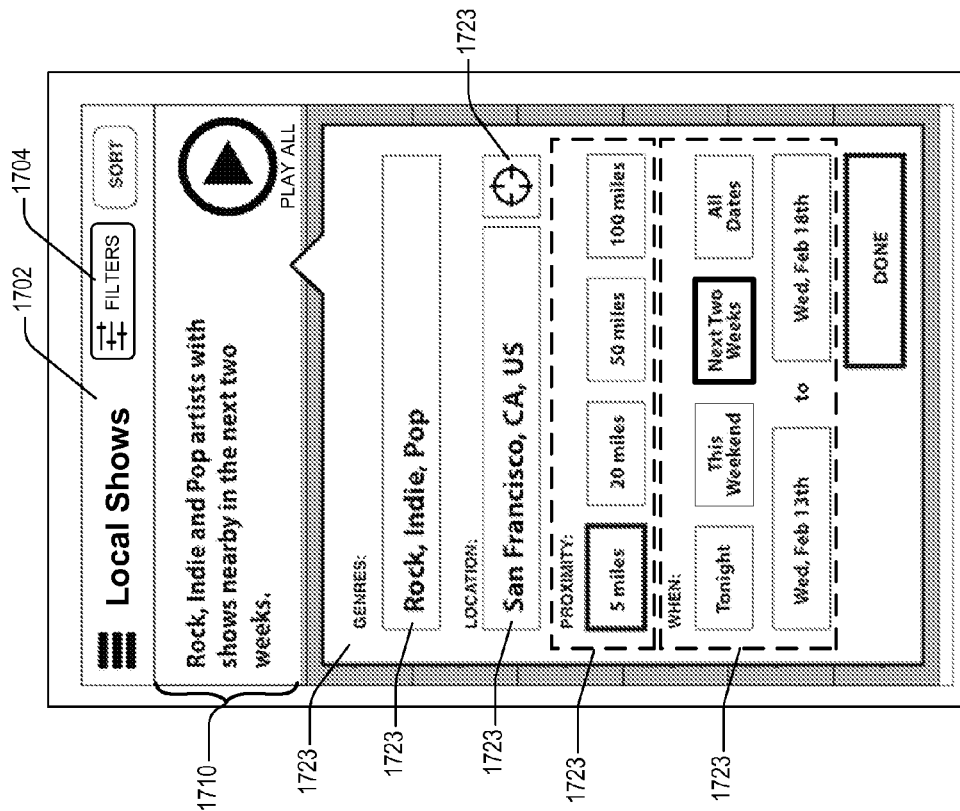

FIG. 17 shows an example screenshot of an alternate embodiment of a Local Shows GUI 1701, which has been configured or designed to include combined aspects of functionality from Genre Selection GUI 1420, Location/Proximity Selection GUI 1520, and Timeframe Selection GUI 1620.

Figures 18, 19:
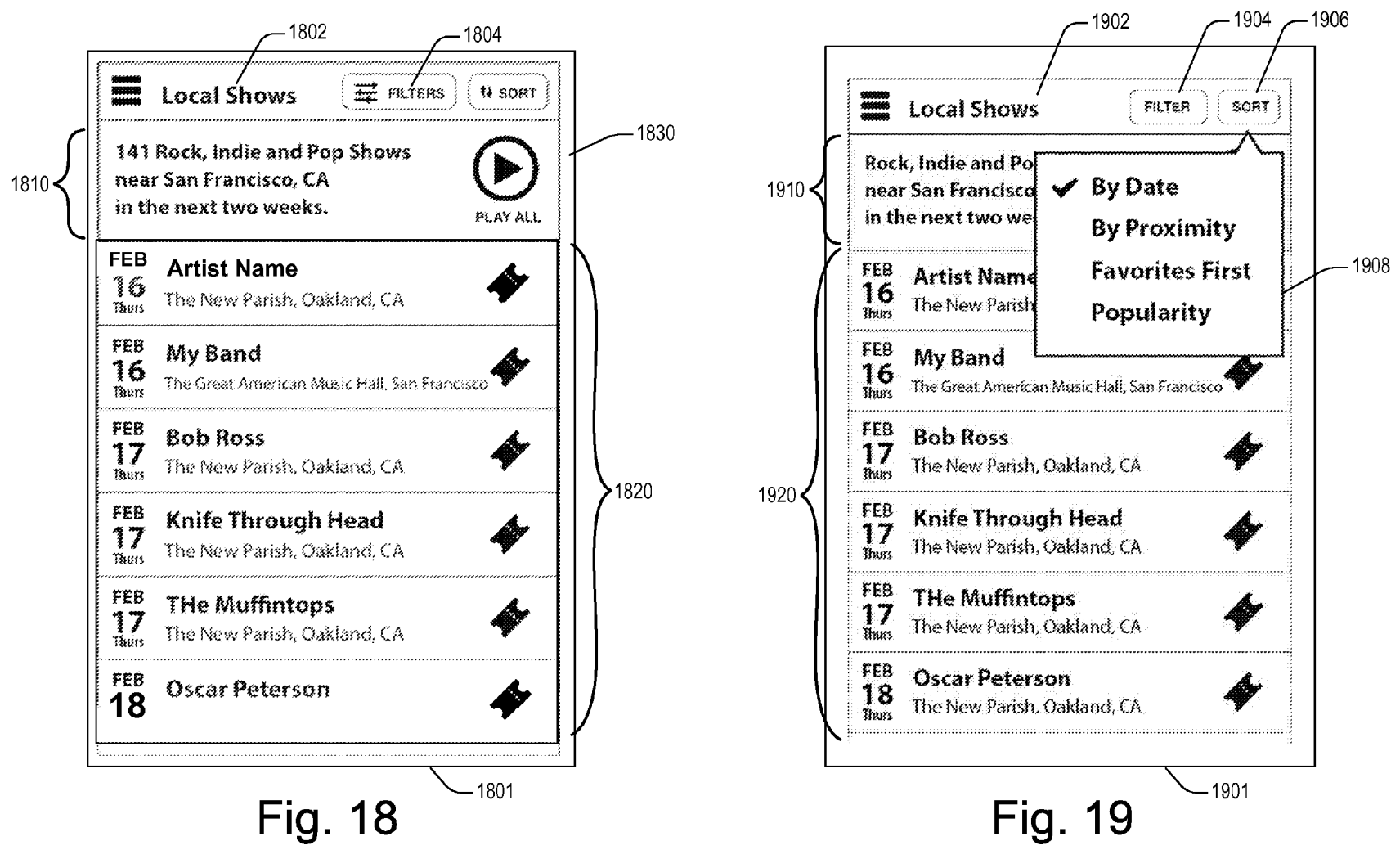

FIG. 18 shows an example screenshot of an alternate embodiment of a Local Shows GUI 1801 in which the filter criteria 1810 is shown in text format. In one embodiment, a user may tap on the Filters button 1804 to display additional GUIs for enabling the user to modify the filter criteria.

As illustrated in the example embodiment of FIG. 19, the Local Shows GUI may include sorting functionality (1906, 1908), which, for example, may allow the user to sort the displayed list of upcoming shows/events (1920) according to user selected criteria such as, for example:
- "By Date" which, for example, may list the search results chronologically.
- "By Proximity" which, for example, may list the search results based on events occurring closest to the user's location.
- "Favorites First" which, for example, may list the artists, venues and events that the user has starred or indicated as a Favorite.
- "Popularity" which, for example, may list the results according to the most popular artists, venues and events (e.g., among the user's DeliRadio friends or among all DeliRadio users)
- Etc.

FIG. 20 illustrates an example screenshot of an Event Page GUI 2001 which may be used to facilitate, initiate and/or perform various operation(s) and/or action(s) relating to the DeliRadio System technology described herein. In the specific example embodiment of FIG. 20, it is assumed that the user has tapped on an event listing (e.g., 1822) displayed in the Event List 1820 of Local Shows GUI (FIG. 18) to access the Event Page GUI. As illustrated in the example embodiment of FIG. 20, Event Page GUI may be configured or designed to provide information relating to the selected event, such as, for example, one or more of the following (or combinations thereof):

A list of the names of the artist(s) who will be performing at the event (2004).
The day/date of the event (2006).
The event venue name, and address (2008).
The ticket price and the start time of the event (2009).

In at least one embodiment, a user may click or tap on the name of one of the display artist names (e.g., Artist Name") to display a Mobile Artist Profile Info GUI which provides more detailed information about the selected artist. According to different embodiments, the Mobile Artist Profile Info GUI may be displayed either via a new screen, or at the bottom of the Event Page GUI.

As illustrated in the example embodiment of FIG. 20, Event Page GUI may include one or more icons (e.g., 2010, 2012, 2014, 2016) which may each be configured or designed to enable the user to initiate and/or perform various operation(s) and/or action(s) such as, for example, one or more of the following (or combinations thereof):
- Initiate (e.g., 2010) streaming of a customized DeliRadio Station which plays songs performed by (or recorded by) artists/bands who will be performing at the identified venue.
- Star (e.g., 2012) the identified event, which may cause the event to be added to the user's favorite events.
- Purchase and/or reserve (e.g., 2014) one or more tickets for the identified show.
- Share details about the identified event with the user's DeliRadio friends, other DeliRadio users, social networks, email, twitter, etc.
- and/or other types of actions, operations and/or activities described and/or referenced herein.

For example, in at least one embodiment, the user may tap the "Play" icon 2010 to cause the DeliRadio System to dynamically generate and begin streaming a customized DeliRadio Station which plays songs performed by (or recorded by) one or more of the artists/bands (e.g., 2004) who will be performing at the identified venue (e.g., 2008) on the identified date (e.g., 2006). In this way, the DeliRadio System provides functionality for enabling a user to create and play a dynamically customized DeliRadio Station which may represent a lineup for a selected show at a given venue, and which features full tracks by the artists/bands who will be performing at that show.

In other embodiments, additional venue-related DeliRadio Station icons and/or GUIs may be presented for enabling the user to:
- Cause the DeliRadio System to dynamically generate and begin streaming a customized DeliRadio Station which plays songs matching one or more genres which are performed by (or recorded by) artists/bands who will be performing at the identified venue.
- Cause the DeliRadio System to dynamically generate and begin streaming a customized DeliRadio Station which plays songs performed by (or recorded by) artists/bands who will be performing at the identified venue within a specified time period (e.g., within the next two weeks, within the next 30 days, this weekend, etc).
- Cause the DeliRadio System to dynamically generate and begin streaming a customized DeliRadio Station which plays songs matching one or more genres which are performed by (or recorded by) artists/bands who will be performing at the identified venue within a specified time period.
- Cause the DeliRadio System to dynamically generate and begin streaming a customized DeliRadio Station which only plays songs matching one or more genres which are performed by (or recorded by) artists/bands who will be performing at the identified venue within a specified time period.

Cause the DeliRadio System to dynamically generate and begin streaming a customized DeliRadio Station which plays songs matching one or more genres which are performed by (or recorded by) artists/bands are listed on the venue's show calendar.

Cause the DeliRadio System to dynamically generate and begin streaming a customized DeliRadio Station which plays songs matching one or more genres which are performed by (or recorded by) artists/bands who have performed at the identified venue in the past.

In at least some embodiments, the DeliRadio System and/or DeliRadio Mobile Application may include functionality which enables a user to create and stream a customized, multi-venue DeliRadio Station which plays songs/tracks performed by (or recorded by) artists/bands who have upcoming shows at least one of a group of venues (e.g., songs by artists who will be performing at either The Fillmore Theater or the Warfield Theater (in San Francisco)).

In at least one embodiment, the DeliRadio System and/or DeliRadio Mobile Application may be configured or designed to present different types of Calendar Event GUIs which are customized for a given user. For example, some types of Calendar Event GUIs may include a list of "suggested events" (e.g., shows that the DeliRadio System "thinks" the user may be interested in attending) which, for example, may be based on one or more of the following (or combinations thereof):

The user's starred (or Favorite) DeliRadio artists/bands who have upcoming local shows in the user's current geographic location.

The user's starred (or Favorite) venues.

The user's starred (or Favorite) genres.

Invitations from the user's DeliRadio friends and/or other users who have invited or recommended the user to attend one or more shows/events.

In at least some embodiments, other types of Calendar Event GUIs may include a list of specific events:

That the user has already starred or expressed interest in attending.

That the user has already reserved or purchased tickets for.

FIG. 21 illustrates an example screenshot of a Local Artists GUI 2101 which may be used to facilitate, initiate and/or perform various operation(s) and/or action(s) relating to the DeliRadio System technology described herein. In the specific example embodiment of FIG. 21, it is assumed that the user has tapped on Local Artists GUI portion 906 of the Navigation Pane GUI of FIG. 9. As illustrated in the example embodiment of FIG. 21, Local Artists GUI may be configured or designed include functionality for dynamically determining and displaying a list of artists/bands (e.g., 2120) who have indicated a "hometown" that matches the user's search criteria for genre (e.g., 2104) and location) e.g., 2106). As illustrated in the example embodiment of FIG. 21, Local Artists GUI may include a "Play" icon 2108 which, when tapped or selected by the user, may cause the DeliRadio System to dynamically generate and begin streaming a customized DeliRadio Station which plays songs performed by (or recorded by) one or more of the artists/bands listed in the filtered results (e.g., 2120). In this way, the user is able to create and listen to a dynamic DeliRadio Station of tracks performed (or recorded by) local artists/bands which match the user's specified genre and/or location filters.

As illustrated in the example embodiment of FIG. 22, the Local Artists GUI may include sorting functionality (2203, 2205), which, for example, may allow the user to sort the displayed list of local artists/bands according to user selected criteria such as, for example:

"Favorites First" which, for example, may sort the list results according to the artists/bands that the user has starred or indicated as a Favorite.

"Popularity" which, for example, may sort the list results according to the most popular artists/bands (e.g., as rated by the user's DeliRadio friends or among all DeliRadio users)

"On Tour" which, for example, may sort the list results based on whether or not a given artist/band is currently on tour (and/or based on a given artist's/band's tour schedule).

FIG. 23 illustrates an example screenshot of a Local Venues GUI 2301 which may be used to facilitate, initiate and/or perform various operation(s) and/or action(s) relating to the DeliRadio System technology described herein. In the specific example embodiment of FIG. 23, it is assumed that the user has tapped on Venues & Festivals GUI portion 908 of the Navigation Pane GUI of FIG. 9. As illustrated in the example embodiment of FIG. 23, Local Venues GUI may be configured or designed include functionality for dynamically determining and displaying list (e.g., 2320) of local venues and festivals, which, for example, may be determined based on the user's input (e.g., via input interface 2304) and/or based on the user's current geographic location. As illustrated in the example embodiment of FIG. 23, a respective "Play" icon (e.g., 2322b, 2324b) may be displayed next to each different venue/festival (e.g., 2322a, 2324a) displayed in the Local Venues list 2320, which enables the user to create and play a dynamically customized DeliRadio Station which may represent a lineup of the bands/artists who are (or who will be) performing at the identified venue/festival, and which may feature full tracks by the artists/bands who will be performing at that venue/festival. In at least some embodiments, Local Venues GUI may also include additional venue/festival relating information such as, for example: venue/festival location, the number of DeliRadio artists who will be performing at the venue/festival (and/or who are included as one of the artists/bands of that venue/festival's DeliRadio Station), etc.

FIG. 8B illustrates an alternate example screenshot of a Local Shows GUI, which, is configured or designed to enable a user to search for upcoming artist/band performances which match user-specified criteria such as, for example, one or more of the following (or combinations thereof): geographic location; geographic proximity; time/date criteria; venue name(s); music genre(s); video genre(s); artist/band name(s); geographic location of artist/band origin (e.g., home town); geographic location of upcoming shows and/or events; geographic proximity of upcoming shows and/or events; etc.

As illustrated in the example embodiment of FIG. 8B, GUI 851 may include a Navigation Pane Access button 840, which, if selected by the user, may cause a Navigation Pane GUI to be displayed at the user's mobile device. Alternatively, in at least one embodiment, when a user swipes from left to right (or right to left) from one or more screens/GUIs of the DeliRadio Mobile App, a Navigation Pane GUI may be caused to be displayed, as illustrated, for example, in FIG. 9.

Figure 9:
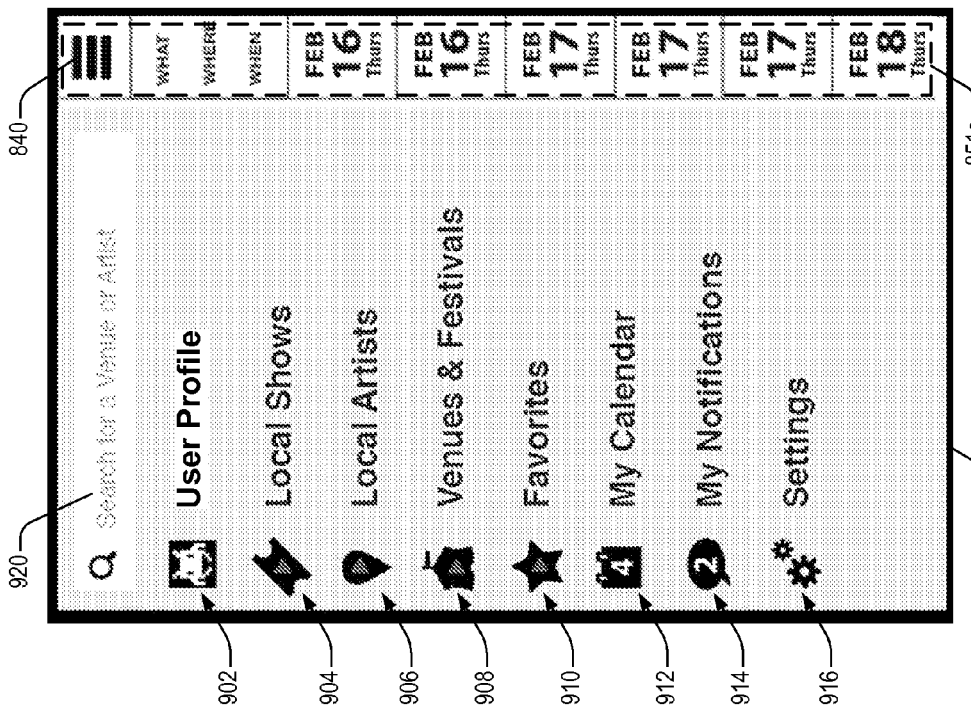

FIG. 9 illustrates an example screenshot of a Navigation Pane GUI, which may be configured or designed to provide the user with top-level menu choices for navigating and accessing various features and functionalities of the DeliRadio Mobile App, such as, for example, one or more of the following (or combinations thereof):

Accessing the DeliRadio user's profile and related information 902.

Displaying a list of local upcoming shows;
Performing customized searches for upcoming local shows 904.
Displaying a list of artists who will be performing locally; Performing customized searches for upcoming local shows 904.
Searching the DeliRadio database for artists or venues.
Displaying a local artist list and/or a.
Displaying a local venue and festival list.
User's collection of starred artists, tracks, events, venues and stations.
List of the events saved to the user's DeliRadio Calendar.
User's notifications of content shared with that user by other users, activity by other users, upcoming events, follow requests, etc.
User's settings for the Mobile App.
Etc.

One of the advantageous features of the DeliRadio mobile application relates to the ability for the DeliRadio mobile application to accurately determine (e.g., in real-time) the precise geolocation of the user at any given time, and to use such information to facilitate the searching, selection, filtering, and display of information which is contextually relevant to the users current, real-time geolocation. For example, in one embodiment, when a user launches the DeliRadio mobile application at the user's mobile device (e.g., smartphone), the DeliRadio mobile application may be configured or designed to precisely determine (e.g., in real-time) the user's current geographic location via use of the mobile device's GPS functionality (and/or via use of other mobile device components which are designed to determine the real-time, current geographic location of the mobile device). In general, the real-time tracking and granularity of determining a user's current geographic location is significantly more accurate using a mobile device's GPS functionality than it is using the device's IP address. Accordingly, by monitoring and tracking the real-time geolocation of the user using GPS functionality, more granular and detailed operations may be performed relating to the searching, selection, filtering, and display of information which is contextually relevant to the users current, real-time geolocation.

Figure 47:
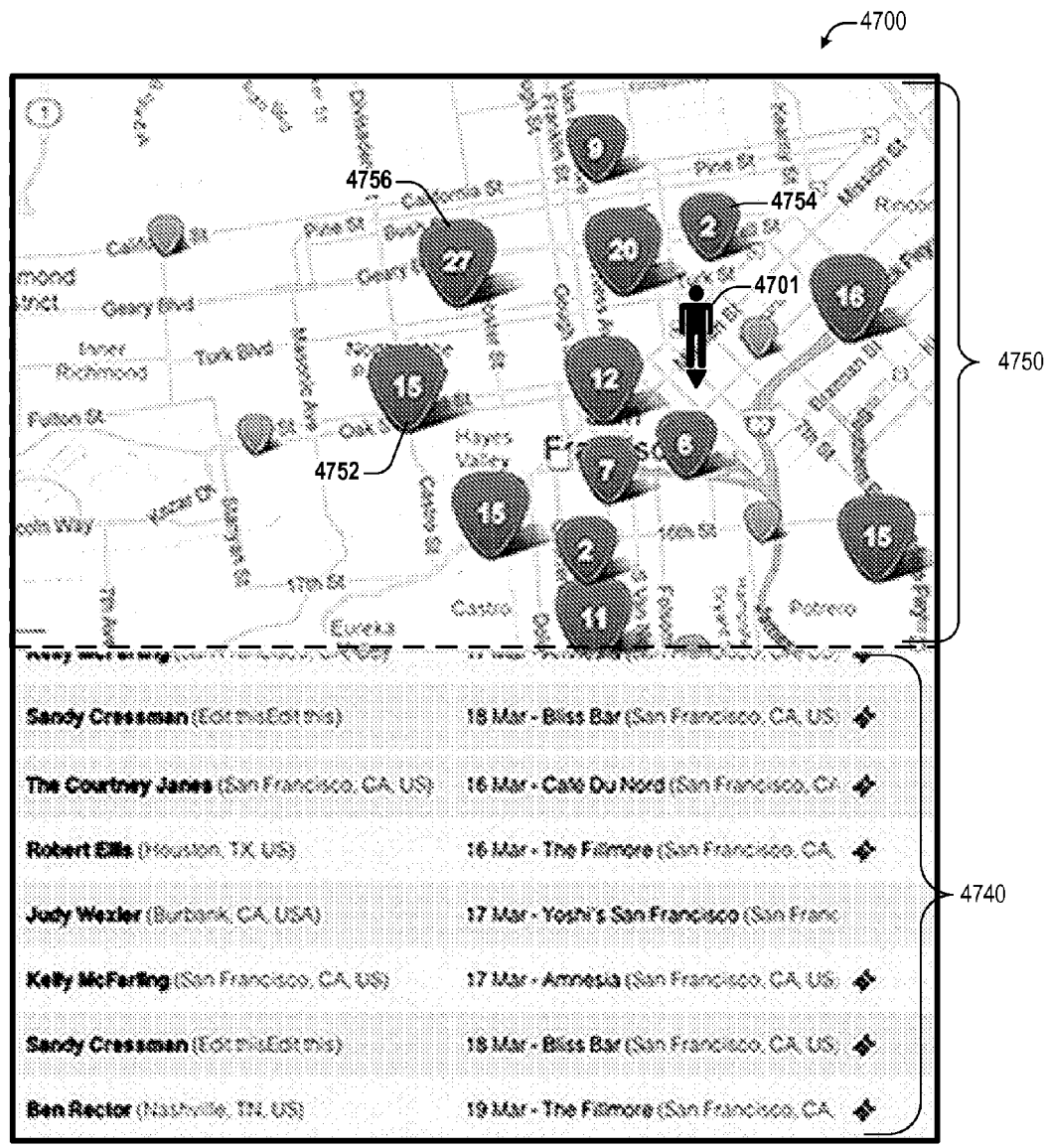

For example, as illustrated in the example embodiment of FIG. 47, the DeliRadio mobile application may use the user's current geolocation to display a Mobile User Event/Venue GUI 4700 which includes a MAP GUI portion 4750 that displays the user's current geographic location 4701 along with filtered search results (e.g., 4752, 4754, 4756) representing bands/artists which have upcoming gigs at venues within a predetermined proximity (e.g., w/in 2 miles) from the users current geographic location. In at least one embodiment, Mobile User Event/Venue GUI may be continuously and/or periodically updated to show changes in user's current geolocation, along with updated content showing updated search results based on the user's then current location. As illustrated in the example embodiment of FIG. 47, Mobile User Event/Venue GUI 4700 may also include an Event List GUI portion 4740. In at least one embodiment, each different record (e.g., 812, 814, etc.) in the Event List may include various types of artist-related, show-related, venue-related, and/or other types of related information such as, for example, one or more of the following (or combinations thereof):
Artist/Band Name
Artist/Band Home Town/City
Show Date
Venue Name (where show will be performed)
Venue Location
Links and/or information relating to show ticket reservation/purchasing.
etc.

According to different embodiments, the displayed list information may be sorted and/or organized based on various criteria such as, for example: proximity to user's current location, show dates/times, etc.

In another example, the DeliRadio-generated playlist of streaming music being streamed to the a user's mobile device may be automatically and dynamically modified over time (e.g., in real-time) based on user's updated geolocation. For example, in one embodiment, a user may be in a moving vehicle listening to a dynamically generated DeliRadio station which is configured to play songs performed by (or recorded by) artists/bands who will be performing at upcoming shows at venues within a radius of 30 miles from the users current geographic location. In one embodiment, if the user is traveling by car from San Francisco to Sacramento, the DeliRadio System may be configured or designed to periodically monitor and determine an updated current geolocation for the user, and may use the user's updated geolocation information to automatically and dynamically modify the playlist of songs being steamed to the user's mobile device. Thus, for example, as the user departs San Francisco, the streamed DeliRadio station may be dynamically configured to play songs performed by (or recorded by) artists/bands who will be performing at upcoming shows at venues in San Francisco. The DeliRadio System may periodically monitor and determine an updated current geolocation for the user, and as the user nears Sacramento, the streamed DeliRadio station may be dynamically modified to include songs performed by (or recorded by) artists/bands who will be performing at upcoming shows at venues in Sacramento.

Venue Check-in Functionality

In at least one embodiment, mobile device users may also advantageously use the DeliRadio Mobile Application to "Check-In" at a show or event. For example, in one embodiment, by accessing one or more databases relating to events, shows, and/or tour dates (e.g., including, for example, DeliRadio tour date archive database), and using the geolocation services/functionality at the user's mobile device (at least a portion of which may be provided by the DeliRadio Mobile Application), the venue check-in process may be streamlined considerably as compared to more traditional methods of check-in. In some embodiments, the DeliRadio Mobile Application may be configured or designed to automatically detect and track the user's current geolocation, and may be further configured or designed to perform automated check-in operations on behalf of the user. For example, in one embodiment, the DeliRadio Mobile Application may be configured or designed to facilitate, enable, initiate, and/or perform one or more of the following operation(s), action(s), and/or feature(s) (or combinations thereof):

Determine that the user has reserved or purchase tickets for a given event/show at a given venue.
Identify the start time of the identified show.
Determine the geolocation of the identified venue.
Automatically initiate and determine the geolocation of the user (or user's mobile device). For example, in one embodiment, if the identified show is scheduled to take place from 8 PM-10 PM, the DeliRadio Mobile Application may be configured or designed to automatically initiate tracking of the user's geolocation during the scheduled show performance (e.g., from 8 PM-10 PM)
Automatically determine if the user's current geolocation matches the geolocation of the venue.

Automatically initiate and complete a "check-in" operation if it is determined that the user's current geolocation matches the geolocation of the venue.

Automatically populate the "check-in" event with contextually relevant information such as, for example, information relating to the artist/band currently performing at the identified venue, information relating to the artist/band for which the user has reserved/purchased tickets, etc. In at least one embodiment, the DeliRadio Mobile Application may be configured or designed to include functionality for facilitating user "Check-In" activities at a given venue & event. After completing a check-in activity at a given location, the user may be granted (e.g., via the DeliRadio Mobile Application and/or DeliRadio website) access to additional functionality, promotional opportunities, and/or rewards, such as, for example, one or more of the following (or combinations thereof):

Join the venue email list.

Vote for upcoming shows (e.g., at that venue).

Access current band's info, twitter, Facebook, merchandise and email list signups.

Incentives for discounted drinks and/or merchandise.

Receive information or notification about friends or other DeliRadio users who will be attending one or more show(s) at the venue and/or who have already check-in at the venue for the current show.

Send photos to band and/or DeliRadio Band/Artist webpage or blog.

Integrate with additional "check-in" services.

Earn points for social activity which may be later redeemed by the user for promotional rewards, incentives, etc.

Figure 10:
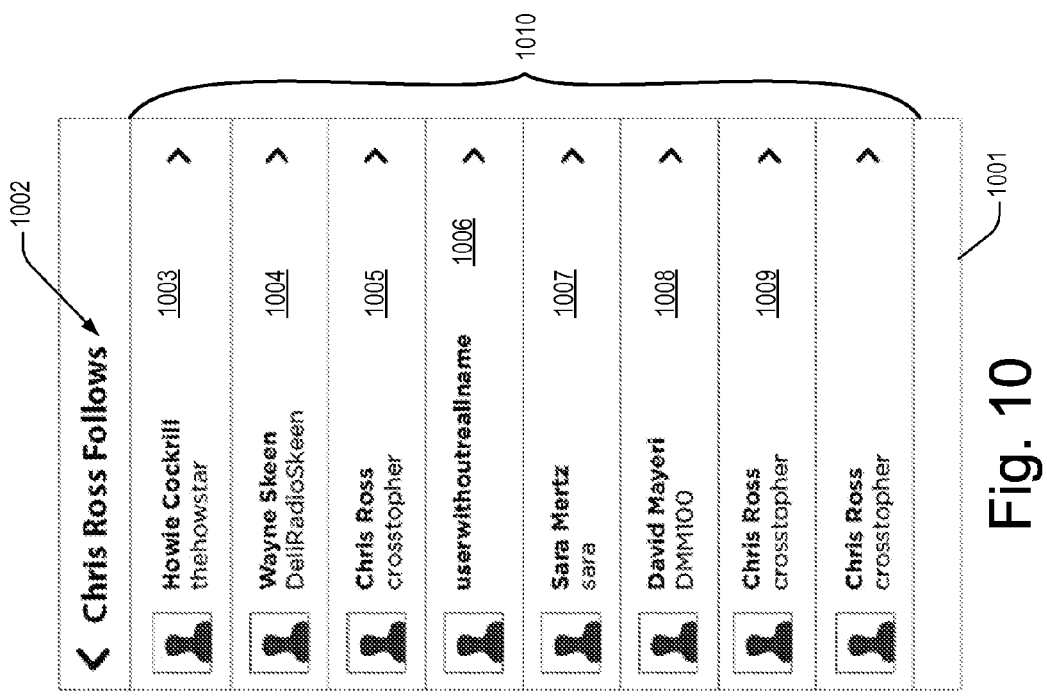

FIG. 10 illustrates an example screenshot of a Following Users GUI which may be used to facilitate, initiate and/or perform various operation(s) and/or action(s) relating to the DeliRadio System technology described herein. In at least one embodiment, the user may tap the "Following" menu item 738 of User Profile GUI 701 to be presented with the Following Users GUI 1001. As illustrated in the example embodiment of FIG. 10, the Following Users GUI may be configured or designed to display a list 1010 of other DeliRadio users that the current user (e.g., Chris Ross 1002) is following. According to different embodiments, profile pictures, real names and DeliRadio usernames may be displayed, together with arrows indicating that more information about each user is available. In at least one embodiment, the user may tap on one of the entries (e.g., 1003) of list 1010 corresponding to a specific user (e.g., Howie Cockrill) to access additional information about the selected user.

Figure 11:
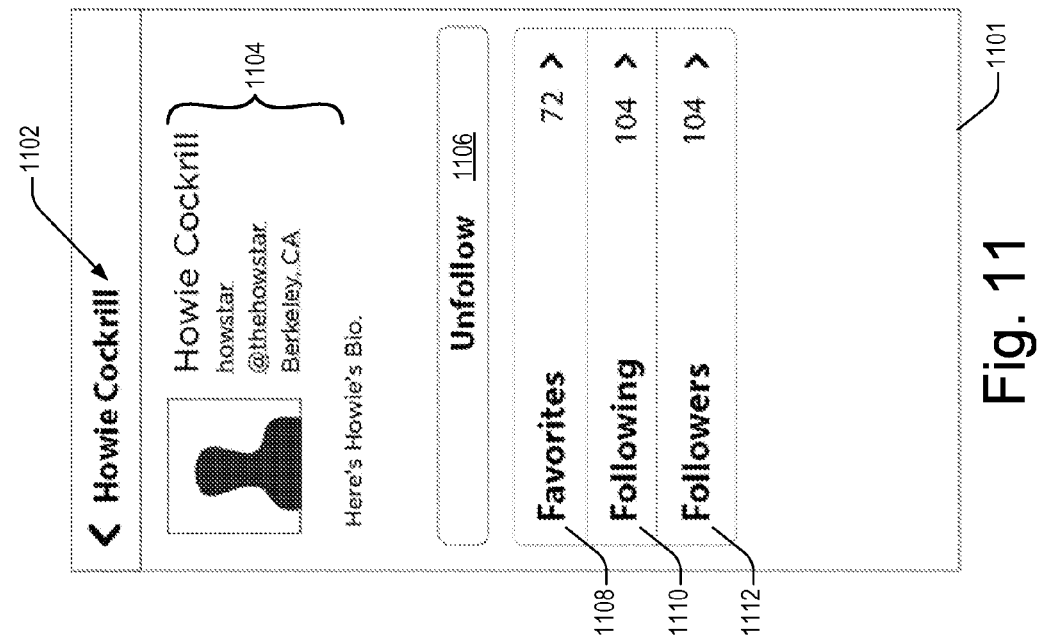

FIG. 11 illustrates an example screenshot of a User Info GUI which may be used to facilitate, initiate and/or perform various operation(s) and/or action(s) relating to the DeliRadio System technology described herein. In the specific example embodiment of FIG. 11, it is assumed that the user has tapped on entry 1003 of list 1010 (FIG. 10) to access additional information about the selected user (Howie Cockrill). As illustrated in the example embodiment of FIG. 11, User Info GUI may be configured or designed to display and/or provide access to various types of information associated with the User Profile for the DeliRadio user: Howie Cockrill, such as, for example, one or more of the following (or combinations thereof):

User profile/bio information 1104.

Favorites Information 1108 relating to the identified user's favorite tracks, albums, bands, playlists, etc. In one embodiment, the user may tap on the Favorites menu item 1108 to access a list of the identified user's (Howie Cockrill's) favorite tracks, albums, bands, playlists, etc.

Following Information 1110 relating to other persons, artists/bands, and/or users which the identified user (Howie Cockrill) is currently following. In one embodiment, the user may tap on the Following menu item 1110 to access a list of other DeliRadio users and/or artists that the identified user (e.g., Howie Cockrill) is following.

Follower Information 1112 relating to other persons, artists/bands, and/or users who are following the identified user (Howie Cockrill). In one embodiment, the user may tap on the Follower menu item 1112 to access a list of other DeliRadio users and/or artists who are following the identified user (e.g., Howie Cockrill).

Functionality 1106 for enabling the current user (Chris Ross) to "unfollow" the identified user (Howie Cockrill), in which case the user will no longer receive information or notifications about Howie Cockrill's activity on DeliRadio.

and/or other types of information and/or functionality described herein.

Figure 12:
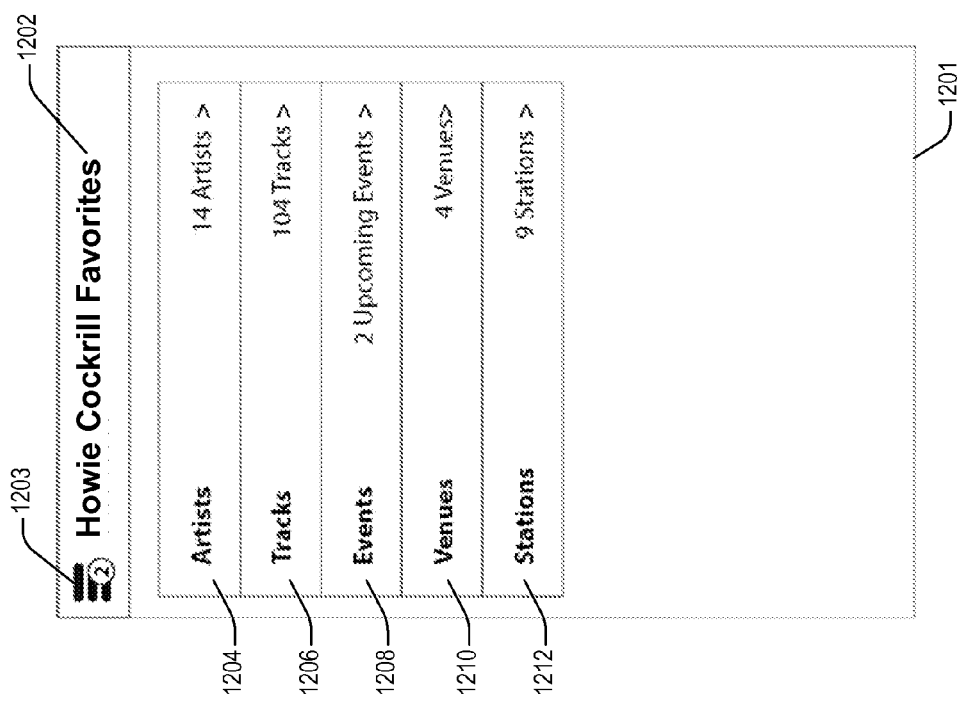

FIG. 12 illustrates an example screenshot of a User Favorites GUI which may be used to facilitate, initiate and/or perform various operation(s) and/or action(s) relating to the DeliRadio System technology described herein. In the specific example embodiment of FIG. 12, it is assumed that the user has tapped on the Favorites entry 1108 (FIG. 11) to access Favorites Information relating to the identified user (Howie Cockrill). As illustrated in the example embodiment of FIG. 12, User Favorites GUI may be configured or designed to display and/or provide access to various types of information associated with the user's favorite or starred content such as, for example, one or more of the following (or combinations thereof):

Favorite artists 1204.

Favorite tracks or songs 1206.

Favorite shows or events 1208.

Favorite venues 1210.

Favorite stations (e.g., DeliRadio stations) 1212.

And/or other types of information and/or functionality described herein.

In at least one embodiment, at least a portion of user's Favorites may be accessed or viewed by other users of the DeliRadio System, such as, for example, the identified user's friends, followers, etc.

Figure 13:
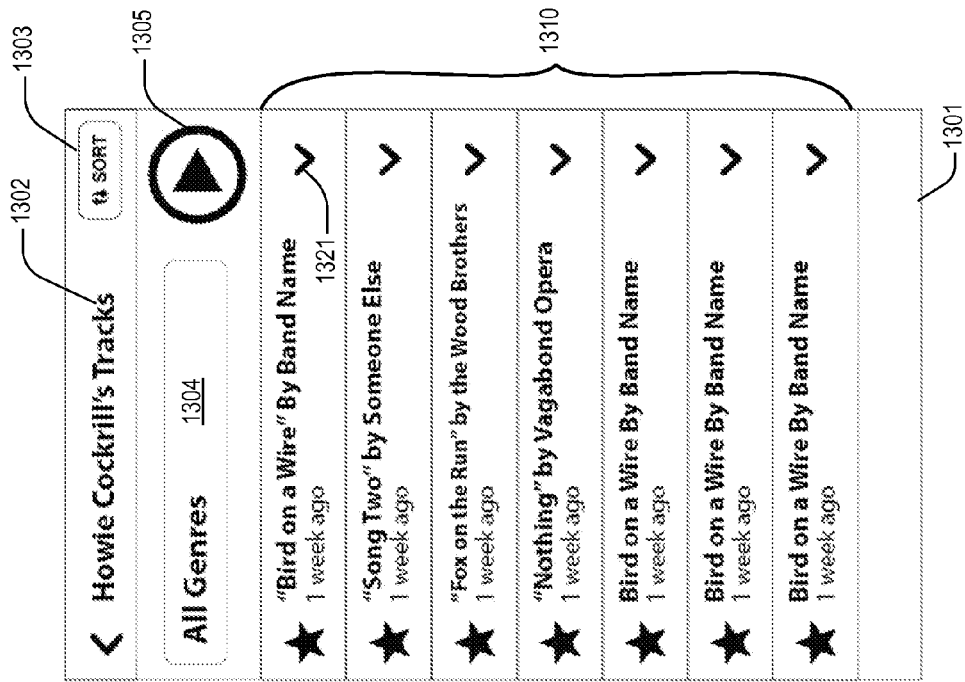

FIG. 13 illustrates an example screenshot of a User Favorite Tracks GUI 1301 which may be used to facilitate, initiate and/or perform various operation(s) and/or action(s) relating to the DeliRadio System technology described herein. In the specific example embodiment of FIG. 13, it is assumed that the user has tapped on the Tracks portion 1206 of User Favorites GUI (FIG. 12) to access the User Favorite Tracks GUI. As illustrated in the example embodiment of FIG. 13, User Favorite Tracks GUI may be configured or designed to display and/or provide access to various types of information associated with the identified user's favorite tracks and/or other starred content.

As illustrated in the example embodiment of FIG. 13, the User Favorite Tracks GUI 1301 may include a Play Button 1305, which, when selected (e.g., tapped on) by a user, may cause the DeliRadio System to dynamically generate a dynamic DeliRadio station which is based on the identified user's (Howie Cockrill's) favorite tracks 1310. In this way, for example, the Play Button may be utilized to create a user-specific, customized DeliRadio Station which represents the identified user's favorite music.

As illustrated in the example embodiment of FIG. 13, the User Favorite Tracks GUI may include information about when the user starred the track. If the user clicks or taps on one of the "down arrow" buttons (e.g., 1321)—a drop down Action Drawer GUI may be displayed which may provide the user with suggested action choices such as, for example, one or more of the following (or combinations thereof): sharing, artist information, seeing which of the users DeliRadio Friends also likes this track or this artist, allowing the user to click through to those Mobile User Profiles, etc.

In at least one embodiment, by clicking on "Friends & Profile" on the QuickStart GUI, the user may be automatically navigated to a GUI portion, which, for example, may display a list of any tracks which the user's DeliRadio Friends have "starred" (and/or additional related information such as, for example, when they starred them, etc.). By clicking on a track which the DeliRadio Friend has starred, the user may listen to that track (and/or related tracks/radio stations).

Figure 29:
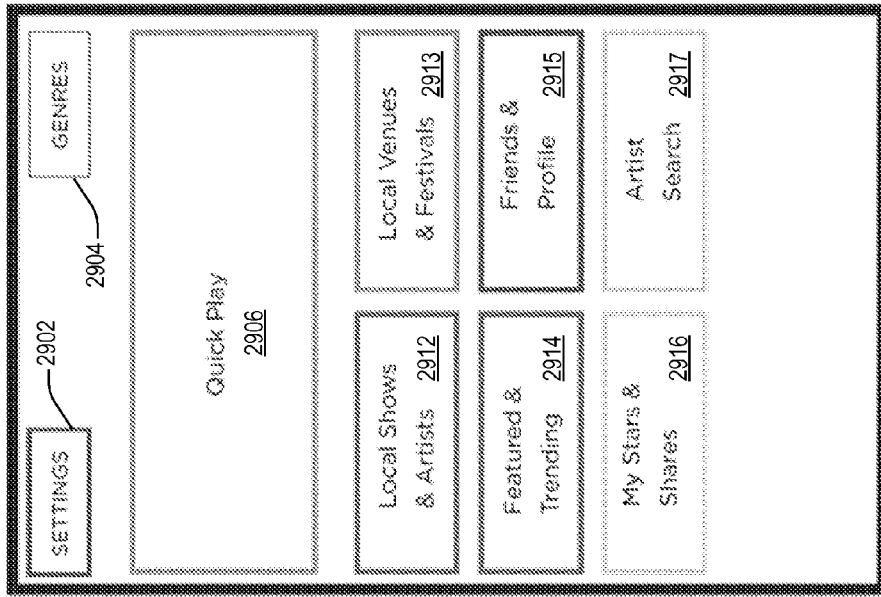

FIG. 29 shows an example screenshot of an embodiment of a DeliRadio Mobile Application Homescreen GUI 2901 which may be used to facilitate, initiate and/or perform various operation(s) and/or action(s) relating to the DeliRadio System technology described herein. In the example embodiment of FIG. 29, the DeliRadio Mobile Application Homescreen GUI may be configured or designed to enable the user to perform or initiate one or more of the following (or combinations thereof):

Access the user's app settings; select genres.

"QuickPlay" a station of artists with shows based around the user's location and selected genre(s).

Finetune the user's station settings with regard to location, proximity around that location, timeframe, and local artists vs. local shows.

Finetune the user's station settings with regard to venue and festival specific searches.

View and listen to featured and trending content on DeliRadio.

View the user's own profile and the user's DeliRadio friends' profiles.

View the content the user has favorited with "stars" as well as the content the user has shared with other DeliRadio friends and across social sharing platforms.

Search for specific artists within DeliRadio.

Figure 30:
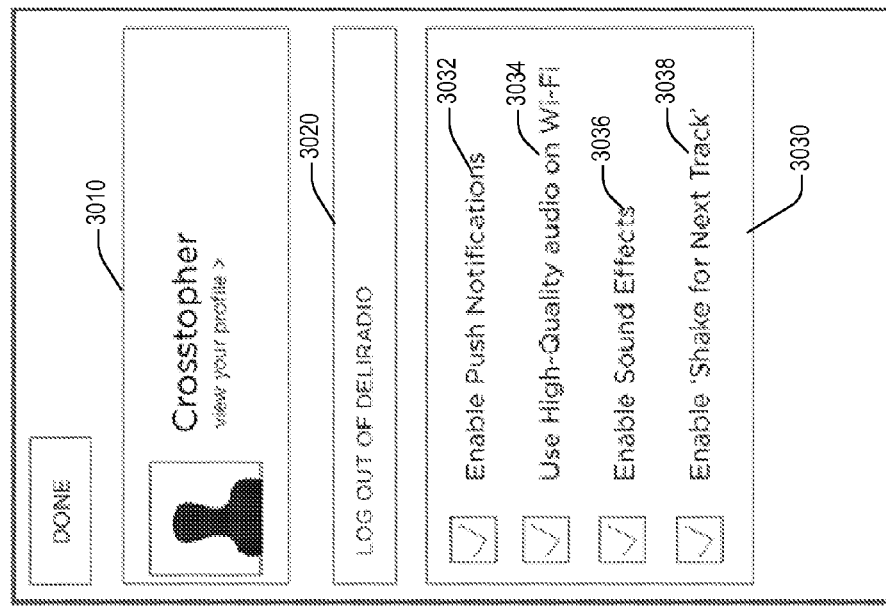

FIG. 30 shows an example screenshot of an alternate embodiment of a User Settings GUI 3001 which may be used to facilitate, initiate and/or perform various operation(s) and/or action(s) relating to the DeliRadio System technology described herein. In the example embodiment of FIG. 30, it is assumed that the user has tapped the "Settings" button on the QuickPlay homescreen and has landed on the User Settings GUI, where the user may view their own profile, log out of DeliRadio, enable "push" notifications to their mobile device, use high-quality audio on Wi-Fi, enable sound effects in the DeliRadio app, enable "Shake for Next Track" to skip tracks in a station, etc.

Figure 31:
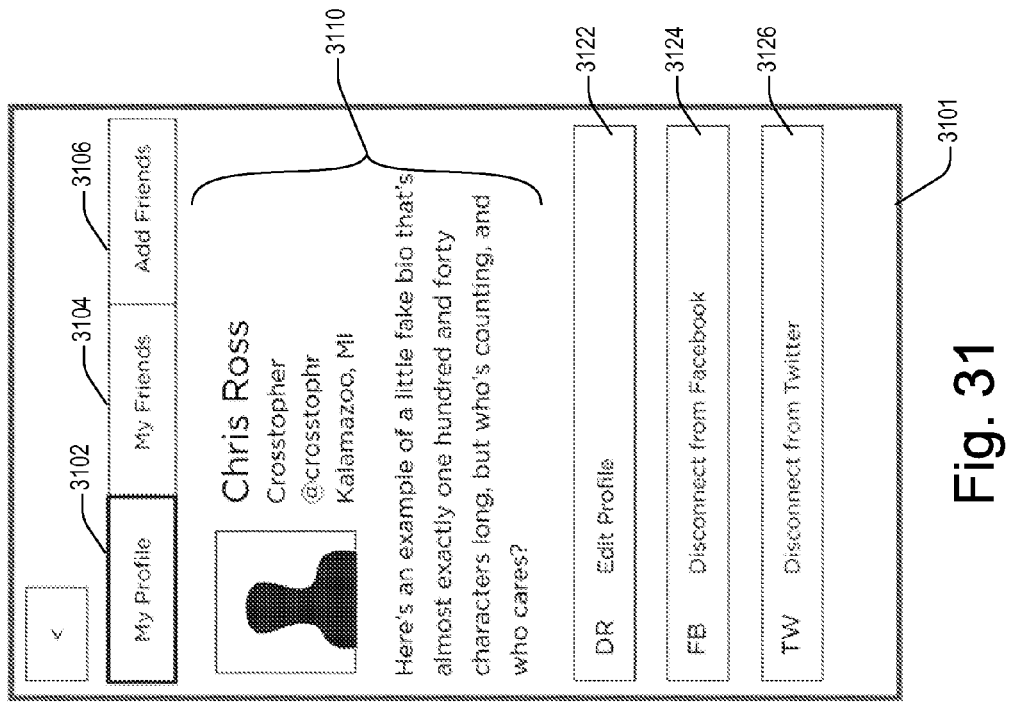

FIG. 31 shows an example screenshot of an alternate embodiment of a User Profile GUI 3101 which may be used to facilitate, initiate and/or perform various operation(s) and/or action(s) relating to the DeliRadio System technology described herein.

FIG. 32 shows an example screenshot of an embodiment of a User Edit Profile GUI 3101 which may be used to facilitate, initiate and/or perform various operation(s) and/or action(s) relating to the DeliRadio System technology described herein.

FIG. 33 shows an example screenshot of an embodiment of a My Friends GUI 3301 which may be used to facilitate, initiate and/or perform various operation(s) and/or action(s) relating to the DeliRadio System technology described herein. In the example embodiment of FIG. 33, the My Friends GUI may enable the user to view other DeliRadio users who have previously accepted the user's friend requests. In the specific example embodiment of FIG. 33, the current user has no pending unaccepted friend requests (3310). The user may edit their DeliRadio friends by clicking the "edit" button 3308. In at least some embodiment, the displayed list of the user's DeliRadio friends may include additional information such as, for example, one or more of the following (or combinations thereof):

friend's real name;

friend's hometown;

friend's recent activity;

friend's current geolocation;

and/or other types of user-related information described and/or referenced herein.

Figure 34:
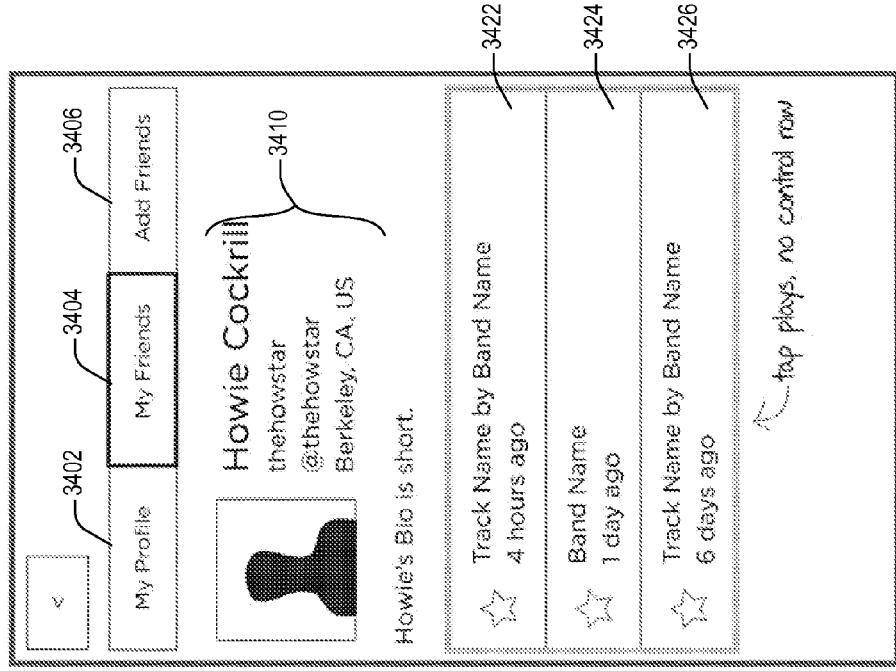

FIG. 34 shows an example screenshot of an alternate embodiment of a User Info GUI 3401 which may be used to facilitate, initiate and/or perform various operation(s) and/or action(s) relating to the DeliRadio System technology described herein. In the example embodiment of FIG. 34, it is assumed that the user has chosen to view the profile of a specific DeliRadio friend, Howie Cockrill. The user is able to see this friend's name, their DeliRadio username, their Twitter handle, their location, their bio, and tracks and/or artists that this DeliRadio friend have "starred." By tapping on a specific starred track (e.g., 3422), the DeliRadio Mobile Application may initiate streaming of the selected track from the DeliRadio System, for playback at user's mobile device. By tapping on a specific starred artist/band (e.g., 3424), the DeliRadio Mobile Application may initiate streaming of a dynamic DeliRadio Station which plays tracks performed by (or recorded by) the identified artist/band. In the specific example embodiment of FIG. 24, the displayed content "Tap plays, no control row" indicates that there are no drop-down action controls for at least one starred item as their might be for content starred by the user themselves.

Figure 35:
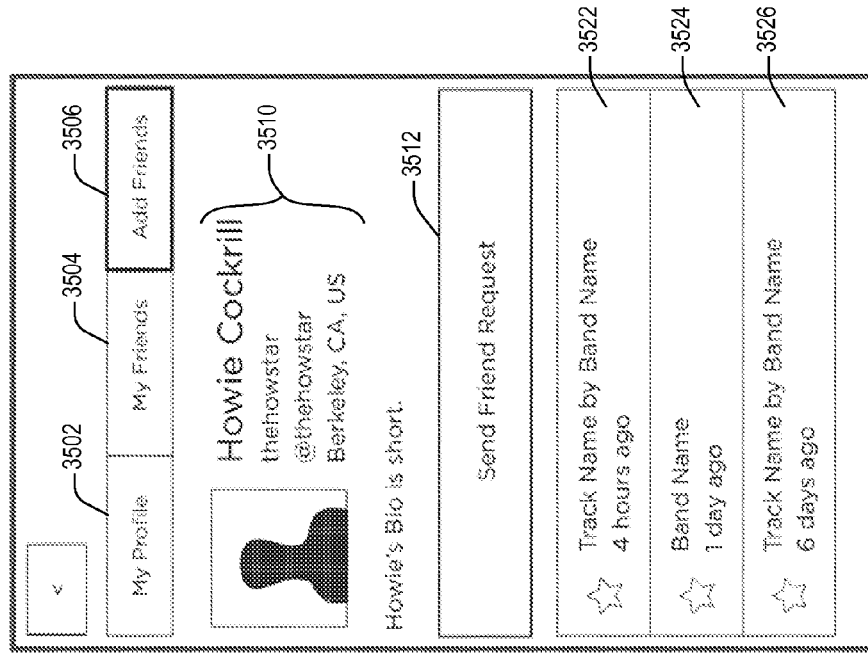

In the example embodiment of FIG. 35, it is assumed that the user has performed a search of DeliRadio users to add as "friends." The user has selected one potential friend (e.g., Howie Cockrill) from the list and is viewing that user's profile. The user may send a friend request (3512) to the selected user (Howie Cockrill) from this GUI, as well as view and listen to content "starred" by that user.

Figure 37:
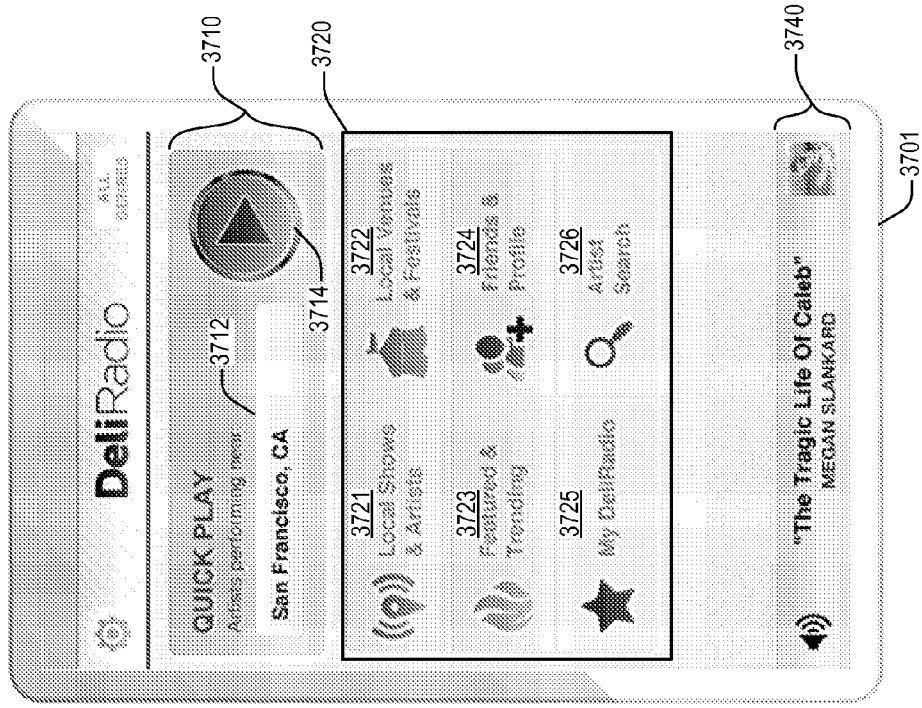
Figure 36:
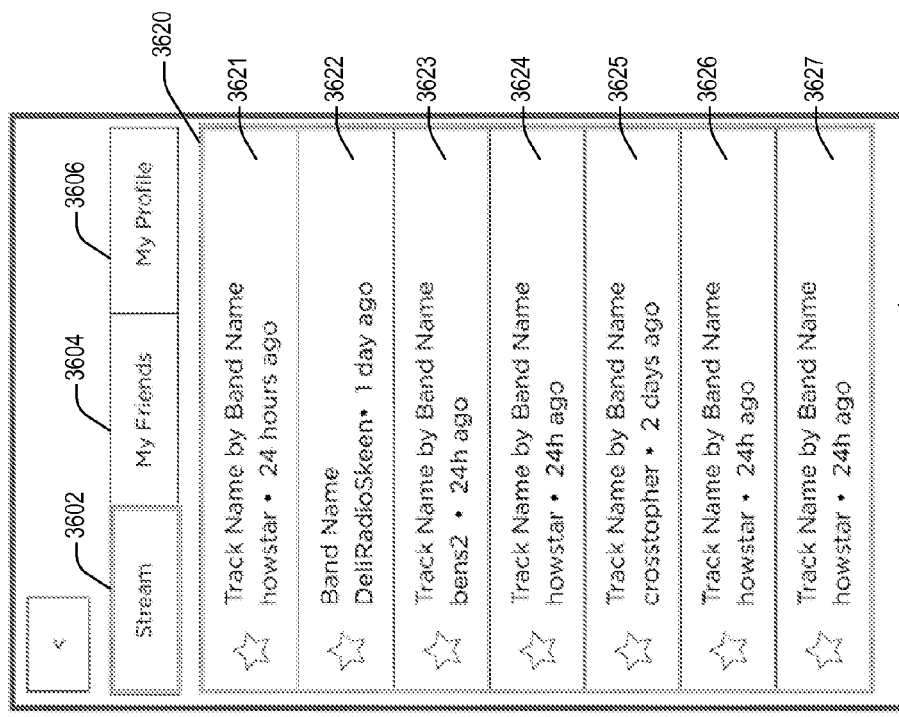

FIG. 36 shows an example screenshot of an embodiment of a Friends Favorites GUI 3601 which may be used to facilitate, initiate and/or perform various operation(s) and/or action(s) relating to the DeliRadio System technology described herein. In the example embodiment of FIG. 36, it is assumed that the user is viewing a "Stream" of activities/events relating to Favorite tracks and/or artists which have been recently starred by the user's DeliRadio friends. The user may tap a starred track name or band name to begin listening to the selected track, and/or to begin listening to a streamed customized DeliRadio Station which is dynamically created to play tracks performed by (or recorded by) the selected artist/band. Deliradio Quick Play FIG. 37 shows an example screenshot of an embodiment of a QuickPlay GUI 3701 which may be used to facilitate, initiate and/or perform various operation(s) and/or action(s) relating to the DeliRadio System technology described herein. With one tap (e.g., on Play icon 3714), a user may hear artists with upcoming live events within a preset geographic radius and preset time frame around the user's selected location, filtered by the user's genre settings. Immediately below the "QuickPlay" module, the user may also choose from other search and listening options, including, for example, one or more of the following (or combinations thereof):

Viewing a list of upcoming local events and the artists playing them, and listening to that list as a DeliRadio station. (e.g., 3721)

Viewing a list of venues and upcoming festivals local to the user, and listening to a specific venue or festival's lineup of artists as a DeliRadio station. (e.g., 3722)

Viewing a list of featured and popular DeliRadio artists and stations, and listening to each featured or popular artist's DeliRadio station and each featured or popular DeliRadio station. (e.g., 3723)

Viewing a list of the user's existing DeliRadio friends (where the user may also connect with additional friends) and viewing/editing the user's existing DeliRadio profile. (e.g., 3724)

Viewing, listening to and sharing with others the user's current "starred" or "favorited" DeliRadio artists, songs and stations. (e.g., 3725)

Searching for specific artists, venues, festivals and stations in DeliRadio's database. (e.g., 3726)

Access "genre filters" by tapping the Genre button in the top right corner of the mobile application GUI. When selected, these genre filters may be set to apply to a discrete search or be set to apply universally throughout one or more searches the user performs on the application.

Figure 39:
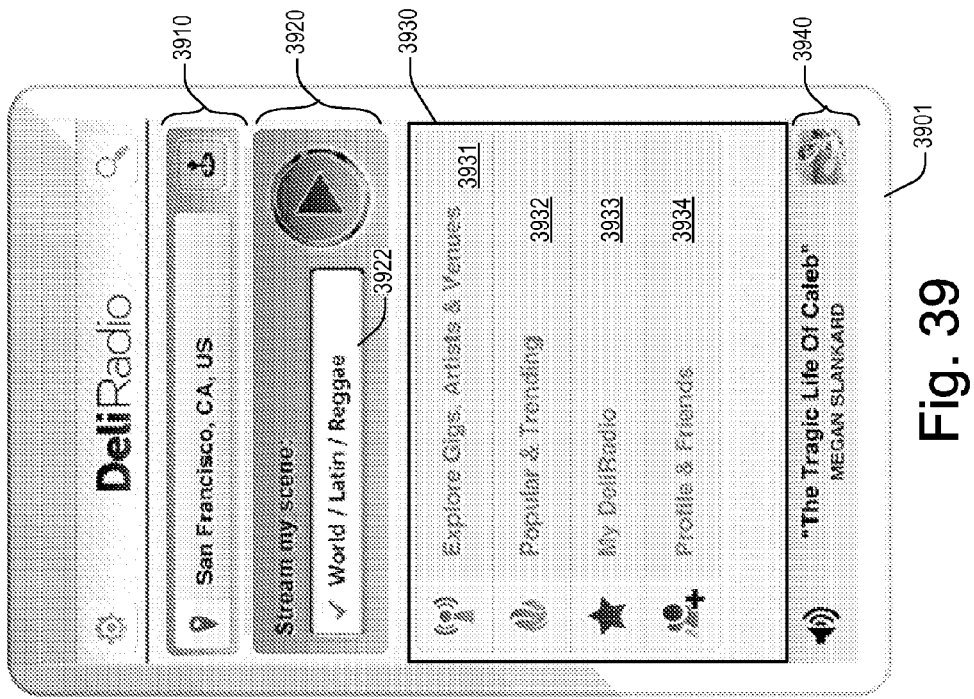
Figure 38:
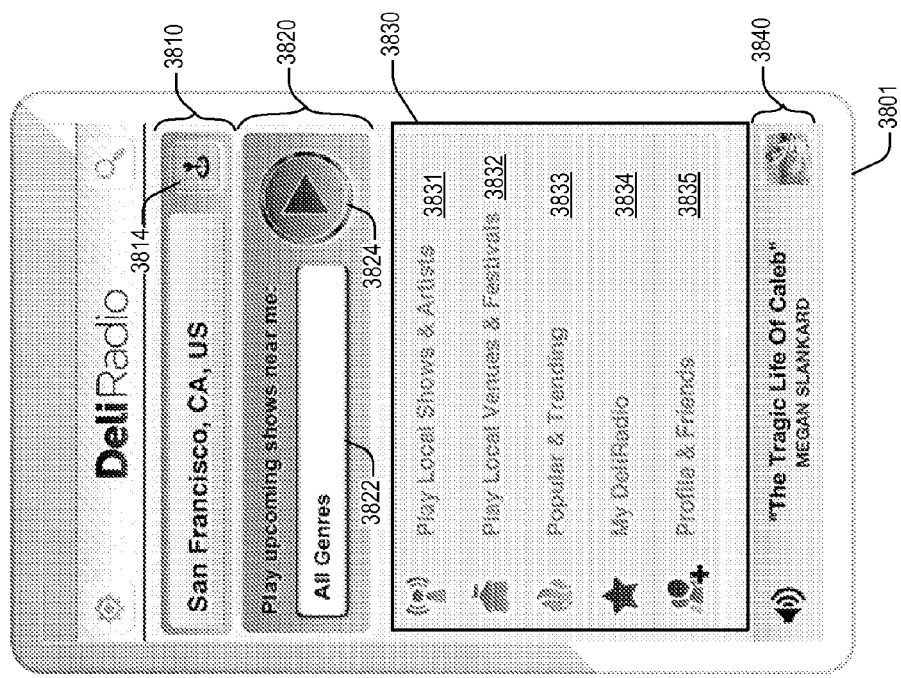

FIG. 38 shows an example screenshot of an embodiment of a QuickPlay Genre GUI 3801 which may be used to facilitate, initiate and/or perform various operation(s) and/or action(s) relating to the DeliRadio System technology described herein. With one tap (e.g., on Play icon 3824), a user may begin listening to a streamed, customized DeliRadio Station which is dynamically created to play tracks matching one or more specified genres (e.g., 3822) which are performed by (or recorded by) artists/bands that have upcoming shows in the specified geographic location (e.g., 3810). For example, as illustrated in the example embodiment of FIG. 39, it is assumed that the user has selected a genre grouping of "World/Latin/Reggae" (e.g., 3922). In at least one embodiment, the DeliRadio System may also filter the selection of tracks to be included in the streamed DeliRadio Station using preset geographic radius criteria and preset timeframe criteria.

Figure 40:
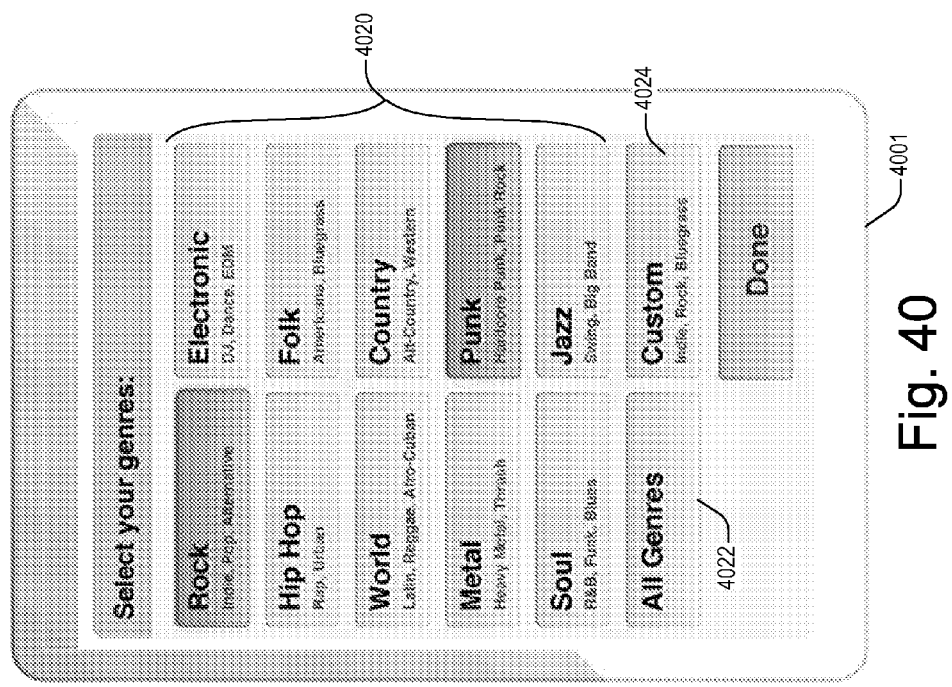

FIG. 40 shows an example screenshot of an alternate embodiment of a Genre Selection GUI 4001 which may be used to facilitate, initiate and/or perform various operation(s) and/or action(s) relating to the DeliRadio System technology described herein. In at least one embodiment, the Genre Selection GUI 4001 may be configured or designed include functionality for facilitating the user in selectively chosing and/or inputting genre-related and/or tag-related filtering criteria to be used as part of the user-specified search criteria. For example, as illustrated in the example embodiment of FIG. 40, the displayed top-level genre groups allow a user to quickly select a group of genres that are commonly associated with one another, rather than having to select them one by one. The ability to select genres one by one, and/or create customized genre groupings are also available to the user.

Figure 41A:
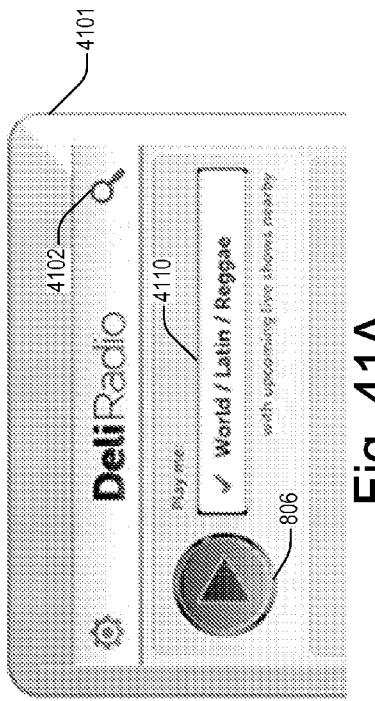
Figure 41B:
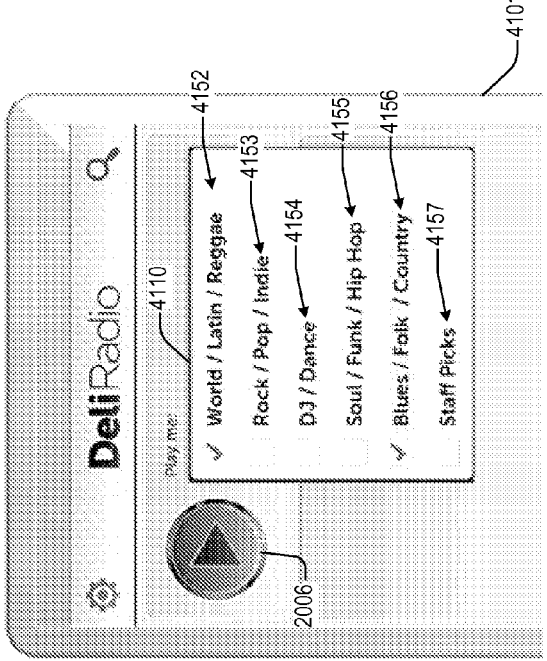

FIGS. 41A and 42B show an example screenshots of different embodiments illustrating the Genre Selection GUI (e.g., FIG. 38) may provide the user with the ability to input and/or to select one or more genres or genre groups via use of manual input interfaces and/or dynamic drop-down menus (e.g., 4110).

Figure 42:
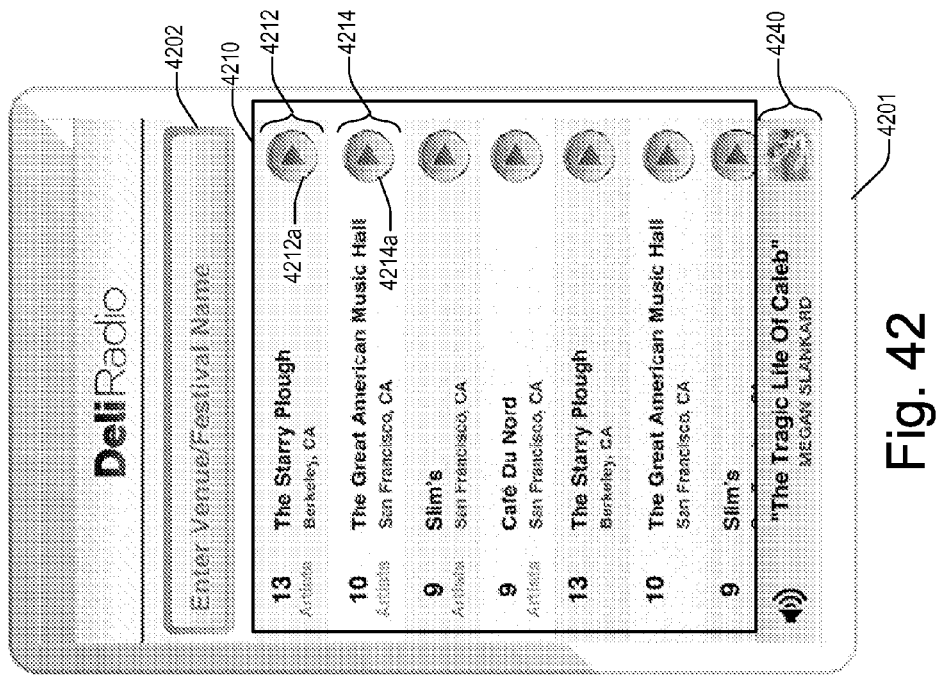

FIG. 42 shows an example screenshot of an alternate embodiment of a Local Shows GUI 4201 which may be used to facilitate, initiate and/or perform various operation(s) and/or action(s) relating to the DeliRadio System technology described herein. In the example embodiment of FIG. 42, it is assumed that a user has tapped "Local Venues & Festivals" icon (3721) of the QuickPlay GUI of FIG. 37, and has been presented with Local Shows GUI 4201. In at least one embodiment, the Local Shows GUI may be configured or designed to provide functionality for enabling the user to view a listing of venues and festivals geographically proximal to the user as well as the number of artists in the DeliRadio database performing at that venue. Clicking or tapping the "Play" button (e.g., 4212a) associated with a given venue record (4212), may cause the DeliRadio System to dynamically generate and begin streaming a customized DeliRadio Station which plays tracks performed by (or recorded by) the artists/bands who will be performing at the identified venue or festival.

In at least one embodiment, as used here, the term "venue" may be defined as a physical place where an organized an organized event takes place such as a live music performance, a concert, a festival, and the like. Examples of different types of venues may include, but are not limited to, one or more of the following (or combinations thereof):

A physical building or convention center (e.g., Moscone Center, San Francisco).

An arena, amphitheater, or stadium (e.g., Red Rocks Amphitheatre, Colorado)

A business establishment such as a bar, restaurant, coffee shop, etc.

A concert hall (e.g., Great American Music Hall, San Francisco)

An organized festival such as, for example, New Orleans Jazz Festival, High Sierra Music Festival, Telluride Bluegrass Festival, etc.

Figure 43:
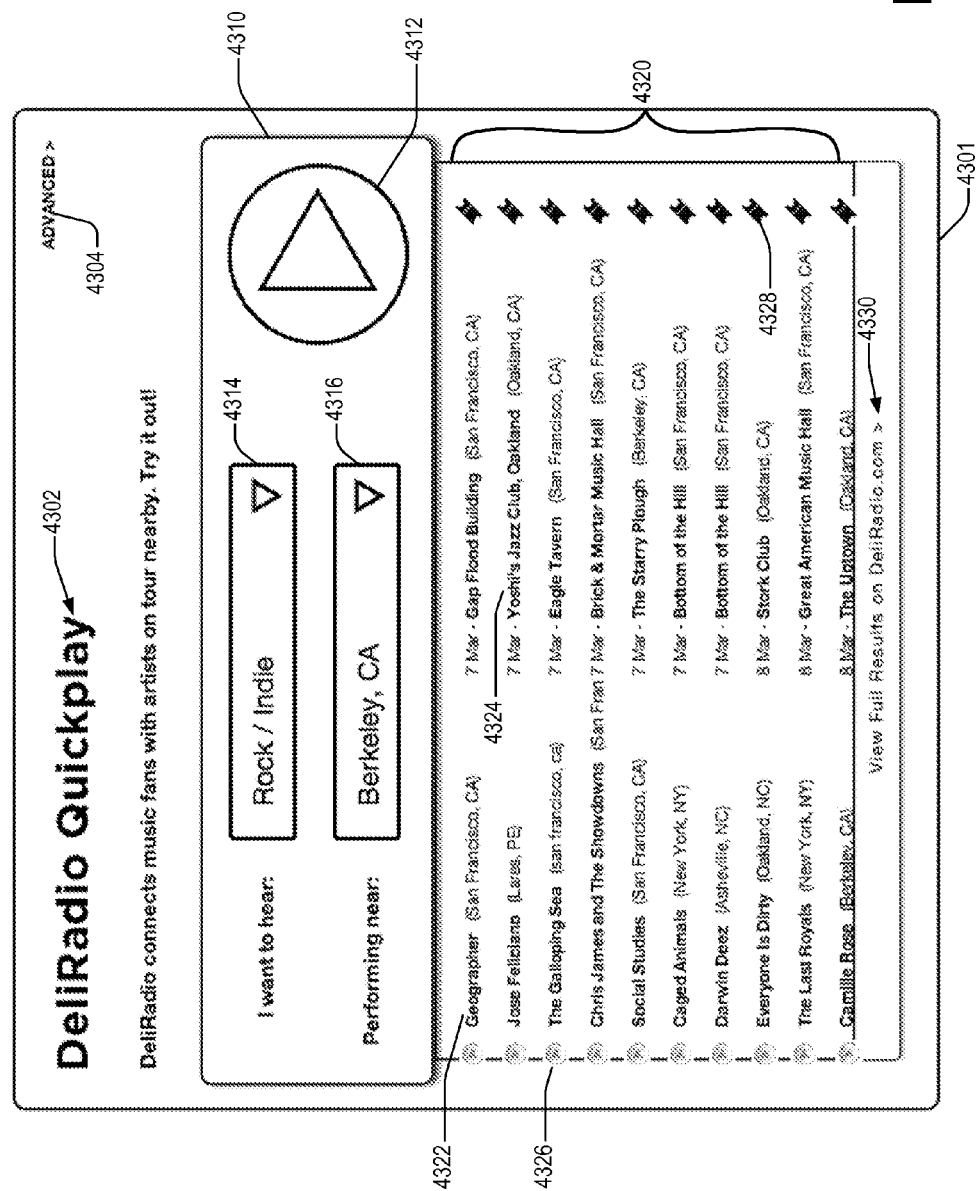

FIG. 43 shows an example screenshot of an embodiment of a DeliRadio Quickplay Webpage GUI 4301 which may be used to facilitate, initiate and/or perform various operation(s) and/or action(s) relating to the DeliRadio System technology described herein. In at least one embodiment, the DeliRadio Quickplay Webpage GUI may be implemented as a standalone website, which, for example, may be accessed via an internet URL such as http://play.deliradio.com. Upon loading, the user's geolocation may be determined by the DeliRadio System using the user's IP address, and the geolocation information may be dynamically entered into the "Performing Near" interface 4316 of the DeliRadio Quickplay Webpage GUI. The user may use the genre selection input interface 4314 to input/select genre filter criteria, and/or may interact with the "Performing Near" dropdown menu 4316 to select other geographic locations, if desired. In one embodiment, the "Performing Near" dropdown menu they include at least some preconfigured geographic locations such as, for example, Chicago, Paris, New York, London, Los Angeles, etc., as well as an option to input a "Custom Location." Clicking the "Advanced" icon 4304 may re-direct the user to the deliradio.com website. Clicking on "View Full Results on DeliRadio.com" may also re-direct the user to the deliradio.com website.

In at least one embodiment, by clicking on the Play icon 4312, a user may begin listening to a streamed, customized DeliRadio Station which is dynamically created to play tracks matching one or more specified genres (e.g., 4314) which are performed by (or recorded by) artists/bands that have upcoming shows in the specified geographic location (e.g., 4316). Clicking an Artist name (e.g., 4322) opens the artist's DeliRadio profile. Clicking the venue name (e.g., 4324) opens a Venue search on DeliRadio.

In at least one embodiment, associated with each artist entry in Quickplay list 4320 is a respective "Play" icon (e.g., 4326) which, when hovered over becomes active/green. Clicking on a given Play icon opens a Pop Out Player which begins streaming a customized DeliRadio Station which is dynamically created to play tracks which are performed by (or recorded by) the associated artist/band. that have upcoming shows in the specified geographic location (e.g., 4316). In some embodiments, each venue event listed in the Quickplay list 4320 has associated therewith a respective Ticket Icon (e.g., 4328) that, when clicked, may direct the user to a Ticket Purchase/Reservation GUI for facilitating the user in purchasing and/or reserving tickets for the selected event. Additional details relating to DeliRadio ticket purchasing and/or reservation functionality are described in U.S. patent application Ser. No. 13/844,672), titled "MULTI-MEDIA MANAGEMENT, STREAMING, AND ELECTRONIC COMMERCE TECHNIQUES IMPLEMENTED OVER A COMPUTER NETWORK", naming SKEEN, et. al. as inventors, and filed 15 Mar. 2013, the entirety of which is incorporated herein by reference for all purposes.

Venue Stations

Figure 45:
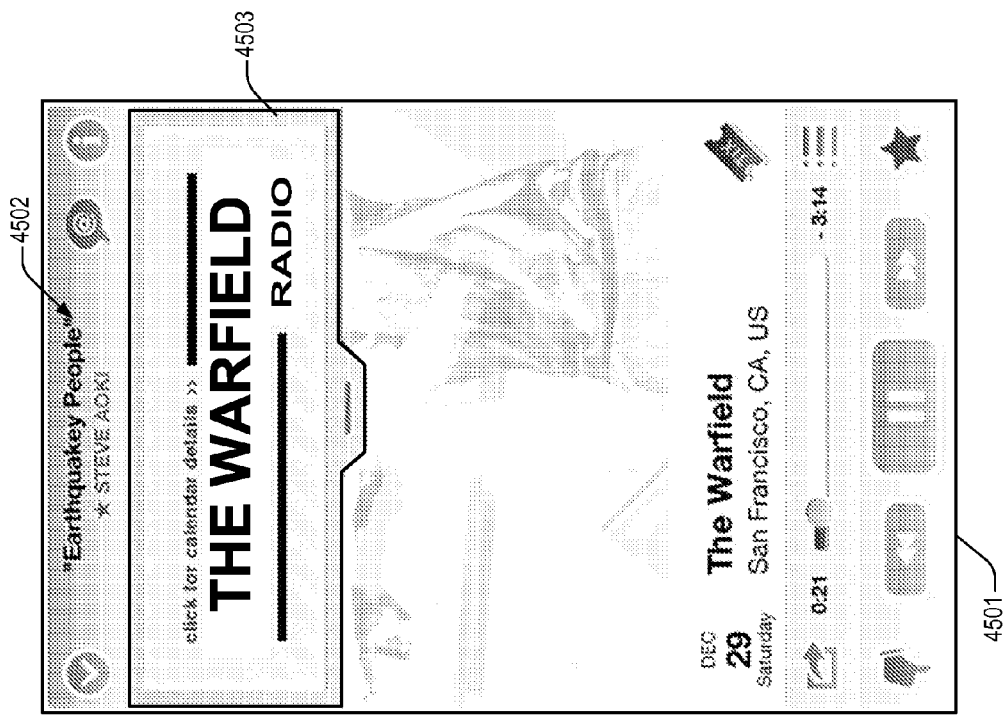
Figure 44:
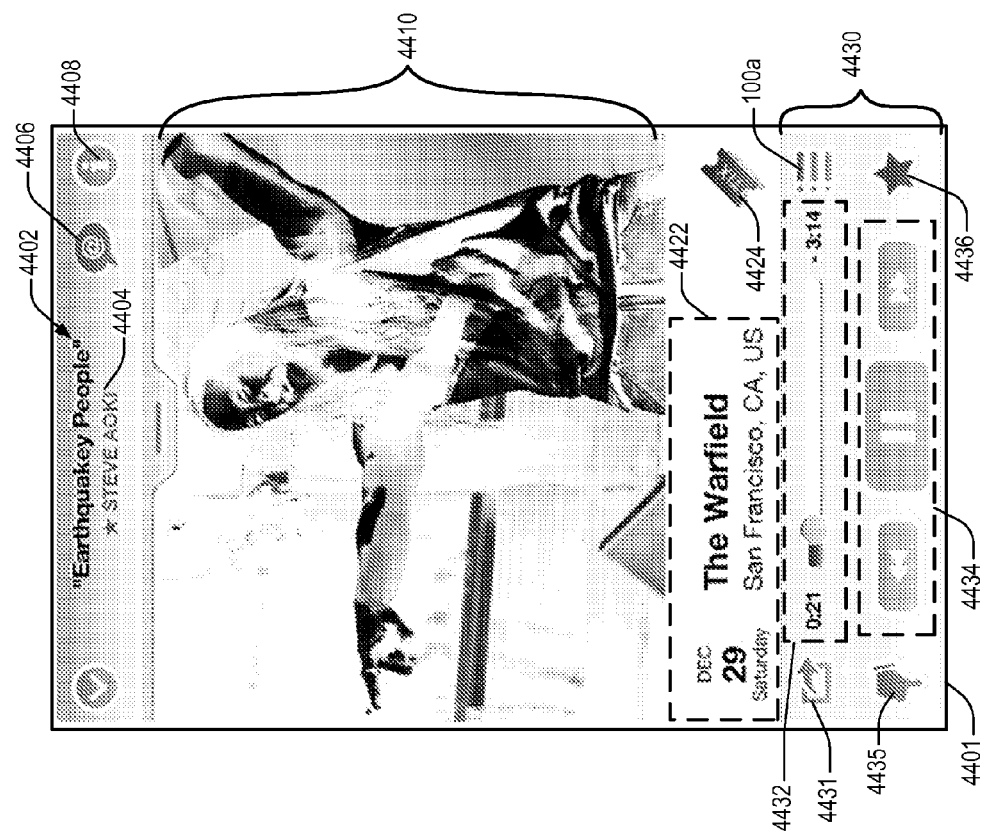

FIG. 44 shows an example screenshot of an embodiment of a Venue Station GUI 4401 which may be used to facilitate, initiate and/or perform various operation(s) and/or action(s) relating to the DeliRadio System technology described herein. FIG. 45 shows an example screenshot of an alternate embodiment of a Venue Station GUI 4501 which may be used to facilitate, initiate and/or perform various operation(s) and/or action(s) relating to the DeliRadio System technology described herein.

As illustrated in the example embodiments of FIGS. 44 and 45, the Venue Station GUI may be configured or designed to be implemented and branded as a venue-specific dynamic DeliRadio Station which has been customized for a specific venue. In at least one embodiment, multiple different venues may each have associated therewith respective DeliRadio Venue Station which has been customized for that specific venue. For example, in the example embodiment of FIG. 44, it is assumed that the Venue Station GUI has been customized as a DeliRadio Venue Station for The Warfield Theater of San Francisco, Calif. As illustrated in the example embodiment of FIG. 45, the Venue Station GUI shows a branded header for "The Warfield Radio". In at least one embodiment, the Warfield Radio station is configured to stream songs or tracks which are performed by (or recorded by) artists/bands that have upcoming shows at The Warfield Theater. In some embodiments, the Warfield Radio station may also be configured to stream songs or tracks which are performed by (or recorded by) artists/bands that have performed at The Warfield Theater.

In at least one embodiment, the DeliRadio Venue Station is a feature unique to the DeliRadio service, offering streaming radio and GUI functionality that displays upcoming show information for a given venue while concurrently streaming songs of that venue's upcoming linup of bands/artists. In at least one embodiment, the Venue Station GUI provides functionality for enabling the user to filter the displayed content and/or streamed audio content based on desired genre preferences and/or timeframe (e.g., show date) preferences.

According to different embodiments, the Venue Station GUI may be configured or designed to provide functionality for one or more of the following features (or combinations thereof):

- Control playback of tracks streamed from the DeliRadio Venue Station (e.g., via playback control interfaces 4432, 4434)
- Display image and/or video content (e.g., 4410) relating to the venue and/or relating to events or shows at the venue.
- Enables users to share the station to his/her social network profiles, email it to a friend, copy the station URL, or obtain the necessary code to embed the actual player on another website.
- Enables users to nix the Artist or Track, thereby instructing the system not to play the Artist or Track for the user in the future. According to different embodiments, the user may also Star the Band, Station, Album, Event, Venue, and/or Track(s) currently playing, thereby adding it to the user's list of favorite bands, stations, tracks, events, venues, etc.
- Displays a hyperlinked band name which users may click to visit the band's Artist Profile Page.
- Displays a hyperlinked venue name which users may click to visit the venue's DeliRadio Profile Page.
- Shows information about the currently-playing band's next performance, such as, for example, one or more of the following (or combinations thereof): date, venue name and location (e.g., 4422), and a link (e.g., 4424) to purchase and/or reserve tickets to that show.
- Display lyrics to the song currently playing, with display synced to song audio.
- Display guitar tablature or other musical notation for the song currently playing, with display synced to song audio.
- Display a slideshow of merchandise being offered for sale by the band. User may click on image of at least one item of merchandise to purchase that item.
- Display a User Interactivity GUI allowing the user to interact with the music. In one embodiment, the User Interactivity GUI includes, for example, a range of graphic elements, such as, for example, one or more of the following (or combinations thereof): pads, keys, rotary controllers, sliders, faders, and buttons. These elements are mapped to a sound-generating device, such as, for example, the MIDI synthesizer component in the user's computer. By interfacing with these elements, the user may generate his/her own musical or sonic accompaniment to the track currently playing. In one embodiment, the User Interactivity GUI also enables the user to dynamically remix the song currently playing, allowing him/her to change various aspects of the track, such as, for example, one or more of the following (or combinations thereof): instrument volumes, instrument panning, effects (reverb, delay, etc.). This remix functionality enables the user to isolate different elements of the track for study or enjoyment, as well as generate a variety of different remixes of the track, at least one of which may be saved.
- User-generated accompaniments and remixes may be displayed on the user's profile page, where they may be streamed, ranked by users, and purchased. These user-generated tracks may also be entered into the DeliRadio System, where they may be returned alongside the original track in search results.

One of the notable features of the DeliRadio Venue Station functionality is that such functionality may be advantageously leveraged by venue owners/managers to provide their customers with the ability to listen to a variety of songs which are performed by (or recorded by) artists/bands who will be performing at that particular venue. For example, by utilizing the DeliRadio Venue Station functionality venue owners/managers no longer need to be burdened with the task of continuously uploading, modifying and maintaining updated playlists of songs of artists/bands who will be performing at their venue. Rather, in at least one embodiment, the venue owner/manager need only embed their customized DeliRadio Venue Station on their website home page to provide their customers with the ability to listen to a variety of songs which are performed by (or recorded by) artists/bands who will be performing at that venue. Because the DeliRadio System includes functionality for automatically and continuously tracking upcoming shows and events at a given venue/festival, and includes functionality for automatically and continuously tracking the artists/bands who will be performing at the given venue, the DeliRadio System is able to automatically and dynamically generate a venue-specific dynamic DeliRadio Station which has been configured to stream songs or tracks which are performed by (or recorded by) artists/bands that have upcoming shows at that venue. In at least one embodiment, the DeliRadio System may charge a service or subscription fee to venue owners/operators for access to the various DeliRadio Venue Station features and functionalities Embedded Streaming Music Widgets for Websites In at least one embodiment, third party websites and on-line content providers can easily embed DeliRadio streaming music players on their websites. For example, one embodiment involves the user creating a DeliRadio station, launching a Pop-Out Player, and, from the Pop-Out Player, generating an embed code unique to that station. The user can then copy that code and paste it into the code for any website, and the user's station may then appear as an "embedded station" on that user's website. This embodiment of an embedded station condenses the visual appearance of the Pop-Out Player into a customizable size, and also gives the user choices of background colors. By using the sharing tools on the DeliRadio Pop-Out Player, the station may also be embedded on Facebook pages and in Facebook comment sections. A player embedded on a website as described herein can also be "popped out" into a DeliRadio Pop-Out Player so that the listening experience occurs within the Pop-Out Player, or the user can be redirected to the station listing on the DeliRadio-.com website.

In addition to artist name and track name, the DeliRadio Pop-Out Player may feature concert information and ticket purchase/reservation links, which make it ideal for event-focused websites attempting to drive event ticket sales, such as venues, festivals, news weeklies, booking agencies, management companies, and live music focused blogs.

An alternate embodiment of the embedded player may include an image (e.g., coded via java script) that is embedded on a third party site. When the image is clicked, the Pop-Out Player associated with the station referenced in the image/java script may be opened. The image may be custom designed for each website to take on the "look and feel" of that website's branding, and may also include the website's or company's logo. In this way, new or additional website features and brand extensions (e.g., custom internet radio) may be added to an existing brand. The user can also upload a header graphic of their choice (with associated hyperlink) to the DeliRadio Pop-Out Player In at least one embodiment, the DeliRadio Pop-Out Player may be configured or designed to be implemented or instantiated as a standalone browser page, and may be further configured or designed to persist (and continue to play streaming music at the user's computer system) as a user navigates across different websites (or across multiple pages of a website) such that the Pop-Out Player and streamed music is not affected by page reloads and/or other Internet browsing activities performed by the user (including not being affected by page reloads of the website from which the Pop-Out Player originates).

At least some embodiments of DeliRadio embedded stations involve the stations automatically updating themselves over time based on event information within the station. Accordingly, once the DeliRadio embedded player is live on a website, the website operator does not need to update it. Although, in at least some embodiments may be desirable for the website operator to ensure that artists with events covered under the DeliRadio Station have DeliRadio accounts, thus ensuring those artists are being fed into the station.

One of the advantages of the DeliRadio's embedded player widget is that it may be optimally designed specifically for the live events market. Alternate embodiments of DeliRadio's embedded players include:

Track-by-track playlists, instead of radio stations

Figure 46:
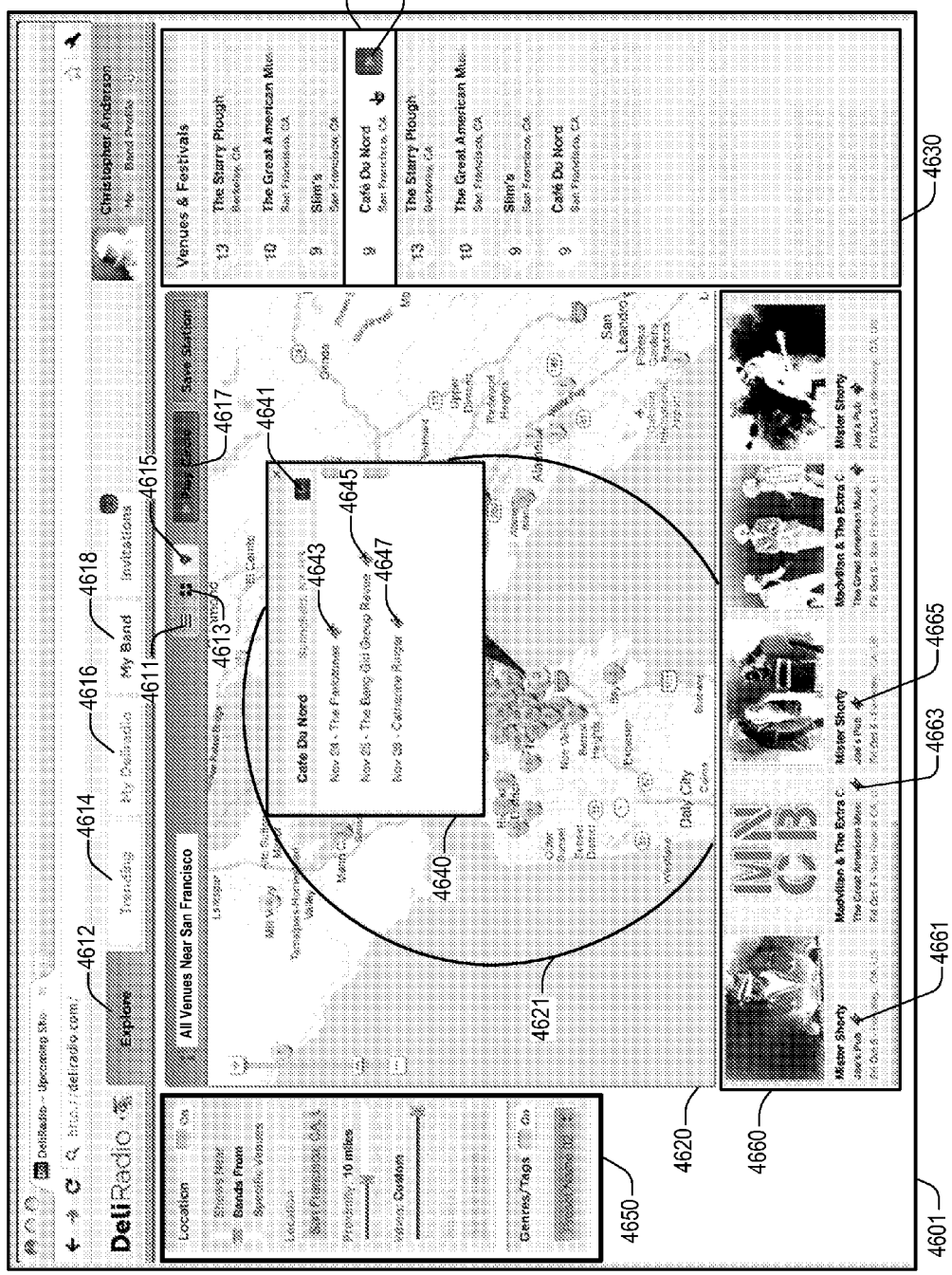

Listener/User comments on the tracks in the station or the station as a whole, within the player, in timed relation to the song Music "buy" links Password protected embedded players for restricted access Giving users more customization control over the player, such as, for example, one or more of the following (or combinations thereof):

how the images in the player animate whether the player starts playing automatically when a page is loaded display of info about the player, including song play count allowing users to provide their own themes via CSS FIG. 46 shows an example screenshot of an alternate embodiment of a DeliRadio Home Page GUI 4601 which may be used to facilitate, initiate and/or perform various operation(s) and/or action(s) relating to the DeliRadio System technology described herein. As illustrated in the example embodiment of FIG. 46, the DeliRadio Home Page GUI may be configured or designed to include, facilitate, enable, initiate, and/or perform one or more of the following operation(s), action(s), and/or feature(s) (or combinations thereof):

Provide the ability for a user to select between map view, grid view and list view.

Grid view shows venue & show date with ticket links (e.g., 4643, 4645, 4647).

Shows & Festivals GUI portion 4630 displays information relating to venues and festivals included within the radius circle 4621.

Dynamic sorting of list of venues/festivals.

Highlighted/colored play button appears when user hovers over a venue in the list.

Clicking on a blue guitar pick icon now turns it yellow to show that it's active.

Play button 4641 in the venue window 4640 for enabling a user to stream songs or tracks which are performed by (or recorded by) artists/bands that have upcoming shows at the selected venue.

Explore GUI functionality 4612 and Trending GUI 4614 functionality.

Genre/tag filter may also show preset "saved" genre/tag searches.

Other Features/Benefits/Advantages

According to different embodiments, at least some DeliRadio System(s) may be configured, designed, and/or operable to provide, enable and/or facilitate one or more of the following features, functionalities, benefits and/or advantages (or combinations thereof):

Station Header Graphic—In at least one embodiment, when a new station is created, the station creator/owner has the option of selecting an image to appear in the header of the Pop-Out Player. The image can also be associated with a hyperlink, so when it is clicked by a user, the user may be redirect to a desired URL (example: www.popnye.com). This functionality may be implemented as part of a broader concept of allowing venues & festivals to claim and "brand" their own DeliRadio stations.

Venue Stations—In at least one embodiment, the "pre-set stations" of the DeliRadio homepage may include a list of venues that match the user's search/filter parameters. Each venue may have associated therewith a respective play button next to enable a user to listen to that venue's customized DeliRadio Venue Station.

Events: "Starring"+Calendaring+Sharing:

"Star" an event to add it to an internal DeliRadio calendar.

Sync the user's DeliRadio calendar with iCal or Google Calendar.

Share an event with a friend or set of friends.

"Starring"+Facebook—By logging in with Facebook, the DeliRadio System may automatically "star" all the bands a user "liked" on Facebook which are also in DeliRadio database.

Playable Notifications (Email+In-App)—In at least one embodiment, this may be implemented using generic notification messages such as "80 rock shows happening near Albany this week. Listen here >>". In other embodiments, at least some notifications may be based on the user's "starred" bands, tracks, venues, and/or preferred genres. Users may also have the ability to receive notifications about their friends, and their friends' friends. In one embodiment, when a given notification is clicked or selected by a user, it launches the DeliRadio Pop-up Player (or DeliRadio Mobile Application on mobile device), and begins to stream a dynamic DeliRadio Station based on the selected notification details. Examples of at least some types of notifications may include, but are not limited to, one or more of the following (or combinations thereof):

"80 rock shows happening near Oakland this week" (generic genre-based notification)

"6 of the user's starred artists have nearby shows this week" (user starred artist notification)

"The user's friend DWolf just starred Steve Winwood" (friend stars artist notification)

"36 starred artists have nearby shows this week" (starred artist notification—stars could include artists the user has starred, artists the user's friends have starred, artists that friends of the user's friends have starred, etc.)

"The user's friend DWolf just starred an Event" (event notification)

BandScanner Functionality

Figure 48:
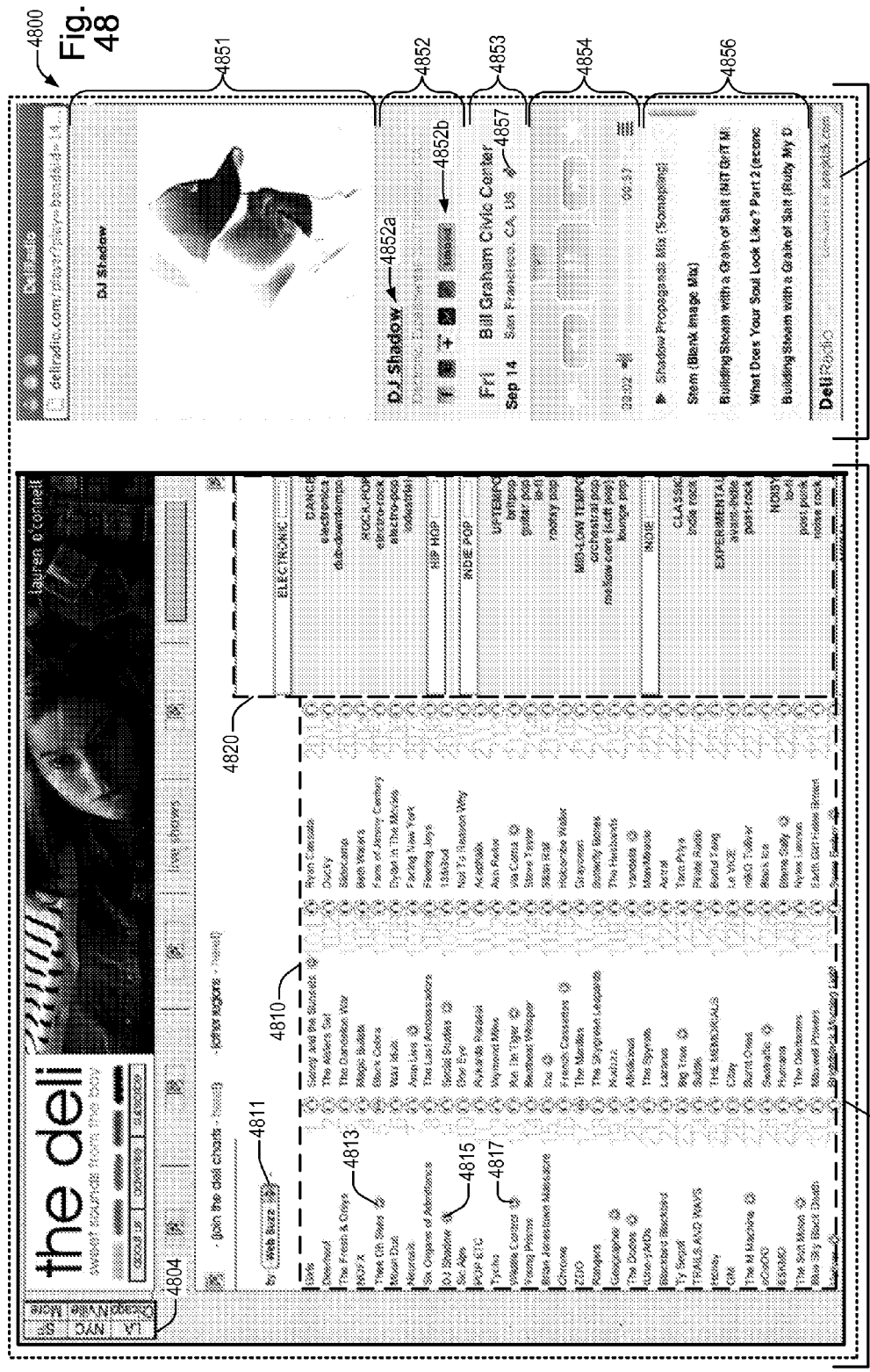

FIG. 48 shows and example screenshot of a graphical user interface (GUI) which has been configured or designed to include BandScanner functionality in accordance with a specific embodiment. As illustrated in the example embodiment of FIG. 48, it is assumed that the user has navigated to a web page which includes displayed content (e.g., FIG. 48A). Additionally in the example embodiment of FIG. 48, it is further assumed that the GUI corresponds to a $3^{rd}$ party web page (e.g., managed by a $3^{rd}$ party content provider) which has been configured or designed to utilize DeliRadio's BandScanner functionality to thereby cause a DeliRadio Pop-Out Player (e.g., FIG. 48B) to automatically be displayed or presented to the user.

In the example embodiment of FIG. 48A, it is assumed that a third party website (and at least a portion of its associated web page(s)) has been configured or designed to implement DeliRadio's "BandScanner" functionality on one or more of its web pages. In at least one embodiment, BandScanner is comprised of javascript code that may be inserted on any page of a third party website that includes references to the names of artists. In other embodiments, at least a portion of the BandScanner functionality may be implemented via a browser plug-in or add-on.

In one embodiment, when executed, the BandScanner code analyzes the webpage content of the third party website, finds references to artist names, and compares those artist names against DeliRadio's database of artist names. When a match is identified, the BandScanner code dynamically and automatically inserts (or causes display of) a "play" button next to the matched artist name displayed on the webpage of the third party, as illustrated, for example, at 4813, 4815, and 4817 of FIG. 48A. When a play button (e.g., 4815) is clicked or selected by a website visitor (e.g., a user), this may cause a DeliRadio Pop Out Player to open at the user's system and begin playing streamed music from (or relating to) the matched artist. In at least one embodiment, when the user clicks on selected play button, it causes the user's system to sends a request to the DeliRadio System to create a radio station for the identified artist. The DeliRadio System may respond by causing DeliRadio Player GUI (e.g., FIG. 48B) to be displayed at the user's system and begin playing streamed music from (or relating to) the matched artist.

For example, as illustrated in the example embodiment of FIG. 48, it is assumed that the user has clicked on the "Play" button 4813 (corresponding to identified artist "DJ Shadow") which has been dynamically displayed on web page 4801 via the BandScanner functionality. In response, a DeliRadio Player GUI (750) is opened at the user's system, and is configured to play, at the user's system, streaming music performed by the artist DJ Shadow.

In some embodiments, at least a portion of the BandScanner code may be implemented at the user's system, such as, for example, during a rendering of the $3^{rd}$ party webpage, or via use of a browser plug-in or add-on, via execution of software at the user's system, etc. In at least one embodiment, when executed at the user's system, the BandScanner code may dynamically analyze the webpage content to be displayed in order to identify references to artist names. In some embodiments, the BandScanner code may dynamically query the DeliRadio System to identify any artist matches. If an artist match is detected, the BandScanner code may cause a "play" button to be dynamically and automatically inserted or displayed on the webpage, such as, for example, next to the matching artist name which is displayed on the webpage.

In some embodiments, the BandScanner functionality may also be configured or designed to enable additional, user-customized content to be dynamically included in (or presented as part of) the webpage content which is displayed to the user (via the user's system). For example, in some embodiments, additional content (e.g., customized, user-specific content) could be automatically and dynamically displayed to the user such as, for example, upcoming tour date(s) (e.g., in the user's geographic location) for one or more artists identified on the webpage;

ticket availability information for one or more artists identified on the webpage;

ticket purchasing button for one or more artists identified on the webpage;

venue information relating to upcoming tour date(s) for one or more artists identified on the webpage;

and/or other types of information and/or content relating to one or more artists identified on the webpage, including, but not limited to, various types of information and/or content described and/or referenced herein.

For example, in one embodiment, the BandScanner functionality may be configured or designed to identify the user's approximate geographic location (e.g., using the user's IP address and/or user's profile information), and use the identified geographic location to identify and display dynamically generated content relating to upcoming tour date(s) for one or more artists identified on the displayed webpage. In some embodiments, the BandScanner functionality may also be configured or designed to dynamically generate and display ticket purchasing button(s) which the user may click on to initiate purchase of event ticket(s) for one or more identified artists (e.g., as shown, for example, at 4857, FIG. 48B). According to different embodiments, when the ticket link/button is clicked by the user, one or more of the following types of operations may be performed:

- the user's web browser may be directed to the DeliRadio artist profile page where more information relating to the artist's tour dates can be viewed;
- the user's web browser may be directed to a specific "event" page for the next event or show which is closest (e.g., either in time or geographic proximity) to the viewer, where tickets can be bought;
- the user's web browser may be directed to the venue website to for the show which is associated with the ticket link/button which was clicked on by the user;
- etc.

According to specific embodiments, other aspects of the BandScanner functionality may include, but are not limited to, one or more of the following (or combinations thereof):

- Displaying a "Play All" button which may be used to create and play a customized streaming radio station which includes all (or selected) bands/artists identified on the third party webpage.
- Providing Automatic vs. Delimited functionality—For example, BandScanner functionality may be configured or designed to work automatically (e.g., without requiring filter or search criteria from the user); or it can focus on a specific filter/search criteria provided by the user.
- Ticket Link or Ticket Icon next to Play Button.

In addition, the operator of the third party website may also use BandScanner to create one or more DeliRadio music station(s) which includes one or more artists referenced on the third party web page on which the BandScanner code has been implemented. The operator of the third party website may control where on the web page the link to this DeliRadio station is placed or embedded. When a visitor to the web page clicks on this link, a DeliRadio Player GUI (e.g., FIG. 48B) may dynamically open and play streaming one or more artists referenced on the page. According to different embodiments, examples of different types of third party entities or websites which may use the BandScanner feature(s) may include, but are not limited to, one or more of those relating to: venues, festivals, music blogs, ticketing companies, music charts, city or regional "free weeklies," etc.

FIGS. 48A and 48B show the DeliRadio Pop-Out Player that has opened when a visitor to a third party website (which has been configured or designed to use BandScanner functionality) has clicked on the play button next to an artist's name on that website.

As illustrated in the example embodiment of FIG. 48B, the DeliRadio Player GUI 4850 may display a variety of content, and may be configured or designed to provide various types of functionality.

For example, as illustrated in the example embodiment of FIG. 48B, the DeliRadio Player GUI 4850 may include functionality for facilitating, initiating, and/or performing one or more of the following operation(s)/action(s) (or combinations thereof): one or more of the following features (or combinations thereof):

- Display Station name (DJ Shadow) and related artist information (e.g., 4852).
- Display and plays a list of songs (e.g., 4856) which have been selected based on the identified matching artist information.
- Enable the user may listen to the songs in the order played by the system, or randomly access any song of his/her choosing.
- Display artist-related event information (e.g., 4853) such as, for example, upcoming show/tour date(s), venue location information; link to buy tickets to selected show(s).
- Display link(s) or object(s) (e.g., ticket object 4857) which enable the user to purchase tickets to upcoming show(s) for the identified artist.
- Display photos, videos, and/or other content (751) relating to the identified artist.
- Enables users to pause/restart playback, adjust playback volume, and skip from point to point within the song (e.g., via player control interface 4854).
- Enables users to share the station to their social network profiles, email station URL to a friend, copy the station URL to the computer clipboard, or obtain the necessary code to embed the Station Player GUI on a website (e.g., 4852b).
- Display a hyperlinked artist name (e.g., 4852a) to visit the band's full DeliRadio profile.

FIG. 50A illustrates an example embodiment of a portion of BandScanner code 5000 that may be inserted by the third party website or webpage (e.g., at the beginning of the code for the web page) for enabling BandScanner functionality on that particular website/webpage. In at least one embodiment, execution of code 5000 may insert the most recent version of the DeliRadio BandScanner code from DeliRadio's servers; insert an external library (e.g., hosted by an entity such as Google); and/or may initializes the script, passing along any configuration options that the third party website operator may desire. In at least one embodiment, the second link displayed in the code portion of FIG. 50A links to and automatically incorporates additional code which is hosted on DeliRadio's servers. One example embodiment of this additional code is illustrated in FIG. 50B.

FIG. 50B illustrates an example embodiment of a portion of additional BandScanner code 5050 that may be included on the third party website/webpage to facilitate communication between the operator's website and the DeliRadio Server System. In at least one embodiment, at least a portion of the communication may be conducted via use of a DeliRadio BandScanner API. The code illustrated in FIG. 50B, and/or alternate embodiments thereof, may be hosted on DeliRadio servers and may be automatically inserted in the code illustrated in FIG. 50A, which is incorporated on the third party website.

Figure 49:

FIG. 49 represents an alternate embodiment of a third party website incorporating DeliRadio's BandScanner code, and illustrates various ways in which BandScanner functionality may be implemented. As illustrated in the example embodiment of FIG. 49, as shown at 4905, 4906, the website operator may constrain the DeliRadio BandScanner to search within a particular tag or tags, in first case, the <H1> header tag. Only artist names within the designated tag may be searched and activated (e.g., with a dynamic "Play" button). The play button graphic automatically scales to match the line-height of the parent element, resulting in a larger button to accompany larger text.

In a second example, as shown at 4901-804, the website operator has simply typed an artist name within the specific delimiter that the BandScanner functionality knows to look for. Any text within the double-square-brackets may be scanned for artist names, and the entire string of text may be turned into a link to a DeliRadio Pop-Out Player.

Figure 51:
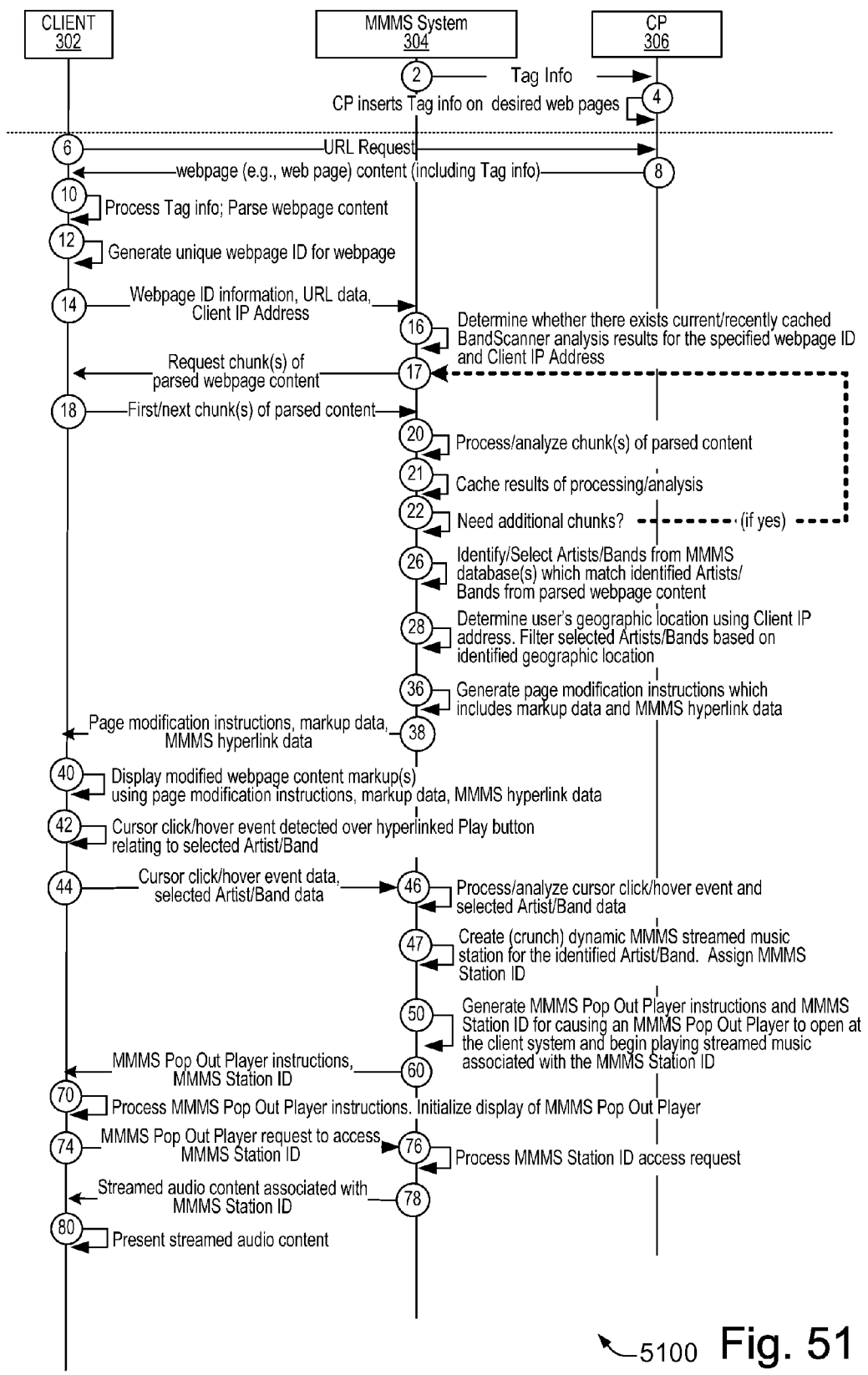
FIG. 51 shows a flow diagram of an example alternate embodiment which may be used for implementing one or more aspects of BandScanner functionality.

FIG. 51 shows a flow diagram of an example alternate embodiment which may be used for implementing one or more aspects of BandScanner functionality. As illustrated in the example embodiment of FIG. 51, the MMMS System 304 provides (2) tag information (e.g., which may include includes the Content Provider ID as well as other scripted instructions) to the Content Provider server (CP) 306 (also referred to herein as "3$^{th}$ Part Website" or "Website operator"). In at least one implementation, the Content Provider may utilize the tag information to generate one or more tags to be inserted or embedded (4) into one or more of the Content Provider's webpages, as desired by the Content Provider. In at least one embodiment, each embedded tag may include information relating to the Content Provider ID.

In one embodiment, dynamic content tags may be inserted or embedded as different distinct tags into each of the selected webpages. Alternatively, the tag information may be inserted into the page via a tag that is already embedded in each of the desired pages such as, for example, and ad server tag or an application server tag. In at least one embodiment, once present on the page, the tag may be served as part of the page that is served from the Content Provider's web server(s). In at least some embodiments, the tag on the Content Provider's page may include instructions for enabling the MMMS-related tag information to be dynamically served (e.g., by 3rd party server) to client system.

As illustrated in the example embodiment of FIG. 51, it is assumed at (6) that a user at the client system 302 has initiated a URL request to view a particular webpage such as, for example, www.rollingstone.com. Such a request may be initiated, for example, via the Internet using an Internet browser application at the client system.

In at least one embodiment, when the URL request is received at the Content Provider server 306, the server responds by transmitting or serving (8) webpage content, including the tag information, to the client system 302.

As shown at (10), the client system processes the tag information. In at least one embodiment, at least a portion of the received tag information may be processed by the client system's web browser application.

In at least one embodiment, the processing of the tag information at the client system may cause the client system to automatically and dynamically parse (10) the received webpage content and/or to generate one or more chunks of plain text based upon the parsed content. In at least one embodiment, the parsing of webpage or document content may include, but is not limited to, one or more of the following (or combinations thereof):

Identifying main content block of a target document
Extracting semi structured information and clean plain text
Converting HTML to clean plain text
Removing all (or selected) menus, advertisements, and link boxes etc.
Generating clean text output of content only, without external noise, while retaining semi structured information such as, for example, titles, bold elements, meta information, etc.
Performing chunking operations for generating chunks of clean text output which may then be provided to the MMMS System for further contextual search analysis and processing.

In at least one embodiment, at least a portion of the parsing operations performed at the client system may be implemented by a Parser component implemented at the client system. For example, in at least one embodiment, the tag information which is processed at the client system may include executable instructions (e.g., via a scripting language such as, for example, Javascript, ActiveX, etc.) which, when executed, causes the client system to automatically and dynamically parse (10) the received webpage content and/or to generate one or more chunks of plain text based upon the parsed content.

In at least one embodiment, the processing of the tag information at the client system may also cause the client system to automatically generate (12) a unique Webpage ID for the received webpage content, and to transmit (14) the Webpage ID (along with other desired information) to the MMMS System 304. Examples of other types of information which may be sent to the MMMS System (e.g., at 14) may include, but are not limited to, one or more of the following (or combinations thereof):

Content Provider ID information;
Webpage URL;
Client IP Address
Chunk(s) of parsed content (e.g., first chunk of parsed content)
etc.

In at least one embodiment, a Webpage ID represents a unique identifier for a specific webpage, and may be generated based upon text, structure and/or other content of that webpage. In at least one embodiment, the first chunk of parsed webpage content may be used as the Webpage ID. In at least one embodiment, the Webpage ID may be based solely upon selected portions of the webpage content for that particular page, and without regard to the identity of the user, identity of the client system, or identity of the Content Provider. However, in at least some embodiments, the Webpage ID may be used to uniquely identify the content associated with specific personalized webpages, customized webpages, and/or dynamically generated webpages, which, for example, may be specifically customized by the Content Provider based on the user's identity and/or preferences.

Upon receiving the Webpage ID information (as well as other related information, if desired), the MMMS System uses the Webpage ID information to determine (16) whether there exists current/recently cached BandScanner analysis results for the specified webpage ID and Client IP Address.

In at least one embodiment, if it is determined there exists current/recently cached BandScanner analysis results for the specified webpage ID and Client IP Address, the MMMS System may choose to forgo new/additional processing and/or analysis of the Source webpage content, and instead use at least a portion of the cached information associated with the identified Webpage ID.

In at least one embodiment (as illustrated, for example, in the specific example embodiments of FIG. 10), if it is determined there does not exist any current/recently cached BandScanner analysis results for the specified webpage ID and Client IP Address, the MMMS System may respond by identifying the URL associated with the Webpage ID, and by retrieving and/or crawling (or by instructing automated agents to crawl) the webpage content corresponding to the identified URL. Alternatively, as illustrated in the example embodiment of FIG. 51, if it is determined there does not exist any current/recently cached BandScanner analysis results for the specified webpage ID and Client IP Address, the MMMS System may respond by transmitting (17) a communication to the client system, requesting or instructing the client system to send or upload a first (or next) chunk of parsed content to the MMMS System.

For example, in the specific example embodiment of FIG. 51, it is assumed (at 15) that the client system has not yet provided any chunks of parsed content to the MMMS System. Accordingly, in a particular example embodiment, the MMMS System may instruct the client to upload the first chunk of parsed webpage content, and the client system may respond by transmitting or uploading (18) a first chunk of parsed webpage content to the MMMS System. In at least one embodiment, each chunk of parsed content may be configured or designed to include about 100-400 characters (e.g., about 200 characters). In some embodiments, the MMMS System may instruct the client system to upload multiple chunk(s) to the MMMS System over one or more sessions. In a different example embodiment, where the client system has previously the first chunk of parsed content, the MMMS System may initially process and analyze the received first chunk of parsed content, and thereafter, may subsequently instruct the client system (if desired) to upload the next chunk of parsed webpage content to the MMMS System.

As illustrated in the example embodiment of FIG. 51, the MMMS System may perform (e.g., in real-time) processing and analysis (20) on the received chunk(s) of parsed webpage content. In at least one embodiment, such processing and analysis may include, for example, identifying references to artist/band names in the processed webpage content; using the identified artist/band name references to search the MMMS database(s) for matching artist/band names identified in the MMMS database(s), etc. As shown at (21), the MMMS System may cache at least a portion of the output data which is generated as a result of the processing and analysis of the received chunks of parsed webpage content.

As shown at (22), the MMMS System may determine (22) whether or not it is desirable or necessary to processes additional chunk(s) of parsed content for the identified webpage. For example, as illustrated in the example embodiment of FIG. 51, if the MMMS System determines that it is desirable or necessary to processes additional chunk(s) of parsed content for the identified Source webpage, the MMMS System may request (17) or instruct the client system to upload a next chunk (chunks) of parsed webpage content to the MMMS System, whereupon the client system may then respond by transmitting (18) or uploading a next chunk(s) of parsed webpage content to the MMMS System. The MMMS System may then process and analyze (20) the next received chunk(s), cache (21) the results, and then determine (22) once again whether or not it is desirable or necessary to processes additional chunk(s) of parsed content for the identified Source webpage.

In at least one embodiment, the MMMS System may continue to request and/or analyze parsed webpage content associated with the webpage URL until the entirety of the parsed webpage content has been analyzed, and/or until the MMMS System has determined that it has acquired/generated sufficient analysis output data to enable the MMMS System to adequately and subsequently perform specifically desired or required operations.

As shown at (26), the MMMS System may identify and/or select Artists/Bands from the MMMS database(s) which match identified Artists/Bands from parsed webpage content.

As shown at (28), the MMMS may determine user's geographic location using Client IP address, and may filter selected Artists/Bands based on the user's identified geographic location.

As shown at (36), the MMMS System may use the identified matching artist/band information to dynamically generate page modification instructions which includes markup data and MMMS hyperlink data. In at least one embodiment, the page modification instructions may cause display of a "play" button next to the matched artist name displayed on the webpage displayed at the client system, as illustrated, for example, at 713, 715, and 717 of FIG. 48A. In one embodiment, when a play button (e.g., 715) is clicked or selected by the user, this may cause a MMMS Pop Out Player to open at the user's system and begin playing streamed music from (or relating to) the matched artist.

As shown at (38) the MMMS System may send the page modification instructions/information to the client system. In a specific embodiment, the webpage modification instructions may include highlight/markup instructions, and MMMS hyperlink data.

As illustrated in the example embodiment of FIG. 51, when the webpage modification instructions are received at the client system, the client system processes the instructions, and in response, modifies (40) the display of the webpage content in accordance with the page modification instructions, which, for example, may cause display of a "play" button next to the matched artist name displayed on the webpage displayed at the client system (e.g., as illustrated, for example, at 713, 715, and 717 of FIG. 48A).

As shown at 42, it is assumed that the client system has detected a cursor click/hover event over one of the hyperlinked MMMS Play buttons relating to (or associated with) a selected Artist/Band identified by the user.

As shown at 44, information relating to the detected cursor click/hover event and selected artist/band data may be automatically transmitted by the client system to the MMMS System.

As shown at 46, the MMMS System may process and analyze the cursor click/hover event and identified Artist/Band data.

As shown at 47, the MMMS System may create (or "crunch") a dynamic MMMS streamed music station for the identified Artist/Band, and may assign a unique MMMS Station ID for this dynamic MMMS streamed music station.

As shown at 50, the MMMS System may Generate MMMS Pop Out Player instructions and MMMS Station ID for causing an MMMS Pop Out Player to open at the client system and begin playing streamed music associated with the MMMS Station ID.

As shown at 60, the MMMS System may provide the MMMS Pop Out Player instructions and MMMS Station ID information to the client system.

As shown at 70, the client system may process the received MMMS Pop Out Player instructions, and initialize display MMMS Pop Out Player at the client system.

As shown at 74, the MMMS Pop Out Player may transmit a request to the MMMS System to access the streamed music station corresponding to the MMMS Station ID. In response, the MMMS System may process (76) the MMMS Station ID access request, and initiate streaming (78) of audio content (and/or other related content/information) associated with the identified MMMS Station ID. In at least one embodiment, the streamed audio content is received at the client system, and presented to the user via a suitable audio presentation component at the client system such as, for example, speakers which are connected to the client system. In at least one embodiment, the streamed audio content may be received at the client system in encoded format, and may be processed by the MMMS Pop Out Player for playback at the client system.

Ticket Reservations & Purchasing Functionality

In at least one embodiment, the MMMS System may be configured or designed to provide ticketing reservation and purchasing functionality for enabling and/or facilitating users in performing activities/operations relating to reservation and/or purchasing of tickets to events such as live performances at one or more venues. For example, in at least one embodiment, the DeliRadio System may include a Ticketing Reservation/Purchase System ("TRPS") which, for example, may be configured or designed to automatically and/or dynamically identify event ticketing reservation/purchasing opportunities in advance of tickets going on sale to the public. According to different embodiments, various aspects of the MMMS System's ticketing reservation and purchasing functionality may include, but are not limited to, one or more of the following (or combinations thereof):

Venue Implementation: In at least one embodiment, the MMMS System may be configured or designed to provide ticketing reservation and purchasing functionality for enabling and/or facilitating users in performing activities/operations relating to reservation and/or purchasing of tickets to events such as live performances at one or more venues. For example, in at least one embodiment, the MMMS System may include a Ticketing Reservation/Purchase System ("TRPS") which may be configured or designed to automatically and/or dynamically identify event ticketing reservation/purchasing opportunities in advance of tickets going on sale to the public. In one embodiment, reservation and/or purchasing of tickets by DeliRadio users may be facilitated by 3rd party system(s)/component(s). In at least one embodiment, at some point after the Initial Ticket On-Sale event (e.g., approximately 1-5 days after), the venue hosting the event (e.g., concert/show) would set the Reservation Allotment for how many reservations it would guarantee/allot for a specific concert. In one embodiment, to determine the Reservation Allotment, the venue may take their "Sellable Capacity" less "Anticipated Sales", and the remaining number may be the Anticipated Unsold Tickets ("AUTs"). For example, a venue with a Sellable Capacity of 500 and Anticipated Sales of 300 would have 200 AUTs remaining. The TRPS would multiply the venue's AUT by a "super percent" multiplier (e.g., 100+%), thus creating the Reservation Allotment for the event. One reason for the super percentage multiplier is that not all reservations may be converted to a ticket purchase.

Customer Interaction: In at least one embodiment, once the Reservation Allotment is available in the TRPS, DeliRadio users may be able to view a Concert Page for a particular event. On the Concert Page, the user may view (e.g., in real-time) information relating to the total number of tickets sold for that event and the number of reservations available. DeliRadio users may be able to "buy now" for immediate ticket purchase and/or be able to make ticket reservations (e.g., for one or more persons). In one embodiment where DeliRadio users may "star" particular venues, DeliRadio users could receive an update when an event is scheduled at one of their starred venues, and by clicking on the update, they may be directed to the Concert Page for that event, where they could purchase tickets and/or make Reservations.

Making the Reservation: In at least one embodiment, when making the Reservation, the Reservation Host may be able to designate other DeliRadio users (Reservation Recipients) to receive an "invitation to accept the Reservation." This message may be sent within DeliRadio to Reservation Recipients. The Host and the Recipients would have a window of time in which to convert their Reservations into Ticket purchases. Once the Host has received confirmation from Recipients of their intent to attend the show as a group (e.g., via DeliRadio SMS, text message, phone call, in person, etc.), the Reservation Host may automatically handle the Ticket purchases on behalf of the Reservation Group.

Picking up Tickets purchased through TRPS: In at least one embodiment, the venue keeps track of tickets purchased through at least one Reservation Group in the TRPS. The Host of at least one Reservation Group is now "hosting" a "guest list" of attendees at the event. At least one member of the Reservation Group arrives at the venue, informs Will Call that they're on the Reservation Host's Guest List, presents ID, and receives their Ticket.

Reservation Incentives: In at least one embodiment, venues participating in the TRPS may be able to access their Venue Dashboard, select a particular event, and set any incentives/discounts it wants to offer for that event. The Reservation Host would then be eligible for deals as an incentive for buying AUTs in bulk, for example. In at least one embodiment, DeliRadio users who reserve or purchase their tickets via the DeliRadio System may receive other types of promotional offers or benefits such as, for example:

Bulk Ticket Discount: By way of example, 5 tickets for the price of 4, with the discount spread across the price of one or more tickets, thus benefiting the Reservation Group. The venue is only getting income from 4 ticket sales, but the event will be attended by 5 persons who may generate other income for the venue while attending the show.

Promotional Offers: drink tickets, venue swag, VIP privileges, priority seat reservations, discount coupons, etc.

Future Show Discounts: Discounts on Ticket purchases for future shows at that venue, or at shows among various venues in a Venue Group.

Vendor Affiliate Discounts: Discounts at vendors/merchants in the same neighborhood as the venue.

Venue "Points": Redeemable by the Host at the venue at some later date for any of the above.

TRPS Monetization: Monetization of the TRPS could take one or more of the following forms (or combinations thereof): Per Ticket Fee; Per Order Fee; and/or Per Show Fee.

Example Models for Sponsorship Sales: (1) local/national sponsor underwrites one or more fees and is perceived as paying one or more convenience fees related to Tickets purchased through the TRPS for that event, in exchange for brand goodwill and/or user data provided by DeliRadio; (2) local/national sponsor pays a flat fee per show to buy a relationship with a specific demographic and receives demographic specific user data from DeliRadio; (3) local/national sponsor pays a flat fee per show and offers product giveaways and/or raffle entries for a contest.

Example "Reservation" Definitions: (1) a socially broadcast interest in attending a particular event (e.g., a "like" for an event that others may see), and then helping that general interest culminate in a tipping point where everyone wants to convert their Reservation into Ticket Buys to be guaranteed admission; (2)

an option to purchase a Ticket; (3) an opportunity for an individual to get a group of people to buy multiple tickets, and by doing so, the organizer (host) receives something of value from the venue; (4) a discrete unit of the allocation of Anticipated Unsold Tickets multiplied by a super-percentage (100+%)

According to different embodiments, a reservation window may close the sooner of (1) x days before the event or (2) X % of Tickets sold. Alternatively, X days after the Reservation is made, but no later than X days before the event.

Example Benefits/Advantages of MMMS System TRPS: Various benefits/advantages of the MMMS System TRPS may include, for example: the limited quantity of Reservations; the limited time window in which to convert Reservations into Ticket Buys; and/or the social broadcast nature of the Reservation (allowing one or more DeliRadio users to see the status of one or more Reservations for a given show at any time.

Figure 52:
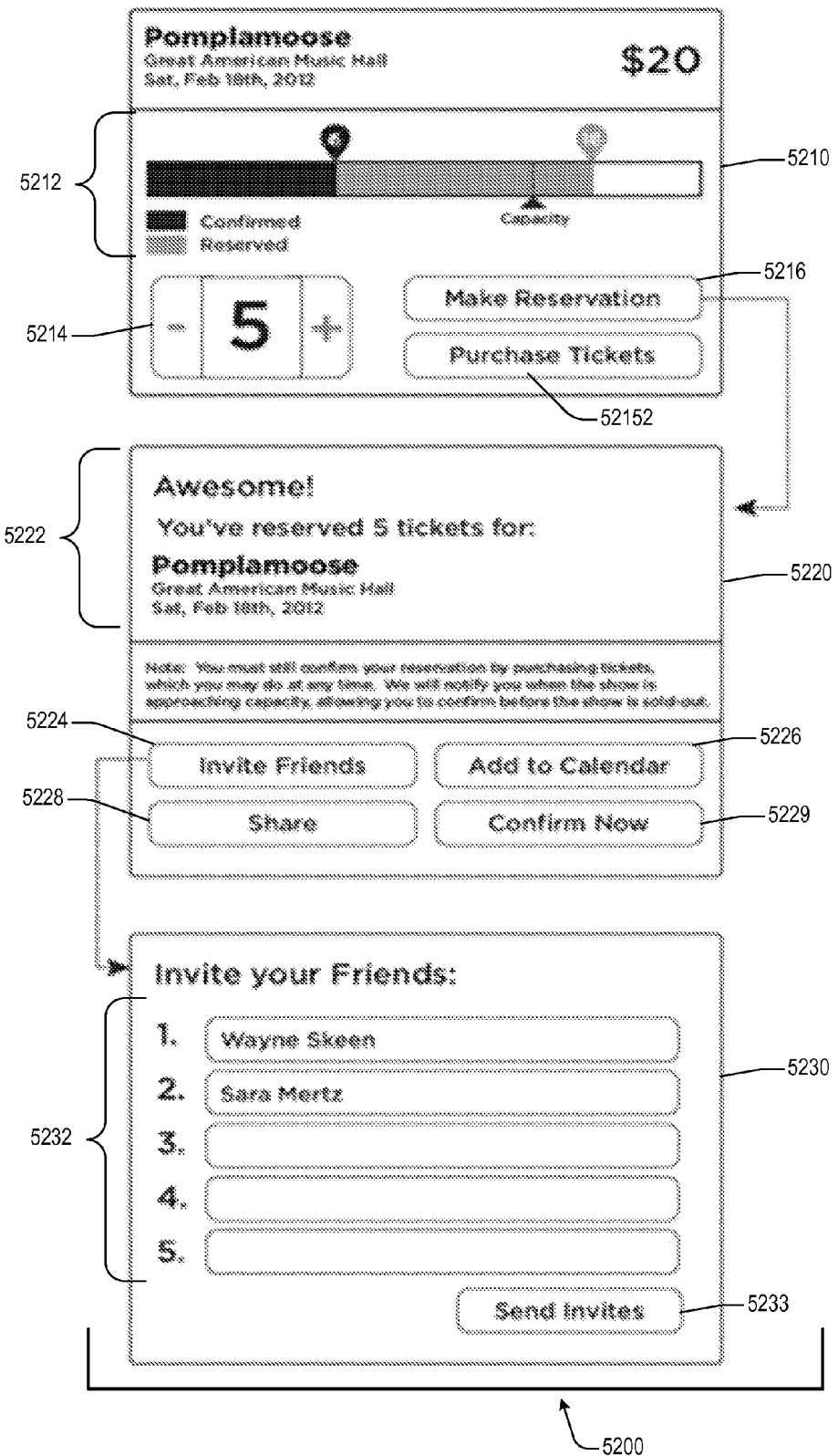
FIG. 52 shows example screenshots of a sequence of several Ticket Reservation GUIs.

FIG. 52 shows example screenshots of a sequence of several Ticket Reservation GUIs which may be configured or designed to provide ticketing reservation and purchasing functionality for enabling and/or facilitating users in performing activities/operations relating to reservation and/or purchasing of tickets to events such as live performances at one or more venues. For example, in at least one embodiment, the DeliRadio System may include a Ticketing Reservation/Purchase System ("TRPS") which may be configured or designed to automatically and/or dynamically identify event ticketing reservation/purchasing opportunities in advance of tickets going on sale to the public. In one embodiment, reservation and/or purchasing of tickets by DeliRadio users may be facilitated by $3^{rd}$ party system(s)/component(s). In at least one embodiment, at some point after the Initial Ticket On-Sale event (e.g., approximately 1-5 days after), the venue hosting the event (e.g., concert/show) would set the Reservation Allotment for how many reservations it would guarantee/allot for a specific concert. In one embodiment, to determine the Reservation Allotment, the venue may take their "Sellable Capacity" less "Anticipated Sales", and the remaining number may be the Anticipated Unsold Tickets ("AUTs"). For example, a venue with a Sellable Capacity of 500 and Anticipated Sales of 300 would have 200 AUTs remaining. The TRPS would multiply the venue's AUT by a "super percent" multiplier (e.g., 100+%), thus creating the Reservation Allotment for the event. One reason for the super percentage multiplier is that not all reservations may be converted to a ticket purchase.

In at least one embodiment, once the Reservation Allotment is available in the TRPS, DeliRadio users may be able to view a Concert Page for a particular event (e.g., 5210). On the Concert Page, the user may view (e.g., in real-time) information (e.g., 5212) relating to the total number of tickets sold for that event, and the number of reservations available. DeliRadio users may be able to indicate the quantity of tickets to be purchased/reserved (e.g., via GUI portion 5214), and elect to purchase tickets 5217 for immediate ticket purchase and/or elect to make reservations 5216 (e.g., for one or more persons). In one embodiment where DeliRadio users may "star" particular venues, DeliRadio users could receive an update when an event is scheduled at one of their starred venues, and by clicking on the update, they may be directed to the Concert Page for that event, where they could purchase tickets and/or make reservations.

As illustrated in the example embodiment of FIG. 52, at 5220 is assumed that the user has initiated the process of reserving tickets for a selected show at a specific venue. In at least one embodiment, the user may be presented with options for performing additional tasks such as, for example: invite friends 5224; add to event to calendar 5226; post or share information relating to the user's ticket reservation activities (e.g., in the DeliRadio System and/or at one or more social networks); confirm ticket reservations 5229; purchased the reserved tickets; make additional ticket reservations/purchases; pre-purchase items of merchandise available at the upcoming show; elect to receive updates relating to the selected show; elect to join the mailing list of the artist/band and/or venue which will be hosting the show; etc.

In at least one embodiment, when making the Reservation, the Reservation Host may be able to designate other DeliRadio users (Reservation Recipients) to receive an invitation to accept the Reservation (e.g., as shown at 5230). This message may be sent within DeliRadio to Reservation Recipients. The Host and the Recipients would have a window of time in which to convert their Reservations into Ticket purchases. Once the Host has received confirmation from Recipients of their intent to attend the show as a group (e.g., via DeliRadio SMS, text message, phone call, in person, etc.), the Reservation Host may automatically handle the Ticket purchases on behalf of the Reservation Group. In at least one embodiment, the venue keeps track of tickets purchased through at least one Reservation Group in the TRPS. The Host of at least one Reservation Group is now "hosting" a "guest list" of attendees at the event. At least one member of the Reservation Group arrives at the venue, informs Will Call that they're on the Reservation Host's Guest List, presents ID, and receives their Ticket.

FIGS. 53-60 illustrate example screenshots of various graphical user interfaces (GUIs) which may be used to facilitate, initiate and/or perform various operation(s) and/or action(s) relating event ticket reservations and purchasing operations implemented via a user's mobile device. According to specific embodiments, at least a portion of the content and functionality of ticked reservation and purchasing GUIs illustrated in FIGS. 53-60 may be implemented at the DeliRadio System.

Figure 53:
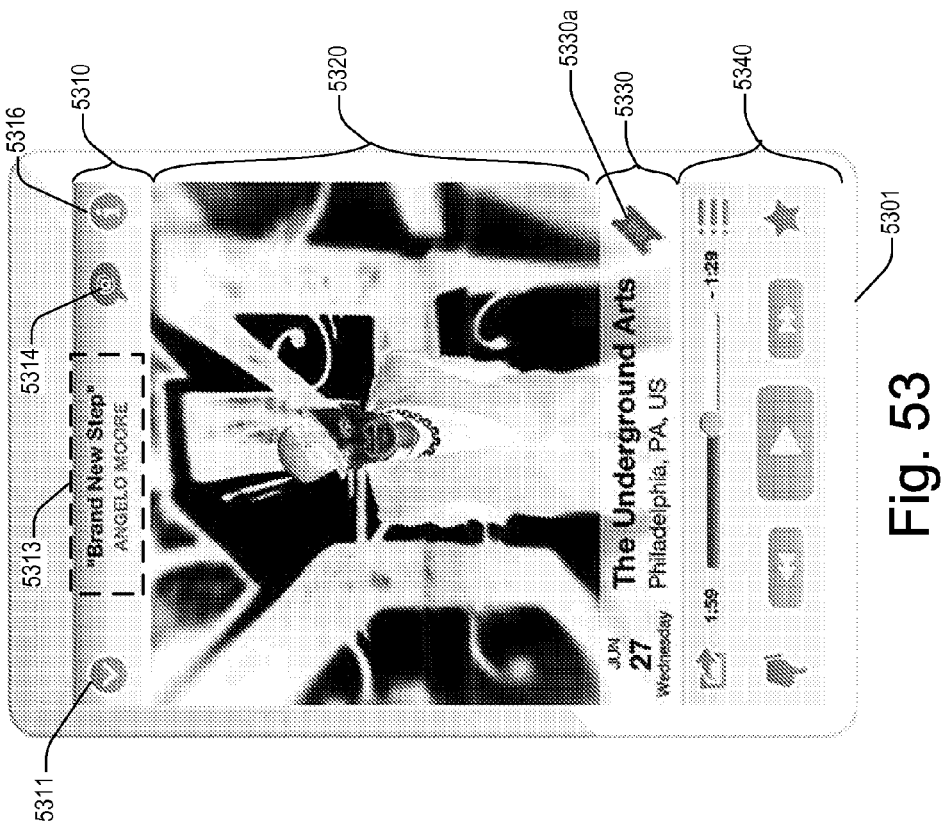

FIG. 53 shows an example embodiment illustrating a view of the DeliRadio Ticket Reservation icon 5330a from the DeliRadio Player GUI 5301. In at least one embodiment, a user of the mobile device may click on the Ticket Reservation icon 5330a to access additional GUIs for facilitating event-related online ticket reservations and purchasing transactions.

In the present example, it is assumed that the user has tapped the Ticket Reservation icon 5330a of FIG. 53, and has been directed to the artist's Event Information GUI 5401 (FIG. 54), which has been configured or designed to display listings of upcoming events associated with the identified artist (e.g., Angelo Moore). In at least one embodiment, as illustrated in the example embodiment of FIG. 54, events (e.g., 5412, 5414) where ticket reservations are determined to be available may include display of a respective Ticket Reservation icon (e.g., 5412a, 5414a) adjacent to each corresponding event. In at least one embodiment, the DeliRadio System may dynamically determine (e.g., in real-time) available ticket reservation opportunities (if any) for each of the events listed in the artist's upcoming events list 5410.

Figure 54:
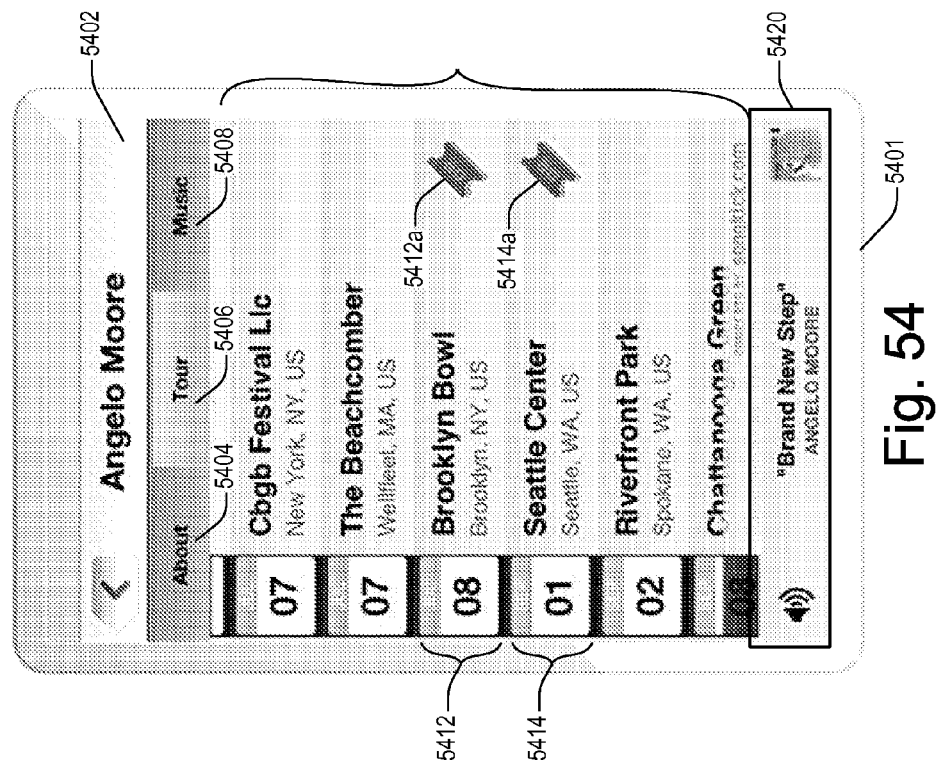

In the present example, it is assumed that the user has tapped on event listing 5412 of FIG. 54 (titled "Brooklyn Bowl"). In response, as illustrated in the example embodiment of FIG. 55, an Artist-Event GUI 5501 may be displayed, which may be configured or designed to provide functionality for enabling the user to initiate, and/or perform one or more of the following operation(s), action(s), and/or feature(s) (or combinations thereof):

View and/or obtain additional information (e.g., 5512, 5514) relating to the selected artist event.

Listen to one or more the artists performing at the event together in one station (e.g., by tapping on "play" button 5522 to initiate playback of a streaming radio station).

Get directions to the event (e.g., by tapping on map portion 5510).

Share the event with friends on their social networks (e.g., 5534).

Initiate ticket reservations for the selected event (e.g., 5532).

Return to the Player GUI of the artist the user is currently listening to (e.g., by tapping on portion 5540).

Figure 55:
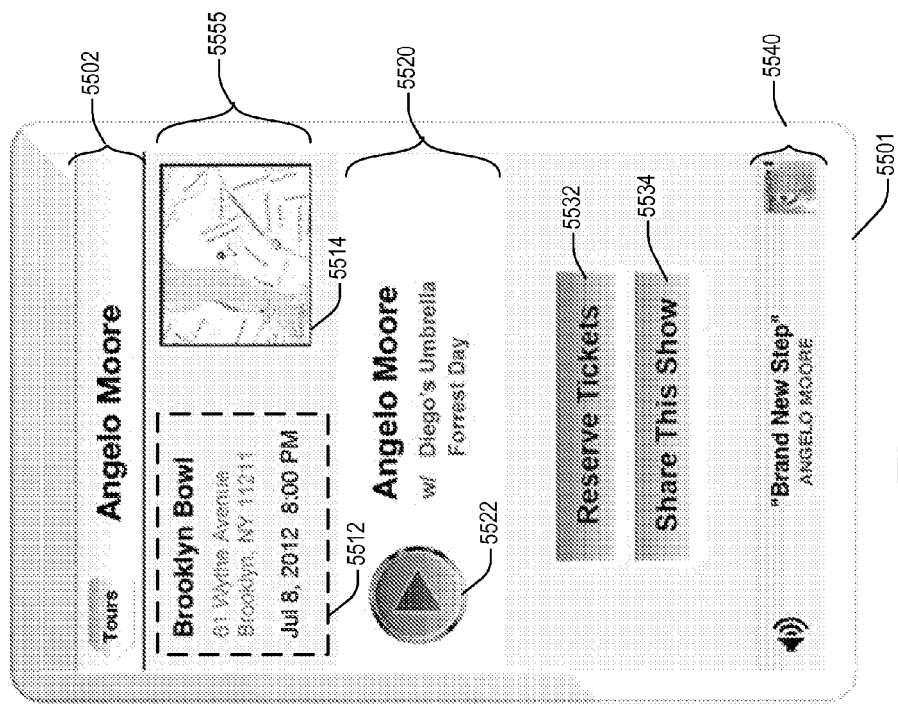

In the present example, it is assumed that the user has tapped "Reserve Tickets" button 5532 of FIG. 55. In response, as illustrated in the example embodiment of FIG. 56, an Event-Reservation GUI 5601 may be displayed, which may be configured or designed to provide functionality for enabling the user to initiate, and/or perform one or more of the following operation(s), action(s), and/or feature(s) (or combinations thereof):

View and/or obtain additional information (e.g., 5610) relating to the selected event (e.g., Artists to be performing, Date, Show Time, etc.).

View and/or obtain additional information (e.g., 5620) relating to the venue (e.g., venue name, venue location, etc.).

View and/or obtain additional information (e.g., 5620) relating to pricing for ticket reservations/purchases for the selected event.

Input the number of tickets to be reserved or purchased for the selected event (e.g., 5630).

Initiate ticket reservations for the selected event (e.g., 5638) for one or more persons.

Return to the Player GUI of the artist the user is currently listening to (e.g., by tapping on portion 5640).

In the present example, it is assumed that the user has provided input indicating that the user wishes to reserve 4 tickets (e.g., as shown at 5630) for the identified show/event. It is further assumed that the user then taps the "Make Reservation" button 5638. In at least one embodiment, after the user has tapped on the "Make Reservation" button 5638, a confirmation message may be displayed on the mobile device prompting the user to confirm the reservation of the requested number of tickets for the identified event. In some embodiments, the confirmed ticket reservations may be held only for a specified duration of time before the reservations automatically expire. If the user does not purchase the reserved tickets within the specified time duration, the reservations may automatically expire. In some embodiments, a separate reservation fee may be charged for the privilege of reserving or holding tickets to a given event.

In some embodiments, the DeliRadio System may be configured or designed to enable the user to reserve a desired number of tickets for a selected event. Additionally, the DeliRadio System may be configured or designed to facilitate the user in identifying and inviting one or more friends (or other persons) to accept one or more of the ticket reservations made by the user. One example of this feature is illustrated in FIG. 57.

Figure 56:
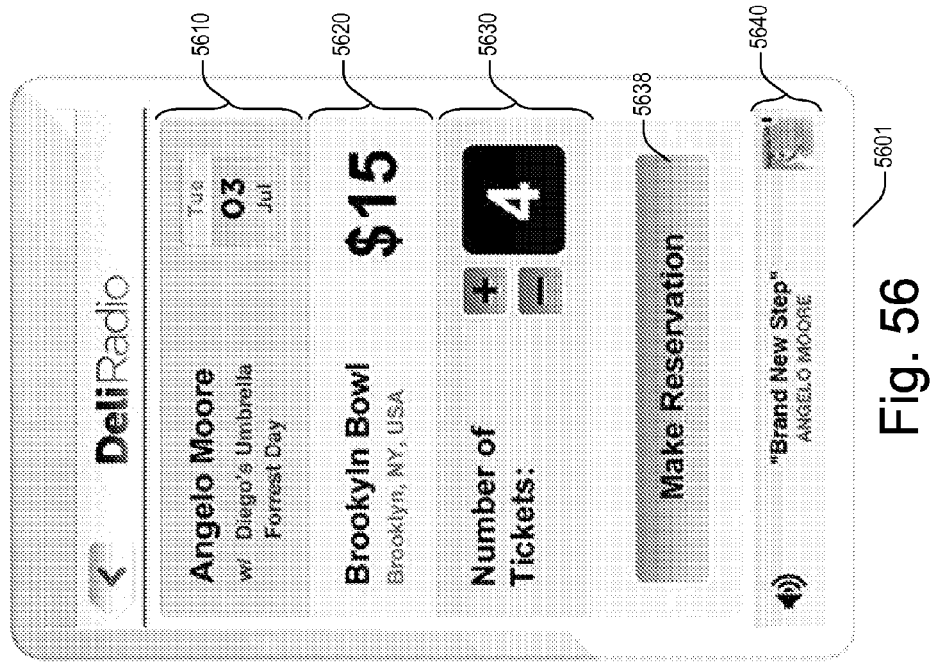
Figure 57:
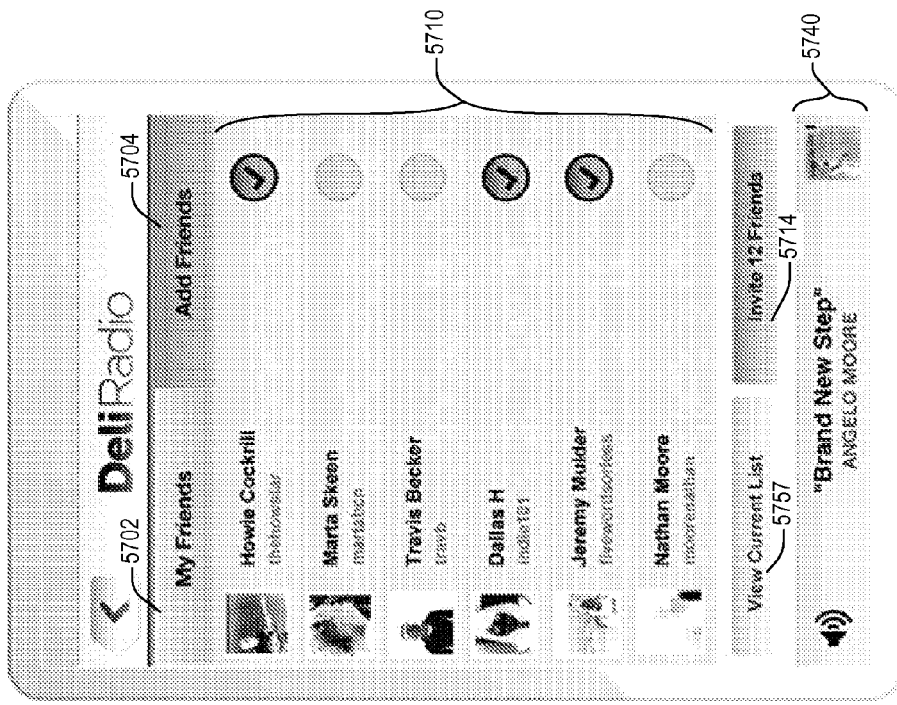

In the present example, after the user has reserved a selected number of tickets for a selected show, as described, for example, with respect to FIG. 56, the user may be presented with a Reservation Invitation GUI, such as, for example, Reservation Invitation GUI 5701 of FIG. 57. In at least one embodiment, the Reservation Invitation GUI may be configured or designed to facilitate and/or enable the user to identify and select one or more friends (or other persons) 5710 for the purpose of inviting the selected friends/persons to accept one or more of the ticket reservations made by the user for the selected show. The user may choose from their DeliRadio Friends (as shown, for example, in FIG. 57) and/or may select from a list of contacts outside the DeliRadio System such as via Facebook, Twitter, mobile device address book, etc. According to different embodiments, the invitations may be sent to the selected recipients via one or more of the following (or combinations thereof): via a DeliRadio System messaging service, via one or more social network messaging service(s) (e.g., Facebook, Twitter, etc.), via email, via SMS (as indicated in the "Add Friends" tab), etc. In the specific example embodiment of FIG. 57, it is assumed that the user has selected to invite 57 DeliRadio Friends to accept the 4 reservations. In at least one embodiment, when an invited recipient receives the invitation request, that recipient may perform one or more of the following types of activities (or combinations thereof):

Accept the reservation invitation.

Purchase one or more of the reserved tickets.

Decline the reservation invitation.

Forward the reservation invitation to one or more other persons. In at least one embodiment, the DeliRadio System may be configured or designed to only allow the invitation recipient to forward the reservation invitation to one or more other persons who share a common friendship connection with both the user who made the original ticket reservations and the recipient who is forwarding the reservation invitation.

Make additional ticket reservations for the selected show.

Send a personal communication back to the user who sent the reservation invitation.

Utilize features embedded in the received reservation invitation to view details or information relating to one or more of the following (or combinations thereof): details about the upcoming show; information about the artist(s) who will be performing at the show; information about the venue where the selected show will be performed; etc.

Utilize features embedded in the received reservation invitation to access and/or listen to a customized DeliRadio station which plays streamed music performed by one or more of the artist(s) who will be performing at the selected show.

Utilize features embedded in the received reservation invitation to access and/or listen to a customized DeliRadio station which plays streamed music performed by one or more of the artist(s) who will be performing at the selected show.

Etc.

Figure 58:
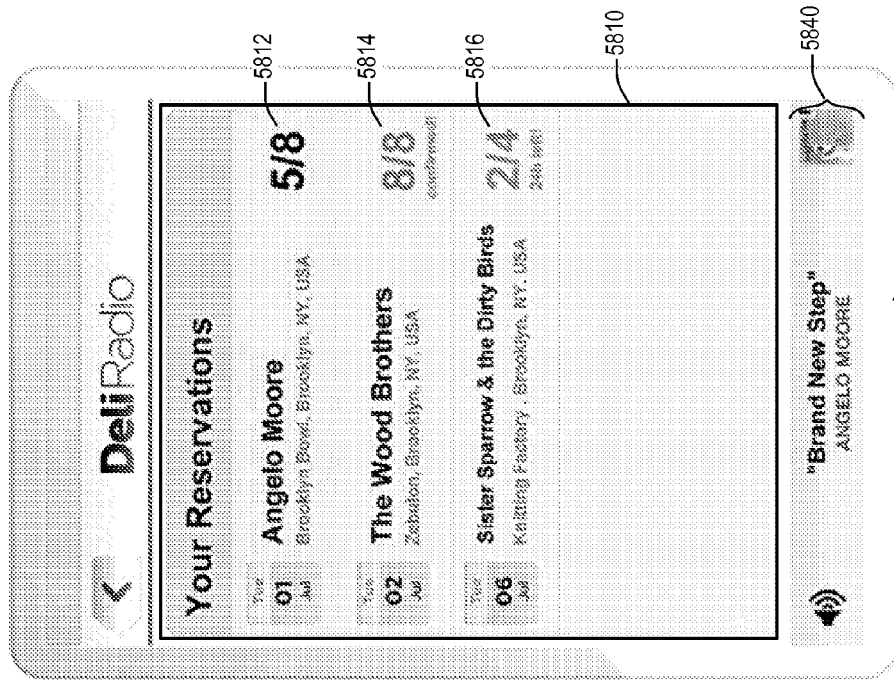

FIG. 58 shows an example embodiment of a User Reservation Status GUI 5801 in accordance with a specific embodiment. In the specific example embodiment of FIG. 58, the User Reservation Status GUI has been configured to present a list view of a user's upcoming reservations. In at least one embodiment, the User Reservation Status GUI may be configured or designed to display information relating to each of the user's existing reservations, as well as updated status information relating to each of the user's existing reservations. For example, as illustrated in the example embodiment of FIG. 58, the updated status information relating to reservation entry 5812 (for the Angelo Moore show) indicates that 5 reservation invitations have been confirmed or accepted out of a total of 53 reservations made by the user. Additionally, the updated status information relating to reservation entry 5816 (for the Sister Sparrow show) indicates that 2 reservation invitations have been confirmed or accepted out of a total of 4 reservations made by the user, and also indicates that the reservations (and/or reservation invitations) are due to expire if the reservations are not ticketed within 24 hours. As illustrated in FIG. 58, colors may be used to indicate a current state or current status of each respective reservation.

In the present example, it is assumed that the user taps or clicks on reservation entry 5812 of the User Reservation Status GUI. In response, the user may be presented with a Reservation Details GUI as illustrated by 5901 of FIG. 59. As illustrated in the example embodiment of FIG. 59, the Reservation Details GUI 5901 may present the user with a variety of information and/or other types of functionality relating to the selected reservation such as, for example, one or more of the following (or combinations thereof):

Details about the upcoming show associated with the selected reservation (e.g., 5912).

Information about the artist(s) who will be performing at the show (e.g., 5912).

Information about the venue where the selected show will be performed (e.g., 5912).

Information relating to confirmations from friends who have accepted the user's invitation for a reserved ticket 5914 (e.g., 5914).

Information relating to the user's remaining available reserved tickets associated with the selected reservation (e.g., 5912, 5914).

Functionality for sending out additional reservation invitations to additional persons (e.g., 5922).

Functionality for sending communications to one or more of the reservation invitation recipients (e.g., 5924).

Functionality for viewing additional information relating to currently outstanding and/or declined reservation invitations for the selected show (e.g., 5926).

Functionality for accepting or confirming a ticket reservation for the selected show (e.g., 5928).

Functionality for to access and/or listen to a customized DeliRadio station which plays streamed music performed by one or more of the artist(s) who will be performing at the selected show (e.g., 5940).

Thus, for example, in at least one embodiment, the user may choose to invite more friends; send a message via email or SMS to confirmed invitees; view the status of current outstanding and declined invitations; confirm the ticket reservations with the DeliRadio System; etc.

Figure 60:
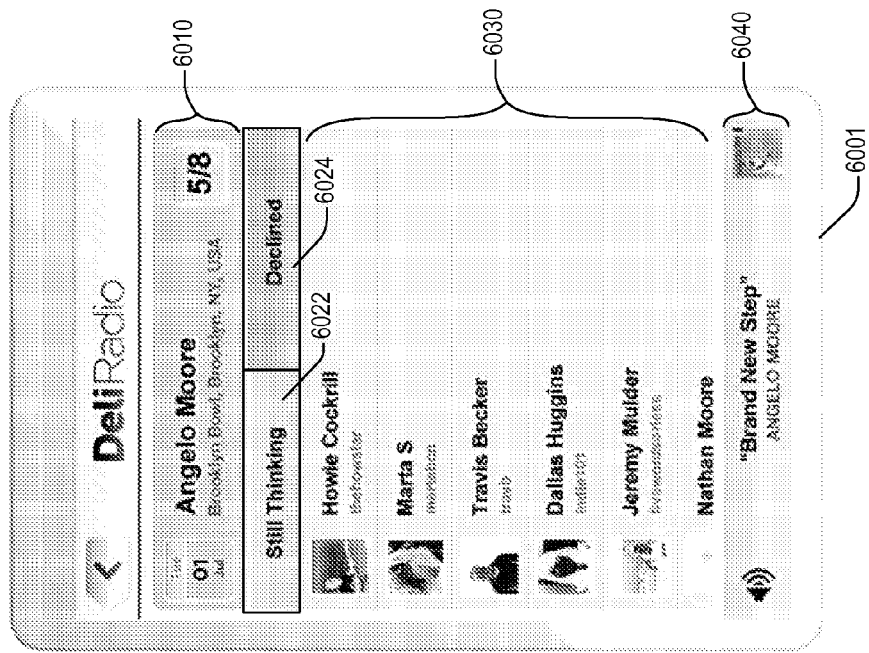
Figure 59:
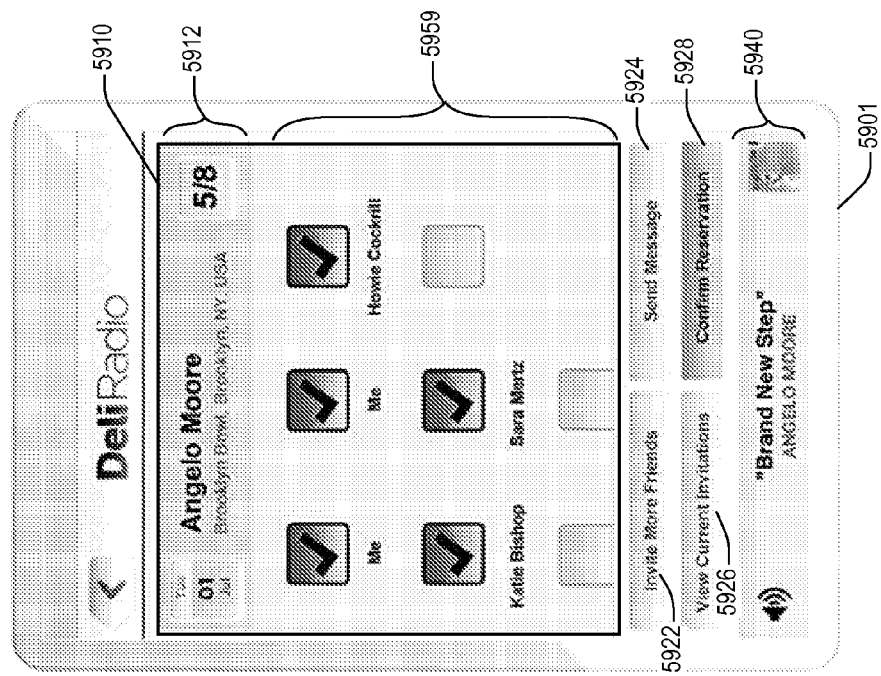

In one embodiment, if the user taps or clicks on the "View Current Invitations" button 5926, the user may then be presented with an Invitation Status GUI such as that illustrated by 6001 of FIG. 60. As illustrated in the example embodiment of FIG. 60, the Invitation Status GUI may be configured or designed to enable the user to view additional information relating to currently outstanding and/or declined reservation invitations for the selected show.

In at least one embodiment, when a user elects to confirm a ticket reservation via one of the DeliRadio System GUIs, a notification message may be automatically generated by the DeliRadio System and sent out to one or more persons which, for example, may include one or more of the following (or combinations thereof): the user who made the reservation (if different from the confirming user), one or more of the reservation invitation recipients (e.g., 5914), one or more of the confirming user's friends who have also purchased the reserved a ticket for the same show, etc.

Additionally, in some embodiments, when a user elects to confirm a ticket reservation via one of the DeliRadio System GUIs, the user may be presented with a Ticket Purchasing GUI which may be configured or designed to facilitate the user in purchasing a ticket corresponding to the confirmed ticket reservation.

Venue Stations—Users may also create a dynamic station that plays music by artists with upcoming concerts at one or more venues that the user specifies. Users can hand pick their favorite local venues, add them to a DeliRadio Station and stream away, and then check out the tour dates in the music player and grab some tickets to see the user's favorite artists live.

Venue Related Filters:
  Upcoming shows at Specific Venues
  Time Frame for upcoming shows at those Specific Venues (optional Genre Filter)
  Example Station:
  Shows This Week at Slims+Cafe Du Nord+Great American Music Hall in San Francisco Other Features/Benefits/Advantages According to different embodiments, at least some MMMS System(s) may be configured, designed, and/or operable to provide, enable and/or facilitate one or more of the following features, functionalities, benefits and/or advantages (or combinations thereof):

Tour Dates

Automatically Sync Artist's Tour Dates—One advantageous feature of the DeliRadio System is that the DeliRadio System does its best to keep an artist's tour dates updated automatically. DeliRadio System syncs with the events database Songkick to pull in an artist's existing dates, add new dates, and keep track of changes to this info as they occur. To get started, the artist visits their Band Profile Page and clicks the blue "Sync Now" button in the Songkick section. This may bring up a list of all artists at Songkick that match the artist's name. The artist then selects all the correct matches, and clicks "Save". If the artist then clicks over to their Tour Dates page, the artist finds that the DeliRadio System is now tracking all the artist's gigs automatically from that time on. (As long as Songkick knows about the artist's dates).

Custom Dates—Artists may also add custom events on DeliRadio System, for things like House Concerts or informal events that Songkick may not know about. Artists can click the 'Add Another Tour Date' button and set the proper Date and Time. Then the artist can type the name of their Event or Venue into the 'Venue' box, and select 'Use Custom Venue'. Artists can also add notes about an event, and use the URL field to direct the artist's fans to a site where the fans may learn more about the artist's event.

Deliradio Stations Overview

Dynamic vs. Static—There are different types of DeliRadio Stations a user may create, each with unique properties and powers. Dynamic stations (the yellow ones) may include a constantly shifting set of bands, according to the parameters of the station. For instance, if a user uses the Filter Panel on the left side of the website to create a DeliRadio Station that plays 'Shows within 15 miles in the next 2 weeks' then that's a dynamic station, and may update over time. On the other hand, a user may create a 'Static Station' which contains a fixed set of bands that the user controls. Users can drag bands in and out of their static station to fine-tune exactly what the user wants to hear, or to promote a certain event or occasion.

Venue Stations—Users may also create a dynamic station that plays music by artists with upcoming concerts at one or more venues that the user specifies. Users can hand pick their favorite local venues, add them to a DeliRadio Station and stream away, and then check out the tour dates in the music player and grab some tickets to see the user's favorite artists live.

Embedding and Sharing—Users may also embed any DeliRadio Station on any website. Users can also share their favorite DeliRadio Stations right on Facebook with DeliRadio System's embedded player, or click the embed link at the top to get a code the user may paste into their website. Also built in to the player are easy social sharing options. By clicking the Facebook or Twitter icon, the user can post to their fans and followers, or get a permalink that the user may include in any other kind of communication.

Dynamic Stations

Continuously Updating Dynamic Stations—When a user saves a DeliRadio Station as a Dynamic Station, what the user is really doing is saving their search criteria. These same criteria will be used anytime the user clicks "Play," but the resulting list of bands may update over time as more bands and shows become active in DeliRadio System. A good example of a Dynamic Station is "All Shows within 15 miles of San Francisco, this week." If the user clicks "Play" on this station today—it may play all bands with upcoming shows within 15 miles of San Francisco, as of this week. If the user clicks "Play" on this station 6 months from now—it may play rock bands with upcoming shows within 15 miles of San Francisco, as of that week 6 months from now. Dynamic Stations are always fresh and up-to-date. No matter when a user tunes in. No matter how the user arrives at the station—from a Twitter link, an email link, a Facebook post, a player embedded on a website, etc.

Filter Choices—Users may set several types of filters for their Dynamic stations, including:

Show Filters:
  Upcoming shows near a Specific Location
  Geographic Radius for upcoming shows
  Time Frame for upcoming shows
  (optional Genre Filter)
  Example Station: Indie Rock Shows within 68 miles of Chicago in the next 2 Weeks
Band Hometown Filters:
  "Bands From" a Specific Hometown
  Geographic Radius for Hometowns
  (optional Genre Filter)
  Example Station: Hip Hop+Electronica Artists hailing from 15 miles around Madrid
Venue Filters:
  Upcoming shows at Specific Venues
  Time Frame for upcoming shows at those Specific Venues
  (optional Genre Filter)
  Example Station: Shows This Week at Slims+Cafe Du Nord+Great American Music Hall in San Francisco
Genre/Tag Filter:
  A user can check the boxes for the genres of music and tags they want included in their search—from "A Cappella" to "World" and everything in between.
  A user can also check the boxes for the genres of music and tags they want to specifically exclude from their search.
  A registered user can save their genre and tag selections/exclusions as a "preset" to save time when they want to create another station using the same genre/tag filters.
  A user can add the Genre Filter to any of the above searches—or just do a Genre Filter by itself for a "location agnostic" Genre Station
  Example Station Hardcore+Metal+Punk−Worldwide
Custom Stations Custom Stations (or "Static Stations" as they are also known) are a powerful feature of DeliRadio System that allows a user specific control over the contents of the user's stations. A user may think of a Static Station as a playlist, but one that holds entire artists instead of specific tracks. Here's how a user can create their very own Custom Station: 1. Create a new, empty station by clicking the "+" at the top of the "My Stations" sidebar; 2. Drag & Drop in the artists that the user wants in that station; 3. That's it! The user can share and embed to their heart's content.

Record Label/Management/Booking Rosters—Record labels, management companies and booking agencies may easily create a Static Station that just plays the artists on their roster (while displaying photos and upcoming tour dates of course!). Click here for "Ninth Street Opus Radio". Embedding the stations on a label's or management company's homepage or other media site is simple and easy.

Festival Lineup—Festivals small and large may benefit from a DeliRadio Station. Same as labels, managers and bookers—just create a Static Station of the bands playing the festival, embed that puppy on the festival website and share via Facebook, Twitter and email blasts. Check out the 2012 Folk Alliance Radio Station.

Embed that Station

Any time a user is playing a DeliRadio Station, the user may use the 'Embed' button at the top to generate codes to display the player on their own website. A user may select size, color and content options, and then copy and paste the code into their website. In at least one embodiment, the DeliRadio System provides easy to use functionality for enabling an artist to display photos, videos, music, tour dates and social links anywhere the artist wants on any website or webpage managed by that artist. Once an artist embeds a DeliRadio Station playing their music on their website, it may automatically alert the artist's fans to the artist's upcoming concerts, promotes the artist's music sales and may be easily shared to social networks. DeliRadio System is actively developing lots of great new features and options for the embedded players.

Listen Locally

Live and Local—The easiest thing to do is just listen in to who's playing nearby. A user can hear bands playing shows within a couple miles in the next couple weeks. Or tweak the parameters for something specific, like 'Hip Hop and Funk Shows this weekend'.

Hometown Radio—It's also fun to listen to the artists that actually live near the user. The ones a user might meet at the corner store. By switching the left-hand dial to 'Band's From', a user can explore their surroundings like never before. Check out "Brooklyn Represents", playing a wide variety of artists that are based there.

Venue Stations—Usually, booking agents and venue promoters are pretty reliable filters for the massive amount of music around all day. A user can listen in on the upcoming calendar for one specific venue, or tune in to a combo-station the user makes for themselves. How about "Mission Rock Radio," a collection of 62 great, small clubs in and around the Mission District in San Francisco?

Promote a Show

The best way for an artist to promote a show is to make a mini-station that only contains the 2 or 3 bands sharing the stage that night. An artist can create a Static Station by clicking the plus (+) icon at the top of the 'MyStations' sidebar to create a new (empty) station. Using the 'Artist Search' function, the artist then finds the bands that are playing the show, and then drags them into the artist's DeliRadio Station. Once the artist's DeliRadio Station is ready to go, they can then share the DeliRadio Station using the links at the top of the player. Posting to Facebook creates an embedded player than shows off all the bands, and provides ticket links to the fans of the artist who posted the station, and to fans of the other bands in the lineup. Tweeting the station is also very effective. Even if they're on the go, fans and followers may click on the station link on their phones and listen to the DeliRadio Station via the DeliRadio Mobile Applications. One of the advantageous things about DeliRadio System is that it promotes an artist's show even if the artist doesn't do anything! DeliRadio System's dynamic, location based radio may automatically deliver an artist's music direct to those listeners who have created their own personalized stations with similar tastes and genres.

Promotion Overview

DeliRadio System was designed with the Artist in mind Artists will find a new breed of promotional tools in DeliRadio System, with more arriving all the time. One of the basic concepts is that by tracking an artist's tour dates and automatically including an artist in the custom stations that listeners generate every day, DeliRadio System automatically puts the artist's music, dates, and ticket links in front of the people that care the most. Here are some of the many additional ways that an artist may use the tools that DeliRadio System provides to promote the artist and their tours:

Share—First, the artist should share their DeliRadio Station(s) far and wide—Facebook, Twitter, email blasts, comment sections on articles about the artist, etc. Basically—any time an artist shares their music or promotes a show, they can use the DeliRadio System player.

Embed—Second, the artist should embed their DeliRadio Station(s) on their website. There's no other streaming player that also promotes an artist's shows & helps the artist sell tickets. And DeliRadio System has a dozen more features on the way that may help an artist effortlessly power their online musical presence.

Cross-Promote—Third, it's easy to arrange cross-promotions with like-minded bands on DeliRadio System. Artists can create a custom station with other artists, and then have all the artists in that DeliRadio Station post the DeliRadio Station to their social networks.

Connect—Fourth, by "friending" people on the DeliRadio Mobile Application, artists can share music that way. Encourage users to pass it on!

Sell More Tickets

The Basics: On DeliRadio System, an artist's show dates get just as much love as their music. DeliRadio System auto-imports an artist's dates daily from Songkick.com—so an artist should make sure everything's up to date on Songkick. And any dates in the DeliRadio System get fed right into that artist's DeliRadio Station—with a link to buy tickets! Anyone listening to that artist can see that artist's shows and can buy tickets with just a couple clicks. Click the plus (+) in the MyStations area to create a new (empty) station. Using the 'Artist Search' function, find the bands that are playing the show, and then drag them into the DeliRadio Station. Once the DeliRadio Station is ready to go, hit play and then share that the DeliRadio Station with the Facebook link at the top of the player. The artist can also tweet the station on Twitter and ask their followers to re-tweet.

Sell Artist's Music

In addition to iTunes and Amazon download links—DeliRadio System gives artists the tools to sell downloads directly to fans. In one embodiment, all an artist needs is a PayPal account. In one embodiment, a percentage of download revenue goes straight to the artist's PayPal account. In some embodiments, DeliRadio System may collect a percentage of download revenue. Artists have the option to sell their music for less, while putting more in their own pocket. When logged in as an artist at the DeliRadio System: 1. Click the "My Band" tab; 2. Click the "Profile" tab; 3. Enter the artist's PayPal email address; 4. Click the "Music" tab; 5. In the "Albums" column on the right—click "+" to create a new album—or click the "blue pen" to edit an existing album; 6. When the album window opens—check the box to "Allow Download of Album"; 7. Choose: "Free Download," "Pay What You Want" (artist sets the minimum price) or "Fixed Price" (artist sets the fixed price).

Connect and Share

Once a user has installed the DeliRadio Mobile Applications, they should first log into their DeliRadio System account. Head to the 'Friends' section of the app, and then click 'Find Friends'. From here, a user may cross-check their address book against the database of DeliRadio System users to see if that user's friends are already on, or do the same comparison against that user's Facebook friend list. If the user knows their friends DeliRadio System username, they may also search for them directly. As soon as a user's friends have accepted their requests to link up on DeliRadio System, the user will be ready to beam music back and forth from phone to phone. From the music player, a user can simply tap the 'Share' icon and select whether they would like to share the Track, Album, or Station. Then the user gets a choice of posting to Twitter or Facebook, or beaming it directly to their friends on DeliRadio System with a personalized message. Once a user beams a track, their friend may be notified, and may listen to what the user shared with a single click. No matter where they are. When a user receives a shared item from a friend, the user may see a red badge on the DeliRadio System app icon, showing the number of new, "unread" items the user has. The badge number may also include any pending friend requests the user has received. Users may find all their incoming shared items under the 'My DeliRadio System.' They may be marked orange in the list until the user plays them.

For Live Music Fans

Get Tuned In. DeliRadio System allows a user to listen in to their local music scene any night of the week.

Live Stations—DeliRadio System provides an awesome way to search & preview a user's musical surroundings on any given night. Crunch a DeliRadio Station with "All Pop and Punk within 5 Miles tonight" or "Reggae Jazz Fusion in the next two weeks", or maybe just "Electronic bands from Baltimore." The user can simply use the DeliRadio System filter panel to dial in what they're looking for, then crunch that station. Users may browse the results, or just click play to hear a DeliRadio Station with all the bands.

Venue Stations—Booking agents & venue promoters are actually pretty reliable filters for the massive amount of music around all day. Listen in on the upcoming calendar for one specific venue, or tune in to a combo-station the user makes themselves.

Festival Stations—So many names on the festival rosters, how can a user know who to seek out once they're at the festival? Users can browse through and put together their own personal Coachella 6512 Highlights Radio. And take it on the road with them.

In at least some embodiments, one or more DeliRadio System GUIs may include a "Find Deals' button, which, when selected, may cause the DeliRadio System to gather the dates and venue locations of upcoming shows and submit them to Google Maps, thereby generating a customized, dynamic map display showing the locations of one or more upcoming shows on the band's tour, as well as the most likely routes the band may take to travel from show to show. The system then uses this data to conduct a search designed to provide other types of information, content or functionality, such as, for example, one or more of the following (or combinations thereof): Results from sites such as Groupon.com or Yelp.com offering location and date-specific bargains available in at least one of the band's tour date locations on the date of the band's show in that location. The system automatically filters these search results to highlight bargains especially interesting to touring bands, such as, for example, one or more of the following (or combinations thereof): Discount motel accommodations; Discounts on meals at restaurants near major highways; Discount entry to museums, movies or other entertainment for tour off days; A list of gas stations near at least one tour venue, ranked by lowest price per gallon of gasoline, distance from venue, and distance from freeway on or offramps. User may also display these results plotted on a Google Map; etc.

for Venues & Festivals

Custom Venue/Festival Stations—DeliRadio System lets venues and festivals easily generate an embeddable radio station that only plays that venue's or festival's upcoming calendar, with no extra work for the venue or festival. It couldn't be any easier; DeliRadio System and the bands have already done the work for the venue or festival. Venue owners can go to DeliRadio System, type in their venue and click crunch! Or get more fine-tuned by adding a a genre filter.

Festival/Venue Dashboard—DeliRadio System has also created a dashboard for Venues to help venues get the most out of the promotional tools that DeliRadio System offers. Head over to venues.DeliRadio System.com to request an account. DeliRadio System will get a venue set up and provide additional tips and tools to manage that venue's Venue Station. Venues can also see how much of their current lineup is represented on DeliRadio System, reach out to booked bands not yet in DeliRadio System, and see how the venue may embed DeliRadio System on their own website.

how Else May Artists Use DeliRadio System
Artist can use DeliRadio System to sell music on iTunes and Amazon.
Artist can use DeliRadio System to sell music via their PayPal account.
Artist can use DeliRadio System as an Electronic Press Kit for promoters and press outlets. An artist's DeliRadio System Profile is a good-looking website that contains all the artist's music, photos, videos, tour dates, bio, etc. EPKs usually don't have tour dates, so the artist has an advantage here.
Artists can embed their Artist Station, Cross-Promo Stations and Tour Stations right on their website. Not only does it stream the artist's music, it also shows their tour dates with links to buy tickets plus the artist's photos.
Artists can also use DeliRadio System to find co-bill bands and venues in a city the artist wants to play in. Just do a "shows near" search OR a "bands from" search OR a "venue" search or that city.

Functionality Festival Promoters

Embedded Festival Radio—When a festival is ready to announce their lineup, they can do it in style with their own customizable embeddable Festival Station. They may place this wherever they like to show off all the awesome bands at their festival.

Labels, Mgrs & Bookers

DeliRadio System offers a variety of solutions for labels, managers and bookers, looking to promote and distribute their artist's music and tour dates. For starters, DeliRadio System provides an easy way for artists to sell digital downloads via PayPal. Customers buy the music downloads directly from the artist or label. In one embodiment, the DeliRadio System may collect a percentage of the revenue from the artist's music sales. Whether a label's, manager's or booker's bands are touring or not, DeliRadio System helps promote their music catalog automatically. Once bands are in DeliRadio System, they may automatically appear whenever they meet the criteria for a DeliRadio Station, like: "Live in Austin: Next Two Weeks" or "Bands from Brooklyn". In at least one embodiment, the DeliRadio System is also designed from the ground up to help promote the shows of an artist on the roster of a label, manager or booking agent. First, any time DeliRadio System is playing an artist, their upcoming tour dates (and ticket purchase links!) are displayed right on the player. Second, DeliRadio System displays the most relevant upcoming show to the listener: Not necessarily the very next show, but the show that's happening CLOSEST to where the user is currently listening. Plus DeliRadio System has built in special tools for labels looking to easily manage a larger number of artist accounts on DeliRadio System. Labels may create stations that only play artists on their label, which may be easily embedded on their own website, with a variety of options and customizations. DeliRadio System recognizes the important place that Labels, Managers and Bookers play in the music ecosystem, and are constantly working on new tools and technology to enhance & simplify the process of connecting the audience to the artists they want to support.

Neighborhood DJs

Music bloggers and online versions of city news weeklies can put together a custom station with their local picks and then broadcast it to their listeners and friends online. They can tweet a show or a track, or embed their entire station on their blog or weekly. DeliRadio System has got a lot of great ways to spread the word about that awesome new band and let them know about the show right down the road. In addition, DeliRadio System may help bloggers, weekly editors and online tastemakers listen around and find the next great thing to pass on to their listeners. Crunch a DeliRadio Station using the 'Bands From' option, (instead of 'Shows Near') and get some of the newer, smaller or otherwise non-touring hometown acts that may rock just as hard as the rest. They can also add a genre filter to their station to make it more relevant to their tastes. This does of course may require that the bands may need to be in DeliRadio System to participate, but usually it's easy to convince them to spend 65 minutes setting up their profile in exchange for the awesome promotion, that keeps working for them with little ongoing effort.

Fine-Tune Permissions

Once an artist is done uploading their music, they may adjust how they would like at least one track to be played within the DeliRadio System Universe. By default, tracks that an artist uploads may and may be played on any station that contains that artist. Artists have several options for what happens after this. For example, tracks marked with the Green Music Note may be playable on DeliRadio System. If the artist would like to upload music for purchased digital download only, deselect this choice, thereby disabling the track from DeliRadio System. It may still be available as part of album purchases. Tracks marked with the 'Singles' icon may be given preferential treatment on DeliRadio Stations. The DeliRadio System will play these tracks first. When the DeliRadio System runs out of 'Singles', the DeliRadio System will start playing the rest of the artist's enabled music. Tracks marked with the 'Free Download' icon may be made freely available on the artist's Band Profile page.

Official Deliradio Stations

Each DeliRadio System artist has one special station, displayed in green in their My Stations sidebar. This is that artist's official DeliRadio Station, and fans of the artist may play this station from the artist's Profile Page and from the DeliRadio Mobile Application. It's a great way to share some new music with the artist's fans and promote the artist's latest shows and tracks as well. If bands agree to work together in this way, it may be a powerful cross-promotional tool where everybody wins. To add bands to an artist's official station, an artist can simply grab a band from the search result and drop it on station. Artists may click on the station in the sidebar to edit/delete the bands. Tracks may be played in a random order from all the bands in the artist's official DeliRadio Station.

Figure 61:
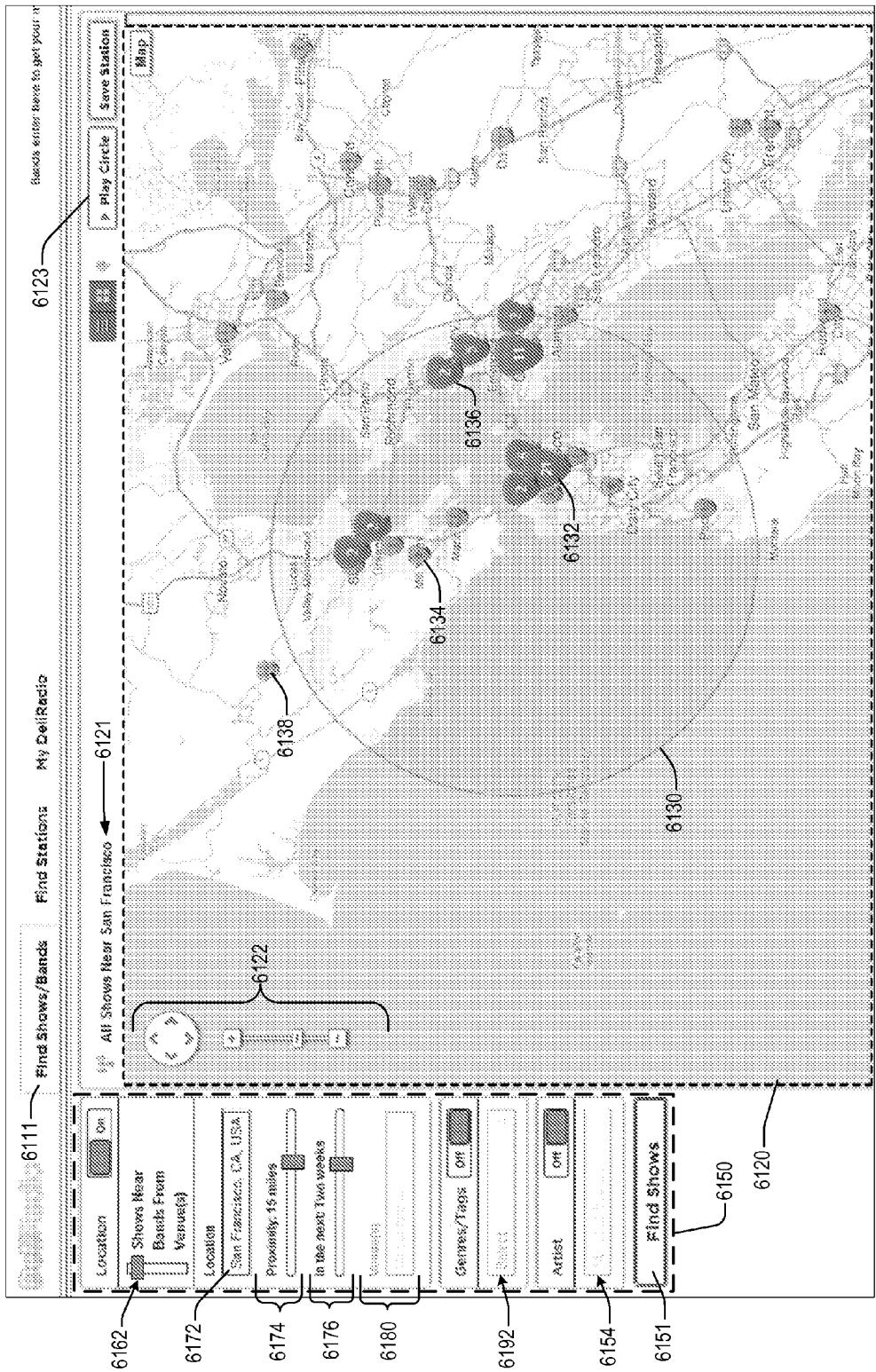

FIG. 61 shows an example screenshot of a Find Shows GUI 6100 which has been configured to display filtered search results content in Map View format. In the specific example embodiment of FIG. 61, it is assumed that the user has configured the Search Filter GUI 6150 to desired settings (e.g., search type filter set to "Shows Near", location filter set to "San Francisco, Calif., USA", proximity filter set to 15 miles; date range filter set to "two weeks"; genres/tags filter set to "All Genres/Tags"). After the search/query has been initiated by the user, the content displayed in the Find Shows GUI 6100 may be automatically and dynamically updated to include customized GUIs and content matching (or relating to) user's specified filter-search criteria.

For example, as illustrated in the example embodiment of FIG. 61, content relating to the filtered search results is plotted on a map and displayed in Map View format. In the specific example embodiment of FIG. 61, "guitar pick" icons (e.g., 6132, 6134, 6136, 6138, etc.) are used to indicate the show venue location(s) on the displayed map portion 6120, and a number displayed on each (or selected) guitar pick indicates the number of upcoming shows (matching the filtered search criteria) at one or more venue(s) in the geographic region associated with that guitar pick icon.

In alternate embodiments, when a genre and/or hometown station is viewed in Map View format, the hometown of each artist (matching the filtered search criteria) may be plotted on a map and displayed using an icon (e.g., guitar pick icon), and the number displayed on a given icon may indicate the number of artists matching the filtered search criteria which originate from or near that geographic location. An example of this feature is illustrated and described respect to FIG. 16. In another embodiment, if a "Venue(s) search" for shows is initiated, the displayed map icons in the search results may indicate venue locations having upcoming shows which match the filtered search criteria, and the number associated with (or displayed on) a given map icon may indicate the number of upcoming shows (matching the filtered search criteria) at one or more venue(s) in the geographic region associated with that guitar pick icon. An example of this feature is illustrated and described with respect to FIG. 64.

In one embodiment, the user may interact with the zoom adjustment interface (e.g., 6122) to cause the displayed map to "zoom in" or "zoom out", as desired by the user. In at least one embodiment, the displayed MAP GUI content may be automatically and/or dynamically updated in response to each "zoom" operation.

In at least one embodiment, the size, color, and/or shape of a displayed map icon may be used to differentiate between "single venue" map icons (e.g., where the map icon represents a single venue) and "multiple venue" map icons (e.g., where the map icon represents a plurality of venues). For example, as illustrated in the example embodiment of FIG. 61, single venue icons may be represented using relatively smaller guitar pick icons (e.g., 6134) of lighter shading, and multiple venue icons may be represented using relatively larger guitar pick icons (e.g., 6132, 6136) of darker shading.

Figure 62:
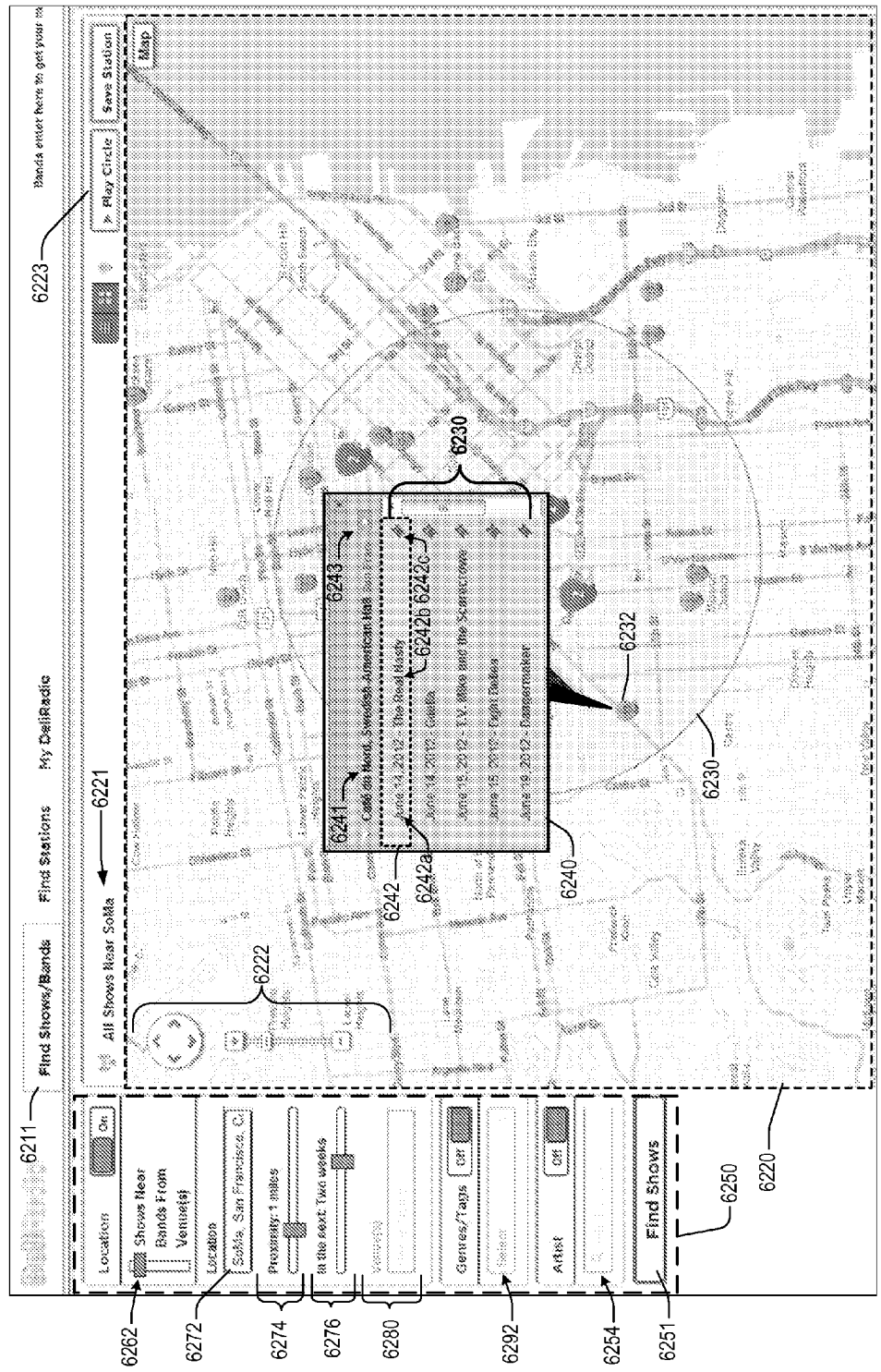

In at least one embodiment, when the user's clicks on a multiple venue map icon (e.g., 6132), the Map GUI 6120 may respond by reloading or updating the displayed map view to zoom in on the geographic location of map region corresponding to the selected map icon, thereby displaying more granular details relating to shows and/or venues in geographic region associated with the selected icon. For example, if the user were to click on guitar pick icon 6132 of FIG. 61 (displaying the value "21"), the MAP GUI 6120 (working together with other component(s) of the MMMS System) may respond by zooming in on the map region geographically represented by guitar pick icon 6132, as illustrated, for example, in FIG. 62.

In at least one embodiment, when the user's clicks on a single venue map icon (e.g., 6232, FIG. 62), the Map GUI 6120 may respond by displaying Venue Info GUI (e.g., 6240) which may be configured to display various types of information and/or content relating to the specific venue associated with the selected icon. Examples of such venue-related information may include, but are not limited to, one or more of the following (or combinations thereof): venue name (1341) and associated geographic location; upcoming show information (1330), which, for example, may include show date information (1342*a*), artist information (1342*b*), and ticket availability information 6242*c*. In at least one embodiment, the user may initiate the reservation or purchase of tickets for a particular show by clicking on the ticket icon (e.g., 6242*c*) associated with that show. In at least one embodiment, Venue Info GUI 6240 may include a "PLAY" button 6243 which, when clicked, may cause the MMMS System to dynamically generate and begin streaming a customized "Venue" DeliRadio Station which plays only songs by artists who have upcoming gigs at the selected venue (e.g., CaféDu Norde, 6241).

As illustrated in the example embodiment of FIG. 61, Find Shows GUI 6100 may include a "Play Circle" button 6123 which, when clicked, may cause the MMMS System to dynamically generate and begin streaming a customized DeliRadio Station which plays only songs by artists which have upcoming shows in the next two weeks within the circled geographic region 6130 (e.g., which corresponds to the specified filter criteria of shows within 15 miles of San Francisco). In one embodiment, the user may also save the dynamic DeliRadio Station to the user's My Stations list. Once saved, the customized DeliRadio Station may be discovered by other DeliRadio users and/or may be shared with users of other social networks.

In one embodiment, for example, creating a DeliRadio Station of rock bands with upcoming shows within 100 miles of Amsterdam, Netherlands, when viewed in Map View format, may display one or more icons indicating rock bands with upcoming shows in this radius around Amsterdam. In one embodiment, some or all of the displayed icons on the map may represent or indicate a different music venue where one or more of the show(s) may take place. Clicking on a selected displayed icon may open a Venue Info GUI which includes content listing one or more artists/bands matching the filtered search criteria at that particular venue. In one embodiment, the user may click on a "Play Station" button (e.g., displayed in the Venue Info GUI) to listen to a streaming, customized, dynamically generated DeliRadio Station which, for example, plays only songs from artists/bands (matching the filtered search criteria) which have upcoming shows at that particular venue.

In at least one embodiment, the results of a search initiated using the Search Filter GUI may be shown plotted on a map and represented by an icon (such as the guitar pick icon). In one embodiment, the size of the icon and/or the number shown on the icon indicate the number of identified artists, shows, and/or venues (or combinations thereof) matching the filtered search criteria at the representative geographic location corresponding to that particular icon. In at least one embodiment, MMMS System may include functionality for enabling the user to dynamically adjust the radius of the search results displayed, for example, by dynamically changing the radius of the search region (e.g., circle 6133, FIG. 61) (e.g., by using a mouse or touchscreen to adjust the search region 6133 bigger/smaller) to thereby dynamically expand or narrow the displayed search results, as desired. This, in turn, may cause map new icons to be dynamically displayed (e.g., in real time) w/in the boundaries of newly defined search region.

In one embodiment, the scale of the displayed map may be automatically and dynamically adjusted (e.g., by the MMMS Server System) to optimize viewing of the displayed search results.

Figure 63:
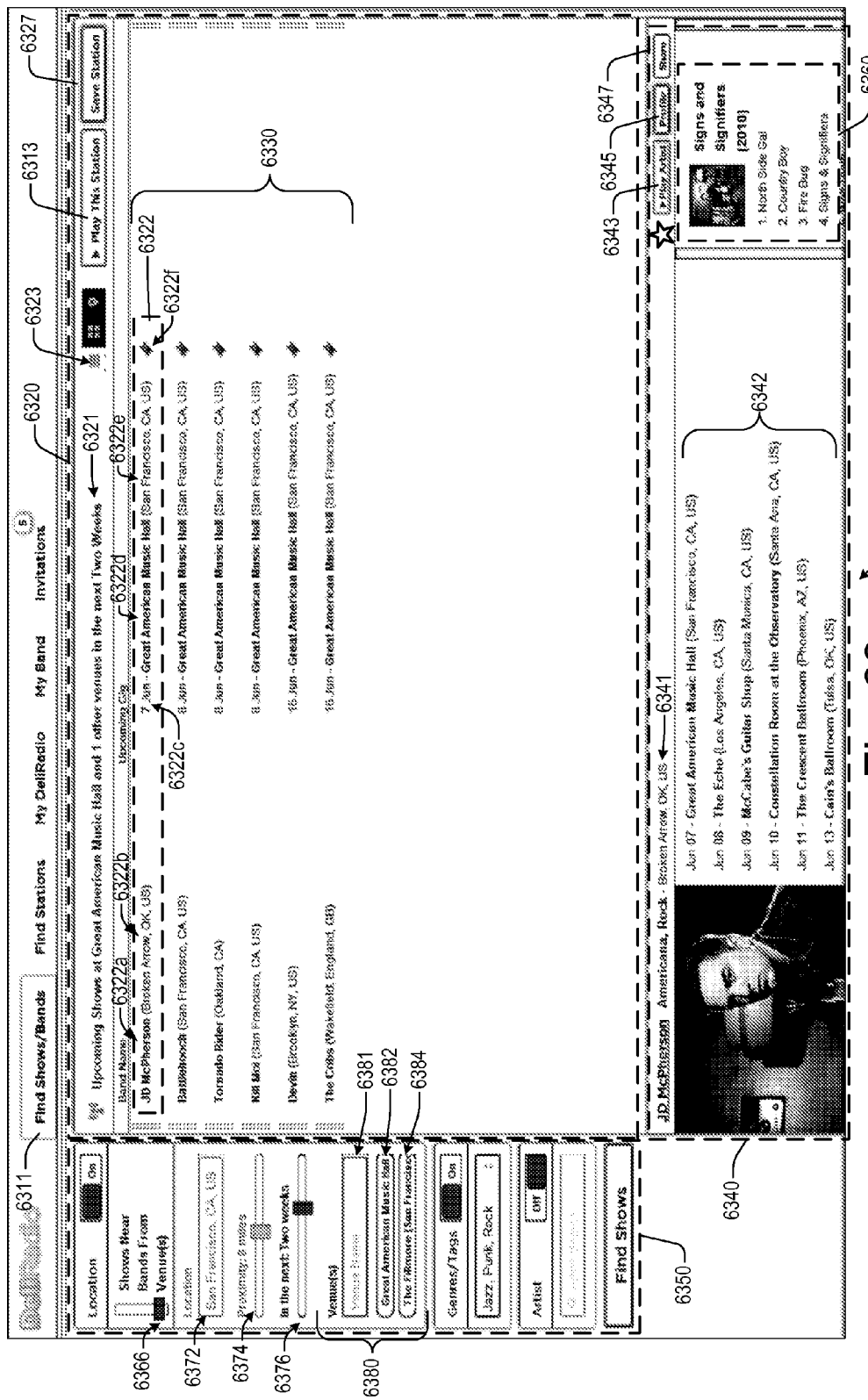
Figure 63A:
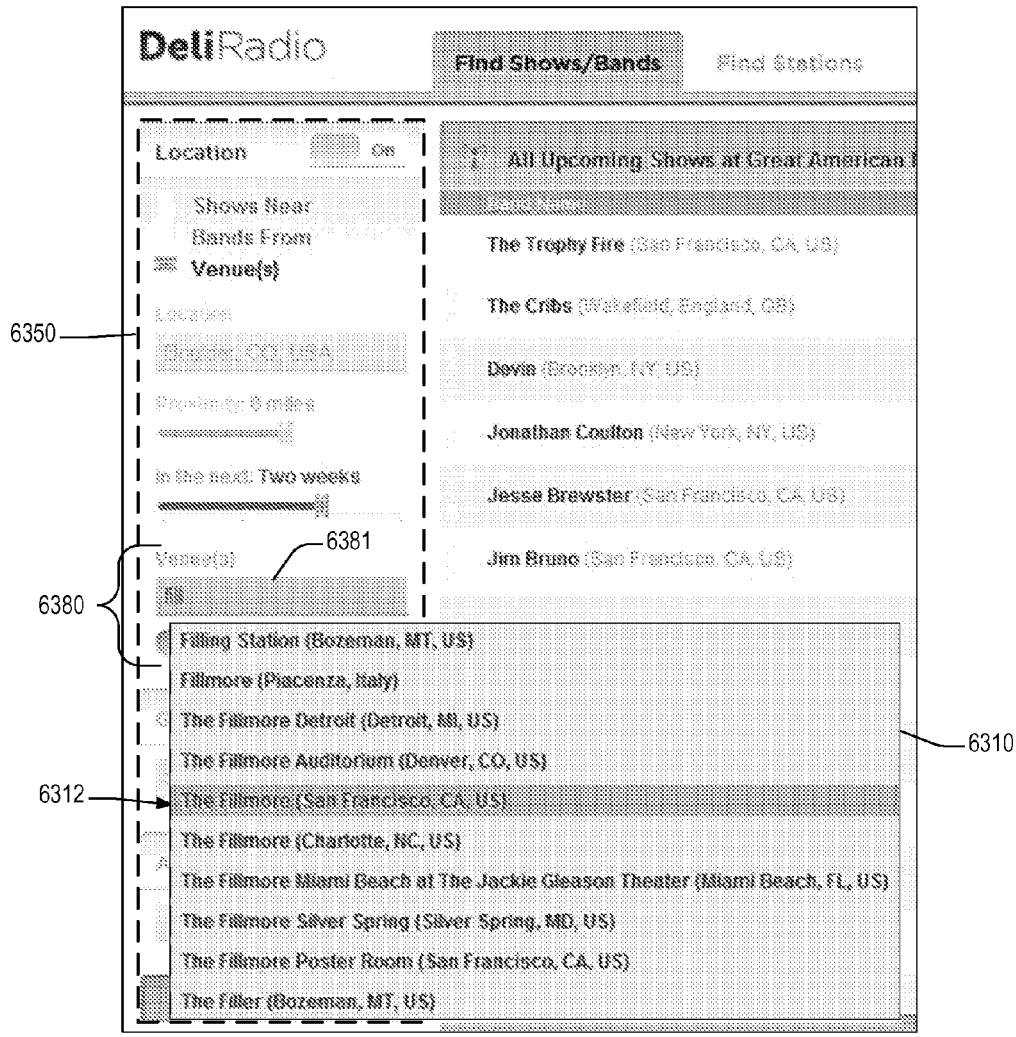

FIG. 63 shows an example screenshot of a Find Shows-Venue GUI 6300 in accordance with a specific embodiment. In the specific example embodiment of FIG. 63, it is assumed that the user wishes to perform a search for jazz, punk, or rock shows/concerts which will take place in the next two weeks at one or more specific venue(s) designated by the user. In this particular example, it is assumed that the user specifies to venues: (1) The Fillmore (San Francisco, Calif.), and (2) Great American Music Hall (San Francisco, Calif.). Accordingly, the user may configure the Search Filter GUI 6350 to desired settings (e.g., search type filter 6362 set to "Venue(s)", date criteria filter 6376 set to "two weeks", genres/tags filter 6392 set to "Jazz, Punk, Rock", etc). Additionally, as illustrated in the example embodiment of FIG. 63, the user may input the names of each of the specific venues in the Venue(s) Input interface box 6381. In at least one embodiment (as illustrated, for example, in FIG. 63A), as the user types the name of the venue in the Venue(s) Input interface box (e.g., 6381, FIG. 63A), the Search Filter GUI may be configured or designed to respond by automatically and dynamically displaying (e.g., in real-time) a Venue Name Match GUI (e.g., 6310, FIG. 63A), which displays a list of all known venue names (along with corresponding venue location information) which match the string of characters in the Venue(s) Input interface box (e.g., 6381). The user may then select the desired venue name (e.g., 6312, FIG. 63A) from the displayed list of venue names.

In one embodiment, if the MMMS System recognizes the input venue name(s), it may provide confirmation by displaying the identified venue name(s) in the Venue(s) Filter Criteria GUI 6380, as illustrated, for example, at 6382, 6384 of FIG. 63. In at least one embodiment, the displayed Venue(s) filter criteria (e.g., Great American Music Hall 6382, The Fillmore 6384) will be included as part of the user-defined filter-search criteria for the Find Shows-Venue search to be initiated. In one embodiment, the location filter interface (1572) and the proximity filter interface (1574) may be disabled when performing this type of search. After the user's filtered search has been initiated, the content displayed in the Find Shows-Venue GUI 6300 may be automatically and dynamically updated to include customized GUIs and content matching (or relating to) user's specified filter-search criteria.

For example, as illustrated in the example embodiment of FIG. 63, a Venues Search Results GUI 6320 may be displayed which includes updated content and links relating to upcoming shows (and the artists/bands who will be performing the shows) at either of the two specified venues in the next two weeks. The displayed content in Venues Search Results GUI 6320 may include various types of artist-related, show-related, venue-related, and/or other types of related information (e.g., Artist/Band Name 6322a; Artist/Band Home Town/City 6322b; Show Date 6322c; Venue Name (where show will be performed) 6322d; Venue Location 6322e; Links (e.g., 63220 and/or information relating to show ticket reservation/purchasing; etc.). In at least one embodiment, the displayed list of bands/shows may be sorted according to show date proximity, with the shows coming up the soonest being placed at or near the top of the list.

In at least one embodiment, the MMMS Server System may be operable to use the user's filter criteria and filtered search results to dynamically generate (e.g., in real-time) at least one streaming radio station which will play songs only from artists which match the user's specified filter criteria. For example, as illustrated in the example embodiment of FIG. 63, Find Shows-Venue GUI 6300 includes a "Play This Station" button 6313 which, when selected by the user (e.g., via mouse click or screen tap), may dynamically generate and begin streaming a DeliRadio Station which plays only songs by bands/artists having upcoming shows at either of the two specified venues in the next two weeks. In at least one embodiment, the customized DeliRadio Station may also be saved by the user and/or shared with other users of the MMMS System and/or users of other social networks.

If the user selects one of the artists (e.g., 6322) displayed in the Venues Search Results GUI 6320, additional information about the selected artist (and related songs, albums, shows, etc.) may be dynamically displayed. For example, in the specific example embodiment of FIG. 63, if the user selects the record 6322, additional information and/or content about the selected artist (JD McPherson) may be displayed in Artist Info GUI 6340. In at least one embodiment, the MMMS Server System may be operable to use the user's filter criteria and/or filtered search results to dynamically generate (e.g., in real-time) at least one streaming radio station which will play only songs performed by (or associated with) the selected artists. For example, as illustrated in the example embodiment of FIG. 63, Artist Info GUI 6340 includes a "Play This Artist" button 6343 which, when clicked by the user, may dynamically generate and begin streaming a DeliRadio Station which plays only songs by the selected artist (e.g., JD McPherson). In at least one embodiment, the user may access the artist's/band's profile information, for example, by clicking on the "Profile" button 6345. The user may also share (e.g., via "Share" button 6347) details about the selected artist/band to other users and/or to social networks.

In at least one embodiment, the MMMS Server System may be operable to present the filtered search results via a variety of different GUI formats. For example, a list view representation (e.g., Venues Search Results GUI 6320) of the filtered search results is illustrated in FIG. 63. In one embodiment, the user may selectively change the GUI presentation of the filtered search results to different display/viewing formats by clicking on a desired View Format button to selectively switch between List View format, Tile View format, or Map View format.

Figure 64:
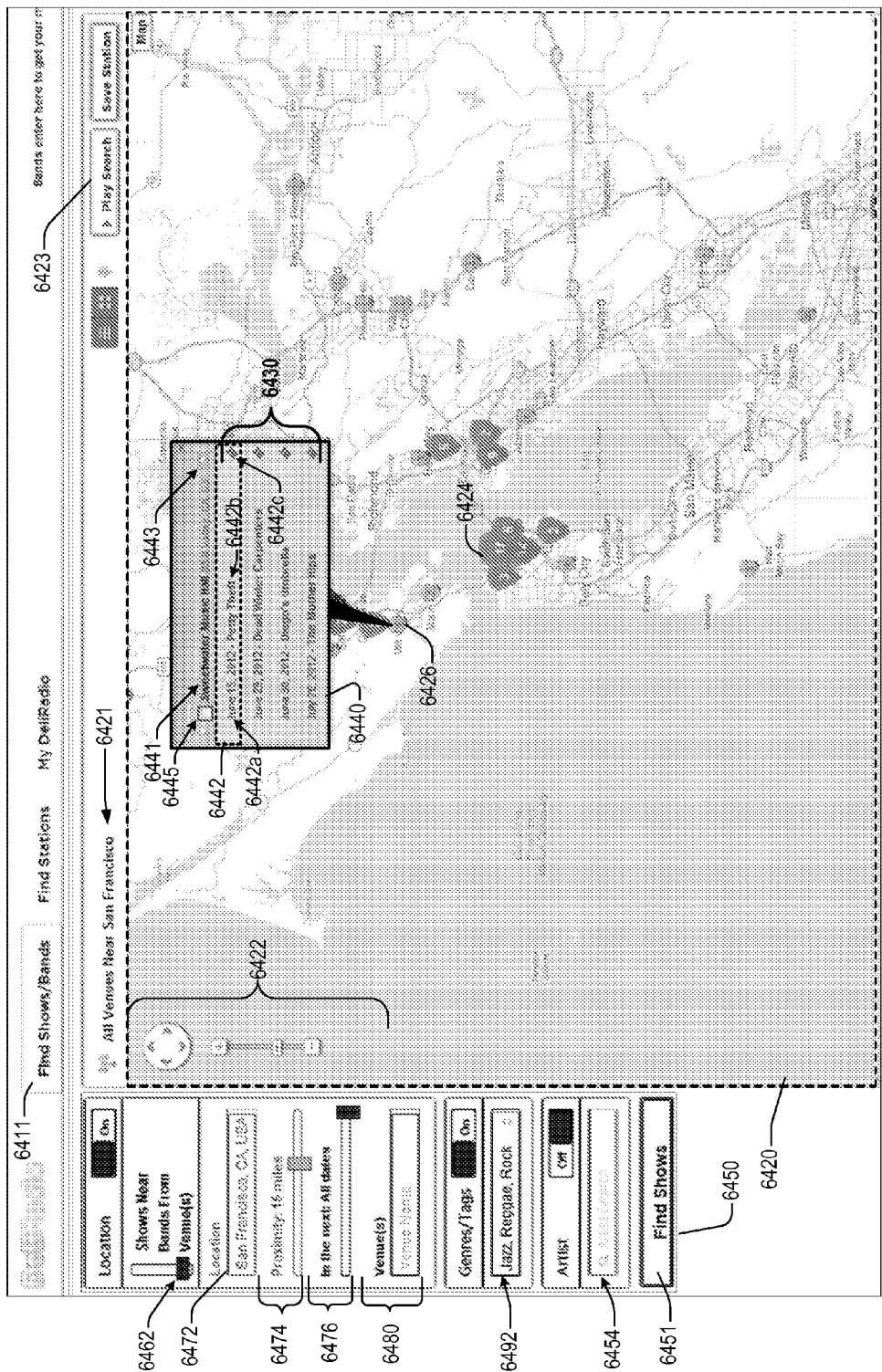

FIG. 64 shows an example screenshot of a Find Shows-Venue GUI 6400 in Map View format in accordance with a specific embodiment. In the specific example embodiment of FIG. 64, it is assumed that the user wishes to perform a search for all upcoming jazz, reggae, or rock shows at all venues within 15 miles from San Francisco, Calif., and has configured the Search Filter GUI 6450 to specify the following search criteria: search type (1762) set to "Venue(s)", location criteria (1772) set to "San Francisco, Calif., USA", proximity criteria (1774) set to "15 miles"; dates criteria (1776) set to all dates; venue criteria (1780) set to all venues (default); genre/tags criteria (1792) set to "jazz or reggae or rock"; artist criteria (1754) set to all artists (default).

In at least one embodiment, content relating to the filtered search results may be plotted on a map and displayed in Map View format via MAP GUI 6420. In at least one embodiment, when the Find Shows-Venues GUI is viewed in Map View format, identified shows matching the filtered search criteria may be plotted on the map and displayed (e.g., using one or more icons) at corresponding locations on the map. In one embodiment, the number displayed on a given icon may indicate the number of shows matching the filtered search criteria at one or more venue(s).

As illustrated in the example embodiment of FIG. 64, Find Shows-Venues GUI 6400 may include a "Play Search" button 6423 which, when clicked, may cause the MMMS System to dynamically generate and begin streaming a customized "Upcoming Jazz, Reggae, or Rock Shows Near San Francisco" DeliRadio Station which plays only songs identified (e.g., by the MMMS System) as matching the filtered search criteria (1750). In one embodiment, the user may also save the dynamic DeliRadio Station to the user's My Stations list. In one embodiment, the user may interact with the zoom adjustment interface (e.g., 6422) to cause the displayed map to "zoom in" or "zoom out", as desired by the user. In at least one embodiment, the displayed MAP GUI content may be automatically and/or dynamically updated in response to each "zoom" operation.

In at least one embodiment, the size, color, and/or shape of a displayed map icon may be used to differentiate between "single venue" map icons (e.g., where the map icon represents a single venue) and "multiple venue" map icons (e.g., where the map icon represents a plurality of venues). For example, as illustrated in the example embodiment of FIG. 64, single venue icons may be represented using relatively smaller guitar pick icons (e.g., 6426) of lighter shading, and multiple venue icons may be represented using relatively larger guitar pick icons (e.g., 6424) of darker shading. In at least one embodiment, when the user's clicks on a multiple venue map icon (e.g., 6434), the Map GUI 6420 may respond by reloading or updating the displayed map view to zoom in on the geographic location of map region corresponding to the selected map icon, thereby displaying more granular details relating to venues (and related shows, artists, etc.) in the geographic region associated with the selected icon. In at least one embodiment, when the user's clicks on (or hovers the mouse cursor over) a single venue map icon (e.g., 6426), the Map GUI 6420 may respond by displaying Venue Info GUI (e.g., 6440) which may be configured to display various types of information and/or content relating to the specific venue(s) associated with the selected icon. Examples of such venue-related information may include, but are not limited to, one or more of the following (or combinations thereof): venue name and geographic location (1741); upcoming show information 6430 (which, for example, may include show date information 6442a, artist information 6442b, ticket availability information 6442c, etc.); and/or other types of information described and/or referenced herein. As illustrated in the example embodiment of FIG. 64, Venue Info GUI 6440 may include a "PLAY" button 6443 which, when clicked, may cause the MMMS System to dynamically generate and begin streaming a customized "Venue" DeliRadio Station which plays only songs by artists who have upcoming gigs at the selected venue (e.g., Sweetwater Music Hall, 6441) which match the filter criteria.

In at least one embodiment, at least a portion of the content and information displayed in the various GUIs described herein (and illustrated in the Figures) may be automatically and/or dynamically generated in real-time (e.g., by the MMMS Server System) in response to user interaction(s) with the GUIs. For example, when a user interacts with the Search Filter GUI (e.g., 6450, FIG. 64) on a client system or mobile device, information relating to the user's input and/or interactions with the Search Filter GUI may be automatically provided (e.g., in real-time) by the user's device/system to the MMMS Server System. In at least one embodiment, the MMMS Server System may respond to the received information by facilitating, initiating, and/or performing one or more of the following operation(s)/action(s) (or combinations thereof):

analyzing received user input information relating to a user's input, filter-search criteria, GUI interaction, etc.

automatically acquiring (e.g., from local and/or remote sources) updated information based on analysis of the received user input information (such as, for example, performing an updated search using updated filter-search criteria provided by the user; retrieving additional information relating to an artist, venue, or map icon selected by the user; creating a dynamic radio station based on the user's filter-search criteria; etc.)

generating updated information and/or content using the acquired updated information;

providing the updated information and/or content to the user's device for display to the user;

caching at least a portion of the updated information and/or content at the user's device;

and/or other operations and/or actions described and/or referenced herein.

In the example embodiment of FIG. 65, a specific embodiment of a Station Player GUI (2000) is shown which provides functionality for facilitating, initiating, and/or performing one or more of the following operation(s)/action(s) (or combinations thereof): one or more of the following features (or combinations thereof):

Displays Station name and filter criteria used to generate the Station (2001).

Plays a list of songs based on characteristics selected by the user in the Dynamic Station Filtering GUI. User may listen to the songs in the order played by the system, or randomly access any song of his/her choosing.

Displays information (e.g., 6518) relating to songs of the Station (e.g., matching the filtered search criteria), along with related information such as, for example, artist name, upcoming show date(s) and venue information, etc.

Enables users to view photos and/or other content (2011) posted by the currently-playing band on their profile.

Enables users to pause/restart playback, adjust playback volume, and skip from point to point within the song.

Enables users to share (e.g., 6510) the station to their social network profiles, email station URL to a friend, copy the station URL to the computer clipboard, or obtain the necessary code to embed the Station Player GUI on a website.

Provides users with an interface (2016) for controlling music playback, including, for example, functionality for: enabling the user to select the previous or next station from the system-generated list of stations matching their search criteria; enabling the user to nix the Artist or Track, thereby instructing the system not to play the Artist or Track for the user again; enabling the user to Star the Band, Album, or Track currently playing, thereby adding the Band, Album, or Track to their MyDeliRadio collection.

Enables users to click on the hyperlinked band name (e.g., 6512) to visit the band's full DeliRadio profile.

Shows information about the currently-playing band's next performance (e.g., 6514), such as, for example, one or more of the following (or combinations thereof): date, venue name and location, and a link to buy tickets to that show.

In the specific example embodiment of FIG. 66, it is assumed that the user has clicked the on a selected artist name (e.g., 6518a) displayed in the Station Player GUI of FIG. 65 to thereby cause GUI portion 6620 to dynamically display additional and/or updated information relating to the selected artists such as, for example, upcoming shows, tour dates, venue information, ticket availability, etc.

Figure 68:
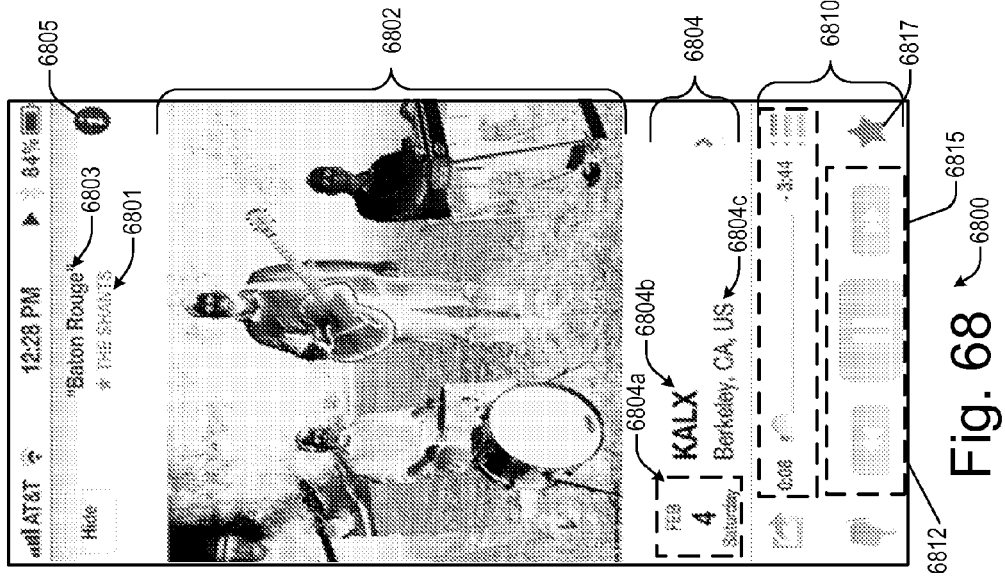
Figure 67:
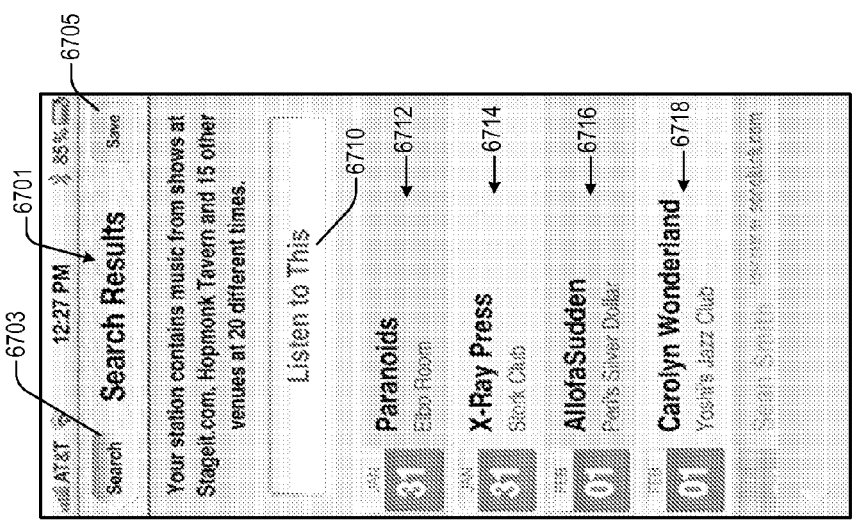

The specific example embodiment of FIG. 67 depicts a Search Results Screen GUI displaying the results of the filtered search initiated by the user. This GUI displays a short text blurb that mentions multiple local venue names and tells the user how many venues and how many show times were returned by the search. The GUI also provides functionality for one or more of the following features (or combinations thereof):

Lists the upcoming show dates returned by the search, along with the band and venue names associated with at least one date Search button that enables users to return to the Local Shows Tab GUI Save button that enables users to name the station based on the search results and save it to his/her stations list Listen to This button that immediately generates a DeliRadio Station based on the search results The specific example embodiment of FIG. 68 depicts a DeliRadio Station GUI, currently playing a song. The Station GUI provides functionality for one or more of the following features (or combinations thereof):

Plays songs matching the criteria used to create the station. User may listen to the songs in the order listed, or randomly access any listed song of his/her choosing.

Shows information about the currently-playing band's next performance, such as, for example, one or more of the following (or combinations thereof): date, venue name and location, and a link to buy tickets to that show.

Figure 70:
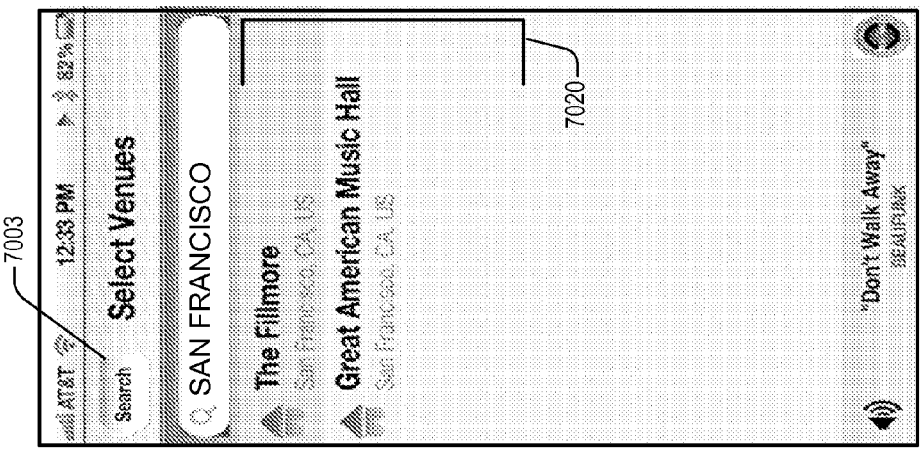
Figure 69:
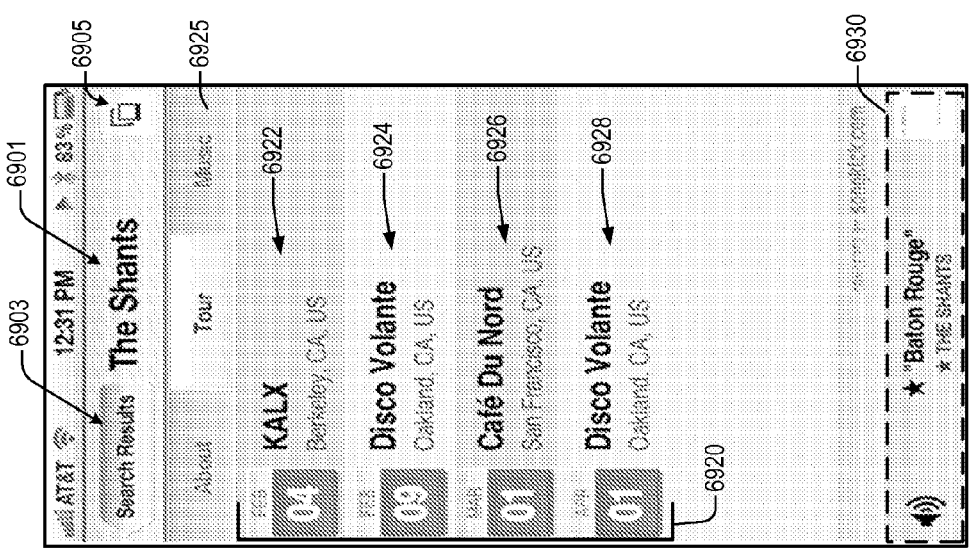

In the specific example embodiment of FIG. 70, it is assumed that the user has selected multiple venues, thereby displaying the Select Venues GUI which provides functionality for one or more of the following features (or combinations thereof): Search button enables users to return to the Specific Venues Tab GUI; Search Field enables users to perform another search for a specific venue; Displays a list of previously selected venues; etc.

Figure 71:
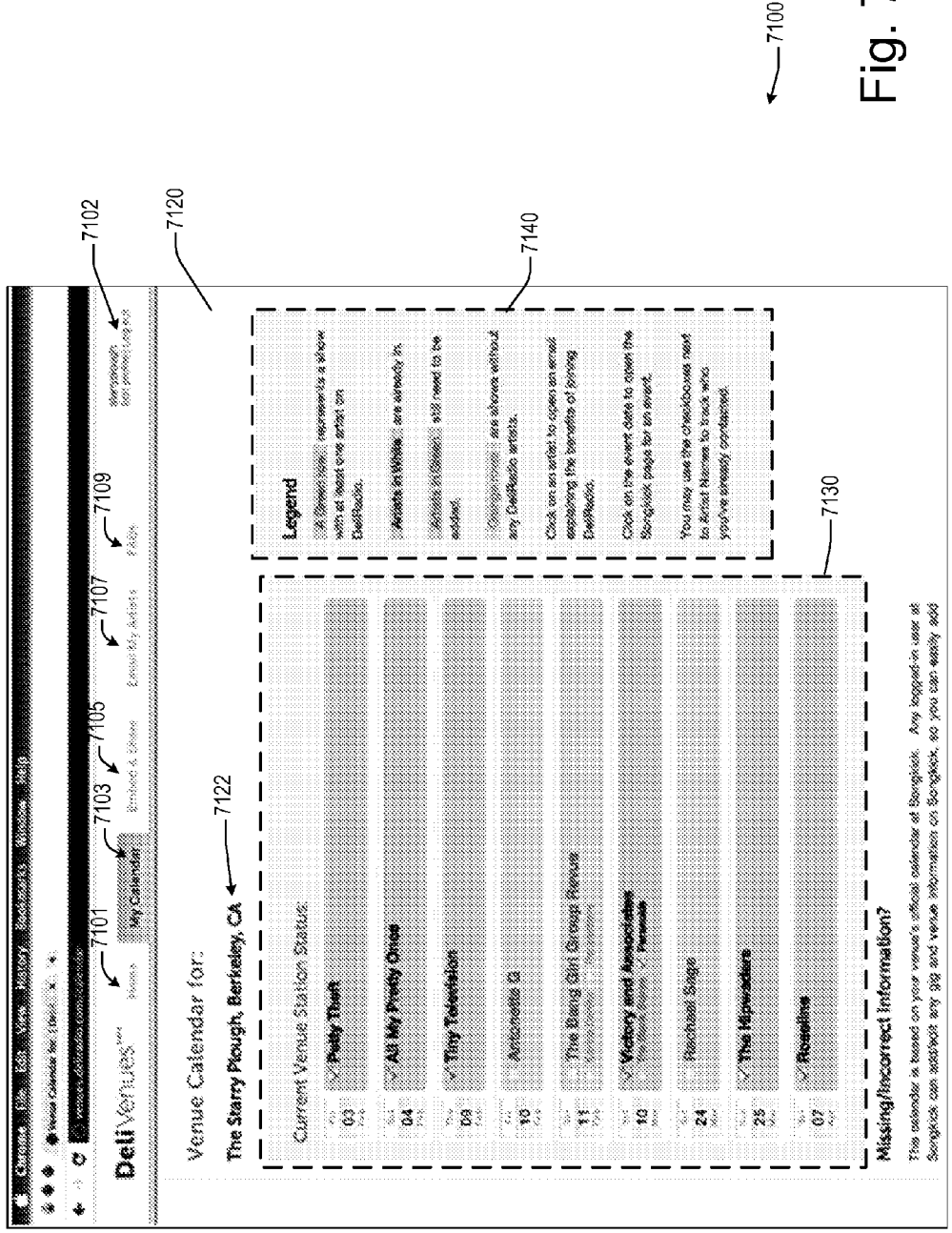

FIG. 71 shows an example screenshot of an Artist Tour GUI 7100 in accordance with a specific embodiment. In the specific example embodiment of FIG. 71, it is assumed that the user has tapped the Upcoming Gig GUI 6804 (FIG. 68), thereby causing the display of Artist Tour GUI 7100 which displays a list of upcoming tour dates for the currently playing artist (e.g., The Shants), along with the venue names and locations of upcoming gigs for that artist.

FIG. 71 shows an example screenshot of a DeliVenue(s) GUI 7100 in accordance with a specific embodiment. The specific example embodiment of FIG. 71 depicts the My Calendar Tab GUI 7103, which provides functionality for enabling a user to import upcoming show information from the currently selected venue's profile at $3^{rd}$ party venue/show information sites such as songkick.com. This information is displayed as a list of upcoming calendar dates, along with the names of the bands performing on those dates.

In the specific example embodiment of FIG. 72, it is assumed that the user has clicked the DeliRadio button 7211, thereby causing display of a GUI 7210 which presents the user with a list of options related to the currently selected track, artist, or station. In at least one embodiment, GUI 7210 may provide functionality for enabling the user to initiate or perform for one or more of the following activities (or combinations thereof): Beam this track 7212, which enables the user to pick one (or more) users from their DeliRadio System Friends and send a message with the currently playing track attached; Beam this artist 7214, which enables the user to pick one (or more) users from their DeliRadio System Friends and send a message with a link to the artist profile page for the currently selected artist attached; Beam this station 7216, which enables the user to pick one (or more) users from their DeliRadio System Friends and send a message with a link to the create station page for the currently selected station attached; Add this artist to a DeliRadio Station 7218, which enables the user to add the currently selected artist to a user-created station; etc.

In the specific example embodiment of FIG. 73 it is assumed that the user has clicked the Twitter button 7315, thereby causing display of a Twitter Share GUI 7310 may provide functionality for enabling the user to initiate or perform for one or more of the following activities (or combinations thereof): Tweet this station; Tweet this artist; Tweet this track; Tweet @ the currently selected artist; etc.

FIG. 74 shows an example screenshot of a Themeable/Brandable Player GUI 7400 in accordance with a specific embodiment. Graphics/Banners may be inserted in the DeliRadio Player GUI, with the graphic/banner including a clickable image associated with a URL designated either by DeliRadio System or a third party. In the specific example embodiment of FIG. 75, clicking on the "Wakarusa Festival" graphic 7410 could route a user to the Wakarusa website or any other website designated by DeliRadio System or the third party.

Figure 75:
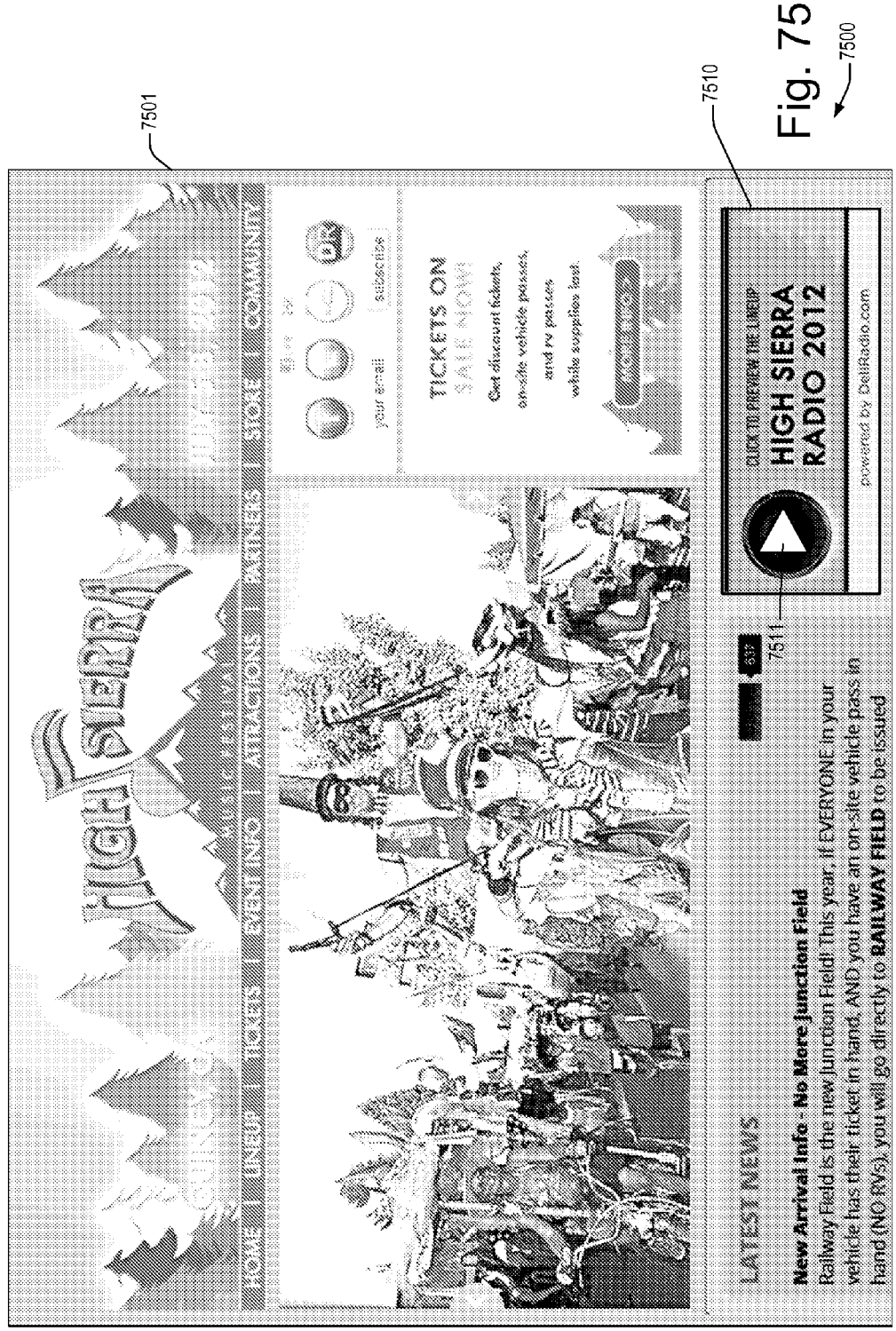
Figure 76:
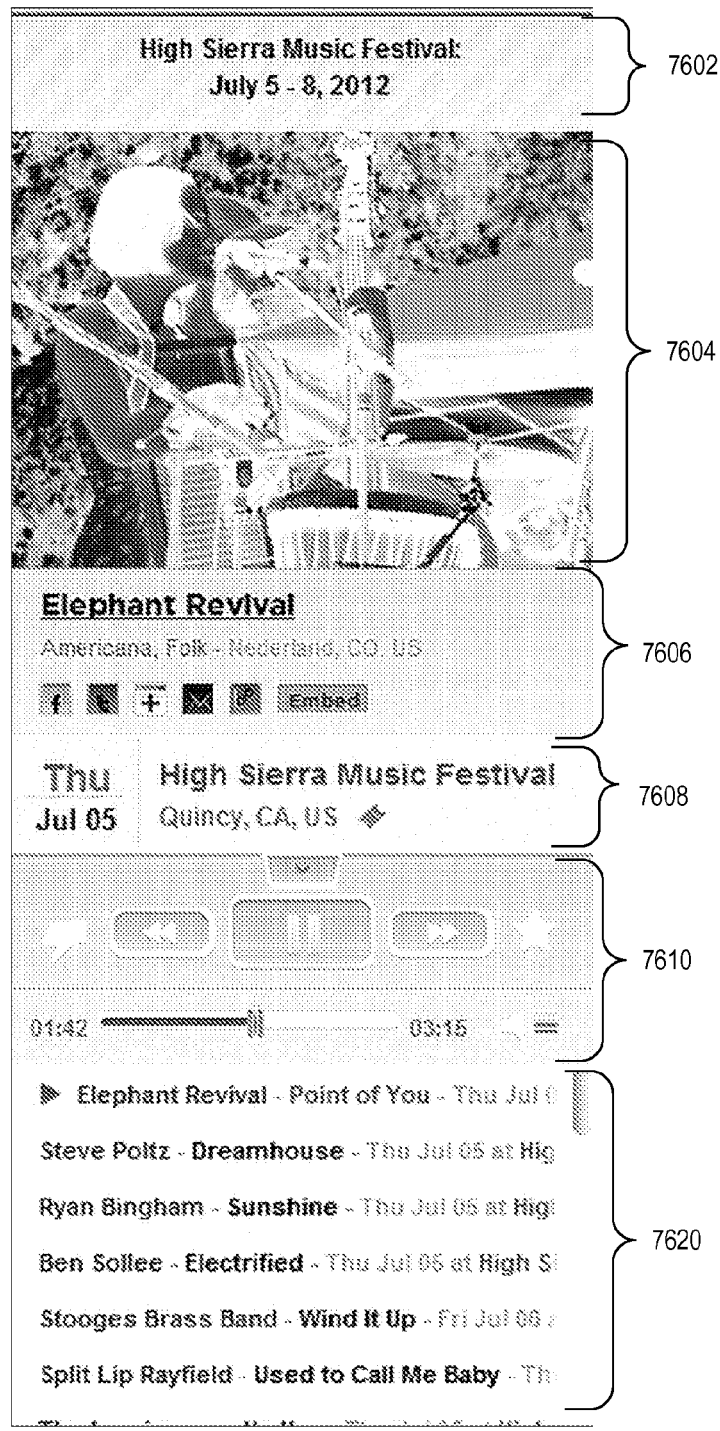

FIGS. 75 and 76 illustrate example screenshots of customizable DeliRadio Station Button GUIs and Player GUIs in accordance with a specific embodiment. In at least one embodiment, the DeliRadio System precludes functionality for providing customers. venues, and/or other third parties to embed customizable DeliRadio Station Button GUIs (e.g., 7510, FIG. 75) on external, third party websites. The customizable DeliRadio Station Button GUI may include a "Play" button (7611) for enabling visitors to the external website to play a streaming DeliRadio Station that has been created and customized for that particular website. For example, as illustrated in the example embodiment of FIG. 75, organizers of the High Sierra Music Festival may log create a customized "High Sierra Radio 6512" DeliRadio Station (e.g., via the DeliRadio System GUIs described herein) which plays songs from artists/bands that will be performing at the High Sierra Music Festival. In one embodiment, the DeliRadio System may generate and provide a set of code or script which may be used for embedding a customizable DeliRadio Station Button on one or more desired page(s) of the High Sierra Music Festival website. The embedded, customized "High Sierra Radio 2012" DeliRadio Station Button may be linked to the High Sierra Radio 6512 DeliRadio Station. Persons visiting the High Sierra Music Festival website may click on the "Play" button 7511 to listen to the High Sierra Radio 6512 DeliRadio Station, which, for example, may be streamed from the MMMS Server System. In at least one embodiment, the Custom Button Link does not stream the user's DeliRadio Station directly from a streaming widget on the third party site, but rather the Custom Button Link may be implemented as a graphic link of a "play button," specifically customized to resemble the look and feel of the third party site, and when clicked by a user, automatically opens a separate window of a customized DeliRadio Player GUI (e.g., 7600, FIG. 76) at the user's device. In at least one embodiment, the customized DeliRadio Player GUI facilitates playing of the customized DeliRadio Station at the user's device. Thus, for example, in one embodiment, the Custom Button Link serves as a "white label" solution for third parties with specific needs for a graphically customized streaming music player on their website.

DeliRadio Concert Network

In at least one embodiment, the DeliRadio Concert Network may be implemented to include a network of branded venue and festival internet radio stations. In one embodiment, each station plays music performed by (or recorded by) selected artists/bands with upcoming performances at a given venue and/or festival. The network operates on the DeliRadio System platform comprised of a database of artists, genres, performance dates and recordings.

In at least one embodiment, each venue/festival station ("Venue/Festival Station") may be configured or designed to be "branded" in various ways, such as, for example, one or more of the following (or combinations thereof):

Custom header graphic on the web Pop Out Player. When clicked—the user is directed to a URL selected by the venue/festival.

Custom "play button" graphic on the venue/festival website.

Custom header graphic within the station on the DeliRadio mobile application. When tapped—the user is directed to a URL selected by the venue/festival.

Audio station IDs—interspersed between recordings in the station.

Etc.

Genre Filtering: Listeners may filter a Venue/Festival Station by genre, such that the listener may hear artists/bands from one or more genres performing at a given venue/festival, or only selected artists/bands performing at a venue/festival which have been filtered/selected based on listener-selected genre criteria.

Audio Comments:

In at least one embodiment, one or more venue/festival stations may be configured or designed to include audio commentary/information interspersed between playback of songs. These audio clips may be grouped in different ways, such as, for example:

Audio clips associated with the venue/festival station

Audio clips associated with artists with recordings in a venue/festival station

Etc.

Venue/Festival Station Audio Comments may be implemented as audio files associated with a specific venue/festival station. According to different embodiments, the venue/festival station audio comments may include different types of content, such as, for example, one or more of the following (or combinations thereof):

Station IDs ("call-outs") for a venue/festival

Promotions for venue/festival (Artist/Performance Agnostic)

ongoing drink specials or calendar info contests

Promotions for specific shows. Note—if a show is cancelled or past, the clip may be deleted.

ticket giveaways show announcements

Reviews of past shows. Note—these may be configured to time-out after a certain period of time Local News & Weather. For example, these may be licensed from a $3^{rd}$ party, or created by DeliRadio. In one embodiment, these may be configured to time-out daily.

Artist Audio Comments are audio files associated with a specific artist. These clips may be adapted to "follow" a given artist across multiple different DeliRadio stations, including, for example, Venue/Festival Stations, Artist/Band stations, "Shows Near" stations, "Bands From" stations, Genre stations, etc. According to different embodiments, the Artist Audio Comments may include different types of content, such as, for example, one or more of the following (or combinations thereof):

Artist IDs—announcing the artist and other relevant (but station agnostic) information about the artist, such as Hometown, genre description. "Station agnostic" means the ID would be relevant in any station in which the clip was played. Performance/Ticket information for a specific show is an example of an ID that is NOT station agnostic.

Artist Interviews

Track IDs—announcing the artist & track. Note—if an artist deletes a track this clip is associated with, the clip would also be deleted.

Other Artist Editorial Content

Audio Comments Option: In one embodiment, Listeners have the ability to toggle on/off one or more of these audio comments—or just certain types of audio comments.

Creators of Audio Clips.

1. Deejays/Hosts: These are professional radio hosts with a local connection to the venue whose station they are hosting. They:

record Venue/Festival-specific audio content on behalf of the venue/festival.

curate the audio content of artists and users that gets inserted between songs.

record artist-specific audio content that follows at least one artist and is simultaneously inserted into multiple stations.

read scripts which are dynamically fed to him/her, regarding station-specific or station-agnostic information, and in the case of station-agnostic information (news, weather)—that audio would be automatically inserted into multiple stations simultaneously.

would not have control over the music played in the station (artists control which songs are played), but they may have control over the audio commentary associated with at least one station they administered/hosted.

2. Artists: Have the ability to record and upload their own audio commentary, which would be associated with themselves as an artist and/or their recordings. This audio commentary would be inserted (or available to be inserted, by a Deejay) in any station in which the artist appeared.

3. Users: Users may upload short audio commentary about a band or a track, attach that commentary to an artist or a track, and this commentary would be inserted (or available to be inserted, by a Deejay) in any station in which the artist appeared. Users providing this content may range from tastemaking bloggers to avid local concert-goers. In an alternate embodiment, users may also have the opportunity to host a Venue Radio Station for a set period of time. Users have access to one or more tracks uploaded to DeliRadio by Artists in the Venue Radio Station. Users would then have the opportunity to act as a "station programmer" by curating these tracks in the user's own preferred sequence. Other users may have the option to listen to the DeliRadio programmed version of the Venue Radio Station, or switch to a "live" version of the Venue Radio Station curated by another user. If the user-listener enters the "live" mode of the Venue Radio Station, their listening experience would automatically be synched with other "live" mode listeners, and these listeners may have the opportunity to live chat with at least one other and the user-host about the listening experience and the upcoming performances.

4. Venue Representatives: Venue representatives may upload audio commentary to be inserted in their Venue Radio Station.

5. Voice-Over Actors: DeliRadio itself may contract out audio comments to be recorded by professional voice-over actors. In one embodiment, a Venue representative may have the ability to type in the text of the audio comment, select a language for the text to be translated to, select the type of voice-over actor (male, female, type of accent, voice quality (upbeat, sensual, etc.)) and submit To enable the foregoing with regard to audio commentary, at least one commentary (deejay, artist, user) creator may have an "admin" account where they upload their commentary and associate it with a station and/or an artist.

Commenter Ratings: In addition to the ability to turn on/off audio commentary associated with a station, listeners also have the ability follow and rate commenters. For at least one station and artist—a listener is able to view a list of commenters who have available content associated with that station or artist. The listener may view the profiles of these commenters and see what stations and artists they are commenting on. The listener may thus determine which commenters to follow. If a listener follows a commenter, then that commenter's comments may play interspersed between songs in any station or artist with content associated with that commenter. If there are multiple commentators for a single artist—and the listener is following those commentators—then those comments are inserted sequentially whenever that artist is played. The commentator decides if their commentary regarding an artist or track may precedes or follows the track by that artist in the station. Thus, when they upload—they know whether to say "That was X artist/track . . . " or "Next up is X artist/track."

In at least some embodiments, the "feel" of the Venue-based DeliRadio Stations may be similar to the golden age of 1950s-70s AM/FM radio, but through the medium of internet radio and with a bit more automation. In some embodiments, the "feel" of the Venue-based DeliRadio Stations avoid a Pandora-type listening experience, which is lonely song after lonely song, continuing indefinitely. The "feel" of the Venue-based DeliRadio Stations may also avoid a Clear Channel-type listening experience, which is the nationally consolidated radio playlist model, where each station in each city sounds substantially the same. In contrast, listening to a DeliRadio Venue or Festival Station may be like listening to old school local music radio. Colorful, respected deejays with flare & dialect that reflect the local culture. Conversational but informative bits between songs, and one or more centered around the live music calendar of at least one venue and festival—with the dual aim of (1) selling tickets and (2) corralling listeners & their data for sponsors, advertisers, venues and festivals.

According to different embodiments, a Venue-based DeliRadio Station (or Event-based DeliRadio Station) may include, but are not limited to, one or more of the following aspects/features (or combinations thereof):

be branded by the venue or festival.

be sponsored by a third party—especially as certain stations start to attract high levels of listenership have station IDs identifying the station name—read by a deejay or by a band playing the venue/festival have venue promotions offered between songs—read by a deejay or by a band playing the venue/festival have 5-15 second Band Info intros or outros to songs—read by a deejay or by a band playing the venue/festival. (or give the listener the option of hearing these) (these might follow the band around from venue station to venue station as they tour)

have news, sports, weather, etc. bits inserted between songs—giving the listener the option to select which bits they want potentially be curated more broadly by a "name" deejay or music tastemaker One or more of the above-described aspects/features may be monetized, for example, by charging fees to the associated Venue(s) and/or event organizers. Listeners may add shows to their personal calendars and buy tickets directly from the venue/festival or ticket provider—straight from the app, website or car dashboard. (in the case of car dashboards—calendaring features may be available, which might also send the user an email reminder to buy tickets).

FIGS. 77-85 illustrate example screenshots of various graphical user interfaces (GUIs) which may be used to facilitate, initiate and/or perform various Venue-related and DCN-related aspects disclosed or referenced herein.

Figure 77:
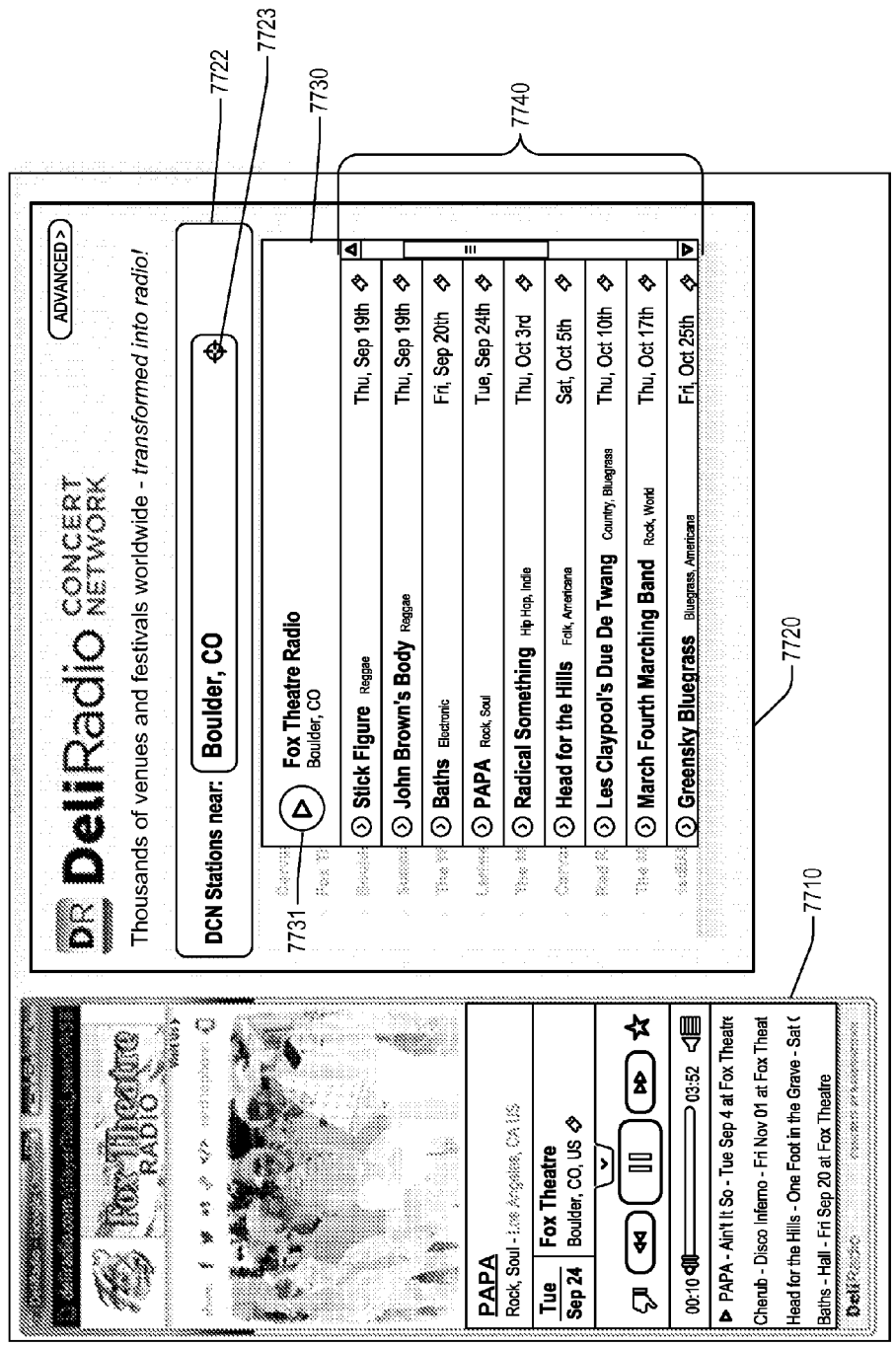

FIG. 77 shows an example embodiment of a DeliRadio Concert Network (DCN) GUI 7700. As illustrated in the example embodiment of FIG. 77, the DeliRadio Concert Network (DCN) GUI includes a Streaming Media Player GUI portion 7710, and a DCN Search & Information GUI portion 7720.

In one embodiment, when a user accesses the DCN website, they the user's geolocation maybe automatically and dynamically determined (such as, for example, based on the user's IP address, based on the location of the user's mobile device, and/or based on other geolocation determining techniques). The user may also manually enter a desired location (e.g., via input GUI portion 7722). As illustrated in the example embodiment of FIG. 77, the DeliRadio Concert Network (DCN) GUI may include functionality for enabling the user to click on a geolocate button 7723, to thereby cause the DCN server to automatically and dynamically geolocate (or re-geolocate) the user.

Figure 81:
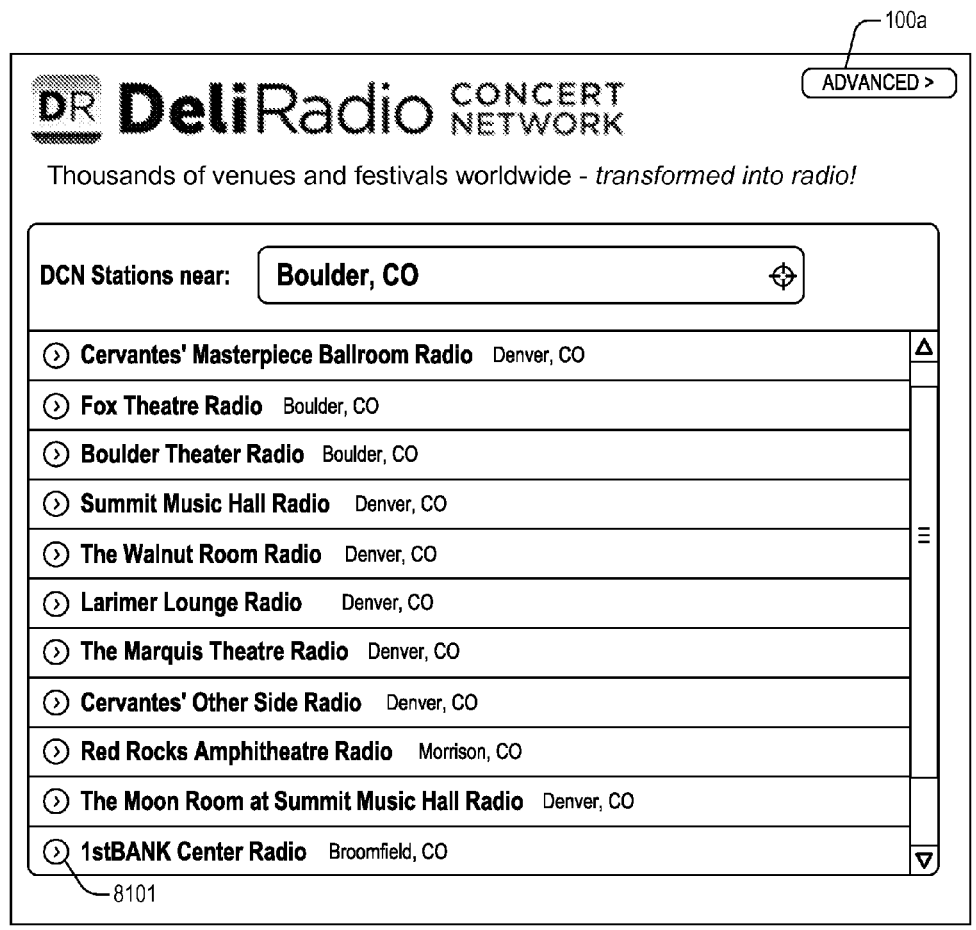

In one embodiment, once the user's location is determined, the DCN server (or MMMS System) may query its database of Radio Stations associated with Venues within a specified proximity of the user's determined location, and presents a list of these Venue-based radio stations to the user (e.g., such as that illustrated in FIG. 81).

In performing these operations, the MMMS System may use the user's geolocation to facilitate, enable, initiate, and/or perform one or more of the following operation(s), action(s), and/or feature(s) (or combinations thereof):

Identify one or more Venues within a given proximity to the user's geographic location.

Identify sets of artists/bands which are scheduled to perform at least one live music performance at each of the identified Venues.

Identify, for a given Venue, sets of songs/tracks which are performed by or recorded by artists/bands which are scheduled to perform at least one live music performance at the identified Venue.

Dynamically create, for the identified Venue, a Venue-related streaming media playlist which includes songs/tracks which are performed by or recorded by artists/ bands which are scheduled to perform at least one live music performance at the identified Venue.

The user may select one of the displayed Venue-based radio stations (e.g., Fox Theater Radio Station 7730) to view a list (e.g., 7740) of artists/bands with upcoming performances at that Venue, along with other revant information such as, for example, the date(s) of the upcoming performances, the musical genres of the performing artists, ticket icons that link to websites where the user may purchase tickets to the performances.

The user may choose to play selected tracks performed by artists/bands from the Venue Station list of artists/bands, and/or the user may choose to play the Venue-based radio station itself (e.g., by clicking on the "play" button 7731). For example, in the specific example embodiment of FIG. 77, if the user clicks on the "play" button 7731, the MMMS System may respond by initiating streaming of the Venue-related streaming media playlist (e.g., associated with the identified Fox Theatre Venue, which would include songs/tracks which are performed by or recorded by artists/bands that are scheduled to perform at least one upcoming, live music performance at the identified Venue. In some embodiments, the Venue-related streaming media playlist may also include songs/tracks which are performed by or recorded by artists/bands that have performed at least one live music performance at the identified Venue. In one embodiment, the artists may be played chronologically, beginning with artists that have the soonest upcoming perforamnces at the Venue. Alternatively, the artists may be shuffled at random or according to an algorithm within the Venue Station.

In one embodiment, when the user selects content to play, a Streaming Media Player GUI (e.g., 7710) may be opened or displayed to the user, providing the user with more information regarding the specific content they have selected, such as, for example, one or more of the following (or combinations thereof):
  artist name;
  artist musical genres;
  artist hometown;
  the day and date of the upcoming performance at the Venue;
  the location of the Venue;
  images of the artist;
  player controls for the music (play, pause, ff, rw);
  an option to "favorite" the artist or track;
  the option to "nix" the artist or track so that they/it are never played again;
  a list of the upcoming artists and tracks in the Venue Radio Station;
  etc.

The DCN GUIs and/or Streaming Media Player GUIs may include functionality for enabling the user to filter their selected Venue Radio Station by genre, such that only Artists corresponding with the user's selected genre(s) may be played.

In addition to the artist tracks in the Venue Radio Station, the user also hears audio "callouts" or "Station IDs" announcing the name of the Venue Radio Station the user is listening to as well as other Venue, Artist or Event specific information and that the Venue Radio Station is part of the DeliRadio Concert Network.

The DCN GUIs and/or Streaming Media Player GUIs may also include functionality for enabling the user to share the Venue Radio Station, the Artist or the currently playing Track via a hyperlink across social networks, in emails or SMS, or directly to another DeliRadio user as a push notification.

Figure 78:
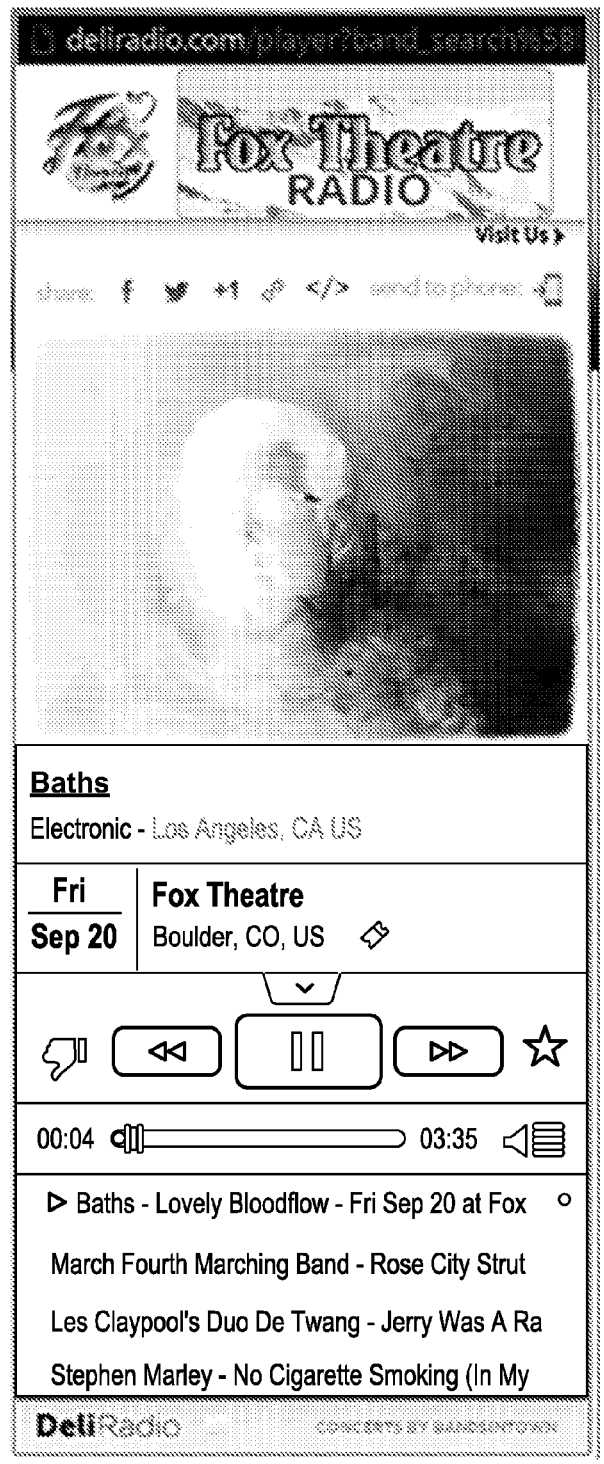

FIG. 78 shows an example embodiment of a Streaming Media Player GUI 7710.

Figure 79:
Figure 80:
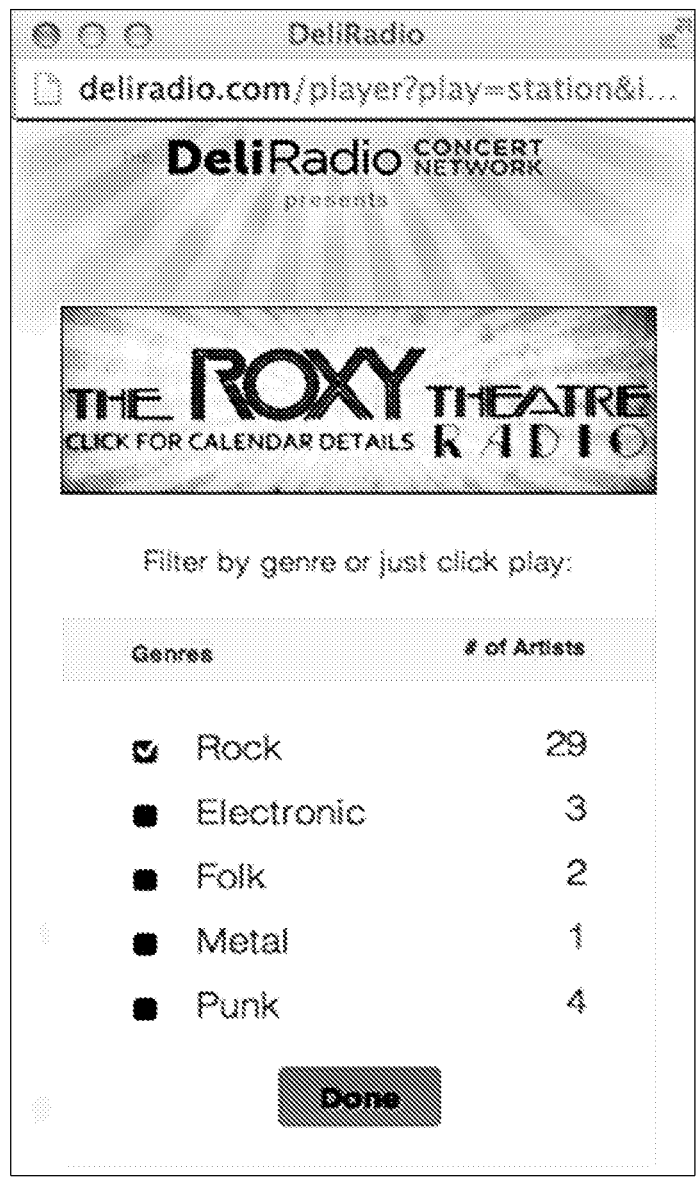

FIG. 79 shows an example embodiment of a DCN-related GUI which is configured or designed to include functionality for enabling a user to filter a Venue Radio Station by genre. The user's genre filter settings are visible at the bottom of the player, indicating how many genre-filtered Artists are in the Venue Radio Station from how many genres. In one embodiment, GUI 7900 may be configured or designed to include functionality for enabling a user to dynamically modify the user's genre selections (e.g., by clicking on the "gear" icon 7901). An example of this is illustrated in FIG. 80. As illustrated in the example embodiment of FIG. 80, when a user clicks the "gear" icon for genre filter settings on the player, a modal window appears over the player presenting genre filter settings. The modal window indicates the genres of Artists present in the Venue Radio Station and the number of Artists corresponding to each genre. The user may select or deselect certain genres of Artists, thus filtering the music content of the Venue Radio Station by genre. Once the user makes their genre selections, the modal window disappears and the user returns to the Venue Radio Station player. The results of their genre filter settings appear at the bottom of the player, as shown, for example, in FIG. 79.

FIG. 81 shows an example embodiment of a DCN Venue List GUI 8100 which is configured or designed to include functionality for displaying list of Venue-based radio stations associated with one or more Venues within a given proximity to the user's geographic location. As illustrated in the example embodiment of FIG. 81, a respective "play" button (e.g., 8101) may be displayed adjacent to each Venue entry to enable the user to quickly and easily initiate streaming of songs/tracks which are performed by or recorded by artists/bands that are scheduled to perform at least one upcoming, live music performance at the identified Venue/Venue Radio Station. As illustrated in the example embodiment of FIG. 81, the DCN Venue List GUI 8100 may also be configured or designed to include incormation relating to the location of each Venue associated with its respective Venue Radio Station. In at least one embodiment, the user may click the "Advanced" button 8103 to be taken to options to select additional controls for creating stations, including genre and proximity filters, etc.

FIG. 82 shows a specific example embodiment of a DCN Search & Information GUI 8200 (e.g., such as that illustrated at 7720 of FIG. 77). In at least one embodiment, the DCN Search & Information GUI 8200 may be configured or designed to include functionality for enabling a user to selects a Venue Radio Station, and to access additional information relating to the selected Venue Radio Station such as, for example, one or more of the following (or combinations thereof):
  information relating to artists/bands with upcoming performances at that Venue;
  information relating to the date(s) of these upcoming performances;
  information relating to the musical genres of the performing artists;
  information relating to ticket availability, including, for example, icons that link to websites where the user may purchase tickets to the performances, etc.
  etc.

Figure 83:
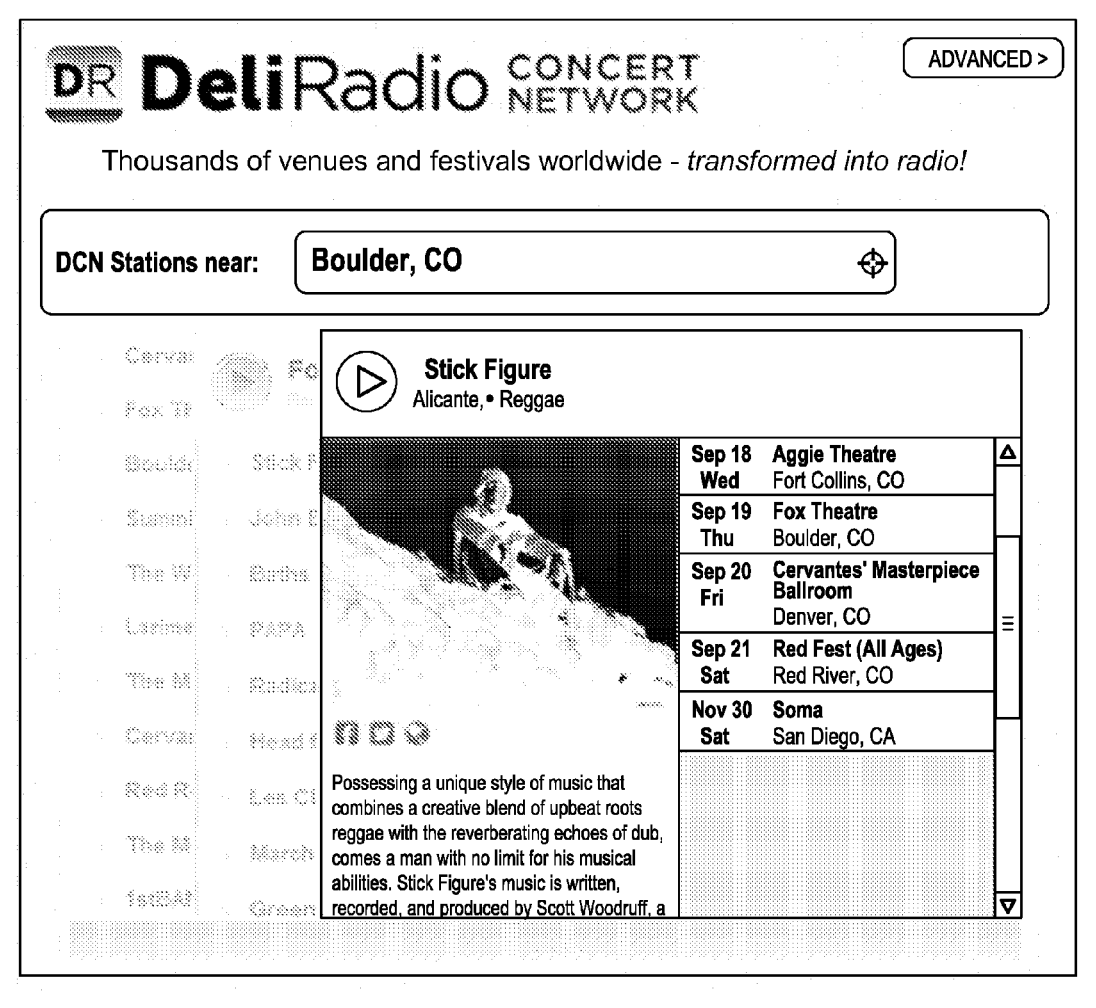

FIG. 83 shows a specific example embodiment of a DCN Artist Information GUI 8300. In one embodiment after a user has selected a Venue Radio Station to view, if the user then selects a specific Artist within the Venue Radio Station, the user is able to view more information about the selected Artist including: Artist name, hometown, genre(s), the day, date, Venue and location of upcoming performances, biographical information, photos, hyperlinks to the Artist's other internet properties, etc. In some embodiments, the user may also choose to listen to music exclusively by this Artist by clicking the "play" button.

Figure 84:
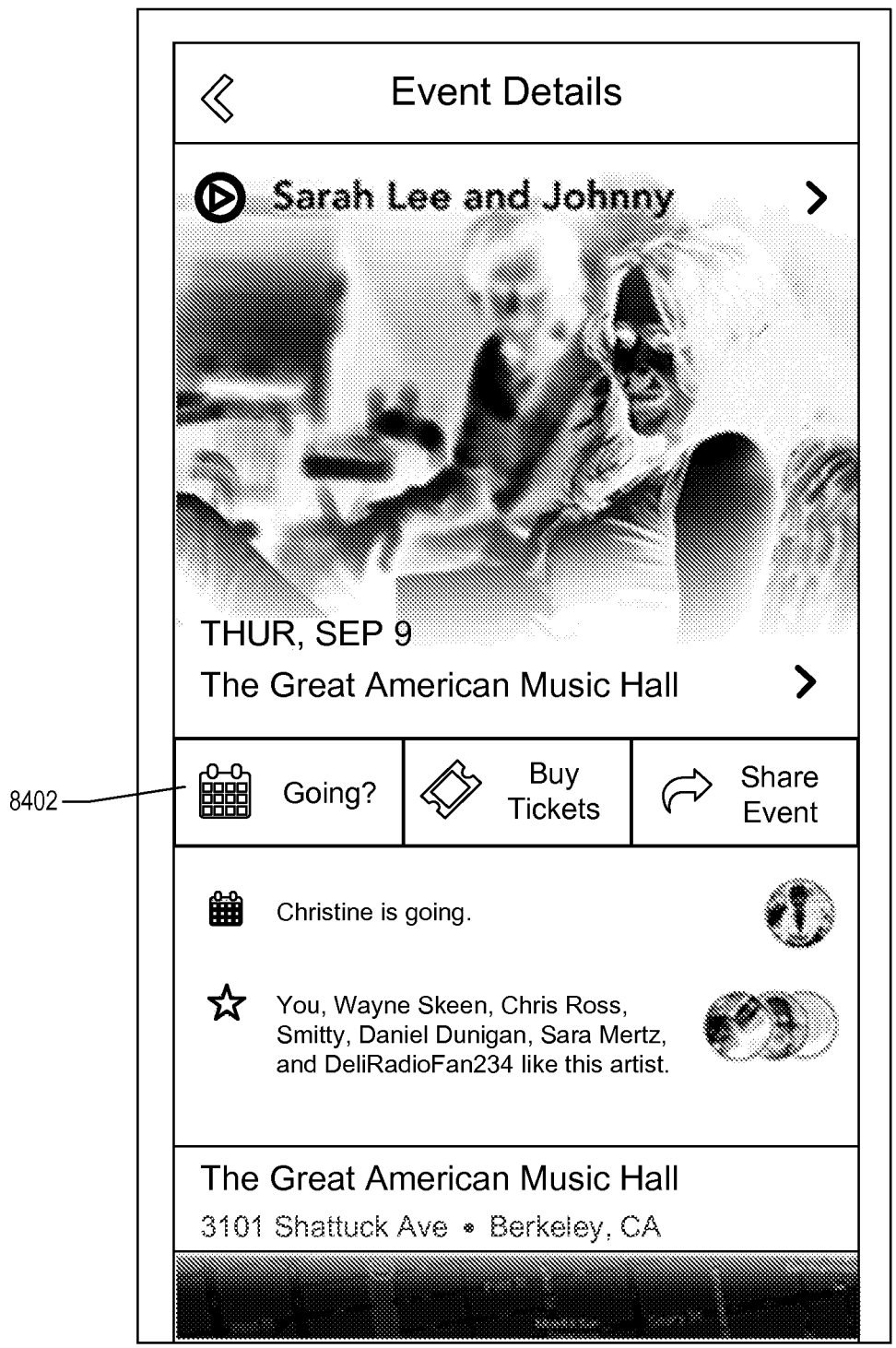
Figure 85:
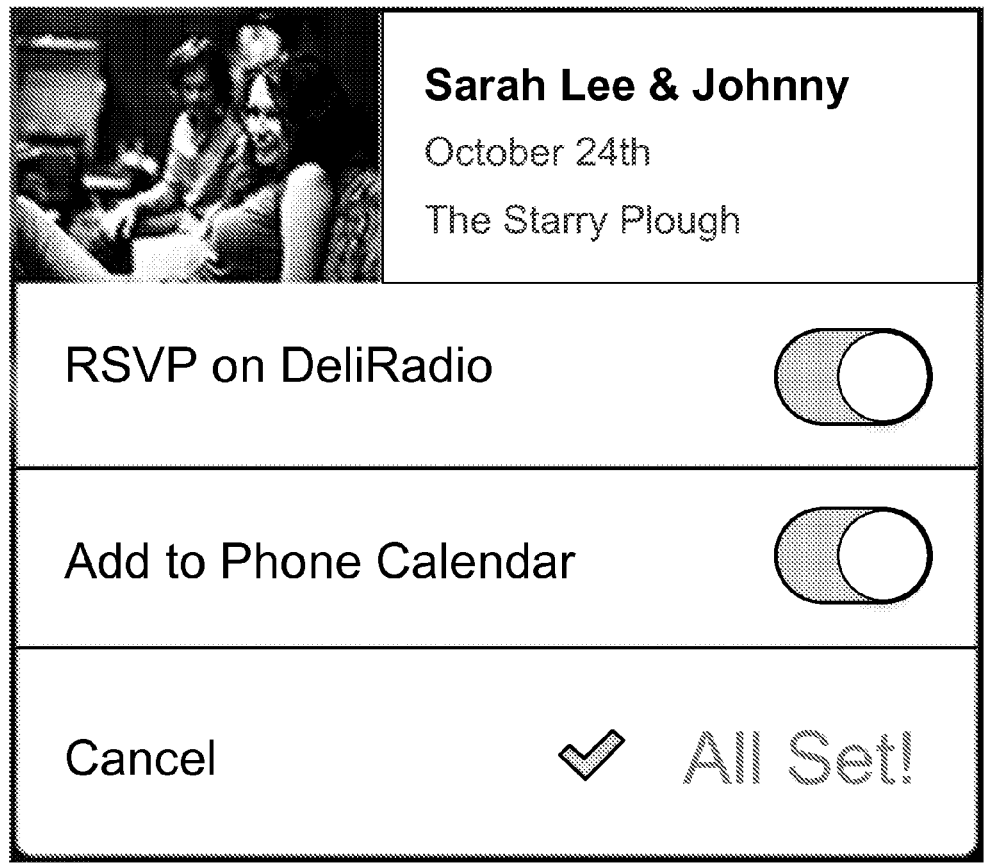

FIG. 84 shows a specific example embodiment of a DCN Event Details GUI 8400. In at least one embodiment, the DCN Event Details GUI 8400 may be configured or designed to include functionality for enabling a user to view and interact with information about a specific upcoming event, including, for example, one or more of the following (or combinations there one or more of the following (or combinations thereof):

- the name of the Artist(s) performing at the event (with the option of viewing more information about the Artist(s) or playing music by each Artist);
- the day, date and Venue of the upcoming performance (with the option of viewing a list of other Artists with upcoming performances at the Venue or playing music by Artists performing at the venue);
- the address of the Venue;
- a map showing the location of the Venue;
- the user's intent to attend the specific Event;
- a hyperlink to a website where tickets for the Event may be purchased;
- the ability to share information about this Event on the internet, via email or SMS or directly to other DeliRadio users via push notification;
- DeliRadio friends of the user who have also indicated an intent the event;
- other DeliRadio users (including the user's DeliRadio friends) who have "favorited" the Artist;
- etc.

In at least one embodiment, if the user clicks on the "Going?" icon 8402 of the DCN Event Details GUI, the user may display a DCN RSVP GUI (e.g., 8500, FIG. 85) which may be configured or designed to present one or more options regarding the user's intent to attend the Event, such as, for example, enabling the user to post (or not post) RSVP'ing on DeliRadio, adding the Event to the user's calendar or to the user's mobile device's calendar, etc.

When a user RSVP's to an Event on DeliRadio, other DeliRadio friends of the user who have also RSVP'd to the Event may receive a push notification of the user's intent to attend the Event, and the Event may also be added to the user's calendar of upcoming events within DeliRadio. In some embodiments, DeliRadio friends of the user who have favorited the Artist (but not RVSP'd to the Event) may also receive a push notification that the user has expressed an intent to attend the Event.

In one embodiment, when a user chooses to add the Event to the user's mobile device's calendar (or online calendar), the Event is automatically created in their mobile device's calendar (or online calendar), and populated with information relating to one or more of the following (or combinations thereof):

- the day, date and time of the Event;
- the Artist(s) performing at the Event;
- the Venue where the Event is scheduled to take place;
- the address of the Venue;
- a hyperlink to the DeliRadio Event Details page (e.g., if the user has synched their mobile device calendar to other cloud-based calendars (such as Google Calendar);
- other Event-related information.

Additional Aspects and Features Relating to DCN Techniques

The DeliRadio Concert Network (DCN) may be implemented as a worldwide B2B sponsorship, advertising and promotion platform built around local live music scenes. Through interactive, streaming radio, DCN engages music-lover and concert-goer demographics in targeted markets globally on behalf of brands, music venues and festivals by leveraging:

- Artist-contributed (royalty-free) content;
- Upcoming concert and ticket information; and
- Pre-existing distribution channels of music venues, festivals and their performers Target Clients & Value Proposition The DeliRadio Concert Network creates value for brands, venues and festivals through:

1. direct-to-consumer engagement;
2. geo-targeted event and brand promotion;
3. actionable analytics to increase brand awareness and target specific demographics and territories; and
4. increased product sales for brands, and increased event ticket and ancillary sales for venues/festivals.

Solution to a Market Problem

THE PROBLEM: Why is there no easy way to listen to artists with upcoming performances at local venues and festivals?

There are countless services for listeners to stream music, and there are several services for concert goers to learn of upcoming local concerts. However, music streaming applications and event promotion services have been and remain separate and rigidly focused on their respective market segments. At the same time, music venue and festival websites are largely just calendars of upcoming events, with occasional external links to performing artist websites.

THE STATUS QUO: A disjointed experience that creates unnecessary barriers for consumers to explore local concert options and to commit to purchasing tickets for those concerts. Consumers then gravitate to concerts for artists they are already familiar with, or that have been recommended by a trusted filter, or they refrain from attending concerts with any frequency.

THE SOLUTION: Using the unified experience of streaming radio, the DeliRadio Concert Network combines audio and visual content to promote music and event discovery, engagement and commerce in local communities, worldwide. The DeliRadio Concert Network's goal is to leverage this solution to serve the needs of music venues, festivals and brands globally.

DCN OVERVIEW: The DeliRadio Concert Network may be configured or designed for implementation as a complete social vertical for concert discovery and attendance, with the goal of hosting the entire conversation with one or more constituents (music lovers, artists, venues, festivals, ticketing companies, brands) around the promotion and attendance of local concerts.

- Now: DCN offers powerful, social, multilateral engagement tools between music lovers, artists, venues and festivals—one or more combined with deep, actionable analytics for the purpose of converting those fans into concert-going customers and patrons.
- Short Term: DCN is developing new interactive promotion tools and analytics to serve the relationship between brands and consumers through sponsorship of venue and festival radio stations.
- Long Term: DCN may build upon existing tools to create CRM-based loyalty programs for venues and festivals and further integrate a social ticketing experience into the platform.

A DCN Service Provider may effect or implement DCN related services via use of the MMMS System. Various examples of such DCN related services may include, but are not limited to, one or more of the following (or combinations thereof):

Branded, sponsored radio stations spinning tracks by artists with upcoming concerts near the listener, interspersed with audio venue/festival station IDs and brand-sponsored call-outs and interactive promotions, along with direct, social ticketing options for at least one event.

Embedded Streaming Player—Small to Mid-Size Venue/Festival Websites: For small and mid-size music venues (at or under 1800-attendance capacity) and music festivals (at or under 25,000 attendees) with existing streaming players on their websites—embedded streaming player on 90% of these sites worldwide. For small and mid-size venues and festivals without an existing streaming player on their websites—embedded streaming player on 75% of these sites.

Embedded Streaming Player—Major Concert Promotion Companies: Embedded streaming player for venues and festivals under the umbrella of one or more of the major concert promotion companies (e.g. AEG, Live Nation)

Complete Venue and Festival Radio Station Coverage: Implementation of viable radio stations for one or more music venue and festival in the world (approximately 6,500) within the DeliRadio Concert Network. At least one station comprised of an ongoing minimum of 5 artists and 15 tracks.

Established Network of Brand Sponsors: Development of strong sponsorship relationships with multiple brands, primarily in the media, beverage and lifestyle sectors.

Value Proposition for Venues/Festivals: DCN's value proposition for venues and festivals through analytics evidencing causal increases in overall event attendance, ticket sales and ancillary sales (food, beverage, etc.).

Value Proposition for Sponsors: DCN's value proposition for brand sponsors through analytics evidencing global impressions and opportunity-to-see for targeted demographics.

Example DCN Revenue Model(s)

Brand Sponsors: for station sponsorships and interactive consumer promotions

Venues & Festivals: for event promotion, loyalty programs and customer relationship management (CRM)

Ticketing Companies: for affiliate link sales

BRANDS: DCN's value proposition for sponsoring brands lies in its ability to drive awareness of those brands amongst targeted consumers and influencers (the festival and concert-going demographic) in targeted markets globally to increase overall sales.

Targeted Global Markets: Brand sponsors may slice, dice and bundle the world of venue and festival radio stations as they see fit to best reach their targeted audience—by city, region, country and territory.

Multi-Brand Parent Companies: Parent companies may specify which sub-brands sponsor which stations. For example, SAB/MILLER owns 84 beer and beverage brands throughout the world. SAB/MILLER's Milkwaukee's Best may sponsor one or more stations in mid-western U.S. states; Grolsch may sponsor one or more Holland stations; and Pilsner Urquell may sponsor California stations and one or more stations in Europe ex-Holland.

Multiple Touch Points: Brand sponsorship of DCN stations combines targeted brand content, a long life cycle, multi-platform availability and amplified reach through social networks and partners to ticketed and vicarious fans globally to create an unmatched consumer engagement opportunity amongst music lovers and concert-goers.

DCN's inventory for brand sponsor sales are comprised of 5 impression types:

Station Banners: Branded headers on DCN web and mobile players

In-Stream Audio: Branded audio spots between tracks in any language

Player Takeovers: Branded web and mobile player skins

Interactive Promotions: Audio and video calls to action with in-player interactive opportunities Partner Site Play Buttons: Branded station "play" button on venue and festival partner sites The impression value for Station Banners, In-Stream Audio, Player Takeovers and Interactive Promotions is based on the number of listener track streams. The impression value for Partner Site Play Buttons is based on the number of page hits for the venue/festival website where the Play Button iFrame is embedded.

VENUES & FESTIVALS: Music venues and festivals are currently DCN's primary outside distribution channel. By offering free branded radio stations with direct ticket links for thousands of venues and festivals, a core belief is that the following chain of events may take place:

Venues and festivals see increased sales at the box office and bar

DCN's metrics on listenership and ticket click-through rates prove causation for this increase.

Existing venue and festival partners increase promotion of their stations to their patrons, and new venue and festival partners begin promotion by embedding players on their websites and proliferating through their social marketing channels.

The demographic and social reach of these stations builds value for brand sponsorships.

Currently DCN's services to venues and festivals are completely free of charge, and include:
auto-generated, fully branded radio station
unlimited social sharing tools
branded station banner and "play" button graphics
free audio callouts (station IDs)
basic analytics As listenership and social engagement grow, and the relationship between DCN station promotion and increased concert ticket sales is solidified, this distribution channel may expand rapidly and in multiple territories—proving the value necessary to begin monetizing DCN's services to venues and festivals.

In some embodiments, DCN may employ a "freemium" model for music venue and festival accounts. An example implementation of these tiered services is as follows:

The Free Package may include the current offering, but limiting free audio callouts to 90 days.

The Silver Package ($79/month) may include one or more of the Free Package items, plus:
10 audio callouts quarterly for specific events
artist callouts
advanced analytics
availability of ala carte promotions (see below)

The Gold Package ($199/month) may include one or more of the Free and Silver Package items, plus:
10 audio callouts monthly for specific events
2 ala carte promotions monthly
priority support station auditing (ensuring that station artists & info is up to date) (includes outreach to artists not in DeliRadio database)

The Platinum Package ($499/month) may include one or more of the Free, Silver and Gold Package items, plus:
10 audio callouts weekly for specific events, with male/female voices for one or more event
station sponsorship availability, including sponsor audio callouts and incorporation into branded graphics
premium analytics
unlimited ala carte promotions
personalized campaign coaching
advanced station editing
$100 in customized venue station swag/giveaways (coasters, posters, stickers, etc.) at least one month Ala Carte Promotions: Paying venue/festival subscribers may also choose from a list of ala carte promotions, based on their subscription tier. These promotions may require payment over and above the monthly subscription. As DCN's technology and reach mature, the list of paid promotions available to venues and festivals may grow.
Social Engagement Campaign: $99/month. Listeners are prompted to signup, like and follow the venue on DCN's web and mobile players
Ticket Giveaways: $99/month. Custom audio callouts designed for ticket giveaways
Venue Check-In Campaigns: $99/month. Venue may onboard and have a dialog with attendees during an event
Priority Station: $99/month. Station appears top of list in a "local venues & festivals" search by a listener.

Sponsorships: By subscribing to the Platinum Package paid tier, venues and festivals may be eligible to have their stations sponsored by third party brands. A DCN Service Provider may secure sponsorships for venue and festival radio stations ahead of that in order to generate interest in this new sponsorship asset as well as to help drive listenership and analytics.

A short-term business model for festival radio sponsorship acquisition is to activate one or more multi-national, multi-brand parent company sponsor, as described above. A mid-term business model for festival and venue radio sponsorship acquisition is to offer the station free of charge to the venue or festival, allowing them or DCN to sell the sponsorship on it, with DCN receiving a variable commission depending on which party secures the sponsorship. Once the paid subscription plans for venues/festivals have been rolled out—sponsorship of the station may be predicated by the venue's or festival's enrollment in the Platinum Package. A long-term business model is to develop an automated bidding system, similar to eBay, whereby brands may place bids in real time on sponsorships for the stations of participating venues and festivals.

TICKETING COMPANIES: DCN's revenue goals with ticketing companies dovetail with the DCN Service Provider's ultimate ambitions to control its event data source.

In at least one embodiment, DCN's event data may be API-fed from data aggregator (such as, for example, Bandsintown), which may receive affiliate fees for ticket sales resulting from ticket links clicked by DCN users. In one embodiment, the DCN Service Provider may obtain its event data using direct API feeds from the major primary ticket sellers (e.g., thereby obviating the need for an event data aggregator middle man such as Bandsintown or Songkick), which may provide various advantages such as, for example, one or more of the following (or combinations thereof):

Control: DCN would obtain a greater degree of control over its concert data
Revenue: DCN would realize a new revenue stream based on primary ticket affiliate fees for tickets purchased through DCN
Analytics: DCN would receive better analytics of tickets purchased through its platform—thereby providing greater understanding of ticket purchase behavior and helping prove DCN's value to venues and festivals with regard to ticket sales DCN's may also be configured or designed to integrate a social ticketing experience into its platform. By working directly with venues, festivals and ticketing companies to help them sell anticipated unsold tickets through engagement and promotion opportunities in the DCN's radio stations, DCN would be in a position to command a higher commission on tickets sold on its platform than tickets sold on third party sites via DCN.

DCN Services

The DeliRadio Concert Network currently provides a wealth of unmatched services to music lovers, concert-goers, artists, venues, festivals, brand sponsors. Some DCN services are free and may remain so in the foreseeable future for music lovers and artists. In some embodiments, DCN may to adopt a "freemium" services model for venues and festivals, with brands paying for sponsorship opportunities.

Example DCN Services for Brand Sponsors:
Targeted Engagement:
content and branding geo-targeted to music lover and concert goer demographic
vicarious and ticketed concert goers alike
Global Scope:
network of thousands of venue, festival and city stations, worldwide
individual station sponsorships or bundled sponsorships by regions and territories in developed and emerging markets
Custom Branding:
in-stream audio spots
banner (web & mobile+partner sites)
partner site "play" buttons
player takeovers
interactive promotions & contests
Powerful Analytics:
impressions by inventory type
heat map of listeners
station plays activity (daily, weekly, monthly)
streams per user
sharing activity
Long Activation Cycle:
4-6 months before festivals
ongoing before venue events
Amplified Through Distribution Channels:
venue & festival websites and mobile apps
social sharing—performing artists, their fanbases and venue/festival patrons Example DCN Services for Venues & Festivals:
Branded Concert Promotion:
venue/festival branded radio playing artists with upcoming concerts
direct ticket links to official website—no secondary market tickets
Branded Audience Engagement:
custom audio callouts & station IDs—including listener calls to action
months of pre-event audience engagement New Sponsorship Asset:
  venue/festival set price
  long life cycle—months before the concert
  custom audio clips and graphics
  ticketed+vicarious fans, globally
  web+mobile+festival apps+car in-dash
Powerful Analytics:
  Heat map of Listeners
  Station Plays Activity (daily, weekly, monthly)
  Streams Per User
  Ticket Clicks
  Sharing Activity
  venue/festival CRM-based loyalty programs
Simple Implementation:
  dynamic station updating=no maintenance
  venue/festival web player loads via iFrame
  web player persists as users navigate venue/festival website
Multiple Distribution Channels:
  venue/festival website
  DeliRadio website
  third-party website embeds
  Facebook embeds
  social network links
  DeliRadio mobile app (iOS+Android)
  car in-dash via Satellite Radio
  festival mobile app integration via festival websites
  API for additional partner integrations
  Multiple Venues/Festivals Under Common Ownership:
  cross-promotion of events amongst stations
  bundle sponsorship sales for affiliated stations by franchise, territory and genre
Example DCN Services for Music Lovers:
  Relevant & Actionable:
    one or more streamed artists have upcoming concerts near the listener
    at least one track stream+ticket link is a potential evening out
    closest concert date to listener is displayed
    listen to venue and festival lineups as radio
    opt in for emails and push notifications to stream relevant stations
    active listening—"Would I go see this artist live?"
  Social:
    share stations/artists/tracks (Facebook, Twitter, Google+, email, SMS)
    embed stations on blogs and websites
    tweet directly at currently playing artist
    add artists/tracks to personal collection
    listen to playlist of artists starred by friends, filtered by genre and upcoming concerts)
  Lean Back:
    1-click "Quick Play" for radio of artists with upcoming concerts nearby
    2-click tune in to specific venue and festival radio stations
    dynamic stations update themselves as artist tour information changes
  Everywhere for Everyone:
    global coverage
    web+mobile+car in-dash
    unlimited listening—no subscription required
  Musical Tourism:
    search and play "shows near" or "bands from" any location
    explore music scene of cities for trip planning
    share artists performing in other cities with friends living there
DCN for Artists:
  Geo-Targeted Radio Play:
    automatic inclusion in city, venue, festival and genre stations
    music is geo-targeted to listeners in markets where artist is touring
  Powerful Analytics:
    Track Stream Activity (daily, weekly, monthly)
    Most Starred Tracks
    Most Popular Tracks
    Rotation Report (venue/festival stations)
    Top Stations spinning artist tracks
    Top Streaming Locations
    Fan Email Signups
  One-Stop Profile:
    upcoming concert dates with direct ticket links
    artist bio
    photos and videos
    track/album streams
    downloads (iTunes, Amazon, PayPal)
    social media links
    fan email list signup
    music share links
  Simple Backend Controls:
    unlimited content hosting
    automatic concert data importation, with manual entry option
    track-by-track enable for streams and downloads
    variable PayPal pricing for downloads—artist keeps 100%
    artist-controlled radio stations
Additional DCN-Related Features
  Venue/Festival Dashboards: Similar to the existing Artist Dashboards, Venue/Festival Dashboards may allow these users to view listener metrics, communicate with their upcoming performers and promote their venue/festival stations.
  API: DCN may already have the world's most extensive cache of rights-cleared music of touring artists (62,000 tracks and counting), as well as a wealth of concert information and media assets. With the API, other websites, apps and services may be able to make use of this database in non-competitive ways, potentially share revenue, and most importantly drive more artists to join DCN. One market which may to use the API are companies which make mobile apps for music festivals. Another market may serve up DCN to its network of car dashboards. Other potential partners include other automotive infotainment providers, ticketing companies, event discovery services, travel services, airlines and many more.
  New Mobile Interface
    Follower/Followee Architecture: Similar to Twitter's structure. With this architecture, when a listener streams a locally performing artist, they may instantly see who within their social circles is also a fan of that artist and that upcoming event. By knowing which friends also like the same artist and by making the event-invite process simple and social, the odds are increased that friends may purchase tickets for events.
    DCN Becomes Landing Page: Instead of the current menu-style landing page, users may immediately see names of venues and festivals, as well as a cross-venue "shows tonight" quick play option.

Artist Photos Integrated Into Landing Page: At the suggestion of Apple UI designers, we are introducing band photos alongside one or more DCN stations on the apps new landing page.

New Website Front End: DCN's existing website is being overhauled to mirror the look and feel of the forthcoming mobile app, bringing with it social functionality that has been previously unavailable on the website.

LISTENER POSITIONING: Because of the complexity of the streaming music space, DCN's positioning may be nuanced. From a revenue position, DCN is a B2B platform for venues, festivals and sponsors. However, the value of its B2B platform is ultimately dependent on the strength of the user base of engaged listeners. For this reason, one challenge is to successfully position DCN in the marketplace of user listeners.

One pillar of the listener positioning strategy is to frame the DeliRadio Concert Network as a lifestyle app and event discovery service featuring music, as opposed to a pure streaming music discovery service. Put simply, DCN may be grouped with other location-based "what to do tonight nearby" services like OpenTable (restaurants), Fandango (movies) and Yelp (nearby businesses) but using radio as the vehicle of event discovery, as opposed to pure music services like Spotify and Pandora which do little more than act as a social library for the history of recorded music.

Another positioning strategy is to use dry humor and stark juxtaposition to transform DCN's perceived weaknesses into strengths, and to transform the perceived strengths of other streaming services into weaknesses. In this vein, the now-iconic 1950s-70s Volkswagen ad campaigns ("Think Small", "Lemon", etc.) provide a touch point for the DCN Service Provider's marketing philosophy. For example:

Catalog Size: The size of DCN's content catalog is not as large as other major streaming services. However, the problem with access to 22 million songs is that the consumer is paralyzed by the tyranny of choice. At least one track streamed by a listener in DCN is imminently relevant to and actionable by that listener.

Miniscule Royalty Payments: There is much controversy over the royalty rates paid out by streaming services to artists, amounting to fractions of a penny per stream. While artists do not receive streaming royalties from DCN, they do receive a value proposition through direct access to fans, transparent analytics, guaranteed radio play with ticket links in one or more city where they perform, and 100% of download sales Curation & Algorithms: The new fad in streaming services is to combine recommendation algorithms with human "tastemaker" curators. DCN has been doing this since inception, using its state of the art technology and local venue and festival bookers to program radio stations of endless, relevant music.

One embodiment of a playlist algorithm may include (1) determining the Venue capacity of a Venue in an Artist's hometown where the Artist has an upcoming performance or has recently performed at; (2) determining the Venue capacity of a Venue in the user-listener's selected location where the same Artist has an upcoming performance; (3) expressing those two Venue capacities as a ratio, where if the Artist's hometown Venue capacity is larger than the user-listener's Venue capacity, this would be an indication that the Artist is performing near the user-listener at a smaller Venue than the Artist would normally play in their hometown, presenting an opportunity for the user-listener to attend a performance by an Artist "on the rise". This algorithm would "weight" tracks by this Artist such that these tracks get played more frequently and sooner in the playlist than other tracks. Other potential "weights" include the following information associated with an Artist in a particular station: Artist Facebook likes, Artist Twitter followers, Artist DeliRadio stars, DeliRadio stars for a particular Artist track, DeliRadio nixes for a particular Artist or Artist track, whether the Artist is performing at a Venue that the user has indicated a preference for, whether the Artist, track or Venue has been favorited/starred by DeliRadio friends of the user, beats-per-minute of at least one track in the station and any "tags" associated with an Artist provided by the Artist themselves or other users.

To complement listener marketing positioning, the DCN Service Provider may also focus on an array of distribution channels for the DCN media player in order to be available in one or more of the places where listeners listen:

Venue/Festival Websites
City Free Weekly Websites
Music and Event Blogs
Cars (e.g., via Harman Kardon's Aha Radio)
Venue/Festival Mobile Apps via Integration with App Designers (e.g., Aloompa)
Television Set-Top Boxes (Roku, Xbox)
Facebook, Twitter, Tumblr
Further Distribution via Public API Integrations
Onsite Music Festival Activations One alternate embodiment of a listener experience involves creating radio stations based around a user's mood for a particular type of outing. Using factors such as Venue capacity, genre and user-generated "mood" or "activity" tags for Artists, DeliRadio may create specific radio stations tailored for a user's desire for particular type of outing. A user would indicate the type of outing/evening they are seeking and DeliRadio would generate radio stations of Artists with upcoming events corresponding to the user's selection. For instance, "Singer/songwriters at Romantic Cafes", "Dance Party", "Headbanging Metal Shows", "Club Rock 'n Roll", "Seated Folk Shows", "All Show Options within 2 Miles", etc.

VENUE/FESTIVAL POSITIONING: According to different embodiments, various aspects of the DCN's features and services may be configured or designed to accomplish or achieve various objections for successful venue and festival B2B positioning such as, for example, one or more of the following (or combinations thereof):

A robust user base of engaged listeners generating insightful analytics
Simple, useful tools for event promotion and ticket sales
Incremental sponsorship revenue from venue and festival stations Additional Aspects and Features Relating to MMMS System Techniques Calendar, Schedule, Scene, Lineup, Upcoming are a Few Candidates.

What it is: Your own personal, shareable and playable schedule of upcoming events you're interested in.

It's a top level screen (accessible directly from the left-hand nav) that includes:
artists with local shows you've calendared +
artists you've followed with upcoming local shows
Filters Include:
location
genre
my "schedule" or "mine+my friends"

Currently, as you listen to any station in DeliRadio, you may calendar a show or follow an artist. The DeliRadio mobile application may also allow you to save events to your phone's calendar.

"My Schedule/Scene/etc." aggregates one or more of those into a top level, shareable station (which may also include the relevant shows from your friends' collections).

And it may travel with you. So if you go to Boston, just reset your location—and it automatically updates based on shows you may see in Boston. Share with your Boston friends to pick a show to go to together.

Ability to Identify And Listen To "Rising Buzzing Artists"

Identifying artists coming to your city who you may catch NOW in a smaller room because they're getting big quick.

Think: seeing the Arcade Fire play at Bottom of the Hill in SF before they blew up and started headlining the Greek Theatre in Berkeley.

In one embodiment, this may be implemented by:

1. Looking at an artist's current tour schedule. Seeing the capacity of the hometown venue they're playing (say 750 cap) and comparing it to the cap of the venue they're playing in your city (say 300 cap). Then you get a ratio—and the bigger the difference between hometown venue cap and your city's venue cap→the more likely this is a rising buzz artist you may see now before they start playing larger rooms in your city.

2. Then you may also combine this current tour data with their previous tour data of the rooms they've been playing and get a picture of how fast they're growing in general.

3. So then you may see a snapshot of where they are now and how fast they're predicted to grow in the future.

4. Collect these artists into a station based on your geographic location.

Calendaring Features

In one embodiment, the DeliRadio (DR) Mobile Application and/or DR Web Application may allow users to add a show to their phone's calendar. A link to the artist's DeliRadio station may be provided, for example, in the "Notes" section of the calendared event on the phone itself. So as you're looking at your phone's calendar—you see a calendared upcoming show. You click on that—scroll down—and there's a link you may tap, which opens the DR app and starts playing that artist. So you may remind yourself what they sound like. Buy tickets. Share with friends, etc.

In at least one embodiment, the DR Mobile App and/or DR Web App may be configured or designed to include functionality for enabling users to manage their "push" settings to their personal calendars. For example, in one embodiment, a new "DeliRadio" calendar is created in either Apple's world or Google's world, which shows up in the user's master calendar (iCal)(G-Cal). Like one or more of the user's calendars (personal, spouse's, work, etc.)—this new calendar may be toggled on/off. When toggled on—events in that calendar are shown on the master calendar.

In DR Settings (mobile/web)—the user may have the choice of what shows up in that DeliRadio calendar within their iCal or G-Cal. Their own RSVPs to shows. Their DeliRadio friends' RSVPs to shows. Any DeliRadio artist they've starred who has an upcoming show near the location the user has marked as their "hometown." Etc.

Event notifications at this point may come from the user's web/phone calendar—instead of DeliRadio. Which may be good in terms of avoiding Push Notification Saturation.

Additional calendaring related features/aspects may include, but are not limited to, one or more of the following (or combinations thereof):

One of the biggest hurdles to seeing live music is scheduling. This creates a "lean back" scheduling functionality. Taking simple actions within the app (starring a band) (RSVPing to a show) or even taking no actions (friends starring a band or RSVPing to a show) automatically puts events on your calendar.

Its optional—so if people feel this would clutter their calendar, they don't have to use it.

Integrate DR functionality in the places people already go. This may include personal calendars on third party platforms.

In some embodiments, the DR Mobile/Web App may be configured or designed to include functionality for enabling a user to play various filtered iterations of relevant artists. Artists you've starred—filtered by genre—filtered by upcoming shows. Artists you AND your friends have starred—filtered by genre—filtered by upcoming shows. Artists whose shows you've RSVP'd to. Etc.

In the "Calendar Settings" of the DR Mobile/Web App→whatever toggles you've set for the kinds of events that get pushed to your outside (iCal/gCal) calendar→you would be able to play that as a station as well.

So, for example, if you've set your Calendar Settings to push events to your outside calendar for:
artists you've starred
artists whose upcoming shows you've RSVPd to
artists whose upcoming shows your DeliRadio friends have RSVP'd to
You'd be able to play THAT as a station—filtered by genre if you wanted.

Band to Band Callouts

IDEA: The Band-to-Band Callout page would live in the DR Artist Dashboard. A logged-in DR band would be able to record (themselves) short audio callouts "talking up"/recommending another DR band. These callouts would then be "attached" to the recommended band—and would follow them into any station in which that band was played: Artist Station, Venue Stations, City Stations. They may precede or follow the track by the recommended artist.

CALLOUT EXAMPLE: "This is Adam Duritz from the Counting Crows. I first saw Mobley play in 2012 in Minneapolis and their sound really just blew me away. Do not miss a chance to see them live!"

[CUE MOBLEY TRACK]

Flow Example A:

1. Artist A records introduction/recommendation for Artist B from their laptop, mobile phone or other recording device
2. Artist B receives a notification that Artist A has recorded a recommendation for them
3. Artist B has the opportunity to listen to Artist A's Callout
4. Artist B has the opportunity to approve or block Artist A's Callout
5. If Artist B approves (or does not block) Artist A's Callout—Artist A's Callout is inserted into:
    Artist B's Station
    City Stations spinning Artist B
6. If Artist B approves (or does not block) Artist A's Callout AND if Artist A's Callout would be inserted into any Venue Stations spinning Artist B, then . . . .
    relevant Venues would receive a notification that Artist A has recorded a recommendation for Artist B that would be inserted into Venue's station
    Venue has the opportunity to listen to Artist A's Callout
    Venue has the opportunity to approve or block Artist A's Callout
7. If any Venue approves (or does not block) Artist A's Callout—Artist A's Callout is inserted into that Venue Station 8. Artist A, Artist B and Venues receive notifications when Artist A's Callout goes live
   Artist A and Artist B receive "Callout Rotation Reports" listing one or more stations in which the Callout is live
   Artist B's Station
   Venue Stations
   City Stations
9. Once Artist A's Callout is live in any station→a Listener to that station may not hear Artist A's Callout unless Listener has starred Artist A.
10. Once a Listener has starred Artist A→Listener may hear any Callout by Artist A for any band in DeliRadio in any station—provided Artist A's Callout has been approved by Artist B and any relevant Venues Flow Example B:
Diego's Umbrella records a callout about Forrest Day
Forrest Day approves the callout for one or more stations.
Forrest Day has an upcoming show at Slims.
Slims approves the callout for its Venue Station
Howie Listener has starred Diego's Umbrella
Howie is listening to Slims Station (or SF Station) (or Forrest Day Station)
Howie hears Diego's Umbrella's callout recommending Forrest
   ARTIST DASHBOARD CALLOUTS PAGE: needs to include . . . .
Recommended Artist Field:
   type in artist name being recommended/introduced
   autofill to ensure that artist is in DR
   if no in DR—link to "Invite Bands" section of Dashboard
Format Guidelines:
   duration
   things to say: my band name. other band name. promote their live show.
Record Button:
   button that looks like a microphone
   press it to begin recording on laptop
PlayBack Button:
   listen to the recording just created
   "use this?"
   "try again?"
Upload Button:
   button to upload pre-recorded artist callout
Callout Rotation Report:
   list of stations (Artist, Venue, City) that submitted & approved callout may go into
   NOTE: this may come in the form of an auto-email to Artist A+Artist B→once Artist B and Venues have approved (or not blocked) the callout
Callout Terms of Service:
   check box: You agree that by submitting this callout that DR owns the recording and you hereby license the use of your name in association with this Callout
   (NOTE: when Artist B approves (or doesn't block) the Callout→they may also approve the use of their name in association with the Callout)
Notify Me When Callout Goes Live:
   checkbox
   field to enter email address? (this may not be necessary—if we have their email address associated with their account)
Artist & Venue Notifications:
Artist B gets a notification of Artist A's Callout of them. If they approve (or don't block) . . . .
Venues get notification of Artist A's Callout of Artist B (who is in Venue Station).
   Artist A+Artist B+Venues get notification when Callout goes live
   "Listen to Station?"
   "Share?"
Callouts on Artist Profiles:
   If an artist has received callouts (e.g., introductions/recommendations) from other bands→those may be viewed & listened to on that artist's profile
   If the Listener has not starred a band who has done a Callout for the Artist whose profile page they're viewing→the Listener may star those bands here in order to start hearing callouts by those bands.
   The Listener may also click through to the profiles of Artist B, C & D who provided Callouts for Artist A. On those profiles—they may see the artists who have provided Callouts for Artists B, C, D, etc.
Outreach:
Because we are not restricted by copyright issues around the recordings→Artist Outreach for Callouts transcend the politics around labels, publishers, etc.
Any artist may record a callout for any other artist
If the artist called-out isn't in DeliRadio→we may outreach to them
   "You were recommended by X Band but you're not in DeliRadio. Come join!"
   (similar to emails you get from LinkedIn)

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

It is claimed:

1. A computer implemented method for facilitating user access to streamed multimedia content via a computer network, the method comprising:
   determining a first set of filter criteria for use in performing a database search for music-related information matching the first set of filter criteria, wherein the first set of filter criteria includes first venue filter criteria specifying a first venue;
   identifying a first set of artists or bands ("artists/bands") that are scheduled to perform at least one live music performance at the first venue;
   identifying, using the identified first set of artists/bands, a first set of media content performed by or recorded by at least one of the artists/bands of the first set of artists/bands;
   dynamically creating, using the first set of media content, a filtered streaming media playlist, wherein the filtered streaming media playlist includes a first portion of selected media content from the identified first set of first set of media content; and
   generating, using information relating to the filtered streaming media playlist, a first set of instructions for causing a streaming media graphical user interface ("Streaming Media GUI") to be displayed at an end user's device, wherein the first set of instructions include instructions for configuring the Streaming Media GUI to enable an end user to initiate, via interaction with the Streaming Media GUI, a streamed playback of one or more of the first portion of selected media content associated with the filtered streaming media playlist.

2. The method claim 1 further comprising:
dynamically creating, using the first set of media content, a first venue-related streaming media station, wherein the first venue-related streaming media station is configured to stream songs/tracks from the first set of media content to the end user's electronic device for audio presentation at the end user's electronic device;
receiving a first set of input from the first user, the first set of input including the first venue filter criteria, and including a first request to initiate play of the first venue-related streaming media station at the first end user's electronic device; and
streaming, in response to the first request, media content from the first set of media content to a end user's electronic device for playback at the end user's electronic device.

3. The method of claim 1 further comprising:
receiving a first set of input from the first user, the first set of input including the first venue filter criteria, and including genre criteria specifying a first genre;
identifying, using the first genre criteria, a second set of media content from the at least one database which match the first genre criteria and which are performed by or recorded by at least one of the artists/bands of the first set of artists/bands; and
dynamically creating, using the second set of media content, a filtered venue-related streaming media station, wherein the filtered venue-related streaming media station is configured to stream media content from the second set of media content to the end user's electronic device.

4. The method of claim 1 further comprising:
receiving a first set of input from the first user, the first set of input including the first venue filter criteria, and including timeframe criteria specifying a first time interval;
identifying a second set of artists or bands ("artists/bands") that are scheduled to perform in at least one live music performance at the first venue during the first time interval; and
performing, using the second set of artists/bands, a database search of at least one database for media content performed by or recorded by at least one of the artists/bands of the second set of artists/bands; and
identifying a second set of media content from the at least one database performed by or recorded by at least one of the artists/bands of the second set of artists/bands;
dynamically creating, using the second set of media content, a filtered venue-related streaming media station, wherein the filtered venue-related streaming media station is configured to stream media content from the second set of media content to the end user's electronic device.

5. The method of claim 1 further comprising:
receiving a first set of input from the first user, the first set of input including the first venue filter criteria, the first set of input further including genre criteria specifying a first genre, and further including timeframe criteria specifying a first time interval;
identifying a second set of artists or bands ("artists/bands") that are scheduled to perform in at least one live music performance at the first venue during the first time interval; and
performing, using the second set of artists/bands, a database search of at least one database for media content performed by or recorded by at least one of the artists/bands of the second set of artists/bands;
identifying, using the first genre criteria, a second set of media content from the at least one database which match the first genre criteria and which are performed by or recorded by at least one of the artists/bands of the first set of artists/bands; and
dynamically creating, using the second set of media content, a filtered venue-related streaming media station, wherein the filtered venue-related streaming media station is configured to stream media content from the second set of media content to the end user's electronic device.

6. The method of claim 1 further comprising:
dynamically creating, using the first set of media content, a filtered venue-related streaming media station, wherein the filtered venue-related streaming media station includes only media content from the first set of media content.

7. The method of claim 1 further comprising:
identifying a second set of artists or bands ("artists/bands") that are scheduled to perform at least one live music performance at the first venue;
identifying, using the identified second set of artists/bands, a second set of media content performed by or recorded by at least one of the artists/bands of the second set of artists/bands;
dynamically creating, using the second set of media content, a second filtered streaming media playlist, wherein the second filtered streaming media playlist includes a second portion of selected media content from the identified second set of second set of media content; and
generating, using information relating to the second filtered streaming media playlist, a second set of instructions for configuring the Streaming Media GUI to enable the end user to initiate, via interaction with the Streaming Media GUI, a streamed playback of one or more of the second portion of selected media content associated with the second filtered streaming media playlist.

8. The method of claim 1 further comprising:
dynamically creating, using the first set of media content, a first venue-related streaming media station, wherein the first venue-related streaming media station is configured to stream songs/tracks from the first set of media content to the end user's electronic device for audio presentation at the end user's electronic device;
identifying a second set of artists/bands that have performed at least one live music performance at the first venue;
performing, using the second set of artists/bands, a database search of at least one database for media content performed by or recorded by at least one of the artists/bands of the second set of artists/bands;
identifying a second set of media content from the at least one database performed by or recorded by at least one of the artists/bands of the second set of artists/bands; and
dynamically creating, using the second set of media content, a second venue-related streaming media station, wherein the second venue-related streaming media station is configured to stream songs/tracks from the second set of media content to the end user's electronic device for audio presentation at the end user's electronic device.

9. The method of claim 1 wherein the first venue corresponds to a first physical venue live music performances are hosted.

10. The method of claim 1 wherein the first venue corresponds to a first festival where live music performances are hosted.

11. The method of claim 1 wherein the first venue corresponds to a first virtual venue which hosts live music performances.

12. A computer implemented system for facilitating user access to streamed multimedia content via a computer network, the system comprising:
- at least one processor;
- at least one interface operable to provide a communication link to at least one network device;
- memory;
- the at least one processor being operable to execute the plurality of instructions stored in the memory, and being operable to operate with the memory and the at least one interface for:
- determining a first set of filter criteria for use in performing a database search for music-related information matching the first set of filter criteria, wherein the first set of filter criteria includes first venue filter criteria specifying a first venue;
- identifying a first set of artists or bands ("artists/bands") that are scheduled to perform iii at least one live music performance at the first venue;
- identifying, using the identified first set of artists/bands, a first set of media content performed by or recorded by at least one of the artists/bands of the first set of artists/bands;
- dynamically creating, using the first set of media content, a filtered streaming media playlist, wherein the filtered streaming media playlist includes a first portion of selected media content from the identified first set of first set of media content; and
- generating, using information relating to the filtered streaming media playlist, a first set of instructions for causing a streaming media graphical user interface ("Streaming Media GUI") to be displayed at an end user's device, wherein the first set of instructions include instructions for configuring the Streaming Media GUI to enable an end user to initiate, via interaction with the Streaming Media GUI, a streamed playback of one or more of the first portion of selected media content associated with the filtered streaming media playlist.

13. The computer implemented method of claim 1 wherein the first set of media content includes audio content relating to at least one song or track performed by or recorded by at least one of the artists/bands of the first set of artists/bands.

14. The computer implemented method of claim 1 wherein the first set of media content includes video content relating to at least one video performed by or recorded by at least one of the artists/bands of the first set of artists/bands.

15. A computer implemented method for facilitating electronic commerce via a computer network, the method comprising causing at least one processor to execute a plurality of instructions for:
- determining a first set of filter criteria for use in performing a database search for music-related information matching the first set of filter criteria, the first set of filter criteria including geolocation filter criteria indicating a first geographic region;
- identifying, using the geolocation filter criteria, a first set of artists or bands ("artists/bands") that are scheduled to perform at least one live performance within the first geographic region;
- identifying, using the identified first set of artists or bands, a first set of media content performed by or recorded by at least one of the artists/bands of the first set of artists/bands;
- dynamically creating, using the filtered set of media content, a filtered streaming media playlist, wherein the filtered streaming media playlist includes a first portion of selected media content from the identified filtered set of media content; and
- generating, using information relating to the filtered streaming media playlist, a first set of instructions for causing a streaming media graphical user interface ("Streaming Media GUI") to be displayed at an end user's device, wherein the first set of instructions include instructions for configuring the Streaming Media GUI to enable an end user to initiate, via interaction with the Streaming Media GUI, a streamed playback of one or more of the first portion of selected media content associated with the streaming media playlist.

16. The computer implemented method of claim 15 wherein the first set of media content includes audio content relating to at least one song or track performed by or recorded by at least one of the artists/bands of the first set of artists/bands.

17. The computer implemented method of claim 15 wherein the first set of media content includes video content relating to at least one video performed by or recorded by at least one of the artists/bands of the first set of artists/bands.

18. The computer implemented method of claim 15 further comprising causing the at least one processor to execute additional instructions for:
- streaming media content of the first set of media content to the end user's electronic device.

19. The computer implemented method of claim 15 further comprising causing the at least one processor to execute additional instructions for:
- automatically and dynamically determining the geolocation filter criteria based on a geographic location associated with the end user.

20. The computer implemented method of claim 15 wherein the filtered set of media content includes audio content relating to at least one song or track performed by or recorded by at least one of the artists/bands of the first set of artists/bands.

* * * * *